US012033471B2

(12) United States Patent
Thomas et al.

(10) Patent No.: US 12,033,471 B2
(45) Date of Patent: *Jul. 9, 2024

(54) STICKY WILDS FEATURE FOR TOURNAMENT GAMING FOR ELECTRONIC GAMING MACHINES AND OTHER COMPUTING DEVICES

(71) Applicant: Aristocrat Technologies, Inc., Las Vegas, NV (US)

(72) Inventors: Alfred Thomas, Ventura, CA (US); Joseph Masinter, II, Las Vegas, NV (US); Scott Burns, Las Vegas, NV (US); Larry Pacey, Calabasas, CA (US)

(73) Assignee: Aristocrat Technologies, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/181,484

(22) Filed: Mar. 9, 2023

(65) Prior Publication Data

US 2023/0206726 A1 Jun. 29, 2023

Related U.S. Application Data

(63) Continuation of application No. 16/946,114, filed on Jun. 5, 2020, now Pat. No. 11,636,735.

(60) Provisional application No. 62/913,684, filed on Oct. 10, 2019, provisional application No. 62/884,072, filed on Aug. 7, 2019.

(51) Int. Cl.

*G07F 17/32* (2006.01)
*G07F 17/34* (2006.01)

(52) U.S. Cl.

CPC ...... *G07F 17/3265* (2013.01); *G07F 17/3213* (2013.01); *G07F 17/34* (2013.01)

(58) Field of Classification Search

CPC ............. G07F 17/3265; G07F 17/3213; G07F 17/34

See application file for complete search history.

(56) References Cited

U.S. PATENT DOCUMENTS

| | | | |
|---|---|---|---|
| D259,499 | S | 6/1981 | Dunham |
| 5,342,518 | A | 8/1994 | Posner |

(Continued)

FOREIGN PATENT DOCUMENTS

| | | | |
|---|---|---|---|
| AU | 630112 B | 3/1993 | |
| AU | 1997022551 A1 | 8/1997 | |

(Continued)

OTHER PUBLICATIONS

Legato, Frank, "Tourney Time", Global Gaming Business Magazine, Mar. 22, 2019, retrieved from internet on Oct. 7, 2019, https://ggbmagazine.com/article/tourney-time/, 20 pages.

(Continued)

*Primary Examiner* — Dmitry Suhol
*Assistant Examiner* — Jason Pinheiro
(74) *Attorney, Agent, or Firm* — Weaver Austin Villeneuve & Sampson LLP

(57) ABSTRACT

Systems and techniques for providing time-based sticky wild features for use in multiplayer gaming tournaments are disclosed, including various mechanisms and techniques for distributing sticky wild patterns for use in provisioning such sticky wild features.

20 Claims, 51 Drawing Sheets

(56) References Cited

U.S. PATENT DOCUMENTS 5,560,603 A 10/1996 Seelig
5,664,998 A 9/1997 Seelig
5,755,621 A 5/1998 Marks
5,767,854 A 6/1998 Anwar
5,779,242 A 7/1998 Kaufmann
5,779,549 A 7/1998 Walker
6,039,648 A 3/2000 Guinn
6,082,887 A 7/2000 Feuer
6,093,100 A 7/2000 Singer
6,210,275 B1 4/2001 Olsen
6,224,486 B1 5/2001 Walker
6,270,412 B1 8/2001 Crawford
6,287,202 B1 9/2001 Pascal
6,293,865 B1 9/2001 Kelly
6,309,299 B1 10/2001 Weiss
6,354,592 B1 3/2002 Virzi
6,425,828 B2 7/2002 Walker
6,620,045 B2 9/2003 Berman
D492,692 S 7/2004 Fallon
6,817,948 B2 11/2004 Pascal
D499,786 S 12/2004 Dropo
6,908,390 B2 6/2005 Nguyen
7,354,345 B2 4/2008 Bortnik
7,393,280 B2 7/2008 Cannon
7,516,959 B2 4/2009 Huard
D605,725 S 12/2009 Chang
7,682,251 B2 3/2010 Bortnik
7,684,874 B2 3/2010 Schlottmann
7,684,882 B2 3/2010 Baerlocher
7,689,302 B2 3/2010 Schlottmann
7,690,996 B2 4/2010 Iddings
7,704,144 B2 4/2010 Abbott
7,753,790 B2 7/2010 Nguyen
7,780,520 B2 8/2010 Baerlocher
7,787,972 B2 8/2010 Schlottmann
7,798,901 B2 9/2010 Nguyen
7,824,267 B2 11/2010 Cannon
7,878,899 B2 2/2011 Duhamel
7,972,209 B2 7/2011 Kelly
7,976,389 B2 7/2011 Cannon
8,002,630 B2 8/2011 Nguyen
8,021,230 B2 9/2011 Baerlocher
8,043,157 B2 10/2011 Cannon
8,070,583 B2 12/2011 Baerlocher
8,092,309 B2 1/2012 Bickley
8,142,272 B2 3/2012 Walker
8,157,647 B2 4/2012 House
8,192,270 B2 6/2012 Slomiany
8,202,165 B2 6/2012 Duhamel
8,246,434 B2 8/2012 Moody
8,246,439 B2 8/2012 Kelly
8,277,298 B2 10/2012 Mace
8,313,372 B2 11/2012 Naicker
8,317,620 B2 11/2012 Kelly
8,342,957 B2 1/2013 Carpenter
8,382,572 B2 2/2013 Hoffman
8,419,520 B2 4/2013 Johnson
8,419,546 B2 4/2013 Decasa
8,430,736 B2 4/2013 Cannon
8,439,733 B2 5/2013 Kay
8,449,386 B2 5/2013 Englman
8,465,363 B1 6/2013 Mayeroff
8,469,788 B2 6/2013 Carpenter
8,485,892 B2 7/2013 Nguyen
8,506,394 B2 8/2013 Kelly
8,512,119 B2 8/2013 Kelly
8,523,682 B2 9/2013 Bickley
8,540,577 B2 9/2013 Shvili
8,562,418 B2 10/2013 Gomez
8,585,481 B2 11/2013 Owen
8,585,494 B2 11/2013 Parrinello
8,591,338 B2 11/2013 Nguyen
D694,773 S 12/2013 Sakaguchi
D695,778 S 12/2013 Edwards
8,602,877 B2 12/2013 Carpenter
8,613,650 B2 12/2013 Kovacs
8,622,793 B2 1/2014 Ford
8,622,817 B2 1/2014 Englman
8,641,507 B2 2/2014 Kelly
8,641,515 B2 2/2014 Nicely
8,684,830 B1 4/2014 Chun
8,690,661 B2 4/2014 Cannon
8,702,499 B2 4/2014 Johnson
8,702,520 B2 4/2014 Seelig
8,715,051 B2 5/2014 Davis
8,715,052 B2 5/2014 Bennett
8,715,069 B2 5/2014 Arnone
8,721,421 B2 5/2014 Tempest
8,734,232 B2 5/2014 Bunch
D706,808 S 6/2014 Edwards
D710,372 S 8/2014 Dellinger
8,801,518 B2 8/2014 Lipscomb
8,808,077 B1 8/2014 Chun
8,840,462 B2 9/2014 Patel
8,851,980 B2 10/2014 Versaci
8,851,981 B2 10/2014 Ramsey
8,852,001 B2 10/2014 Kelly
8,870,659 B2 10/2014 House
8,894,480 B2 11/2014 Johnson
8,905,841 B2 12/2014 Carpenter
9,005,010 B2 4/2015 Watkins
9,011,241 B2 4/2015 Kelly
D730,373 S 5/2015 Clement
9,022,867 B2 5/2015 Kelly
9,033,786 B2 5/2015 Kelly
D732,054 S 6/2015 Yoneda
9,070,255 B2 6/2015 Christensen
9,111,416 B2 8/2015 Cannon
9,123,208 B2 9/2015 Davis
9,123,210 B2 9/2015 Bennett
D741,897 S 10/2015 Wilkinson
9,155,968 B2 10/2015 Hedrick
9,159,198 B2 10/2015 Moshal
9,165,429 B2 10/2015 Cannon
9,165,430 B2 10/2015 Bickley
9,171,426 B2 10/2015 Dimichele
9,177,445 B2 11/2015 Vemuri
9,214,056 B2 12/2015 Kovacs
D750,113 S 2/2016 Kettner
9,286,756 B2 3/2016 Bramble
D753,158 S 4/2016 Mezzanotte
9,311,773 B2 4/2016 Chun
D759,065 S 6/2016 Mezzanotte
9,361,754 B2 6/2016 Decasa, Jr.
9,364,753 B2 6/2016 Bennett
9,384,631 B2 7/2016 Arnone
9,384,635 B2 7/2016 Nguyen
9,401,073 B2 7/2016 Lee
D763,904 S 8/2016 Knapp
9,430,908 B2 8/2016 Owen
9,443,393 B2 9/2016 Johnson
9,443,394 B2 9/2016 Carpenter
D771,670 S 11/2016 Chan
D772,252 S 11/2016 Myers
D772,260 S 11/2016 Ingenlath
D772,894 S 11/2016 Zhao
9,495,838 B2 11/2016 Davis
9,520,020 B2 12/2016 Bickley
9,530,280 B2 12/2016 Melnick
9,558,632 B2 1/2017 Melnick
D780,201 S 2/2017 Zielinski
9,569,933 B2 2/2017 Baker
9,607,479 B2 3/2017 Robbins
D783,655 S 4/2017 Hu
9,613,492 B2 4/2017 Englman
9,616,331 B1 4/2017 Jordan
9,626,836 B2 4/2017 Arnone
9,633,509 B2 4/2017 Cannon
D788,167 S 5/2017 Fox Uribe
9,656,174 B1 5/2017 McLellan
9,697,671 B2 7/2017 Moody
9,697,674 B2 7/2017 Morrissette
9,715,790 B2 7/2017 Arnone
9,734,660 B2 8/2017 Kiely

(56) References Cited

U.S. PATENT DOCUMENTS

| | | | |
|---|---|---|---|
| 9,747,754 | B2 | 8/2017 | Carpenter |
| D801,990 | S | 11/2017 | Reissner |
| D804,505 | S | 12/2017 | Hoffman |
| 9,858,750 | B2 | 1/2018 | Kovacs |
| 9,984,529 | B2 | 5/2018 | Kim |
| 9,990,806 | B2 | 6/2018 | Davis |
| D823,336 | S | 7/2018 | Tinney |
| 10,013,852 | B1 | 7/2018 | Jordan |
| 10,032,338 | B2 | 7/2018 | Lark |
| 10,055,940 | B2 | 8/2018 | Arnone |
| 10,066,432 | B2 * | 9/2018 | Sanchez .................... E05F 9/00 |
| 10,068,432 | B2 | 9/2018 | Wortmann |
| 10,109,155 | B2 | 10/2018 | Chase |
| D834,604 | S | 11/2018 | Feldman |
| D836,653 | S | 12/2018 | Zhou |
| 10,163,305 | B2 * | 12/2018 | Wortmann .......... G07F 17/3223 |
| 10,195,532 | B1 | 2/2019 | McLellan |
| 10,210,706 | B2 | 2/2019 | Penacho |
| D842,316 | S | 3/2019 | Toth |
| 10,235,841 | B2 | 3/2019 | Nguyen |
| 10,255,765 | B2 | 4/2019 | Washington |
| D847,833 | S | 5/2019 | Toth |
| D849,771 | S | 5/2019 | Foley |
| D852,830 | S | 7/2019 | Penacho |
| D854,554 | S | 7/2019 | Toth |
| 10,354,491 | B2 | 7/2019 | Melnick |
| 10,360,766 | B2 | 7/2019 | Arnone |
| 10,373,442 | B2 | 8/2019 | Schlottmann |
| 10,395,474 | B2 | 8/2019 | Englman |
| D858,535 | S | 9/2019 | Evans |
| 10,424,162 | B2 | 9/2019 | Heenan |
| D861,703 | S | 10/2019 | Suslik |
| D861,710 | S | 10/2019 | Frackelton |
| 10,445,985 | B2 | 10/2019 | Davis |
| 10,460,568 | B2 | 10/2019 | Givant |
| D867,391 | S | 11/2019 | Yoshioka |
| D868,825 | S | 12/2019 | Paulik |
| D870,123 | S | 12/2019 | Butcher |
| D870,126 | S | 12/2019 | Crispino |
| 10,504,332 | B2 | 12/2019 | Riggs |
| 10,510,215 | B2 | 12/2019 | Arnone |
| 10,515,514 | B1 | 12/2019 | Weaver |
| 10,540,852 | B2 | 1/2020 | Lark |
| D875,110 | S | 2/2020 | Spors |
| D876,450 | S | 2/2020 | Suslik |
| D876,477 | S | 2/2020 | Gansert |
| D879,122 | S | 3/2020 | Ebler |
| 10,621,829 | B2 | 4/2020 | Loader |
| D889,493 | S | 7/2020 | Schwegler |
| D890,790 | S | 7/2020 | Marks |
| D895,645 | S | 9/2020 | Sanborn |
| D896,256 | S | 9/2020 | Kawaichi |
| 10,789,814 | B2 | 9/2020 | Palmisano |
| D898,769 | S | 10/2020 | Park |
| D905,106 | S | 12/2020 | Kang |
| D905,736 | S | 12/2020 | Felkins |
| 10,864,443 | B2 | 12/2020 | Eatedali |
| 10,872,492 | B2 | 12/2020 | Oberberger |
| D910,071 | S | 2/2021 | Chen |
| D913,325 | S | 3/2021 | Chen |
| D914,056 | S | 3/2021 | Chen |
| D916,754 | S | 4/2021 | Johnson |
| D916,903 | S | 4/2021 | Arena |
| D917,503 | S | 4/2021 | Sakurai |
| 11,055,951 | B2 | 7/2021 | La Guardia |
| 11,183,020 | B2 | 11/2021 | Berman |
| 2001/0034260 | A1 | 10/2001 | Luciano |
| 2001/0054003 | A1 | 12/2001 | Chien |
| 2002/0028707 | A1 | 3/2002 | Pascal |
| 2002/0119824 | A1 | 8/2002 | Allen |
| 2002/0183105 | A1 | 12/2002 | Cannon |
| 2003/0050831 | A1 | 3/2003 | Klayh |
| 2003/0060264 | A1 | 3/2003 | Chilton |
| 2004/0229700 | A1 | 11/2004 | Cannon |
| 2005/0020352 | A1 | 1/2005 | Chilton |
| 2005/0071024 | A1 | 3/2005 | Henshaw |
| 2005/0160003 | A1 | 7/2005 | Berardi |
| 2006/0058082 | A1 | 3/2006 | Crawford |
| 2006/0082056 | A1 | 4/2006 | Kane |
| 2006/0148565 | A1 | 7/2006 | Gauselmann |
| 2006/0157934 | A1 | 7/2006 | Yoseloff |
| 2006/0178202 | A1 | 8/2006 | Hughes |
| 2006/0287045 | A1 | 12/2006 | Walker |
| 2007/0129147 | A1 | 6/2007 | Gagner |
| 2007/0191102 | A1 | 8/2007 | Coliz |
| 2007/0218968 | A1 | 9/2007 | Snow |
| 2007/0218982 | A1 | 9/2007 | Baerlocher |
| 2007/0243936 | A1 | 10/2007 | Binenstock |
| 2008/0045288 | A1 | 2/2008 | Moshal |
| 2008/0070692 | A1 | 3/2008 | Schlottmann |
| 2008/0070693 | A1 | 3/2008 | Schlottmann |
| 2008/0070694 | A1 | 3/2008 | Schlottmann |
| 2008/0070695 | A1 | 3/2008 | Baerlocher |
| 2008/0076520 | A1 * | 3/2008 | Chan ........................ G07F 17/32 463/20 |
| 2008/0146305 | A1 | 6/2008 | Moody |
| 2008/0207313 | A1 | 8/2008 | Acres |
| 2008/0254883 | A1 | 10/2008 | Patel |
| 2009/0005150 | A1 | 1/2009 | Haveson |
| 2009/0011810 | A1 | 1/2009 | Moshal |
| 2009/0011827 | A1 | 1/2009 | Englman |
| 2009/0029773 | A1 | 1/2009 | Cherry |
| 2009/0061997 | A1 | 3/2009 | Popovich |
| 2009/0061999 | A1 | 3/2009 | Popovich |
| 2009/0069093 | A1 | 3/2009 | Kelly |
| 2009/0104965 | A1 * | 4/2009 | House ................ G06Q 20/3674 463/20 |
| 2009/0118000 | A1 | 5/2009 | Yoshizawa |
| 2009/0124320 | A1 | 5/2009 | Dewaal |
| 2009/0124364 | A1 | 5/2009 | Cuddy |
| 2009/0170584 | A1 | 7/2009 | Tan |
| 2009/0197659 | A1 | 8/2009 | Christensen |
| 2009/0270168 | A1 | 10/2009 | Englman |
| 2009/0275374 | A1 | 11/2009 | Nelson |
| 2010/0022307 | A1 | 1/2010 | Steuer |
| 2010/0035674 | A1 | 2/2010 | Slomiany |
| 2010/0062840 | A1 | 3/2010 | Herrmann |
| 2010/0070056 | A1 | 3/2010 | Coronel |
| 2010/0105470 | A1 | 4/2010 | Englman |
| 2010/0120503 | A1 | 5/2010 | Hoffman |
| 2010/0197377 | A1 * | 8/2010 | Aoki ........................ G07F 17/32 463/31 |
| 2010/0210356 | A1 | 8/2010 | Losica |
| 2010/0210362 | A1 | 8/2010 | Toompere |
| 2010/0227686 | A1 | 9/2010 | Brunet De Courssou |
| 2010/0311497 | A1 | 12/2010 | Suslik |
| 2011/0014964 | A1 | 1/2011 | Crowder, Jr. |
| 2011/0028160 | A1 | 2/2011 | Roeding |
| 2011/0070940 | A1 | 3/2011 | Jaffe |
| 2011/0111856 | A1 | 5/2011 | White |
| 2011/0130186 | A1 | 6/2011 | Chim |
| 2011/0281624 | A1 | 11/2011 | Moody |
| 2012/0122561 | A1 | 5/2012 | Hedrick |
| 2012/0129610 | A1 | 5/2012 | Mazursky |
| 2012/0225724 | A1 | 9/2012 | Barber |
| 2013/0029739 | A1 | 1/2013 | Ramsey |
| 2013/0065676 | A1 | 3/2013 | Owen |
| 2013/0072294 | A1 | 3/2013 | Mosley |
| 2013/0116809 | A1 | 5/2013 | Carpenter |
| 2013/0122978 | A1 | 5/2013 | Slomiany |
| 2013/0244751 | A1 | 9/2013 | Bennett |
| 2013/0252704 | A1 | 9/2013 | Gilbertson |
| 2013/0281179 | A1 | 10/2013 | Tempest |
| 2013/0296036 | A1 | 11/2013 | Scott |
| 2013/0310127 | A1 | 11/2013 | Bradley |
| 2013/0331181 | A1 | 12/2013 | Newton |
| 2013/0331184 | A1 | 12/2013 | Kelly |
| 2013/0331968 | A1 | 12/2013 | Newton |
| 2014/0038703 | A1 | 2/2014 | Lampert |
| 2014/0038724 | A1 | 2/2014 | Layne, IV |
| 2014/0051520 | A1 | 2/2014 | Davis |
| 2014/0087815 | A1 * | 3/2014 | Caputo ................... G07F 17/34 463/18 |
| 2014/0106866 | A1 | 4/2014 | Hardy |

(56) References Cited

U.S. PATENT DOCUMENTS

| | | | |
|---|---|---|---|
| 2014/0162787 | A1 | 6/2014 | Carpenter |
| 2014/0194176 | A1 | 7/2014 | Robbins |
| 2014/0274308 | A1 | 9/2014 | Guinn |
| 2014/0323199 | A1 | 10/2014 | Dimichele |
| 2015/0018070 | A1 | 1/2015 | Meyer |
| 2015/0099576 | A1 | 4/2015 | Anderson |
| 2015/0199878 | A1 | 7/2015 | Wright |
| 2015/0228151 | A1 | 8/2015 | Damodaran |
| 2015/0248810 | A1* | 9/2015 | Wortmann .............. G07F 17/34 463/20 |
| 2015/0287069 | A1 | 10/2015 | Gissara |
| 2015/0348361 | A1 | 12/2015 | Adiraju |
| 2015/0355727 | A1 | 12/2015 | Hu |
| 2015/0356815 | A1 | 12/2015 | Kim |
| 2015/0379822 | A1 | 12/2015 | Ellis |
| 2016/0063807 | A1 | 3/2016 | Bennett |
| 2016/0104344 | A1 | 4/2016 | Meyer |
| 2016/0140807 | A1 | 5/2016 | Chase |
| 2016/0148126 | A1 | 5/2016 | Paleja |
| 2016/0217646 | A1* | 7/2016 | Hornik ................ G07F 17/3213 |
| 2016/0275757 | A1 | 9/2016 | Decasa, Jr. |
| 2016/0284157 | A1 | 9/2016 | Marrinson |
| 2016/0328918 | A1 | 11/2016 | De Waal |
| 2017/0161999 | A1 | 6/2017 | Givant |
| 2017/0200349 | A1 | 7/2017 | Englman |
| 2017/0323528 | A1 | 11/2017 | Arnone |
| 2017/0337775 | A1 | 11/2017 | Singer |
| 2018/0052582 | A1 | 2/2018 | Hilbert |
| 2018/0068529 | A1 | 3/2018 | Delekta |
| 2018/0075708 | A1 | 3/2018 | San |
| 2018/0089953 | A1 | 3/2018 | Palmisano |
| 2018/0089954 | A1 | 3/2018 | Carpenter |
| 2018/0095616 | A1 | 4/2018 | Valdivia |
| 2018/0130312 | A1 | 5/2018 | Cire |
| 2018/0146206 | A1 | 5/2018 | Weekes |
| 2019/0066446 | A1 | 2/2019 | Mariscal |
| 2019/0073859 | A1 | 3/2019 | Penacho |
| 2019/0080562 | A1 | 3/2019 | Jungmann |
| 2019/0096182 | A1 | 3/2019 | Oberberger |
| 2019/0102993 | A1 | 4/2019 | Washington |
| 2019/0139366 | A1 | 5/2019 | Davis |
| 2019/0147706 | A1 | 5/2019 | Bolling, Jr. |
| 2019/0244482 | A1 | 8/2019 | Washington |
| 2019/0262717 | A1 | 8/2019 | Thielbar |
| 2019/0287344 | A1 | 9/2019 | Oberberger |
| 2019/0333314 | A1 | 10/2019 | Henshaw |
| 2019/0340883 | A1 | 11/2019 | Arnone |
| 2019/0347907 | A1 | 11/2019 | Bolling, Jr. |
| 2019/0378379 | A1 | 12/2019 | Satterlie |
| 2019/0385406 | A1 | 12/2019 | Marks |
| 2020/0043233 | A1 | 2/2020 | Nelson |
| 2020/0043293 | A1 | 2/2020 | Nelson |
| 2020/0043294 | A1 | 2/2020 | Davis |
| 2020/0111293 | A1 | 4/2020 | Oberberger |
| 2020/0184775 | A1 | 6/2020 | Oberberger |
| 2020/0279451 | A1 | 9/2020 | La Guardia |
| 2020/0364987 | A1 | 11/2020 | Weaver |
| 2021/0007632 | A1 | 1/2021 | Blahnik |
| 2021/0256811 | A1 | 8/2021 | Uberuaga |

FOREIGN PATENT DOCUMENTS

| | | | |
|---|---|---|---|
| AU | 1997029346 | A1 | 11/1997 |
| AU | 1997030070 | A1 | 11/1997 |
| AU | 1997035809 | A1 | 1/1998 |
| AU | 700667 | B2 | 1/1999 |
| AU | 2001036378 | A1 | 5/2001 |
| AU | 2001294751 | A1 | 6/2002 |
| AU | 2002311978 | A1 | 12/2002 |
| AU | 755912 | B2 | 1/2003 |
| AU | 2002250161 | A1 | 7/2003 |
| AU | 2003281244 | A1 | 1/2004 |
| AU | 2004904539 | P0 | 8/2004 |
| AU | 2005203403 | A1 | 2/2006 |
| AU | 2005285317 | A1 | 3/2006 |
| AU | 2002306874 | B2 | 6/2006 |
| AU | 2006200237 | A1 | 8/2006 |
| AU | 2007200711 | A1 | 10/2007 |
| AU | 2008100162 | B4 | 4/2008 |
| AU | 2008100163 | B4 | 4/2008 |
| AU | 2006208418 | B2 | 11/2008 |
| AU | 2007211906 | B2 | 2/2009 |
| AU | 2005235004 | B2 | 4/2009 |
| AU | 2008323670 | B2 | 5/2009 |
| AU | 2007216930 | B2 | 3/2010 |
| AU | 2007237214 | B2 | 3/2010 |
| AU | 2008200060 | B2 | 3/2010 |
| AU | 2004267734 | B2 | 7/2010 |
| AU | 2010200449 | A1 | 9/2010 |
| AU | 2005270750 | B2 | 12/2010 |
| AU | 2010202077 | A1 | 12/2010 |
| AU | 2004267733 | B2 | 1/2011 |
| AU | 2004267746 | B2 | 1/2011 |
| AU | 2005203404 | B2 | 3/2011 |
| AU | 2011200529 | A1 | 3/2011 |
| AU | 2010246507 | A1 | 6/2011 |
| AU | 2007200050 | B2 | 9/2011 |
| AU | 2006302141 | B2 | 1/2012 |
| AU | 2005248969 | B2 | 2/2012 |
| AU | 2011205125 | A1 | 3/2012 |
| AU | 2011200434 | B2 | 11/2012 |
| AU | 2010202282 | B2 | 1/2013 |
| AU | 2012268860 | A1 | 1/2013 |
| AU | 2008312413 | B2 | 9/2013 |
| AU | 2013254911 | A1 | 11/2013 |
| AU | 2014900096 | P0 | 1/2014 |
| AU | 2013202667 | B2 | 1/2015 |
| AU | 2015201979 | A1 | 5/2015 |
| AU | 2012326136 | B2 | 6/2015 |
| AU | 2015200050 | A1 | 7/2015 |
| AU | 2013213728 | B2 | 1/2016 |
| AU | 2011307385 | B2 | 3/2016 |
| AU | 2016203321 | A1 | 6/2016 |
| AU | 2016204577 | A1 | 7/2016 |
| AU | 2014395471 | A1 | 1/2017 |
| AU | 2014317574 | B2 | 6/2017 |
| AU | 2014317575 | B2 | 6/2017 |
| AU | 2016349725 | A1 | 6/2018 |
| AU | 2018203786 | A1 | 6/2018 |
| AU | 2018203839 | A1 | 6/2018 |
| CA | 2340562 | A1 | 8/2002 |
| CA | 2536018 | A1 | 3/2005 |
| CA | 2920520 | A1 | 3/2005 |
| CA | 2538706 | A1 | 4/2005 |
| CA | 2259197 | C | 9/2005 |
| CA | 2253884 | C | 11/2005 |
| CA | 2563942 | A1 | 11/2005 |
| CA | 2580187 | A1 | 3/2006 |
| CA | 2522944 | A1 | 7/2006 |
| CA | 2527367 | A1 | 5/2007 |
| CA | 2527416 | A1 | 5/2007 |
| CA | 2403035 | C | 7/2007 |
| CA | 2572719 | A1 | 7/2007 |
| CA | 2604412 | A1 | 4/2008 |
| CA | 2617034 | A1 | 7/2008 |
| CA | 2691337 | A1 | 8/2010 |
| CA | 2812377 | A1 | 4/2012 |
| CA | 2838347 | A1 | 12/2012 |
| CA | 2852464 | A1 | 4/2013 |
| CA | 2876890 | A1 | 7/2015 |
| CA | 2947448 | A1 | 11/2015 |
| CA | 2956084 | A1 | 1/2016 |
| CA | 2535880 | C | 4/2016 |
| CA | 2599635 | C | 8/2016 |
| CA | 2535838 | C | 9/2016 |
| CA | 2941629 | A1 | 3/2017 |
| CA | 3004490 | A1 | 5/2017 |
| CA | 3017742 | A1 | 9/2017 |
| CA | 3017745 | A1 | 9/2017 |
| CA | 2655095 | C | 4/2018 |
| CN | 1853203 | A | 10/2006 |
| CN | 1853204 | A | 10/2006 |
| CN | 1853205 | A | 10/2006 |

(56) References Cited

FOREIGN PATENT DOCUMENTS

| | | | |
|---|---|---|---|
| CN | 101018592 | A | 8/2007 |
| CN | 101043923 | A | 9/2007 |
| CN | 101044523 | A | 9/2007 |
| CN | 101044525 | A | 9/2007 |
| CN | 101321564 | B | 7/2011 |
| DE | 19740287 | A1 | 3/1998 |
| EP | 1021228 | A4 | 1/2001 |
| EP | 1296294 | A3 | 2/2004 |
| EP | 1644902 | A2 | 4/2006 |
| EP | 1656647 | A1 | 5/2006 |
| EP | 1656648 | A1 | 5/2006 |
| EP | 1677263 | A3 | 4/2007 |
| EP | 1794721 | A1 | 6/2007 |
| EP | 1903522 | A1 | 3/2008 |
| EP | 1912185 | A1 | 4/2008 |
| EP | 1933960 | A2 | 6/2008 |
| EP | 2003630 | A1 | 12/2008 |
| EP | 1740281 | A4 | 2/2009 |
| EP | 1814091 | A3 | 2/2009 |
| EP | 2218487 | A3 | 8/2010 |
| EP | 2435995 | A1 | 4/2012 |
| EP | 2723462 | A4 | 11/2014 |
| EP | 2621595 | A4 | 6/2015 |
| EP | 3171951 | A4 | 12/2017 |
| EP | 3149713 | A4 | 2/2018 |
| EP | 3429710 | A2 | 1/2019 |
| EP | 3429711 | A1 | 1/2019 |
| GB | 2387950 | A | 10/2003 |
| GB | 0409224 | | 4/2004 |
| GB | 2401063 | B | 10/2006 |
| GB | 2427149 | B | 3/2007 |
| HK | 1237704 | A | 4/2018 |
| IL | 216538 | A | 2/2012 |
| IN | 201847034966 | A | 9/2018 |
| JP | 2007502658 | A | 2/2007 |
| JP | 2007502659 | A | 2/2007 |
| JP | 2007502661 | A | 2/2007 |
| JP | 5941152 | B2 | 6/2016 |
| JP | 2017518850 | A | 7/2017 |
| NZ | 703662 | A | 7/2015 |
| PH | 12018501052 | A1 | 1/2019 |
| RU | 96117375 | C1 | 9/1999 |
| SG | 131166 | A1 | 5/2007 |
| SG | 11201401444 | | 5/2014 |
| SG | 10201500175 | | 8/2015 |
| SG | 11201803977 | | 6/2018 |
| TW | 573262 | B | 1/2004 |
| WO | 1997027921 | A1 | 8/1997 |
| WO | 1997039811 | A1 | 10/1997 |
| WO | 1997041933 | A1 | 11/1997 |
| WO | 1998000210 | A1 | 1/1998 |
| WO | 2001032276 | A3 | 2/2002 |
| WO | 2003059472 | A1 | 7/2003 |
| WO | 2002094399 | A8 | 8/2003 |
| WO | 2002027676 | A8 | 9/2003 |
| WO | 2003083796 | A1 | 10/2003 |
| WO | 2004004853 | A2 | 1/2004 |
| WO | 2005020165 | A1 | 3/2005 |
| WO | 2005020166 | A1 | 3/2005 |
| WO | 2005020164 | A3 | 4/2005 |
| WO | 2005030353 | A3 | 4/2005 |
| WO | 2005102480 | A1 | 11/2005 |
| WO | 2006015442 | A1 | 2/2006 |
| WO | 2006031439 | A1 | 3/2006 |
| WO | 2005110563 | A3 | 1/2007 |
| WO | 2007044785 | A3 | 4/2007 |
| WO | 2007050119 | A3 | 7/2007 |
| WO | 2007087297 | A3 | 7/2008 |
| WO | 2007146791 | A3 | 12/2008 |
| WO | 2009006274 | A1 | 1/2009 |
| WO | 2009052300 | A1 | 4/2009 |
| WO | 2009062187 | A1 | 5/2009 |
| WO | 2009086466 | A3 | 7/2009 |
| WO | 2009108805 | A3 | 9/2009 |
| WO | 2010011673 | A1 | 1/2010 |
| WO | 2009135086 | A3 | 2/2010 |
| WO | 2010054061 | A1 | 5/2010 |
| WO | 2010098808 | A1 | 9/2010 |
| WO | 2010137010 | A1 | 12/2010 |
| WO | 2011019949 | A9 | 11/2011 |
| WO | 2012044559 | A1 | 4/2012 |
| WO | 2013059372 | A3 | 4/2013 |
| WO | 2013052453 | A3 | 5/2014 |
| WO | 2014074271 | A1 | 5/2014 |
| WO | 2014210080 | A1 | 12/2014 |
| WO | 2015172060 | A1 | 11/2015 |
| WO | 2015183335 | A8 | 12/2015 |
| WO | 2016014266 | A1 | 1/2016 |
| WO | 2017079706 | A1 | 5/2017 |
| WO | 2017160910 | A1 | 9/2017 |
| WO | 2017160917 | A3 | 12/2017 |
| WO | 2019125422 | A1 | 6/2019 |
| WO | 2019168646 | A1 | 9/2019 |
| ZA | 201500185 | B | 12/2015 |

OTHER PUBLICATIONS

Office Action dated Aug. 18, 2020 for U.S. Appl. No. 29/703,046 (pp. 1-12).

Countdown Timer Background 10 Seconds, by Kanadaka, YouTube [online], published on Dec. 15, 2013, [retrieved on Aug. 13, 2020], retrieved from the Internet <URL: https://www.youtube.com/watch?v=AwOYH3RDUe4> (Year: 2013) 1 page.

3 2 1 Go! Countdown Green Screen, by Da24Gemini, YouTube [online], published on Sep. 15, 2012, [retrieved on Aug. 13, 2020], retrieved from the Internet <URL: https://www.youtube.com/watch?v=WJhxCcx1 M4g> (Year: 2012) 1 page.

Candy Words—Match Word Puzzle Game, by Homer S, YouTube [online], published on Mar. 5, 2019, [retrieved on Aug. 13, 2020], retrieved from the Internet <URL: https://www.youtube.com/watch?v=4TsGNDLrpWk> (Year: 2019) 1 page.

"Cashman Casino," Sep. 2018 screenshot from YouTube video. Publication date Apr. 4, 2017, 1 page.

"House of Fun," Sep. 2018 screenshot from web page: "https://www.houseoffun.com/play-now/," 1 page.

Office Action dated May 14, 2020 for U.S. Appl. No. 16/290,836 (pp. 1-5).

Office Action dated Jul. 20, 2020 for U.S. Appl. No. 16/290,833 (pp. 1-9).

Notice of Allowance dated Jun. 17, 2020 for U.S. Appl. No. 29/682,178 (pp. 1-10).

"Gold Stacks 88 Lunar Festival Slot—Nice Session, All Features!" Feb. 14, 2019, YouTube, site visited May 27, 2020: https://www.youtube.conn/watch?v=kusOLt2fvM4 (Year: 2019) 1 page.

"Figures and Polygons" Sep. 15, 2008, Themathleague, site visited May 27, 2020: https://www.mathleague.com/index.php/ connponent/content/article/31-nnathleaguewebsite/general/75-figuresandpolygons#octagon (Year: 2018) 2 pages.

"Catherine Wheels, Fireworks, android/ios game" Oct. 24, 2015, YouTube, site visited May 27, 2020: https://www.youtube.com/watch?v=DzCYicyl FJA (Year: 2015) 1 page.

"Golden Firework Video Slot Casino Game with a "Mega Win" Free Spin Bonus" Apr. 16, 2018, YouTube, site visited May 27, 2020: https://www.youtube.conn/watch?v=YgCbY7c-nYM (Year: 2018) 1 page.

"Lucky Firecracker slot game [Wild Jackpots]" Jan. 30, 2015, YouTube, site visited May 27, 2020: https://www.youtube.com/watch?v=Gzfe182Qtbc (Year: 2015) 1 page.

Office Action dated Jun. 23, 2020 for U.S. Appl. No. 29/682,179 (pp. 1-11).

"iSoftBet—Scrolls of Ra HD" May 8, 2015, YouTube, site visited Jun. 16, 2020: https://www.youtube.conn/watch?v=9ZciLdlqQNo (Year: 2015) 1 page.

"New Game  Fortune Scroll  Slot Lover" Feb. 11, 2019, YouTube, site visited Jun. 16, 2020: https://www.youtube.conn/watch?v=cdCsvzzRHvs&list=LLMFvEIKJd5VZ1hOwZ7BZDdQ&index=2873 (Year: 2019) 1 page.

(56) References Cited

OTHER PUBLICATIONS

"Hot Shot Twin Fire Live Play with many features Bally Slot Machine" Jan. 8, 2017, YouTube, site visited Jun. 16, 2020: https://www.youtube.com/watch?v=b_03gJvQecw (Year: 2017) 1 page.
"Traditional Torah Icon" Feb. 6, 2018, Alamy, site visited Jun. 16, 2020: https://www.alamy.com/ stock-photo-traditional-torah-icon-174149305.htnnl (Year: 2018) 1 page.
"Paper Scroll Clip Art" Dec. 11, 2017, FavPNG, site visited Jun. 16, 2020: https://favpng.com/png_view/ paper-scroll-clip-art-png/DDpwDsEh (Year: 2017) 3 pages.
"Torah Scroll Icon" Jun. 25, 2018, Depositphotos, site visited Jun. 16, 2020: https://depositphotos.com/201375256/stock-illustration-torah-scroll-icon-outline-style.html (Year: 2018) 1 page.
Notice of Allowance dated Aug. 26, 2020 for U.S. Appl. No. 16/290,836 (pp. 1-8).
Notice of Allowance dated Oct. 7, 2020 for U.S. Appl. No. 29/682,179 (pp. 1-7).
Office Action dated Nov. 12, 2020 for U.S. Appl. No. 16/290,833 (pp. 1-8).
Notice of Allowance dated Jan. 7, 2021 for U.S. Appl. No. 29/703,046 (pp. 1-9).
Office Action dated Jan. 27, 2021 for U.S. Appl. No. 16/290,838 (pp. 1-9).
International Search Report and Written Opinion for App. No. PCT/US19/53398, dated Jan. 6, 2020, 9 pages.
International Search Report and Written Opinion for App. No. PCT/US19/53407, dated Jan. 9, 2020, 8 pages.
Notice of Allowance dated Mar. 15, 2021 for U.S. Appl. No. 16/290,833 (pp. 1-8).
International Preliminary Report on Patentability for App. No. PCT/US2019/053407, dated Apr. 15, 2021, 8 pages.
Office Action dated May 11, 2021 for U.S. Appl. No. 16/946,113 (pp. 1-14).
Notice of Allowance dated May 19, 2021 for U.S. Appl. No. 29/703,046 (pp. 1-8).
Supplemental Notice of Allowability dated Jun. 7, 2021 for U.S. Appl. No. 16/290,833 (pp. 1-2).
Office Action (Final Rejection) dated Aug. 5, 2021 for U.S. Appl. No. 16/290,838 (pp. 1-7).
Corrected Notice of Allowability dated Aug. 18, 2021 for U.S. Appl. No. 29/703,046 (pp. 1-4).
Office Action (Notice of Allowance and Fees Due (PTOL-85)) dated Oct. 21, 2021 for U.S. Appl. No. 16/946,113 (pp. 1-5).
Office Action (Notice of Allowance and Fees Due (PTOL-85)) dated Nov. 9, 2021 for U.S. Appl. No. 16/290,838 (pp. 1-7).
IP.com NPL Search Strategy (Year: 2021).
Office Action (Non-Final Rejection) dated Dec. 27, 2021 for U.S. Appl. No. 17/058,548 (pp. 1-32).
Office Action (Non-Final Rejection) dated May 24, 2022 for U.S. Appl. No. 16/946,114 (pp. 1-8).
Office Action (Non-Final Rejection) dated Mar. 25, 2022 for U.S. Appl. No. 17/304,107 (pp. 1-7).
Office Action (Non-Final Rejection) dated Apr. 1, 2022 for U.S. Appl. No. 17/058,531 (pp. 1-15).
Office Action (Final Rejection) dated Apr. 12, 2022 for U.S. Appl. No. 17/058,548 (pp. 1-18).
Office Action (Non-Final Rejection) dated May 6, 2022 for U.S. Appl. No. 16/948,961 (pp. 1-16).
Office Action (Non-Final Rejection) dated Jun. 9, 2022 for U.S. Appl. No. 16/948,846 (pp. 1-7).
Office Action (Non-Final Rejection) dated Jun. 22, 2022 for U.S. Appl. No. 16/946,116 (pp. 1-16).
Office Action (Notice of Allowance and Fees Due (PTOL-85)) dated Jul. 27, 2022 for U.S. Appl. No. 16/948,846 (pp. 1-7).
Office Action (Final Rejection) dated Jul. 27, 2022 for U.S. Appl. No. 17/304,107 (pp. 1-8).
Office Action (Non-Final Rejection) dated Jul. 21, 2022 for U.S. Appl. No. 16/946,117 (pp. 1-6).
Office Action (Notice of Allowance and Fees Due (PTOL-85)) dated Aug. 8, 2022 for U.S. Appl. No. 17/058,548 (pages (1-13).
Office Action (Notice of Allowance and Fees Due (PTOL-85)) dated Dec. 9, 2022 for U.S. Appl. No. 16/946,114 (pp. 1-8).

* cited by examiner

| Player/EGM | Name | Rank | Score | Multiplier | Trophy |
|---|---|---|---|---|---|
| 1 | John T. | 22 | 12130 | 2X | |
| 2 | Sara J. | 4 | 64190 | | |
| 3 | Fred S. | 9 | 50900 | 12X | |
| 4 | Chris R. | 3 | 70000 | | |
| 5 | Don F. | 8 | 54970 | 9X | |
| 6 | Pat G. | 2 | 71430 | | 5X, Pole |
| 7 | Matt B. | 5 | 63310 | | |
| 8 | Susan W. | 13 | 38090 | | |
| 9 | Frank G. | 20 | 20170 | | |
| 10 | Tony K. | 16 | 30220 | 24X | |
| 11 | Greg A. | 7 | 58660 | | CFB |
| 12 | Lydia G. | 19 | 21550 | | |
| 13 | Paul H. | 21 | 17370 | | |
| 14 | Ed N. | 24 | 4020 | 6X | |
| 15 | Alice J. | 14 | 36370 | | |
| 16 | Mal C. | 6 | 61930 | | |
| 17 | Jen E. | 17 | 26800 | 18X | |
| 18 | Albert W. | 15 | 31930 | | |
| 19 | Bruce L. | 12 | 43360 | | |
| 20 | John L. | 23 | 8010 | 36X | |
| 21 | Robin H. | 1 | 75020 | 72X | |
| 22 | Mary J. | 11 | 44640 | | |
| 23 | Gwen S. | 10 | 47400 | | |
| 24 | Mike V. | 18 | 25530 | | |

Activate Candle | Activate Edge Light | Initiate Celebration Effect | Clear Selections | Menu

Figure 34

Bank 1

| | Player/EGM: 1 | Player/EGM: 2 | Player/EGM: 3 | Player/EGM: 4 |
|---|---|---|---|---|
| Name: | John T. | Sara J. | Fred S. | Chris R. |
| Score: | 12130 | 64190 | 50900 | 70000 |
| Rank: | 22 | 4 | 9 | 3 |
| Multiplier: | 2X | | 12X | |
| Trophy: | | | | |

| | Player/EGM: 5 | Player/EGM: 6 | Player/EGM: 7 | Player/EGM: 8 |
|---|---|---|---|---|
| Name: | Don F. | Pat G. | Matt B. | Susan W. |
| Score: | 54970 | 71430 | 63310 | 38090 |
| Rank: | 8 | 2 | 5 | 13 |
| Multiplier: | 9X | | | |
| Trophy: | | 5X, Pole | | |

Bank 2

| | Player/EGM: 9 | Player/EGM: 10 | Player/EGM: 11 | Player/EGM: 12 |
|---|---|---|---|---|
| Name: | Frank G. | Tony K. | Greg A. | Lydia G. |
| Score: | 20170 | 30220 | 58660 | 21550 |
| Rank: | 20 | 16 | 7 | 19 |
| Multiplier: | | 24X | | |
| Trophy: | | | CFB | |

| | Player/EGM: 13 | Player/EGM: 14 | Player/EGM: 15 | Player/EGM: 16 |
|---|---|---|---|---|
| Name: | Paul H. | Ed N. | Alice J. | Mal C. |
| Score: | 17370 | 4020 | 36370 | 61930 |
| Rank: | 21 | 24 | 14 | 6 |
| Multiplier: | | 6X | | |
| Trophy: | | | | |

Bank 3

| | Player/EGM: 17 | Player/EGM: 18 | Player/EGM: 19 | Player/EGM: 20 |
|---|---|---|---|---|
| Name: | Jen E. | Albert W. | Bruce L. | John L. |
| Score: | 26800 | 31930 | 43360 | 8010 |
| Rank: | 17 | 15 | 12 | 23 |
| Multiplier: | 18X | | | 36X |
| Trophy: | | | | |

| | Player/EGM: 21 | Player/EGM: 22 | Player/EGM: 23 | Player/EGM: 24 |
|---|---|---|---|---|
| Name: | Robin H. | Mary J. | Gwen S. | Mike V. |
| Score: | 75020 | 44640 | 47400 | 25530 |
| Rank: | 1 | 11 | 10 | 18 |
| Multiplier: | 72X | | | |
| Trophy: | | | | |

Activate Candle | Activate Edge Light | Initiate Celebration Effect | Clear Selections | Menu

Figure 35

STICKY WILDS FEATURE FOR TOURNAMENT GAMING FOR ELECTRONIC GAMING MACHINES AND OTHER COMPUTING DEVICES

RELATED APPLICATION(S)

This application is a continuation under 35 U.S.C. § 120 of U.S. patent application Ser. No. 16/946,114, filed on Jun. 5, 2020, and titled "STICKY WILDS FEATURE FOR TOURNAMENT GAMING FOR ELECTRONIC GAMING MACHINES AND OTHER COMPUTING DEVICES," which claims benefit of priority under 35 U.S.C. § 119(e) to U.S. Provisional Patent Application No. 62/884,072, filed Aug. 7, 2019, and titled "TOURNAMENT GAMING FOR ELECTRONIC GAMING MACHINES AND OTHER COMPUTING DEVICES," and U.S. Provisional Patent Application No. 62/913,684, filed Oct. 10, 2019, and titled "STICKY WILDS FEATURE FOR TOURNAMENT GAMING FOR ELECTRONIC GAMING MACHINES AND OTHER COMPUTING DEVICES," which are both hereby incorporated herein by reference in their entireties and for all purposes, in particular with respect to portions thereof that relate to "sticky wilds" features and the like. This application is also related to U.S. Provisional Patent Application Nos. 62/913,682, titled "SYSTEMS AND TECHNIQUES FOR PROVIDING ANIMATED LEADERBOARDS," 62/913,685, titled "TOURNAMENT GAMING SYSTEM WITH ALL WINS MULTIPLIER MODE," and 62/913,680, titled "TOURNAMENT GAMING FOR ELECTRONIC GAMING MACHINES AND OTHER COMPUTING DEVICES," all of which were filed on Oct. 10, 2019, and all of which are also hereby incorporated by reference herein in their entireties and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Discussed herein are various techniques and systems for providing a "sticky wilds" feature for use with electronic gaming machines. While such techniques and systems are discussed below in the context of gaming tournament systems such as those described below, it will be understood that such techniques and systems may also be used to cause a "sticky wilds" feature to be provided in the context of single-player game play as well. In the context of gaming tournament systems, a "sticky wilds mode" may, in some implementations be activated for all players participating in a particular tournament session (e.g., engaged in simultaneous play against each other) at a particular time and for a particular duration of time, as discussed further below. In other words, triggering of such a sticky wilds mode may be time-based, as opposed to a sticky wilds mode that is outcome-based (e.g., where obtaining a particular outcome may cause a sticky wilds mode to be enabled for some number of spins).

A "sticky wilds" feature may be used in a variety of symbol-based games, e.g., reel-based games such as slot machine games, in which players are shown a display of randomly selected symbols responsive to a play of the game and where the outcome of a particular play of the game is dependent on whether or not those randomly selected symbols produce a particular pattern. For example, in a reel-based game, actual or virtual "reels" may be provided that have a plurality of symbols arranged along their circumference. Typically, three to five such symbols on each reel are visible at a time on the display, and when a play of the game occurs, the reels are caused to spin (either physically or virtually, depending on the format of the game) and the randomly selected symbols that are displayed at the conclusion of the play are simply those symbols on the reels that are visible when the reels stop moving. In such games, the patterns of symbols that may potentially trigger a winning outcome are typically evaluated using one symbol from each reel, e.g., getting five symbols, one on each reel of a set of five reels, satisfying a particular condition.

Some such games may include "wild" symbols among the symbols from which symbols are randomly selected for display. A "wild" symbol, for the purposes of winning pattern determination, may be treated as equivalent to any other symbol that may be selectable for presentation on the display, thereby making it easier for players to form winning patterns. A "sticky wilds" feature is one in which once a "wild" symbol is selected for display in a particular symbol position on a display as a result of a play of the game, it will generally continue to be displayed in that same position for one or more subsequent plays of the game (if a "wild" symbol is selected for display near the end of a sticky wilds mode, however, the sticky wilds mode may end before the player has a chance to start or complete their next play—in some such implementations, the "stuck" wilds may simply be reverted back to normal, non-wild symbols for that next play; in other implementations, however, these "stuck" wilds may be retained and applied to the outcome of that next play—even if the sticky wilds mode is over—before being reverted back to non-wild symbols).

These and other aspects of various sticky wilds features are discussed below in more detail. As will become apparent, such sticky wilds features may be particularly useful in the context of EGM tournament play, including in the context of implementations such as those listed below. It will be understood that the implementations of EGM tournament play systems discussed below may be used without necessarily being accompanied by such sticky wilds features, although the use of the sticky wilds features discussed herein in the context of EGM tournament play may significantly enhance such tournament play for the participants thereof.

In some implementations, an electronic gaming system is provided that may include one or more processors and one or more memory devices. The one or more processors and the one or more memory devices may be operably connected and the one or more memory devices may store computer-executable instructions for controlling the one or more processors to: a) receive information identifying a plurality of electronic gaming machines (EGMs) that are each associated with a common tournament session of a gaming tournament, b) generate one or more sticky wild datasets, each sticky wild dataset defining one or more sticky wild patterns, each sticky wild pattern providing information designating a corresponding first set of one or more symbol positions associated with a symbol-based game display that are to have a wild status, c) distribute a sticky wild dataset of the one or more sticky wild datasets to each EGM of the plurality of EGMs in association with the common tournament session, and d) transmit first information to each EGM of the plurality of EGMs that is configured to cause the EGMs in the plurality of EGMs to simultaneously initiate a sticky wilds feature for the common tournament session at a predetermined first point in time after the common tournament session starts and using the sticky wild datasets distributed to the EGMs.

In some implementations, the first information may be further configured to cause the EGMs in the plurality of EGMs to simultaneously terminate the sticky wilds feature for the common tournament session on each EGM of the plurality of EGMs at a predetermined second point in time after the first point in time.

In some implementations, the first information transmitted to each EGM of the plurality of EGMs may include the sticky wild dataset distributed thereto.

In some implementations, the one or more memory devices further may store additional computer-executable instructions for controlling the one or more processors to transmit the first information substantially at the first point in time to cause the EGMs in the plurality of EGMs to simultaneously initiate the sticky wilds feature for the common tournament session.

In some implementations, the one or more memory devices may further store additional computer-executable instructions for controlling the one or more processors to, for the common tournament session, transmit second information to each EGM of the plurality of EGMs that is configured to cause the EGMs in the plurality of EGMs to simultaneously terminate the sticky wilds feature for the common tournament session.

In some implementations, each sticky wild dataset may include a set of commands that are configured to, when received by the EGM to which the sticky wild dataset is distributed, cause that EGM to display a wild symbol at each symbol position designated by the corresponding sticky wild pattern defined by that sticky wild dataset.

In some such implementations, the electronic gaming system may also include the plurality of EGMs. Each of these EGMs may include one or more displays, one or more EGM processors, and one or more EGM memory devices. For each EGM, the one or more displays, the one or more EGM processors, and the one or more EGM memory devices of that EGM may be operably connected, and the one or more EGM memory devices of that EGM may further store additional computer-executable instructions for controlling the one or more EGM processors of that EGM to, for the common tournament session, cause the one or more display devices to display the symbol-based game display and the symbol positions associated therewith, receive the single sticky wild dataset distributed to that EGM, cause the sticky wilds feature to be initiated by that EGM based on the first information, cause, while the sticky wilds feature is active, wild symbols to be displayed on the one or more display devices of that EGM and in the symbol positions identified by the information in the sticky wild dataset received by that EGM, cause the sticky wilds feature to be terminated based on the second information, and cause the wild symbols displayed on the one or more display devices of that EGM and in the symbol positions identified by the information in the sticky wild dataset received by that EGM to no longer be displayed responsive to the termination of the sticky wilds feature.

In some other such implementations, the electronic gaming system may further include the plurality of EGMs. For each EGM, that EGM may include one or more displays, one or more EGM processors, and one or more EGM memory devices and the one or more displays, the one or more EGM processors, and the one or more EGM memory devices of that EGM may be operably connected. The one or more EGM memory devices of each EGM may further store additional computer-executable instructions for controlling the one or more EGM processors of that EGM to, for the common tournament session, cause the one or more display devices to display the symbol-based game display and the symbol positions associated therewith, receive one or more player inputs during the common tournament session, display a symbol-based game outcome on the one or more display devices of that EGM responsive to each receipt of a player input of the one or more player inputs by that EGM, receive the single sticky wild dataset distributed to that EGM, cause the sticky wilds feature to be initiated by that EGM based on the first information, cause, while the sticky wilds feature is active, wild symbols to be displayed on the one or more display devices of that EGM and in the symbol positions identified by the information in the sticky wild dataset received by that EGM, cause the sticky wilds feature to be terminated based on the second information, and cause the wild symbols displayed on the one or more display devices of that EGM and in the symbol positions identified by the information in the sticky wild dataset received by that EGM to no longer be displayed responsive to the termination of the sticky wilds feature by that EGM and display of the symbol-based game outcome on the one or more display devices of that EGM responsive to the last player input received by that EGM prior to termination of the sticky wilds feature by that EGM.

In some implementations, the one or more memory devices may further store additional computer-executable instructions for controlling the one or more processors to, for the common tournament session, generate a single sticky wild dataset defining a single sticky wild pattern and distribute the single sticky wild dataset to each EGM of the plurality of EGMs.

In some such implementations, the electronic gaming system may further include the plurality of EGMs. For each EGM, that EGM may include one or more displays, one or more EGM processors, and one or more EGM memory devices and the one or more displays, the one or more EGM processors, and the one or more EGM memory devices of that EGM may be operably connected. The one or more EGM memory devices of each EGM may further store additional computer-executable instructions for controlling the one or more EGM processors of that EGM to, for the common tournament session, cause the one or more display devices to display the symbol-based game display, receive the single sticky wild dataset distributed to that EGM, and cause wild symbols to be displayed on the one or more display devices of that EGM and in the symbol positions of the symbol-based game display identified by the information in the sticky wild dataset received by that EGM.

In some such implementations and for each EGM, the one or more EGM memory devices of that EGM may further store additional computer-executable instructions for controlling the one or more EGM processors of that EGM to, for the common tournament session, receive one or more player inputs during a first time period, randomly select, responsive to each received player input, zero or more of the symbol positions associated with the symbol-based game display displayed by the one or more display devices of that EGM, and cause an additional wild symbol to be displayed in each randomly selected symbol position.

In some implementations, the one or more memory devices may further store additional computer-executable instructions for controlling the one or more processors to, for the common tournament session, generate a single sticky wild dataset defining a plurality of sticky wild sub-patterns and distribute the single sticky wild dataset to each EGM of the plurality of EGMs.

In some such implementations, the sticky wild sub-patterns may be sequentially defined and each successive sticky wild sub-pattern of the sticky wild sub-patterns may include information designating zero or more additional symbol positions associated with the symbol-based game display that are to have the wild status and are not designated by the information included in the sticky wild sub-pattern immediately preceding that successive sticky wild sub-pattern.

In some such implementations, the electronic gaming system may further include the plurality of EGMs. For each EGM, that EGM may include one or more displays, one or more EGM processors, and one or more EGM memory devices and the one or more displays, the one or more EGM processors, and the one or more EGM memory devices of that EGM may be operably connected. The one or more EGM memory devices of each EGM may further store additional computer-executable instructions for controlling the one or more EGM processors of that EGM to, for the common tournament session, cause the one or more display devices to display the symbol-based game display, receive the single sticky wild dataset distributed to that EGM, and cause, for each sticky wild sub-pattern of at least one or more of the sticky wild sub-patterns defined by the single sticky wild dataset received by that EGM, wild symbols to be displayed on the one or more display devices of that EGM and in the symbol positions of the symbol-based game display identified by the information in that sticky wild sub-pattern.

In some such implementations and for each EGM, the one or more EGM memory devices of that EGM may further store additional computer-executable instructions for controlling the one or more EGM processors of that EGM to, for the common tournament session, receive one or more player inputs during a first time period, and cause, responsive to each player input received, wild symbols to be displayed on the one or more display devices of that EGM and in the symbol positions identified by the information in a different one of the sticky wild sub-patterns.

In some implementations, the one or more memory devices may further store additional computer-executable instructions for controlling the one or more processors to, for the common tournament session, generate multiple sticky wild datasets, each sticky wild dataset defining a single sticky wild pattern, and distribute a different sticky wild dataset of the multiple sticky wild datasets to each EGM of the plurality of EGMs, wherein the sticky wild patterns defined by at least two of the sticky wild datasets are different from each other.

In some such implementations, the electronic gaming system may further include the plurality of EGMs. For each EGM, that EGM may include one or more displays, one or more EGM processors, and one or more EGM memory devices and the one or more displays, the one or more EGM processors, and the one or more EGM memory devices of that EGM may be operably connected. The one or more EGM memory devices of each EGM may further store additional computer-executable instructions for controlling the one or more EGM processors of that EGM to, for the common tournament session, cause the one or more display devices to display the symbol-based game display, receive the sticky wild dataset distributed to that EGM, and cause wild symbols to be displayed on the one or more display devices of that EGM and in the symbol positions of the symbol-based game display identified by the information in the sticky wild dataset received by that EGM.

In some implementations, the one or more memory devices may further store additional computer-executable instructions for controlling the one or more processors to, for the common tournament session, generate multiple sticky wild datasets, each sticky wild dataset defining multiple sticky wild sub-patterns and distribute a different sticky wild dataset of the multiple sticky wild datasets to each EGM of the plurality of EGMs, wherein at least two of the sticky wild datasets are different from each other.

In some such implementations, the electronic gaming system may further include the plurality of EGMs. For each EGM, that EGM may include one or more displays, one or more EGM processors, and one or more EGM memory devices and the one or more displays, the one or more EGM processors, and the one or more EGM memory devices of that EGM may be operably connected. The one or more EGM memory devices of each EGM may further store additional computer-executable instructions for controlling the one or more EGM processors of that EGM to, for the common tournament session, cause the one or more display devices to display the symbol-based game display, receive the sticky wild dataset distributed to that EGM, and cause, for each sticky wild sub-pattern of at least one of the sticky wild sub-patterns defined by the sticky wild dataset received by that EGM, wild symbols to be displayed on the one or more display devices of that EGM and in the symbol positions of the symbol-based game display identified by the information in that sticky wild sub-pattern.

In some such implementations and for each EGM, the one or more EGM memory devices of that EGM may further store additional computer-executable instructions for controlling the one or more EGM processors of that EGM to, for the common tournament session, receive one or more player inputs during a first time period and cause, responsive to each player input received, wild symbols to be displayed on the one or more display devices of that EGM and in the symbol positions identified by the information in a different one of the sticky wild sub-patterns.

Various systems and techniques for presenting more engaging EGM tournament play are also disclosed herein, including, for example, tournament systems in which various wagering game features, such as soundtracks, multiplier modes, persistent wild modes, and so forth, may be enabled at various times during a tournament session based on the amount of time that has elapsed in the session.

The timing of the activation of many such wagering game features may be arranged so as to introduce greater uncertainty and variability in player game play during a session as the end of the session draws closer. In a typical tournament setting, the closer the tournament is to its end point, the more certain its overall outcome may generally be—the player scores may generally be spread apart, and a handful of players may clearly be in the lead score-wise, with the remaining players having less competitive scores. To potentially offset such scoring inertia, the tournament system may activate the various wagering game features at different times, which may provide greater volatility in player scores during the latter part of the tournament session, thereby making the outcome of the tournament less certain and heightening player interest during the latter part of the tournament session. This can help offset any player apathy that may set in as the session progresses due to a perception that the tournament results may already be inevitable based on the players' current scores. Wagering game features that affect game play or the frequency and/or quantity of winning outcomes may, for example, start being introduced in approximately the last half of a session, and may include features that increase the player's chances of obtaining a winning outcome (like persistent wilds) and/or increase the amount of winning outcomes (like multiplier modes). Other features may be included as well, such as personalized multiplier modes that only affect individual players, as well as delayed recalculation of some player's scores and rankings when in a personalized score multiplier mode—such features may result in large changes in a player's points and ranking, allowing for sudden upsets and come-from-behind victories.

In addition to such features, tournament systems as discussed herein may also or alternatively include other features, such as prizes or trophies that may be awarded during session play but which may not have a known value until later in the tournament, and which may only have value then if the player to which they are awarded is present on the premises of where the tournament is being held.

Another feature which such tournament systems may have is a replay feature in which a player may obtain a replay of their game play during a session after the session is completed, e.g., via a smartphone, tablet, or website. Such replay features may include, for example, video of the player during the session, as well as, in some cases, a game replay and/or player video for competitors of the player during the session.

These features, as well as various other features, are discussed in more detail below, and are not intended to be limiting as to the scope of this disclosure.

In some implementations, a system may be provided that includes a plurality of electronic gaming machines, each electronic gaming machine (EGM) including one or more displays, one or more EGM processors, one or more EGM memory devices, and an EGM communications interface. In such implementations, for each EGM the one or more displays, the one or more EGM processors, the one or more EGM memory devices, and the EGM communications interface may be operatively connected, and the one or more EGM memory devices may store computer-executable instructions for controlling the one or more EGM processors to present a wagering game. Such implementations may further include a tournament management system (TMS) which may include one or more TMS processors, one or more TMS memory devices, and one or more TMS communications interfaces. The one or more TMS processors may be operatively connected with the one or more TMS memory devices and the one or more TMS communications interfaces, the one or more TMS communications interfaces may be configured to communicate with each EGM via the EGM communications interface for that EGM, and the one or more TMS memory devices and the one or more EGM memory devices of each EGM may collectively store computer-executable instructions for controlling the one or more TMS processors and the one or more EGM processors of each EGM, collectively, to: initiate a session for a tournament, the session having a session duration, cause each EGM to present the wagering game in a tournament mode during the session, and cause one or more wagering game features to be activated on the EGMs during the session based on how much of the session duration has elapsed.

In some such implementations, there may be 8, 16, 24 or 32 EGMs.

In some further such implementations, the EGMs may be arranged in banks of eight EGMs each, with each bank including a first row of 4 EGMs arranged side-to-side and a second row of 4 EGMs arranged side-to-side, with the EGMs of the first row being back-to-back with the EGMs of the second row.

In some implementations of the system the one or more wagering game features may include a soundtrack having at least a first segment with a duration equal to the session duration. The first segment may include a first portion and a second portion, the first portion may precede the second portion when the soundtrack is played, at least one of the tempo and the volume of the second portion may be increased in the second portion as compared with the first portion, and the one or more TMS memory devices and the one or more EGM memory devices of each EGM may collectively store further computer-executable instructions for further controlling the one or more TMS processors and the one or more EGM processors of each EGM, collectively, to, cause the soundtrack to be activated during the session by causing the soundtrack to be played during the session.

In some implementations of the system, the one or more wagering game features may include a soundtrack having at least a first segment with a duration equal to the session duration, the first segment may include a Shepard scale, and the one or more TMS memory devices and the one or more EGM memory devices of each EGM collectively may store further computer-executable instructions for further controlling the one or more TMS processors and the one or more EGM processors of each EGM, collectively, to, cause the soundtrack to be activated during the session by causing the soundtrack to be played during the session.

In some implementations of the system, the one or more wagering game features may include a soundtrack having at least a first segment with a duration equal to the session duration, the first segment may includes an intro portion, one or more loop portions, and an outro portion, the intro portion may precede the one or more loop portions, the outro portion may follow the one or more loop portions, at least one of the tempo and the volume of outro portion may be increased in the outro portion as compared with the intro portion, and the one or more TMS memory devices and the one or more EGM memory devices of each EGM may collectively store further computer-executable instructions for further controlling the one or more TMS processors and the one or more EGM processors of each EGM, collectively, to, cause the soundtrack to be activated during the session by causing the soundtrack to be played during the session.

In some implementations of the system with the soundtrack, the soundtrack may also have a second segment following the first segment, the second segment may be played after the session ends, and at least one of the tempo and the volume of the second segment may be lower in the second segment as compared with an end portion of the first segment.

In some such implementations, the one or more TMS memory devices and the one or more EGM memory devices of each EGM may further collectively store computer-executable instructions for further controlling the one or more TMS processors and the one or more EGM processors of each EGM, collectively, to, select the session duration from a plurality of different session durations responsive to one or more inputs, each of the different session durations may have a corresponding session duration that is equal in length to the sum of the duration of the intro portion, the duration of the outro portion, and a total duration of X repetitions of the loop portion, and X may be a positive integer.

In some implementations of the system, the wagering game that each EGM presents during the session may be a reel-based wagering game in which a plurality of symbols are presented on the one or more displays of that EGM in conjunction with each play of the wagering game, the wagering game that each EGM presents during the session may provide an award amount in conjunction with each play of the wagering game based on patterns of the symbols that are presented on the one or more displays of that EGM for that play of the wagering game, the plurality of symbols presented for each play of the wagering game may include one or more wild symbols that are treated as equivalent to at least two other, different symbols in the plurality of symbols for the purposes of identifying the patterns of symbols, and the one or more wagering game features may include a wagering game feature in which the EGMs enter a persistent wild mode in which, during a first time period, any wild symbols presented on a display of the one or more displays of the EGMs responsive to a play of the wagering game are retained for further plays of the wagering game during the duration of the first time period.

In some such implementations of the system, the one or more TMS memory devices and the one or more EGM memory devices of each EGM may collectively store further computer-executable instructions for further controlling the one or more TMS processors and the one or more EGM processors of each EGM, collectively, to, activate the wagering game feature in which the EGMs enter a persistent wild mode responsive to elapsed time of the session being within 40% to 60% of the session duration.

In some implementations of the system, the first time period may have a duration of between 5 and 15 seconds.

In some implementations of the system, the wagering game that each EGM presents during the session may be a reel-based wagering game in which a plurality of symbols are presented on the one or more displays of that EGM in conjunction with each play of the wagering game, the wagering game that each EGM presents during the session may provide an award amount in conjunction with each play of the wagering game based on patterns of the symbols that are presented on the one or more displays of that EGM for that play of the wagering game, the one or more wagering game features may include a wagering game feature in which the EGMs enter a win multiplier mode where, during a first time period, the award amount provided responsive to each play of the wagering game where a winning pattern of symbols is presented is multiplied by a score multiplier, and the score multiplier may be a number greater than 1. In some such implementations of the system, the score multiplier may be a number selected from the group consisting of 2, 3, 4, 5, and 10. In some further or alternative such implementations of the system, the first time period may have a duration of between 5 and 15 seconds.

In some such implementations of the system, the one or more TMS memory devices and the one or more EGM memory devices of each EGM may collectively store further computer-executable instructions for further controlling the one or more TMS processors and the one or more EGM processors of each EGM, collectively, to activate the wagering game feature in which the EGMs enter the win multiplier mode at multiple points in time during the session and use a larger score multiplier for each activation of the wagering game feature in which the EGMs enter the win multiplier mode during the session.

In some implementations of the system, the wagering game that each EGM presents during the session may be a reel-based wagering game in which a plurality of symbols are presented on the one or more displays of that EGM in conjunction with each play of the wagering game, the wagering game that each EGM presents during the session may provide an award amount in conjunction with each play of the wagering game based on patterns of the symbols that are presented on the one or more displays of that EGM for that play of the wagering game, and the one or more TMS memory devices and the one or more EGM memory devices of each EGM may collectively store further computer-executable instructions for further controlling the one or more TMS processors and the one or more EGM processors of each EGM, collectively, to determine that a first EGM of the EGMs is the first of the EGMs to have presented a first pattern of symbols during the session, the symbols in the first pattern of symbols all being the same, determine an identity of a player associated with the first EGM during the session, and provide a notification that the player associated with the first EGM has won a prize.

In some such implementations, the first pattern of symbols may include five symbols.

In some implementations of the system, the one or more TMS memory devices and the one or more EGM memory devices of each EGM may collectively store further computer-executable instructions for further controlling the one or more TMS processors and the one or more EGM processors of each EGM, collectively, to determine that a first EGM of the EGMs has accrued a total award amount that is higher than the total award amount of any of the other EGMs within a predetermined time interval from the start of the session, determine an identity of a player associated with the first EGM during the session, and provide a notification that the player associated with the first EGM has won a prize.

In some implementations of the system, the one or more TMS memory devices and the one or more EGM memory devices of each EGM may collectively store further computer-executable instructions for further controlling the one or more TMS processors and the one or more EGM processors of each EGM, collectively, to determine a relative ranking for players of the EGMs participating in the session based on a running total amount won by each of the players during the session, identify a player associated with a first EGM that experienced a greatest change in relative ranking during a first time period, and provide a notification that the player associated with the first EGM has won a prize.

In some such implementations, the first time period may be a time interval that starts and ends within the session and does not overlap with the start and end of the session.

In some implementations of the system that are configured to provide a notification, the notification may be one or more of an audio announcement identifying the player, a graphical presentation on a display identifying the player, activation of illumination features on the EGM of the first EGM, a notification sent to a communications device associated with the player associated with the first EGM, or a notification sent to communications devices associated with each player participating in the session.

In some implementations of the system, the tournament may include multiple sessions, each session may include multiple players, and the one or more TMS memory devices and the one or more EGM memory devices of each EGM may collectively store further computer-executable instructions for further controlling the one or more TMS processors and the one or more EGM processors of each EGM, collectively, to track the number of prizes won by each player participating in one or more of the sessions during the tournament, select a winning player of the players based on the number of prizes won by the winning player, and assign an award to the winning player.

In some implementations of the system, the wagering game that each EGM presents during the session may be a reel-based wagering game in which a plurality of symbols are presented on the one or more displays of that EGM in conjunction with each play of the wagering game, the wagering game that each EGM presents during the session may provide an award amount in conjunction with each play of the wagering game based on patterns of the symbols that are presented on the one or more displays of that EGM for that play of the wagering game, and the one or more TMS memory devices and the one or more EGM memory devices of each EGM may collectively store further computer-executable instructions for further controlling the one or more TMS processors and the one or more EGM processors of each EGM, collectively, to (a) determine if any symbols presented on that EGM in conjunction with a play of the wagering game are multiplier symbols and (b) modify the award amount in conjunction with the play of the wagering game from (a) based on the multiplier symbols of (a).

In some implementations of the system, each multiplier symbol may be associated with a corresponding score multiplier, and the one or more TMS memory devices and the one or more EGM memory devices of each EGM may collectively store further computer-executable instructions for further controlling the one or more TMS processors and the one or more EGM processors of each EGM, collectively, to, modify the award amount in (b) by multiplying that award amount by the corresponding score multiplier associated with each multiplier symbol that is determined in (a) to be presented in conjunction with that play of the wagering game.

In some such implementations of the system, the one or more TMS memory devices and the one or more EGM memory devices of each EGM may collectively store further computer-executable instructions for further controlling the one or more TMS processors and the one or more EGM processors of each EGM, collectively, to determine if at least a predetermined number of the symbols presented on that EGM in conjunction with a play of the wagering game are scatter symbols, and treat, responsive to determining that at least the predetermined number of symbols presented on that EGM in conjunction with the play of the wagering game are scatter symbols, any symbols presented during one or more subsequent plays of the wagering game that are of a particular type as multiplier symbols.

In some further such implementations of the system, the number of scatter symbols that may be presented on that EGM in conjunction with the play of the wagering game may determine the number of subsequent plays of the wagering game where the symbols of the particular type are treated as multiplier symbols.

In some implementations of the system, the system may further include a tournament host tablet (THT) which may, in turn, include one or more THT processors, one or more THT memory devices, and a touch-screen display. In such implementations, the one or more EGM memory devices of each EGM, the one or more TMS memory devices, and the one or more THT memory devices may collectively store further computer-executable instructions for further controlling the one or more EGM processors, the one or more TMS processors, and the one or more THT processors, collectively, to cause the THT to present indications of a plurality of players participating in the session via the touch-screen display, and cause the THT to provide information in association with each of the indications, via the touch-screen display and throughout the session, and regarding one or more of: the players, a score of each player, and winning outcomes of players.

In some such implementations of the system, the one or more EGM memory devices of each EGM, the one or more TMS memory devices, and the one or more THT memory devices may collectively store further computer-executable instructions for further controlling the one or more EGM processors, the one or more TMS processors, and the one or more THT processors, collectively, to, cause the THT to present a graphical representation of relative positioning of each EGM relative to the other EGMs.

In some such implementations of the system, the one or more EGM memory devices of each EGM, the one or more TMS memory devices, and the one or more THT memory devices may collectively store further computer-executable instructions for further controlling the one or more EGM processors, the one or more TMS processors, and the one or more THT processors, collectively, to identify a first set of players of the players, each player in the first set of players having a score higher than the players in the session that are not in the first set of the players, and cause the THT to, for each player in the first set of players, highlight, via the touch-screen display, the indication of that player.

In some implementations of the system, the one or more EGM memory devices of each EGM, the one or more TMS memory devices, and the one or more THT memory devices may collectively store further computer-executable instructions for further controlling the one or more EGM processors, the one or more TMS processors, and the one or more THT processors, collectively, to identify a first player of the players, where the first player has a score that is increasing faster than the score of any other player in the session and over an immediately preceding time interval of a predetermined duration and cause the THT to highlight, via the touch-screen display, the indication of the first player.

In some implementations of the system, the one or more EGM memory devices of each EGM, the one or more TMS memory devices, and the one or more THT memory devices may collectively store further computer-executable instructions for further controlling the one or more EGM processors, the one or more TMS processors, and the one or more THT processors, collectively, to cause the THT display to provide user-selectable controls that are configured to allow a tournament host to cause, by providing inputs to the touch-screen display of the THT, one or more items to occur that are selected from the group consisting of: pre-recorded audio to be played over speakers of one or more of the EGMs and pre-recorded audio to be player over speakers other than the speakers of the one or more EGMs.

In some implementations of the system, the one or more TMS memory devices and the one or more EGM memory devices of each EGM may collectively store further computer-executable instructions for further controlling the one or more TMS processors and the one or more EGM processors of each EGM, collectively, to cause replay data of content displayed on a first EGM of the EGMs during the session to be stored, and provide, after the conclusion of the session, the replay data to a remote device of a player that was playing the wagering game on the first EGM during the session.

In some implementations of the system, each of one or more of the EGMs may include an imaging sensor configured to obtain player video data of a player playing the EGM that houses that imaging sensor, and the one or more TMS memory devices and the one or more EGM memory devices of each EGM may collectively store further computer-executable instructions for further controlling the one or more TMS processors and the one or more EGM processors of each EGM, collectively, to cause the player video data to be obtained from each of the one or more EGMs that include the imaging sensor during the session, cause the obtained player video data to be stored, and provide, after the conclusion of the session, at least some player video data obtained from at least one EGM during the session to a remote device associated with a first player who was playing the wagering game on one of the EGMs during the session.

In some implementations of the system, the player video data that may be provided to the remote device associated with the first player may be first player video data of the first player obtained during the session.

In some implementations of the system, the player video data that is provided to the remote device associated with the first player may include second player video data of one or more second players who participated in the session, and the one or more second players may be different from the first player.

In some implementations of the system, the second player video data that may be provided to the remote device associated with the first player may include multiple segments, at least some of the segments may be first segments, and each first segment may include second player video data of one of the second players having a ranking, based on a score of each player at the time the second player video data in that first segment was obtained, adjacent to a ranking of the first player at the time the second player video data in that first segment was obtained.

In some such implementations of the system, all of the segments may be first segments.

In some additional implementations, the second player video data for at least some of the segments may be augmented with a graphical overlay that alters an appearance of the second player in the corresponding segment.

In some implementations of the system, the graphical overlay may include one or more graphical objects that are animated so as to have motions synchronized with motion in the overlaid second player video data, and the one or more graphical objects may obscure one or more facial features of the second player in the overlaid second player video data.

In some such implementations, the player video data that may be provided to the remote device associated with the first player may further include first player video data of the first player that was obtained contemporaneously with the second player video data for one or more of the segments.

BRIEF DESCRIPTION OF THE DRAWINGS

FIGS. 34 and 35 depict two example graphical user interfaces (GUIs) that may be provided on a tournament host tablet to display player information during a tournament session.

DETAILED DESCRIPTION

As discussed above, a multiplayer game server (MGS) for wagering game tournament play is provided; the MGS may include one or more computing systems that have computer-executable instructions stored in a memory device or devices thereof that, when executed by one or more processors of the MGS, cause the MGS to manage various aspects of tournament game play using EGMs. In particular, the MGS may facilitate and/or manage various phases of a tournament session for a plurality of players, including, for example, the start of the tournament session, ongoing play during the tournament session, and the end of the tournament session. Prior to discussing the MGS, various aspects of EGMs and other gaming-related equipment are discussed below with respect to FIGS. 1 through 3.

Figure 1:
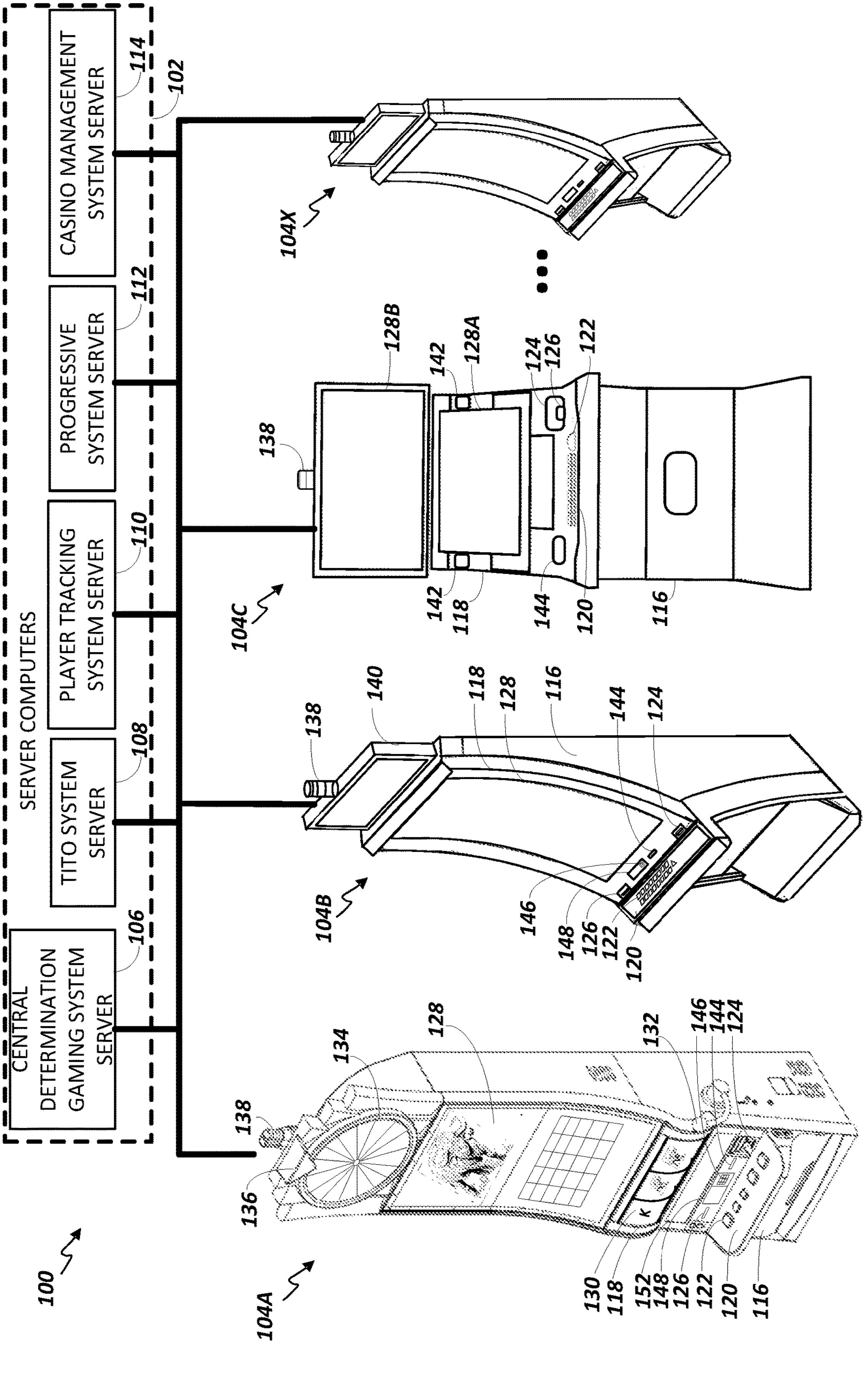
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
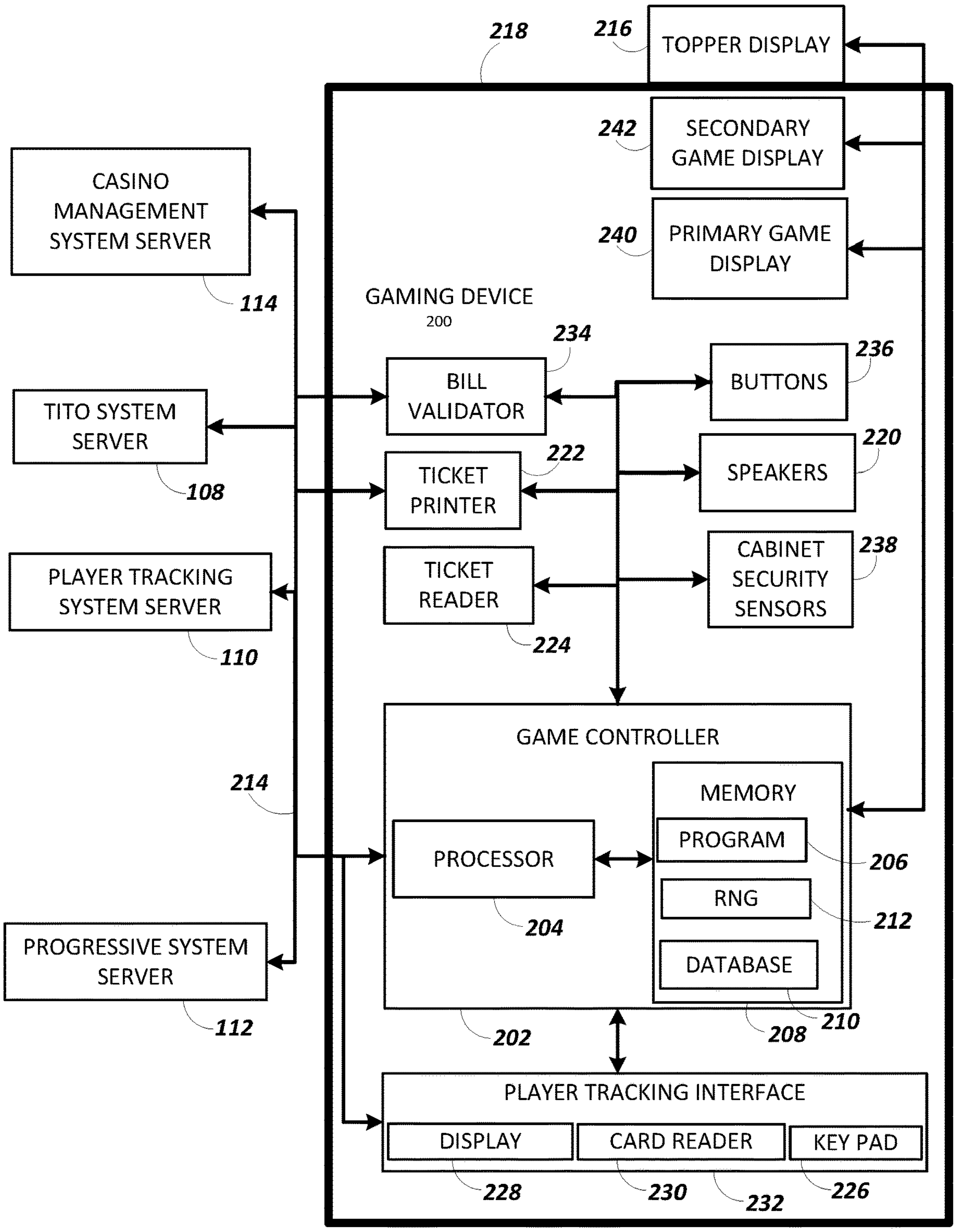
FIG. 2 is a block diagram showing various functional elements of an exemplary EGM.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during the course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrate specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that outputs credits from and/or loads credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
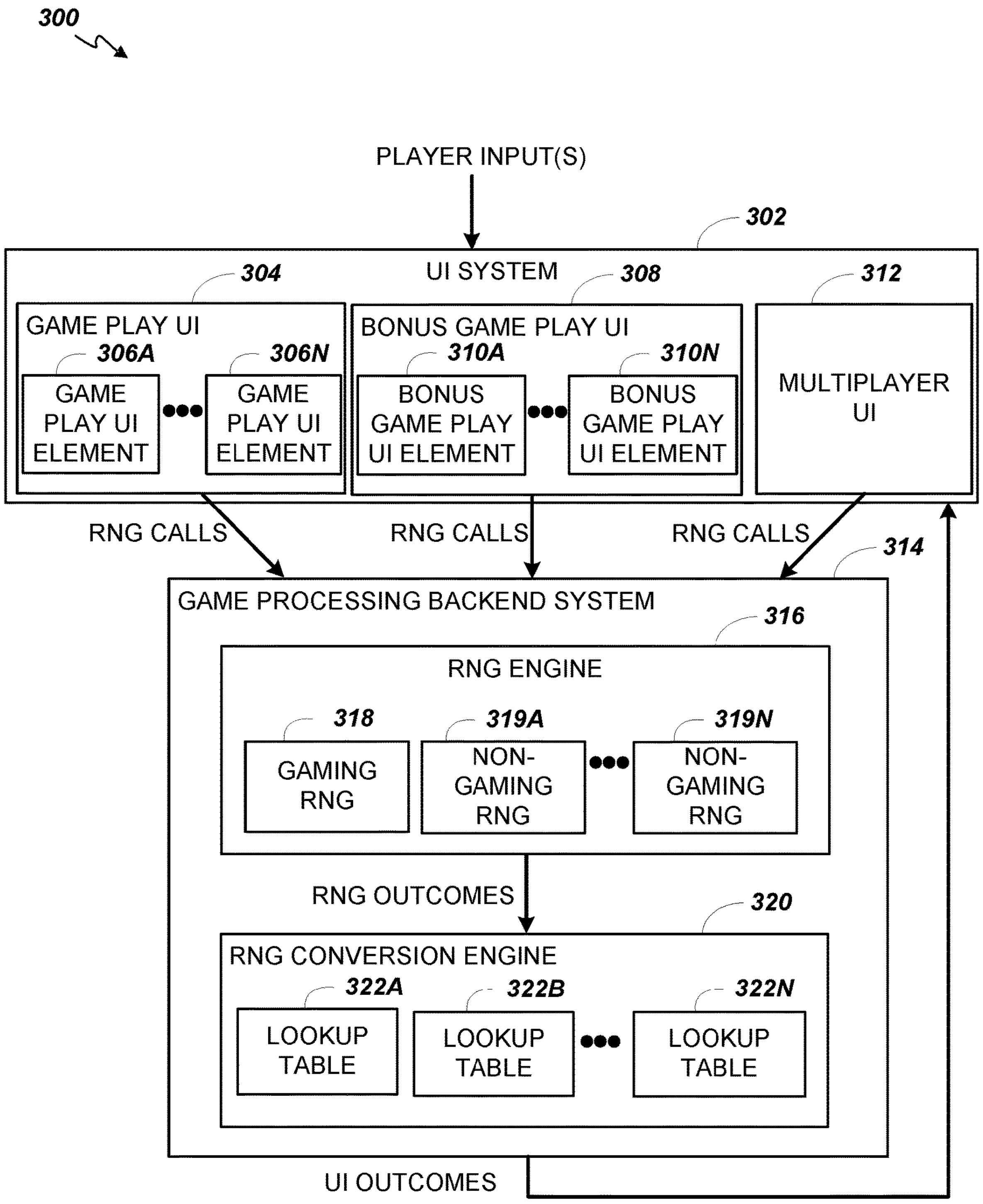
FIG. 3 illustrates, in block diagram form, an embodiment of a game processing architecture algorithm that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

While the above discussion has focused on the operation of electronic gaming machines during conventional wagering play, e.g., solo play by players, electronic gaming machines may sometimes be configured so as to participate in "tournaments." In the context of this disclosure, a "tournament" refers to a multiplayer gaming event in which multiple electronic gaming machines are specially configured to operate in a mode where the electronic gaming machines (or, rather, the players of the electronic gaming machines) compete amongst each other. In some tournament implementations, the player of each participating electronic gaming machine is provided with a large, or infinite, pool of credits with which to make wagers during one or more tournament sessions. The players then compete against each other to see which player can win the largest number of credits for a given tournament session by playing the wagering game using the credits (e.g., the credits won during a tournament may be thought of as "points," the total of which for each player is the player's "score"); in some tournaments, the credits provided to each player for use in the tournament may be non-cashable, e.g., not redeemable for cash (tournaments using non-cashable credits may be referred to herein as "free tournaments" or "marketing tournaments"; it will be understood that any of the tournament systems discussed herein may be used to provide free tournaments or marketing tournaments, or other types of tournaments). Each session may have a generally fixed duration (although some tournaments may have session durations that may vary due to events that occur during play or due to other factors), which is typically quite short, e.g., 2, 3, 4, etc. minutes. In some implementations, a session duration may be defined by a number of spins that each player is permitted to take, e.g., each player may make 100 spins during a session, although each player may use a different amount of time to make those 100 spins. In other implementations, session duration for each player may be defined by a combination of such limits, e.g., a time-based limit or a spin-based limit, whichever each player achieves first (for example, 2 minutes or 100 spins, whichever is reached first by a player). Once a session begins, the players participating in that session try to win as many credits as possible by making wagers on their respective electronic gaming machines. In free tournaments or marketing tournaments, since the credits being wagered do not actually have fungible monetary value, the players are generally freed from any reluctance to place wagers; this, and the relatively short duration of the session, encourage players to make as many plays of the wagering game as possible, and wager as many credits as possible, during the duration of the session. Other types of tournaments may use other mechanisms to determine the pool of credits used by the player, e.g., each player may buy in to the tournament and receive an amount of credits for use in the tournament that is based on their buy-in amount; in other implementations, however, a player may buy in to a tournament and be provided with an infinite pool of credits for use during the tournament. In some implementations, the winnings resulting from such tournaments may be non-cashable and used solely to determine the relative rankings of the players in the tournament, whereas in other implementations, the winnings from such tournaments may not only determine the player's relative rankings within the tournament, but may also be wholly or partially cashable as well.

The term "wagering mode," as used herein, refers to a mode of electronic gaming machine operation in which the electronic gaming machine is operable for wagering game play in which monetary wagers are made for a chance to win a monetary award determined by each individual game outcome and the player is typically only playing against the EGM and not against other players (it will be understood that players may, as part of EGM play, be competing for prizes and/or jackpots that may be available to players on a large number of EGMs, and if one player wins such a prize and/or jackpot, the other players may lose out on the opportunity to win that jackpot, although such competition for a common prize is not, by itself, considered to be competing against other players in the same sense as in a tournament). In some instances, an electronic gaming machine may generally only be operable in a wagering mode, in which case "wagering mode" may simply be viewed as the default operating state of the electronic gaming machine. Electronic gaming machines in wagering mode where actual monetary wagers are in play are strictly regulated and subject to extensive restrictions on how individual game outcomes are determined.

The term "tournament mode," as used herein, refers to a mode of electronic gaming machine operation in which the electronic gaming machine is operable for play of a wagering game in a manner similar to play during wagering mode but in a competitive multiplayer setting. Such competitive multiplayer settings may generally exhibit one or more characteristics that set them apart from "wagering mode" game play. For example, in tournament mode, players competing in a particular tournament session may be given the same duration of time in which to play the subject wagering game, e.g., all players get 2 minutes in which to try and get as high a score as possible in the wagering game; in most such implementations, the time periods given to the players in a particular session may not only be all equal in length, but may also have the same start and end times. In contrast, during wagering mode game play, players are free to play for as little or as long as they like (assuming they have sufficient credits), and the duration of play of one player is not connected with the duration of play of other players. In another example, tournament mode game play results are typically used to generate a relative ranking of players that are participating in the tournament or in a tournament session. In wagering mode game play, in contrast, players are not typically ranked against one another. In one implementation, as discussed above, the player may be provided with an infinite or very large pool of (e.g., non-cashable) credits that may be wagered during a time period for a tournament session in order to potentially win (e.g., non-cashable) credits (in contrast to wagering mode game play, in some implementations, the credits from winnings in tournament mode using non-cashable credits may be kept separate from the credits in the wagering credit pool). In tournament mode, the player's objective is to obtain as many credits as possible during the tournament session time period; at the end of the time period, the player's credit winnings may be compared against the credit winnings of other players engaged in tournament mode play during that time period, and determinations may be made as to which player(s) won the tournament session based on the players' credit winnings. A single tournament may feature multiple rounds of sessions, with players' performance in those tournament sessions being taken into account in determining who wins the tournament or who may advance to play in tournament sessions in later rounds. For example, a tournament may be structured such that every player plays in a first round of tournament sessions, with the three highest scorers from each tournament session being advanced to a subsequent round of tournament sessions, in which the three highest scorers of each tournament session in the subsequent round of tournament sessions are then advanced to a further subsequent round of tournament sessions, with the pool of players and the number of tournament sessions provided in each round of the tournament growing smaller and smaller until a final round is played with a single tournament session. In some other tournaments, a similar tiered tournament session round structure may be utilized, but a player's eligibility to participate in a subsequent round may be based on their score in the tournament session for the current round. For example, players achieving tournament session scores in the upper 25% of the scores achieved in all of the tournament sessions for the round may be advanced to the subsequent round of tournament sessions. Players may win awards, including monetary awards, for their placement in the tournament or other achievements, e.g., trophies won, etc., but such awards may not be directly tied to any actual monetary wager in many implementations. Accordingly, tournament mode gameplay that uses non-cashable credits is generally not subject to the same regulatory restrictions and controls that are placed on wagering mode play.

Various implementations of tournament systems according to this disclosure may offer several benefits. For example, the tournament systems and techniques discussed herein may encourage players to visit a casino more often, thereby potentially driving up casino revenue. Such systems may also cause players that visit a casino to participate in a tournament to spend additional time at the casino before, after, and/or during their tournament play, thereby further increasing revenues for the casino. Tournament systems that run tournaments that do not involve wagering games in which players may win cashable credits may offer other technical benefits as well—for example, regulations that typically govern the RTP or randomness of EGMs in most jurisdictions may not apply to EGMs that are operating in a tournament mode and providing winnings of non-cashable credits.

The present inventors have determined that tournament play may be made even more engaging to players by activating various wagering game features for the EGMs used in a tournament session during the course of the tournament session (for clarity, reference to "session" herein is to be understood, unless otherwise indicated through context, to refer to a "tournament session"). A tournament session, as the term is used herein, refers to a multiplayer gaming event in which a group of players engage in competitive multiplayer play against each other on wagering game machines and/or in online or mobile wagering game play in the context of a gaming tournament for a certain time period. The play of each player during a tournament session is generally continuous and the composition of each group of players within a tournament session does not typically change during the tournament session. Such wagering game features may, for example, be activated at various times during the session, with different wagering game features being activated at different times and the activation of such features being orchestrated to enhance player excitement and engagement with the tournament. In some respects, tournament game play, as set forth herein in some implementations, may be viewed as a complete player entertainment experience, similar to participating in an amusement park ride.

The player's engagement with the tournament may, in some implementations, begin off-site from a casino or other wagering game facility, e.g., in the comfort of the player's home, while in the office, or out running errands. A casino or other wagering game facility ("casino" will be used herein to refer to any facility that may have electronic gaming machines on-site) intending to hold a wagering game tournament may select the player, as well as various other players, as potential participants in the tournament and may cause notifications to be sent to each such selected player via, for example, a smartphone application that is installed on the player's phone. In some implementations, the smartphone application may be a concierge application for the casino. In some other implementations, the smartphone application may, for example, be an online or mobile wagering game application (or an application that allows a person to select between a plurality of such online or mobile wagering game applications, e.g., the Heart of Vegas application offered by Aristocrat® Technologies, Inc.). Online or mobile wagering game applications, in many jurisdictions, do not allow wagers to be placed using cashable credits (and do not allow any won credits to be cashed out); instead, online or mobile wagering game applications typically operate using some form of virtual currency. The player may receive such virtual currency through a variety of means, e.g., by receiving a free quantity of such virtual currency at various times, e.g., on a daily basis, by purchasing a quantity of such virtual currency using real currency, or through obtaining additional virtual currency by making winning wagers using the virtual currency in the online or mobile wagering game application (as used herein, "online" may also refer to mobile contexts). The online wagering game application may, in many implementations, offer game play that is similar to game play on an EGM of a similar wagering game. The player may thus have a common experience with the wagering game, regardless of whether played on an EGM in a casino or on a smartphone at home—the only difference would be that play on the EGM would generally entail the use (and winning) of cashable credits, whereas play on the online version of the same wagering game would typically involve the use (and winning) of non-cashable credits (although EGMs used in tournament implementations may be configured, in some implementations, to use non-cashable credits as well, making the experience of playing such a wagering game online and in a tournament setting very similar). This distinction may not exist in jurisdictions that permit online wager gaming using cashable credits. In some implementations, online wagering game application(s) and casino concierge applications may be combined into a single application or application experience.

Various details of a tournament experience are discussed below with reference to FIGS. 4 through 22, which depict a bank of four EGMs, a virtual button deck display, overhead signage, and a leaderboard display. Various other implementations may feature a subset of such features, e.g., multiple EGMs with no overhead signage or leaderboard, or only a leaderboard with no overhead signage, etc.

While a large percentage of players are likely to have smart phones with online wagering game applications and/or casino concierge applications, notifications inviting players to participate in a tournament may also be sent out to selected players through other mechanisms, e.g., through standard or multimedia text messages, email, physical mail, phone calls, social media posts, etc.

In some implementations, a player may be selected for participation in a tournament based on the player's play of an online wagering game. For example, a player that achieves a particular milestone in online wagering game play, e.g., achieving a lifetime total balance of virtual credits wagered in online wagering game play in excess of a predefined amount, achieving a particular game outcome in an online wagering game play, playing a particular online wagering game a predetermined number of times, etc., may be selected for participation in a tournament based on achieving one or more such milestones. Players may also be selected for participation in a tournament based on, for example, on-site activity at a casino, e.g., achieving a particular outcome on an EGM at the casino or a related property, spending a certain amount of money at restaurants or gift shops at the casino or a related property or properties, booking a hotel room of a particular value at the casino or a related property, etc. In another or further implementation, a player may be selected for participation in a tournament based on their performance in another tournament, e.g., a player may be selected to participate in a tournament that is on-site at a particular casino based on their placement in a previous online tournament.

In some implementations, a tournament may be configured to allow players to participate remotely via an online wagering game application. As mentioned earlier, EGMs configured for tournament play provide their players with a pool of credits to be used for wagering game play during the tournament; similarly, online wagering game application play may also involve a pool of credits to be used for online wagering game play; such credit pools may be finite in some implementations, but are often configured to be infinite for each player (it will be understood that in implementations with infinite credit pools, the EGM may, in some such implementations, not even draw wagers from a credit pool at all and may simply be configured to allow the player to engage in as many spins or plays as they like with a given wager amount during the tournament session. In view of this, some tournaments may be configured to allow players to participate in tournament play by playing wagering games either on an EGM or on, for example, a smartphone or tablet using an online wagering game application. Generally speaking, reference herein to EGMs may be understood to be inclusive of traditional EGMs, e.g., slot machines located in a casino or other venue, as well as alternative EGMs, e.g., smartphones, tablets, or other devices that may provide similar tournament game play experience. In such implementations, the tournament may be configured to allow for mixed play, in which players playing against each other in a tournament session may include players playing the wagering game on traditional EGMs and also players playing an online version of the wagering game via alternative EGMs. In such implementations, the wagering game used in the session may be the same wagering game for both the traditional EGM-based players and the alternative EGM-based online players. Tournaments may also be configured to offer segregated play for traditional EGM-based players and alternative EGM-based online players, e.g., a tournament may have some sessions where only traditional EGM-based players may participate, and other sessions where only alternative EGM-based online-based players may participate; this may help normalize the playing experience for players within a particular tournament session. Online players, for example, may not be provided with the same amount of information available to traditional EGM-based players, who can easily see and hear what other players are doing in the cluster of EGMs in which the traditional EGM-based players are playing. This enhanced situational awareness of traditional EGM-based players may cause traditional EGM-based players to engage in more aggressive play if they perceive that another player is on a "hot streak," whereas alternative EGM-based online players may not be subject to such stimuli. Online players may also experience issues such as network lag that may cause their game play experience to be different from traditional EGM-based wagering game play. In some such tournaments, the tournament sessions for a first round of a tournament may include segregated alternative EGM-based online wagering game play tournament sessions and traditional EGM-based wagering game play tournament sessions, but the tournament sessions for a second round of that tournament may feature only traditional EGM-based wagering game play, thereby requiring the players that participated in the first round of tournament session play in an online format to physically visit the venue where the EGM-based tournament sessions are being offered in order to participate in the second round of tournament session play.

In many implementations, regardless of how a tournament that allows for both online and on-site, EGM-based play is configured to operate, the tournament may be configured to require that a participating player participate in at least some specified number of traditional EGM-based sessions during the tournament, which would require each player to physically visit a location where the tournament EGMs are accessible, e.g., a casino, in order, for example, to remain qualified for the tournament, to advance to a further round of play in the tournament, or in some other way continue participating in the tournament.

For example, a given tournament may require a player to participate in 5 of 100 qualifying sessions in order to qualify to potentially move on to a championship phase of the tournament; players with the highest total scores from the qualifying sessions may advance to the championship phase. In such an implementation, each player may be required to participate in at least one (or some other number) of the qualifying sessions on-site, but may be allowed to participate in the remaining qualifying sessions via online participation. In the championship phase, stricter participation rules may be implemented, e.g., the championship sessions may only be open to players that participate on-site, e.g., on an EGM, in those sessions.

There may be many ways in which a tournament system may be configured to run a tournament. For example, some tournaments may simply determine an overall tournament winner based on the player with the highest cumulative session score at the end of the tournament; in such instances, the more sessions a player plays, the higher likelihood that they will win the tournament (as the points or credits from every session played will contribute to their overall score).

In another implementation, the tournament system may be configured to determine a player's standing in the tournament based on a subset of the player's scores for the sessions they participated in. For example, the tournament system may determine each player's total tournament score by only using the player's top session score of multiple session scores as the player's score for a portion of the tournament, e.g., a round of the tournament, in which those multiple session scores were obtained. In another implementation, the tournament system may be configured to allow each player to play up to X tournament sessions during a given phase of the tournament, and may then sum the Y highest scores achieved across those tournament sessions to determine the player's score for that phase of the tournament (where X Y). Some tournament systems may be configured to allow some of the tournament sessions that are used to calculate a player's score for a given phase of a tournament to include one or more scores for sessions in which the player participated remotely, e.g., through online play as opposed to on-site play at the casino. In some such tournament systems, only a limited number Z of online sessions may be used by the tournament system to determine a player's Y top scores, where Z<Y. Various permutations of Y and Z may be used, including, but not limited to, Y=2 and Z=1, Y=3 and Z=1 or 2, Y=4 and Z=1, 2, or 3, and Y=5 and Z=1, 2, 3, or 4. For example, if a player participated in ten sessions, half of which were on-site sessions and half of which were online sessions, during a particular phase of a tournament, the tournament system may be configured to determine the player's tournament score for that phase of the tournament by summing together the player's three highest tournament session scores from the ten sessions, with a maximum of two of those highest tournament scores being allowed to be from online sessions. Thus, if the player scores during a tournament phase were: 20,100 (online), 19,800 (online), 18,540 (online), 16,330 (online), 16,100 (on-site), 14,230 (on-site), 12,210 (on-site), 9,840 (online), 7,320 (on-site), and 6,930 (on-site), the tournament system may determine the player's score for that phase of the tournament by summing the $1^{st}$ highest score (20,100), the $2^{nd}$ highest score (19,800), and the 5th highest score (16,100); the $3^{rd}$ highest score and the $4^{th}$ highest score, in this example, were not used since they were both from online sessions, and the $1^{st}$ and $2^{nd}$ highest scores had used up the allocated online session scores.

Other tournament configurations may allow for a "bracketed" system in which players compete against other players in the same "bracket" and then the top-scoring players in each bracket are allowed to advance into the next, smaller bracket to compete against the other players that were the top-scoring players in their brackets. Such bracketed competition may continue until only one bracket is left, at which point the winner of that final bracket may be declared the tournament champion. In some implementations, a player's score for determining whether or not they are a top-scoring player may be based on their performance in multiple tournament sessions, some of which may be played remotely, e.g., online. In such tournament implementations, each bracket may be considered a phase of the tournament, with the results of the bracket being determined by the outcomes of the tournament sessions within the bracket. In some implementations, player scores may be determined using a subset of the tournament sessions in which they played in the bracket, e.g., as described above (each bracket may be considered to be a different phase of the tournament).

Selections of players as potential participants in tournaments may be made using a tournament management system, for example, that may have access to a variety of different sources of data, including, for example, player tracking account information, casino transaction histories for players, online wagering game account data, etc., that may be used to drive selection of particular players. In some implementations, the players selected for participation may be selected based on various criteria being satisfied, e.g., players in a certain age group, e.g., 55 and older, between 21 and 30, etc., players having a particular status, e.g., Gold and Platinum level players, players that are enrolled in a player reward program, etc. The tournament management system may be configured to automatically make such selections and notify the selected players, or may be configured to present an interface to an administrator that allows the administrator to guide the selection of players, e.g., by enabling one or more filters or other criteria that are used to identify a population of selected players. Once the desired population of players has been determined, notifications may be sent out to those players inviting them to participate.

Once a player has received an invitation to participate in a tournament (or is otherwise notified of being eligible for participation in the tournament), the player may indicate, in some manner, that they accept the invitation. For example, the player may reply to the notification (or click a hyperlink in the notification) to indicate interest in participating. The tournament management system may track such responses or player actions and then add the players that indicate acceptance of the invitation to participate to a roster of participating players for the tournament.

Once a player is listed as participating in a tournament, various details of the player's participation may be specified and relayed to the player. For example, in some tournaments, players may be assigned by the tournament management system (TMS) a particular session in which they are scheduled to compete, and may need to show up at a designated location, e.g., on-site near the EGMs for the tournament, at a designated time in order to participate in the session. Similarly, in some implementations, players may be assigned by the TMS to a particular EGM in a particular session. In other implementations, the players may be provided with an interface, e.g., via smartphone or at an on-site kiosk, that allows them to select a particular session in which they wish to participate and/or a particular EGM that the player wishes to use during the session.

Figure 4:
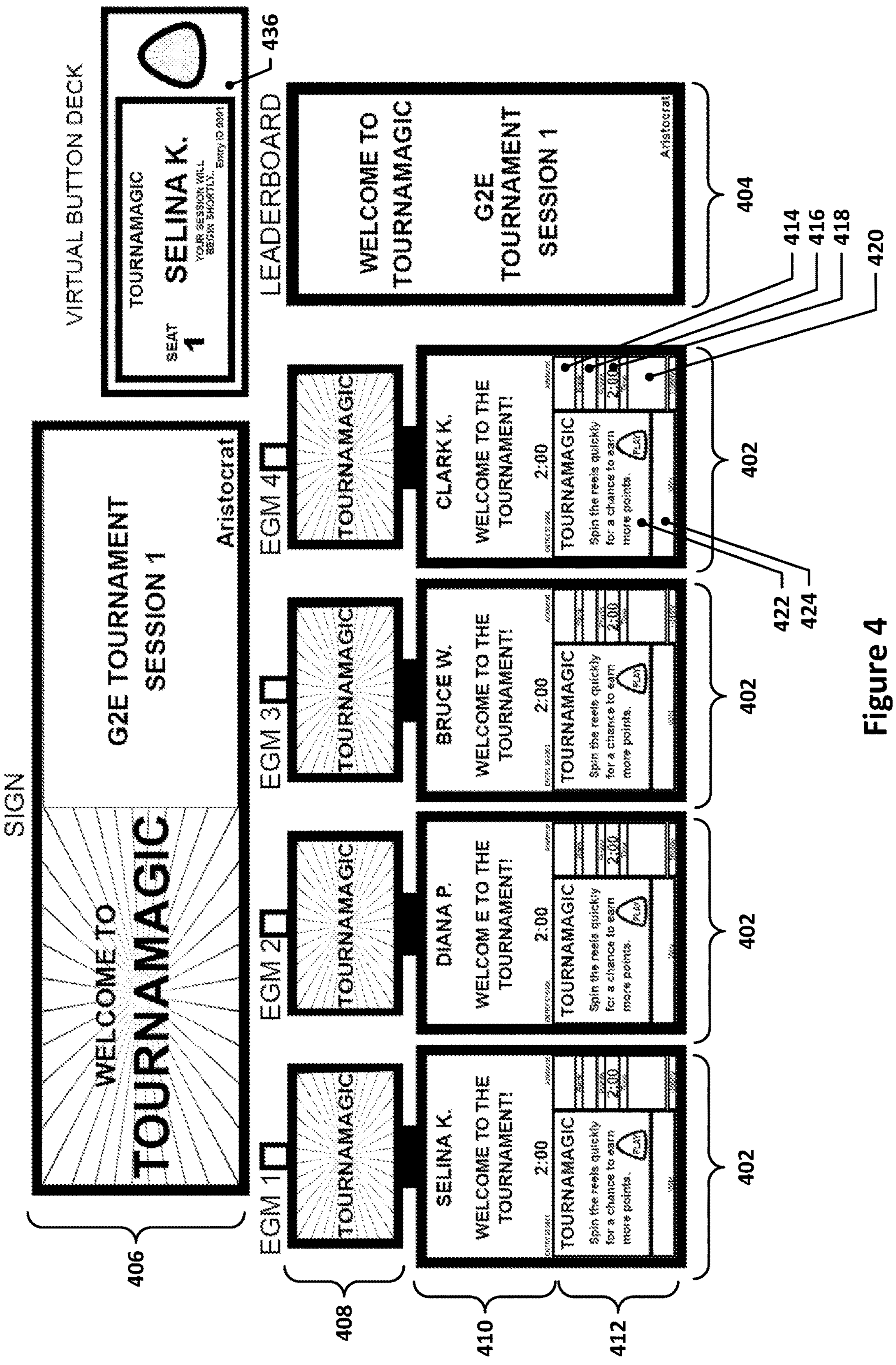
FIGS. 4 through 22 depict various stages of operation of a bank of electronic gaming machines during a tournament session.

When a player's on-site session is about to begin, the players may each be directed to the EGM that each is assigned (or, if players are not pre-assigned an EGM, the players may be directed to pick any unoccupied EGM configured to participate in the session). FIG. 4 depicts an example bank of four EGMs 402 (EGM 1, EGM 2, EGM 3, and EGM 4), e.g., such as may be used by players in a tournament. The bank of EGMs 402 may be paired with an overhead sign 406 and a leaderboard display 404. The EGMs 402 may each include a topper display 408, a main top display 410, and a main bottom display 412. In some implementations, there may be additional displays, such as a virtual button deck display 436 that may be provided on a generally horizontal (or slightly sloped and/or curved surface) of the EGMs. The button deck of an EGM traditionally included a variety of physical buttons that players used to make game selections and otherwise provide input to allow play of a wagering game. In recent years, newer EGMs have featured virtual button decks that provide a touch-screen display with user-selectable controls; such virtual button decks may have either no physical buttons at all, or a reduced number of physical buttons. In the context of some tournament systems, EGMs with virtual button decks may be caused to display tournament-related content on the button decks in some cases. For example, the virtual button deck may display information to the player of the EGM indicating the player's seating position, the player's current rank within the session, the player's current rank within the tournament as a whole, the player's name, information about the activation of a wagering game feature (e.g., "Sticky Wilds Next 10 Seconds!"), information about an active wagering game feature ("Sticky Wilds 3 Second Remaining!"), and/or leaderboard information. The main bottom display 412 may include a plurality of regions, e.g., a player rank region 414, a score region 416, a time remaining region 418, a trophy display region 420, a wagering game display region 422, and a win display region 424. It will be understood that the particular screen layout of the EGMs in FIGS. 4 through 22 may be varied as needed, for example, depending on the format of the particular game used in the tournament. In some implementations, a virtual button deck may provide two separate spin or play button controls that are positioned in close proximity to each other, e.g., within an inch or several inches of each other, thereby allowing a player to alternately activate each separate play button with the fingers of a different one of their hands. This may allow the player to very rapidly provide spin or play inputs via those buttons, as the player may start to push one button with one hand as the other hand is lifting up off the other button.

The topper displays 408 may be used for various purposes during the tournament, including for displaying graphical content indicating that the gaming machine in question is participating in a tournament, graphical content indicating an event or milestone achieved by the player of a particular EGM, graphical content indicating a particular phase of game play, etc. Since the topper display 408 of each EGM 402 is the most difficult display of the EGM 402 for the player thereof to focus on, the topper display may be used to display content that may be more for the benefit of spectators than the individual players; information intended for the individual players may be presented using displays that are positioned so as to be more easily viewed by the individual players, e.g., the main top display 410 and the main bottom display 412, for example.

The main top display 410 may, for example, be used to display leaderboard information and occasionally, other content, e.g., welcome messages, announcements of special play modes, win events, etc. The main bottom display 412 may, for example, be used to display wagering game content, e.g., reels, player controls, etc., in the wagering game display region 422, amounts won in a win display region 424, the player's current rank in the player rank region 414, the player's running total credits/points won for the current session in the score region 416, the amount of time remaining in the current session in the time remaining region 418, and any trophies or prizes won during the current session in the trophy display region 420.

In FIG. 4, the EGMs 402 are all displaying a generic welcome message; there is no wagering game content currently shown on the main bottom display 412 and most of the other regions of the main bottom display 412 have no data.

Figure 5:
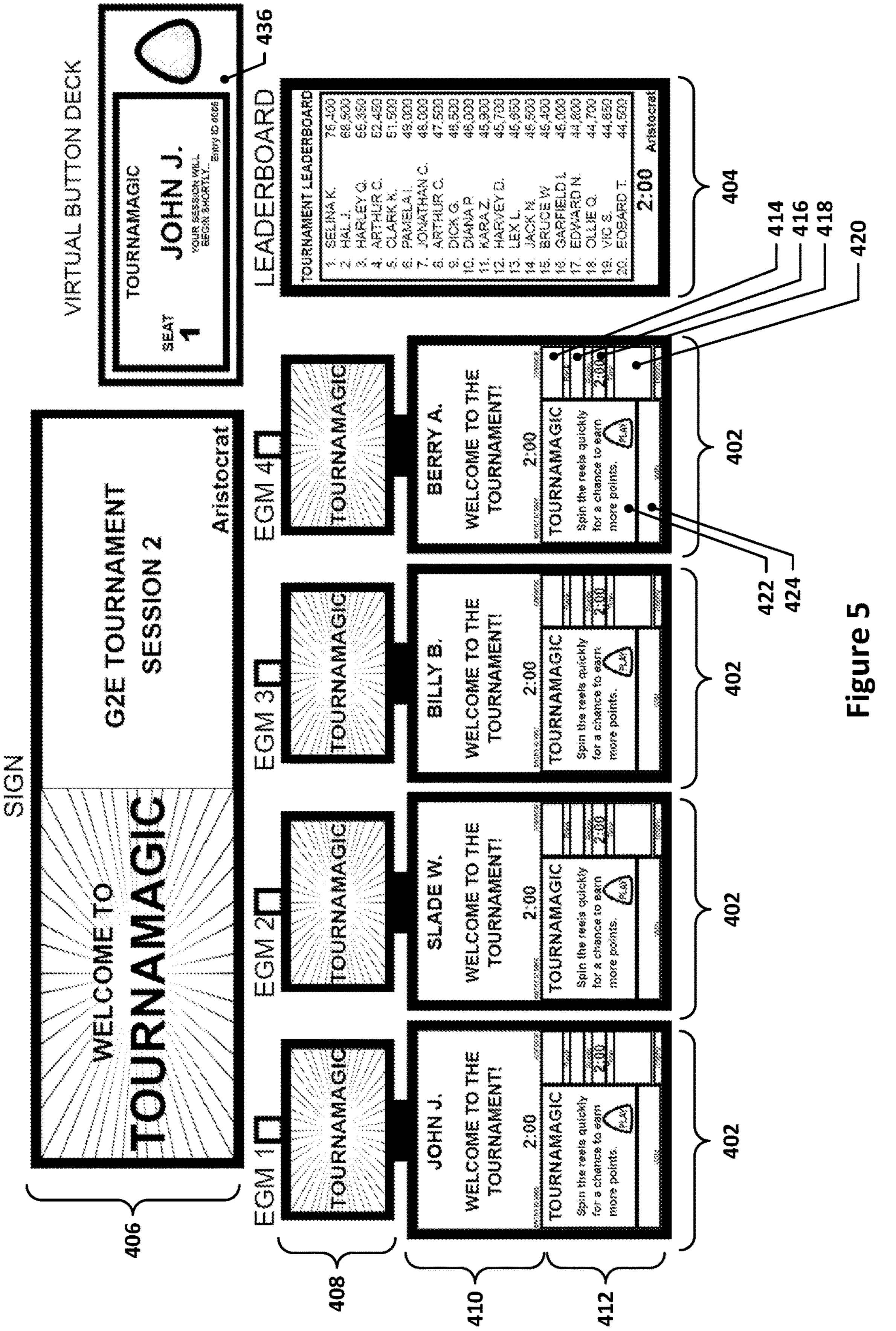

A welcome message may be displayed, e.g., displayed on each EGM and/or on a kiosk display, topper display, leaderboard display, or other signage display, such as overhead sign 406 and leaderboard display 404, in order to welcome players to the upcoming session. In some implementations, as shown in FIG. 5, the leaderboard display 404 may be caused to show the current player tournament rankings. In other implementations, such a leaderboard may be configured to alternatively or additionally show data from a previous session of the tournament or round of the tournament, e.g., the rankings and scores of the players in the immediately preceding session (for the initial session of a tournament or round of a tournament, however, such data may not be available, and content similar to FIG. 4 may be depicted instead).

Figure 6:
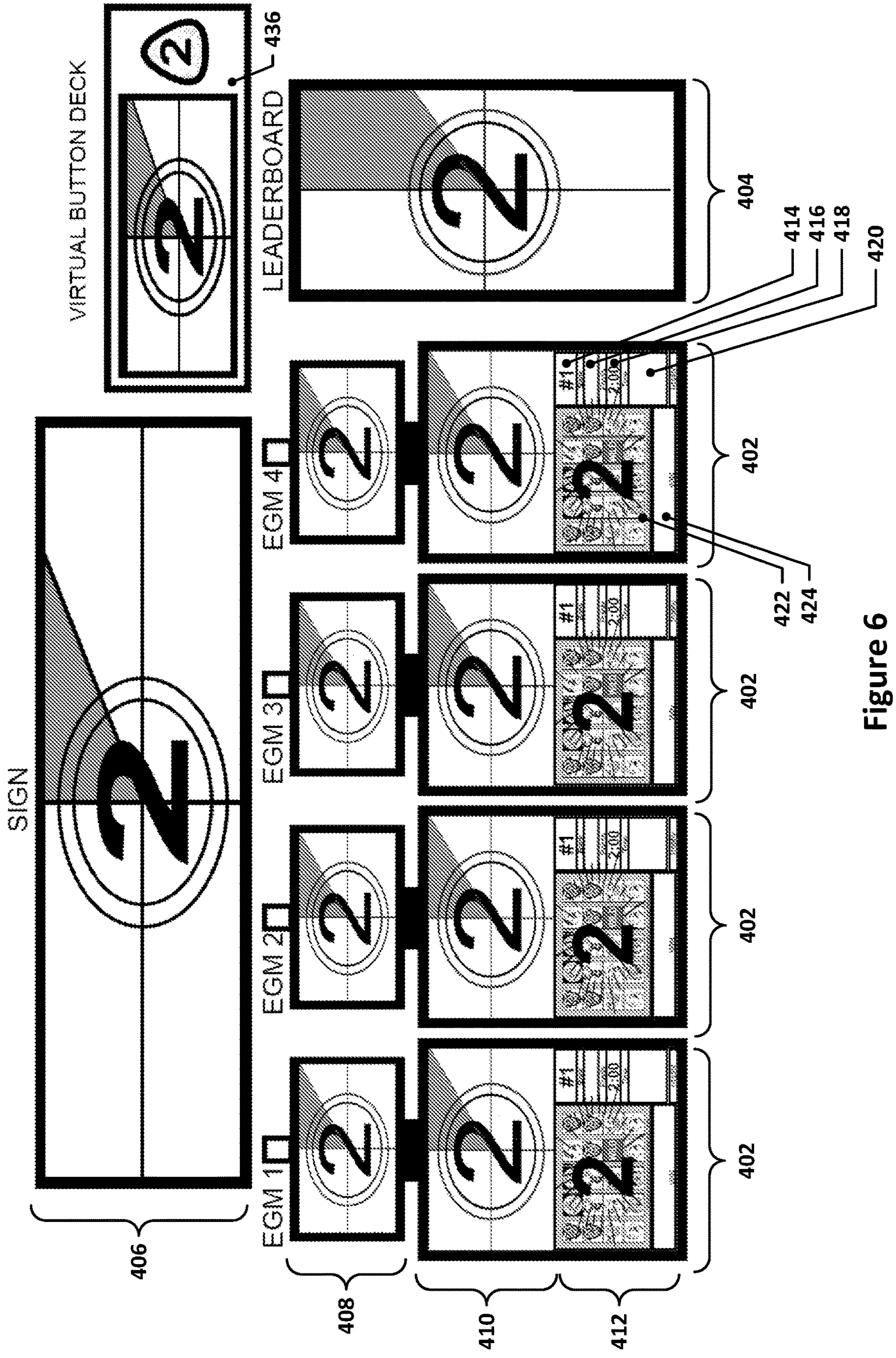

In some implementations, as shown in FIG. 6, a countdown timer may be provided to let players know how much time remains before the session begins. In some implementations, such displays may present graphics indicating that the session is about to begin in the last seconds before the session begins, e.g., graphics indicating text such as "Ready," followed by "Set," followed by "GO!" or "3," "2," "1," "GO!" The countdown timer may be shown on, for example, one or more of the overhead sign 406, the topper displays 408, the main top display 410, the main bottom display 412, the leaderboard display 404, or any other suitable display, such as the virtual button deck display 436 or the physical "Play" button. In the depicted example, the countdown timer, which is shown as being at less than two seconds remaining, is depicted on the overhead sign 406, the topper displays 408, the leaderboard display 404, the main top display 410, the main bottom display 412, the virtual button deck display 436, and the spin button on the virtual button deck display 436 (other implementations may feature less extensive presentation of the countdown timer). The countdown timer in this example is a radial wipe-style timer where a line radiating out from the center of a 2×2 array of quadrants is caused to rotate about that center; as the radial line sweeps through each quadrant, the portion of the quadrant in between the line and a reference line, e.g., a line radiating from the center to the top of the array, and opposite the direction of rotation of the radial line may change color or appearance. Other countdown timer styles may be used as well, if desired. In FIG. 6, the main bottom display 412 also shows a countdown timer, but without the radial wipe-style timer.

Figure 7:
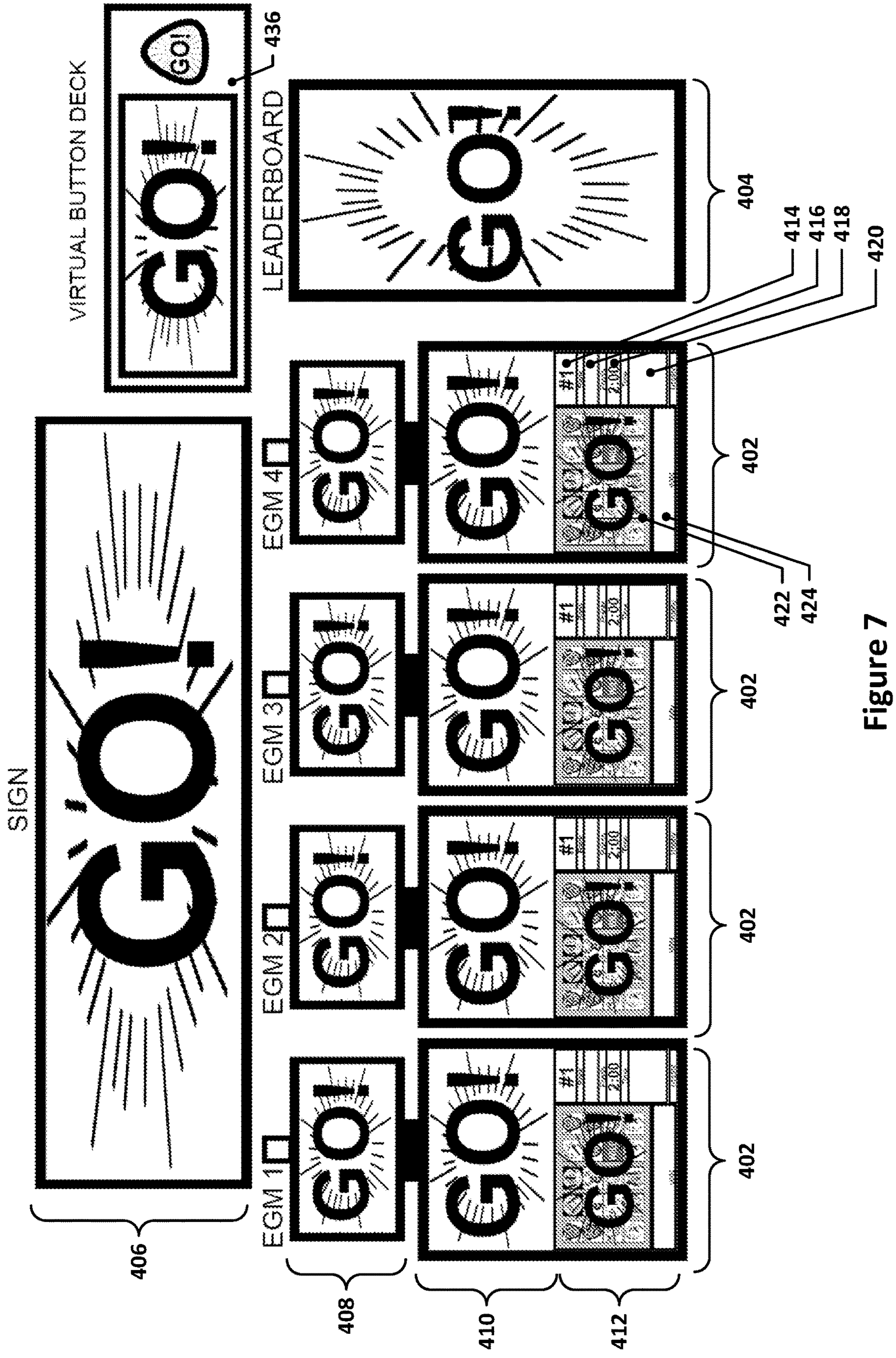

In FIG. 7, the tournament session has begun, as indicated by the word "GO!" displayed on all of the displays of the EGMs 402, the overhead sign 406, and the leaderboard display 404. Immediately after or concurrent with the display of "GO!," the EGMs 402 may be enabled for play by the players so the wagering game play portion of the tournament session may begin. Once the session has started, all of the EGMs in the session may be enabled to accept inputs from the players to cause plays of the wagering games to be made. In the context of this disclosure, a "play" of a wagering game refers to, for example, pushing of a "play" or "spin" button or other player-activatable button or control that causes a wagering event, e.g., a spin of reels in a reel-based wagering game, to be initiated. In a typical EGM, the outcome of a play is typically determined effectively immediately upon receipt of such input, although the EGM may engage in various activities before informing the player of the outcome, e.g., wheel spin animations, bonus animations, etc. In some implementations, players may have the ability to cut short or skip at least some portion of the post-play activities, e.g., animations, by, for example, pushing the play or spin button again, which may cause the animation to stop and the outcome to be immediately displayed. In some such implementations, the next play may start immediately after, or some short time after (such as 0.5 seconds after) the outcome is displayed. In other implementations, a second push of the play or spin button may be required to start the next play, i.e., pushing the play or spin button during such post-play activities will cause those activities to stop and an outcome to be displayed, but will not automatically trigger the next play of the wagering game.

Figure 8:
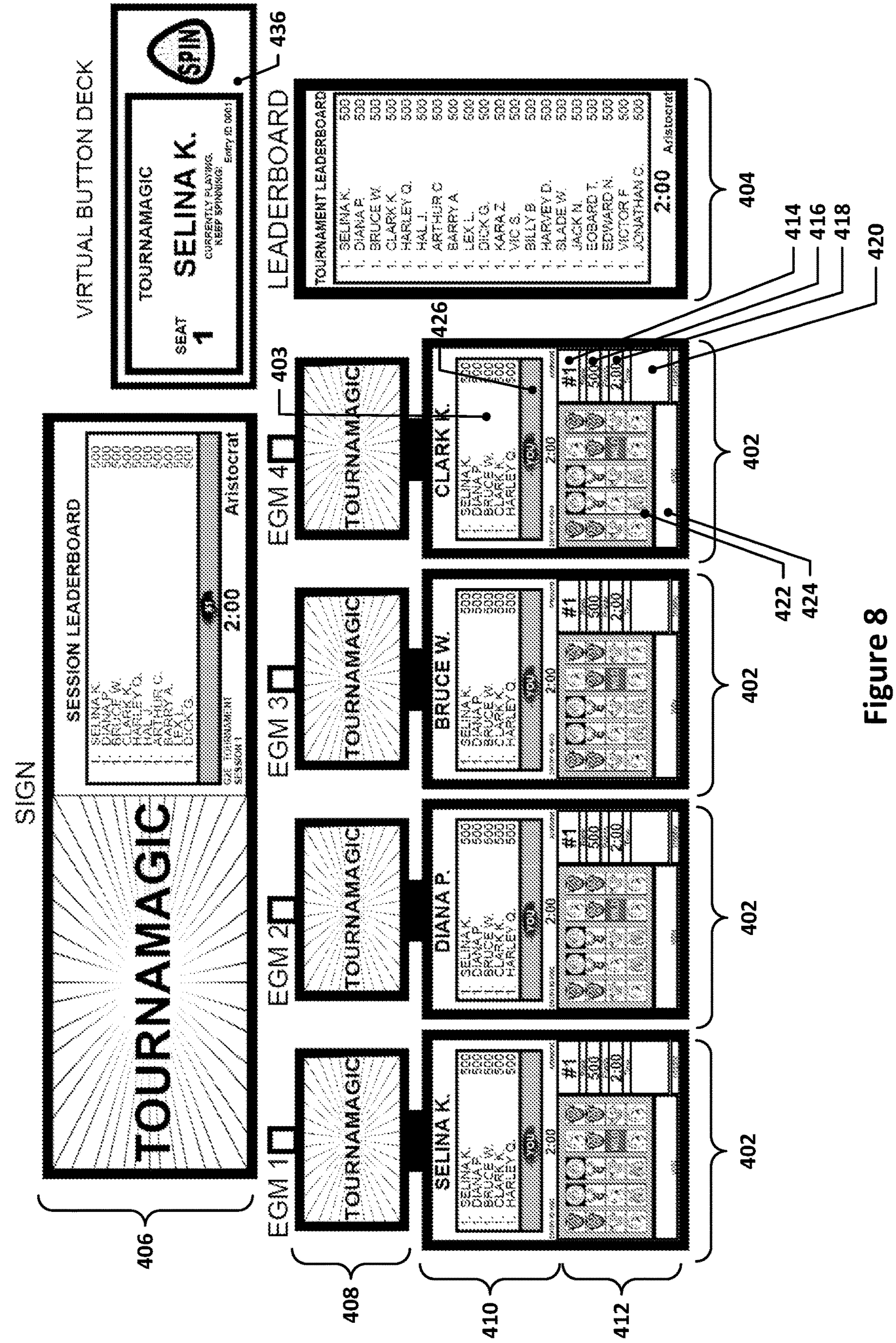

FIG. 8 depicts the bank of EGMs 402 immediately after the session has started. In many implementations, the players participating in a session may be listed on a leaderboard, e.g., a digital display that identifies at least some of the players participating in the session; the players may be identified by name, by an ID number, by a user-selected avatar, by a number associated with the EGM that they are using, or by other means. The leaderboard may be continuously updated throughout the session to show a relative ranking of the players in the session based on their most recent scores. Prior to the session starting (and thus prior to any session scores being accumulated), the order of players listed on the leaderboard may be determined somewhat arbitrarily, e.g., ordered alphabetically based on first name and last name (or last name and first name), ordered based on EGM order, ordered based on when each player logged in to their EGM (or otherwise identified themselves in association with the EGM), or ordered randomly. As can be seen, in FIG. 8, the leaderboard display 404 has been caused to list all (or a large portion of) the players participating in the present session; there are twenty players listed in this example, but more or fewer players may be displayed in other implementations. In some implementations, some or all of the leaderboards that are used in a tournament may be configured to only show the top X players, where X is the number of top players that will receive a prize at the conclusion of the tournament—in such an implementation, a player's inclusion in such a leaderboard indicates that they are, at least for the time being, a potential prize winner at the conclusion of the tournament. In this particular example, the initial order of the players is determined by their player number (which is based on which EGM 402 each is playing); each player has 500 points, and each is ranked #1 since they are all tied for first place at present with identical 500-point scores. In other implementations, players may start a tournament and/or tournament session with other initial scores, e.g., 0 points, although providing all players with an initial score may prevent players from becoming discouraged if their first few plays or spins do not result in any winning events. If the leaderboard display 404 is used to show overall tournament rankings, then the displayed ranking would generally only be valid for the first tournament session played in the tournament, as the leaderboard display 404 would show scores that reflected past tournament session performance for all listed players for all subsequent tournament sessions.

In most implementations, the EGMs 402 will also each display a session countdown timer, e.g., in the time remaining region 418, that informs each player of how much time remains before the session will end and player scores are used to determine a session winner, second place finisher, and so forth. The EGMs 402 may, in some implementations, also present an EGM-based leaderboard display, similar to the leaderboard display discussed earlier and as seen displayed in the main top display 410 of the EGMs 402 in FIG. 8. The EGM-based leaderboards may, in some cases, present only a subset of the players participating in the session to avoid having to use a too-small font that is difficult for the player to read, especially while trying to make as many plays of the wagering game as possible within the allocated session time. The EGM-based leaderboards may, for example, be configured to always indicate the player of the EGM on which a particular leaderboard is displayed, as well as that player's rank and score. In addition to displaying information on the player of the EGM on which a particular leaderboard is displayed, each leaderboard may also be configured to display information regarding, for example, the X top-ranked players (other than the player of the EGM) at any given point during the session (where X is some number less than one less than the overall number of players in the session). In some instances, several top-ranked players for the session may be shown near the top of such a leaderboard, and the players with ranks immediately before and after (if there are such players) may be shown in leaderboard positions adjacent to the player's position. Examples of two such leaderboards are shown below for an EGM on which a player named Henry F. is playing during a session. In Leaderboard 1, the player, Henry F., is always shown, and the remaining five list spots are filled with the five highest-ranked players other than Henry F.—thus, Henry F. is always apprised of how far ahead the leader of the session is (assuming he is not the current session leader). In Leaderboard 2, Henry F. is always shown, as well as the players having the next highest and next lowest ranking with respect to Henry F.'s ranking (if Henry F. occupies the highest or lowest ranking available, of course, then there may be only one player that is shown as immediately adjacent in ranking to Henry F.); the remaining three (or four) list spots are filled with the highest-ranked players other than Henry F. and the player or players having the next highest and/or next lowest ranking with respect to Henry F. Leaderboard 2 thus allows the player, Henry F., to not only gauge how far he is from being able to displace the first-ranked player from their position, but also allows Henry F. to gauge how likely he is to either be overtaken by the player ranked immediately behind him or to overtake the player ranked immediately above him. In this case, player Zelda E. is only 300 points behind Henry F., whereas player John C. is 3060 points ahead of Henry F.; such information thus presents player Henry C. with at least two sources of heightened emotional investment—the excitement associated with potentially overtaking player John C., and the concern that player Zelda E. will do the same to him.

Leaderboard 1

| Rank | Player | Score |
|---|---|---|
| 1 | Irene S. | 123300 |
| 2 | Joe M. | 112350 |
| 3 | Sara T. | 98020 |
| 4 | John C. | 92440 |
| 5 | Megan Q. | 89220 |
| 12 | Henry F. | 65400 |

Leaderboard 2

| Rank | Player | Score |
|---|---|---|
| 1 | Irene S. | 123300 |
| 2 | Joe M. | 112350 |
| 3 | Sara T. | 98020 |
| 11 | John C. | 68460 |
| 12 | Henry F. | 65400 |
| 13 | Zelda E. | 65100 |

When a session first begins, the players may be shown in various leaderboards in an order that does not actually reflect their relative ranking since, at the very start, all players may have the same score and thus the same rank—as players score more and more points, the physical positioning of each player on the leaderboard, as well as their numeric ranking, may be updated based on the updated scores received throughout the session. In some implementations, some leaderboards for a tournament system may be configured to display ranking information for players within the currently active (or most recently completed) tournament session, whereas other leaderboards for the tournament system may be configured to display ranking information for players within the tournament overall. Thus, for example, a tournament-level leaderboard may show the top 20 players in a tournament based on the total of those players' scores for all of the tournament sessions that the players participated in during the tournament, whereas a session-level leaderboard may show the top 20 players in the current or most recent tournament session based on the scores of those players attributable to that tournament session. In some implementations, the player rankings in the tournament may be based, for example, on the top session scores of each player or on the top X session scores for each player, e.g., the top two or top three session scores for each player). It is thus possible for both types of leaderboards to have completely different compositions and, in some cases, there may be no overlap between the two ranking lists.

In some implementations, an additional or alternative mechanism for conveying player ranking may be provided, on the EGM of each player and/or on a leaderboard or other signage or display, in the form of a "race" graphic in which graphical indicators representing each of the players may be caused to be animated so as to show relative standings between the players during the session that are more visually themed than a tabular leaderboard, allowing for players to easily determine their relative rankings within the tournament session with a quick glance during play, as compared with having to scan an entire leaderboard for their name. For example, in a buffalo-themed wagering game, each player may be represented by a graphic or an animation of a charging/running buffalo in a herd of charging/running buffalo; a background graphic, e.g., of prairie, may be caused to scroll in the direction opposite the apparent direction of travel of the buffalo to give the appearance that the buffalo are racing, e.g., racing across the prairie. FIGS. 8, 9, 11-15, 17, and 19 depict an example of such a race animation or race graphic; at some points during tournament session play, e.g., at the end of the tournament session or when special announcements are made (such as the start of a sticky wilds mode or a wild multiplier mode, the race animation may be temporarily obscured or otherwise hidden from view). In FIGS. 8, 9, 11-15, 17, and 19, different implementations of race graphics/animations are shown on both the overhead sign 406 and the main top display 410. In some such implementations, the relative placement of the buffalo in the race graphic may give insight as to the "spread" between the players' scores, with the distance between each buffalo being proportionate with the difference in scores between the players associated with those buffalo. In other such implementations, the relative placement of the buffalo may be generally disconnected from the amounts of the actual scores of each player, but may instead simply convey relative ranking of the player with respect to the other players. Thus, for example, the current player of an EGM may be shown a race graphic with the current player's buffalo graphical indicator shown in the middle of the race graphic, three other buffalo graphical indicators of other players positioned near the right edge of the race graphic (ahead of the current player's buffalo graphical indicator, relative to the orientation of the buffalo graphical indicator), and 20 buffalo graphical indicators of other players positioned near the left edge of the race graphic, e.g., trailing the current player's buffalo graphical indicator (each graphical indicator for a player may, in some implementations, include or be associated with a label that conveys information about which player is associated with that graphical indicator, e.g., the player's name or initials, the number of the EGM that the player is playing on, etc.). If the current player's score starts closing the gap between the current player and the next highest-ranked player, then the race graphic may be updated to show the buffalo graphical indicator for the next highest-ranked player slowing down, breaking away from the buffalo graphical indicators for the two highest-ranked players and then falling back towards the current player's graphical indicator. If the current player's score continues to increase so as to surpass the next highest-ranked player's score, the next-highest ranked player's buffalo graphical indicator may be caused to move past the current player's buffalo graphical indicator and towards the trailing group of buffalo graphical indicators. For clarity, the term "graphical indicator" is used herein to refer to graphical content (either still or animated) that serves as a proxy or representation of a player in various tournament displays, e.g., leaderboard displays, race graphics, etc. Different graphical indicators may be used for the same player in different tournament displays. For example, every player may have a similar graphical indicator in a race graphic, e.g., all players may be represented by buffalo graphical indicators, but each player may have a player-selected graphical indicator to represent them in any leaderboards that are displayed.

Similarly, if the score for a player whose graphical indicator is in the trailing group of buffalo graphical indicators starts approaching the score of the current player, the buffalo graphical indicator for that player may be caused to break away from the trailing group of buffalo graphical indicators and move towards the current player's buffalo graphical indicator, eventually passing it to join the leading group of buffalo graphical indicators once that player's score exceeds that of the current player.

In either case, a graphical indicator that is shown as having broken away from either the trailing or leading group of graphical indicators so as to approach the current player's graphical indicator may, if the score differential between that player and the current player starts increasing again, be caused to reverse course and rejoin whichever portion of the "herd" it was in prior to breaking away therefrom.

In some implementations, the graphical indicators for only a few of the players that have scores above and below the player's score may be shown in the race animation at various points in time. For example, only the graphical indicators for up to X, e.g., three, players with the closest higher scores and up to Y, e.g., three, players with the closest lower scores may be shown on the animation at any given point in time; this may prevent an overly crowded animation that makes it hard to see individual graphical indicators. In some such implementations, the highest-ranked player's graphical indicator may always be shown on the race animation, regardless of whether that player is within the group of X players that have scores higher than, and closest to, the player's score.

In some implementations, when the tournament session first begins, the graphical indicators for the players may be shown clustered together near the center of the race animation and may then separate and spread apart as the players start accumulating points. For example, in FIG. 8, the graphical indicators for the players are all in exactly the same position, with the player's graphical indicator located in the topmost position so as to be visible; the remaining graphical indicators are obscured by the player's graphical indicator, but start to appear when the players start scoring points and various score differentials between players start to emerge, as can be seen in FIGS. 9, 11-15, 17, and 19.

Put more generally, a "race" representation of player ranking for an EGM may be provided by generating three groups of graphical indicators or other indicators of players: a first group of zero or more other players that have scores lower than the current player, a second group consisting of the current player (for ease of reference, this will be referred to as a group despite having only one member), and a third group of zero or more other players that have scores higher than the current player. The graphical indicators may generally be animated or otherwise caused to appear as if they are travelling in a direction extending from a first side of the race representation to a second, opposite side of the race representation.

The race representation may depict each group of graphical indicators as being spatially separated from most or all of the graphical indicators in either of the other groups of graphical indicators (or a single group of graphical indicators if the player does not have players both ahead and behind them in ranking), with the groups ordered by the average score of the players whose graphical indicators are in each group, and with the group having graphical indicator(s) with the lowest average score being positioned closest to the first side of the race representation and the group having the graphical indicator(s) with the highest average score being positioned closest to the second side of the race representation. When a parameter based on the score differential between a player having a graphical indicator in either the first group or the third group and the current player exceeds a first threshold criterion, the graphical indicator for that player may be caused to move away from the group in which it was located and towards the second group. If the score differential reverses sign, e.g., turns from a positive differential to a negative differential, or vice-versa, the graphical indicator for that player may be caused to move past the graphical indicator for the current player and towards whichever of the first group or the third group is in the direction of travel of that graphical indicator (in the case where either the first or third group is missing and the player's graphical indicator moves past the current player's graphical indicator and there is no group for the player's graphical indicator to merge into, the player's graphical indicator may then form the missing group). The parameter based on the score differential may, for example, be an absolute value of the score differential itself, the absolute value of the rate of change of the score differential, or some other characteristic. It will be understood that the above discussion is merely a broad, high-level framework, and that various modifications and refinements of such framework may be considered within the scope of this disclosure.

In yet further implementations, the graphical indicators for the players may simply be shown with relative spacing in between them that is proportionate to the difference in scores between those players. In such an implementation, the graphical indicators may not be clustered into groups so much as spread apart in a manner that reflects the current point spread between the players. In some such implementations, the entire spread of players may not be shown in the race animation at one time, with only the graphical indicators of a subset of the players shown at any given time for each race animation. For example, the race animation may scale so as to only show graphical indicators for players within X points of the current player (and possibly also the player in first place, regardless of the point difference between the first place player and the player for which the race animation is presented), or to only show the graphical indicators for the closest Y players, e.g., the closest 3 players.

Regardless of the specifics of how a race animation may be configured to convey relative positioning and ranking of players, it will be understood that the graphical indicator for each player, i.e., the graphical indicator representing the player of the EGM on which a particular race animation is presented, may be formatted in a way that contrasts it with the graphical indicators of other players. For example, the other player graphical indicators may be presented as semi-transparent, with a washed out appearance, or in a normal manner, whereas the graphical indicator for the player may be presented as being solid/opaque, as having vivid, non-washed-out colors, or having edge effects, e.g., white outlines or a glowing aura, that contrasts it with the other players' graphical indicators.

While the race graphics or animations discussed above feature a player-centric presentation, i.e., conveying relative player ranking information in a manner that allows a particular player to rapidly determine their ranking relative to other players (by highlighting the graphical indicator for that player or locating the graphical indicator for that player in a particular location, such as the center of the display), other implementations of race graphics or animations may provide a non-player-centric presentation. For example, the race graphic that is shown on the overhead sign 406 in FIGS. 89, 11-15, 17, and 19 simply shows the relative ranking/positioning of the ten players with the highest tournament session scores for the active tournament session thus far. Thus, Bruce W., the player of EGM 3, is not even represented in the race graphic shown on the overhead sign 406 since Bruce W.'s score of 11,500 is lower than the tenth-place score of 13,000 achieved by Diana P. on EGM 2 (as can be seen, the "last place" graphical indicator in the race graphic on the overhead sign 406 has a "#2" label associated therewith, indicating that it is the player of EGM 2 that has that ranking). Selina K., on the other hand, is indicated as being in first place by a graphical indicator associated with a label of "#1," which indicates her first-place ranking in the tournament session. Player Clark K. is also depicted on the race graphic on the overhead sign 406 by a graphical indicator associated with a label of "#4" to indicate EGM 4; Clark K.'s graphical indicator appears to show that he is in fourth place, but this is because the graphical indicators for players Harley Q. and Arthur C. are positioned in nearly the same spot just ahead of Clark K.'s graphical indicator due to the very similar scores for those two players (thus appearing to be a single graphical indicator instead of two).

Another feature that may be part of some race animations is an extra graphical indicator that represents the player with the highest tournament session score achieved during similar sessions during the course of the day. For example, if the tournament-wide highest tournament session score was achieved in the fourth session of the tournament, the graphical indicator for the player that achieved that tournament session score may be added to the race animations for every subsequent session (at least, for that round of sessions) until a player beats that tournament session score, at which point the graphical indicator that is shown in race animations for subsequent tournament sessions will be updated to reflect that new highest tournament session score. In some implementations, the highest-scoring player's graphical indicator may be caused to update its position relative to the other graphical indicators in the race animation based on the highest-scoring player's score over time from the earlier session—thus, the players of the current session may, in effect, race the highest-scoring player's score from a previous session.

A similar feature may be used to convey other information—for example, if the top X players in a tournament will receive some sort of award at the conclusion of the tournament (or at the conclusion of a particular phase of the tournament, e.g., a current round of the tournament), an additional graphical indicator may be included in a race graphic or animation that represents the player that is currently in the X ranked position, regardless of whether or not they are participating in the current tournament session. For example, a player-centric race graphic may include a graphical indicator that represents the player in the X ranked position in the tournament. In such an implementation, the relative position of the graphical indicator for the player of the EGM on which the race graphic is shown relative to the graphical indicators of other players in the current tournament session may be determined according to the scores attained by each of those players within that tournament session. In contrast, the relative position of the graphical indicator for the player of the EGM on which that race graphic is shown relative to the graphical indicator for the X ranked player may be determined similarly, but taking into account as well the current player's total tournament score. For example, if the current player had 21,000 points at the start of a tournament session and has earned an additional 3000 points so far during the tournament session, the position of the player's graphical indicator relative to the graphical indicator for the X ranked player may be determined based on the X ranked player's total tournament score, e.g., which may be 25,000 points in this example, as compared with the current player's total tournament score, e.g., 24,000 points. Alternatively, the X ranked player's score may be normalized to account for the current player's pre-tournament session tournament score before being compared with the current player's tournament session score. For example, the X ranked player's score of 25,000 points may be normalized to the player's score by subtracting the 21,000 points that the current player had at the start of the current tournament session to make the X ranked player's score 4000 points—the position of the current player's graphical indicator relative to the X ranked player's graphical indicator may then be determined by comparing the current player's tournament session score against the X ranked player's normalized score of 4000 points.

In some implementations, a similar additional graphical indicator may be included to represent the top-ranked player in the tournament (this, for example, would be equivalent to a graphical indicator for a situation where X=1 in the above example, although there may be players with ranks lower than X that may receive awards).

It will be understood that there may be a variety of different types of leaderboards provided by the tournament system, each of which may provide player ranking information to different degrees of granularity and completeness and/or in different styles. For example, one or more of the leaderboard display 404 may be placed at various locations within a tournament area, or displayed on separate displays, e.g., at locations outside of the tournament area (such as on a display in a bar or restaurant in the tournament venue, or even in a location outside of the tournament venue, such as in another casino. Leaderboard displays, as the term is used herein, may be used to refer to displays that are generally separate from EGMs 402 and/or overhead sign 406 and which may be placed as desired to provide tournament information to players, spectators, etc. In some implementations, overhead signs 406 may also be repositionable to allow for tournaments to be conducted at various different locations within a casino, e.g., using EGMs that provide different wagering games for each tournament. Some leaderboard displays may be temporarily attached to EGMs, e.g., to the sides of EGMs at the ends of a bank of EGMs, but may be easily removable; such leaderboard displays are still, within the scope of this disclosure, considered to be separate from the EGMs to which they are attached since they are designed to be easily removable without affecting the functionality provided by the EGM(s) to which they are attached.

Figure 9:
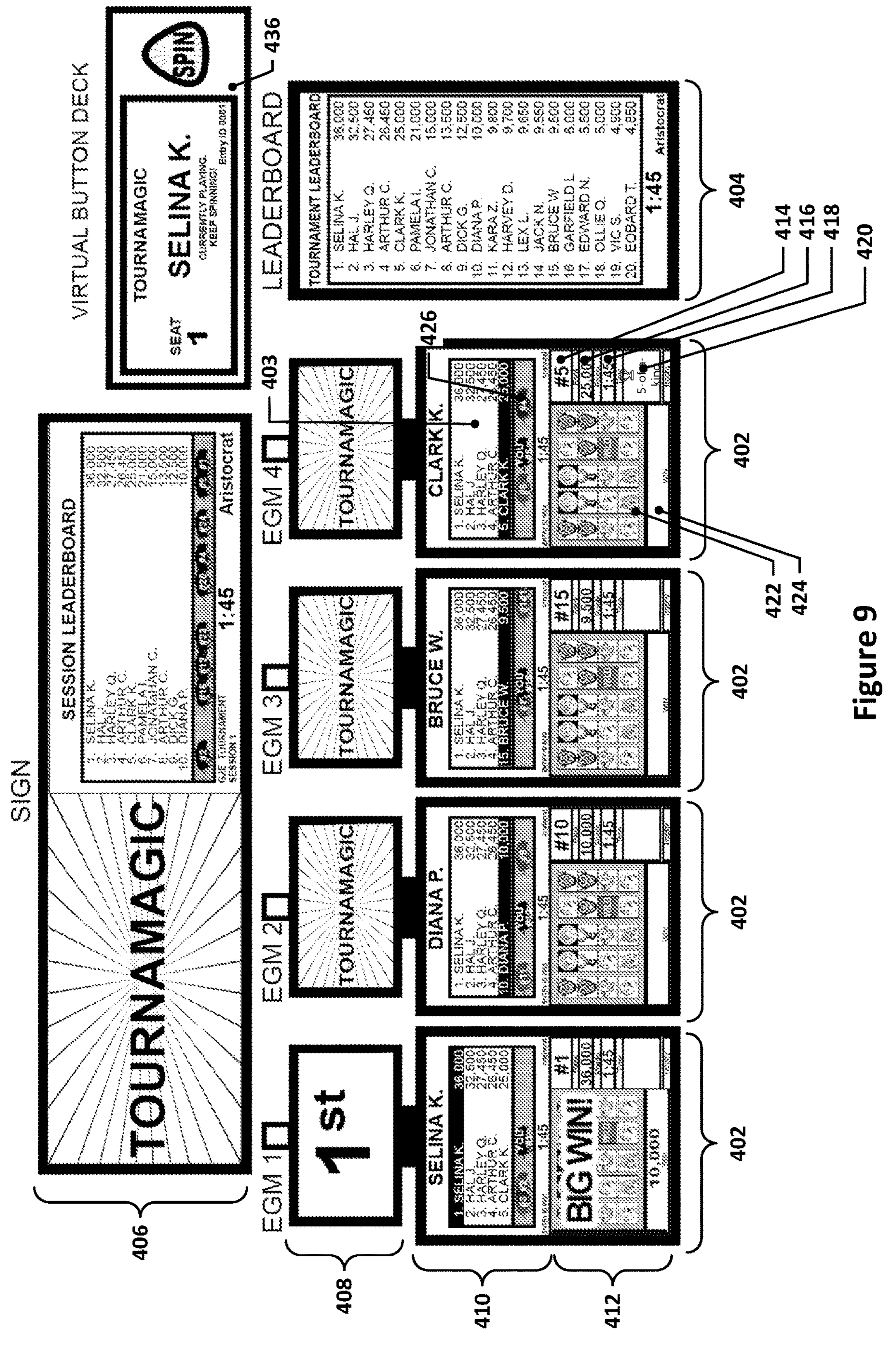

Leaderboard information may also or alternatively be provided on the overhead sign 406 (such as in FIG. 8), which may provide the same or different (as previously described) information as is typically shown on the leaderboard display 404, although possibly in an abbreviated or truncated form—in FIG. 9, for example, the leaderboard information shown only depicts the top 10 players, compared to the leaderboard display's presentation of leaderboard information for the top 20 players. Leaderboards displayed on the overhead sign or signs 406 used in a tournament may be referred to herein as "overhead leaderboards" or "overhead leaderboard displays."

Leaderboard information that is depicted on the displays of the EGM, e.g., the main top display 410, the main bottom display 412, the topper display 408, and/or the virtual button deck 436, may be referred to herein as "EGM-based leaderboards" or "EGM-based leaderboard displays."

As noted above, leaderboard information provided on any of the various types of leaderboards/displays discussed above may be depicted in a variety of ways. One possible depiction is a ranked listing of players, with the highest-ranked player at the top of the list, and the players shown in descending order. Another type of leaderboard depiction is a "race graphic" or "race animation," such as is discussed above, in which icons or graphical indicators of at least some players are shown in a manner that indicates the relative ranking of at least one player relative to the ranking of one or more other players in a format that suggests a race or that the field of players is moving towards a particular goal.

As the tournament session progresses, players may make multiple plays of the wagering game that is the focus of the tournament, with their winnings accruing to their total score for the session. FIG. 9 depicts the EGMs 402 after 15 seconds of wagering game play have elapsed, leaving 105 seconds of session time remaining, as shown in the time remaining region 418. As can be seen, the various players have experienced various degrees of success in their winnings, resulting in score differentials developing between them that allows them to be ordered into various ranks by their scores. The leaderboard display 404 in FIG. 9 depicts the current ranking of all of the players in the tournament, including the players of the current session (who happen to also include the top-ten ranked players in the tournament overall).

FIG. 9 also depicts two or three other features that may be implemented in a tournament. In the far left EGM 402 (EGM 1), the player has experienced a "Big Win," which may be any winning outcome that, for example, exceeds a predefined threshold or otherwise satisfies a rule that defines what a "big win" is. In this case, the win was for 10,000 points, which caused Player 1 to jump from $4^{th}$ place to $1^{st}$ place. The EGM 402 for Player 1 may be caused to flash a "Big Win!" message on the main bottom display 412, for example, to emphasize to Player 1 the magnitude of their win. In some implementations, the "big win" notification may be triggered whenever the player achieves an outcome that multiplies their wager by a particular factor. For example, if the player achieves an outcome that results in a win of 10X or more of their wager, this may cause a "big win" notification to be provided.

In some implementations, the "big win" may be one of several levels of notable win events that may be tracked, with each level associated with a different lower limit and with the notification that is provided to a particular player responsive to achieving such a notable win event being of the highest level that the player's winning outcome is eligible for. For example, there may be five levels of notable win events that a player may be recognized for: a "big win," which may occur for wins of 8× or more of the wager made, a "great win," which may occur for wins of 12× or more of the wager made, a "huge win," which may occur for wins of up to 20× or more of the wager made, a "super win," which may occur for wins of up to 50× or more of the wager made, and an "amazing win," which may occur for wins of 100× or more of the wager made. If a player, for example, achieves a winning outcome for a play that results in a 60 credit (or point) win based on a 1 credit wager, then they may be rewarded with a notable win event notification saying "Super win!" or the like. Notable win event notifications may be displayed on a particular player's EGM 402 for a given period of time before, for example, being faded out and no longer visible. In some implementations, when a notable win event notification is displayed, the player of the EGM 402 on which it is displayed may still be able to make further plays of the wagering game while the notable win event notification is displayed.

Another feature shown in FIG. 9 is visible on the main bottom display of the far right EGM 402, which is displaying a "First 5-of-a-kind!" trophy. Trophies may be viewed as a type of prize that may be awarded to players under various conditions; however, each trophy may generally only be awarded once in a given session. For example and as suggested above, a trophy may be awarded in each session for the first player to achieve a 5-of-a-kind outcome. Another possible example is a trophy that may be awarded to the player in a session who has the highest point total after the first 10 seconds of play of the session. Yet another example is a trophy that may be awarded to the player who moves up the most ranks during a defined window of time, e.g., from 95 seconds to 110 seconds in a 120 second session. Other types of trophies that may be awarded to players may include, for example:

A "Pole Position" trophy awarded to the player for a tournament session with the most points after X seconds, e.g., 10 seconds, has elapsed from the start of the tournament session.

A "Come from Behind" trophy awarded to the player for a tournament session who moves up the most ranks within a given time interval, e.g., 1:35 to 1:50.

Another "Come from Behind" trophy awarded to the player who finishes within the top X places, e.g., 3, 5, or 10 places, in a tournament session but had the lowest rank at a predetermined time, e.g., the halfway point, during the tournament session.

A "Photo Finish" trophy awarded to players for a tournament session who are within X points, e.g., 5000 points, of first place at the conclusion of the tournament session.

A "Collector" trophy awarded to players for a tournament session who get the most occurrences across all of their session game plays of one or more particular, specified symbols. For example, in a Buffalo-themed wagering game, "buffalo" symbols may occasionally be shown in one or more reel stops, and the total number of such buffalo symbols that occur for each player during the session may be tallied up, and the player with the largest number of buffalo symbol occurrences may be awarded a collector trophy, which may, for example, alternatively be named a "Buffalo Herd" trophy.

A "Biggest Feature Win" trophy awarded to the player for a tournament session with the highest paying free spin feature during the tournament session.

A "Last-to-First" trophy awarded to the player for a tournament session who is in last place in the tournament session at a particular time during the tournament session, e.g., the halfway point, and who then finishes in first place in the tournament session when it finishes.

A "Back-to-Back" trophy awarded to the player for the tournament session who gets two particular types of wins in a row.

A "Best Reflex" or "Hot Shot" trophy awarded to the first player for the tournament session to hit the play or spin button (i.e., first person out of the gate) in the tournament session.

A "Got the Beat" trophy awarded to the player for a tournament session who hits the play button the most times during the tournament session.

Trophies may have various effects depending on the particular configuration of a tournament. In some implementations, trophies may cause a predefined amount of points to be added to the player's score immediately upon the trophy being obtained or earned. In some other implementations, trophies may be associated with predefined point values that may be added to a player's score at the end of the session. In such implementations, if the additional points increase the player's score enough to cause the player's rank to increase, this may result in the player moving up in the leaderboard at the end of the session. For example, if the second place player has a trophy that awards an amount of points that is sufficient to cause the second-place player's rank to increase to first place, then that player may be crowned the winner of that session.

In some additional or alternative implementations, trophies may have benefits other than, or in place of, additional points. For example, trophies may serve as vouchers, or be exchangeable for vouchers, that allow the trophy holder to obtain a predefined benefit, such as a free meal, a free drink, an amount of promotional credits that may be wagered in non-tournament wagering game play, or non-cashable credits that may be used in online play, e.g., social wagering game play. In some implementations, trophies that are won by each player may be associated with the player for at least the duration of the tournament and may be used to award various other prizes. For example, the tournament system may be configured to track the number of trophies won by each player during the tournament, and may then, at the conclusion of the tournament, conduct a random selection of one or more players based on the number of trophies won by each player during the tournament. For example, each trophy may be treated as a virtual lottery ticket, and a winner may be selected from all of the players who earned trophies by randomly picking one of the trophy-earning players from the pool of all trophy-earning players. Each such trophy-earning player may have a chance to win such a prize that is commensurate with the number of trophies won by that player during the tournament divided by the total number of trophies won during the tournament. For example, if a player earned 4 trophies over the course of a tournament, and the players in the tournament collectively earned 24 trophies, that particular player would have a 1/6 chance of winning the end-of-tournament lottery. The winner of such a trophy lottery may be provided with a prize that is separate from whatever prize is awarded to the highest-ranked player of the tournament. In some implementations, additional achievements, e.g., each win of a tournament session, may earn a player an additional chance to win a drawing at the conclusion of the tournament.

As can be seen from FIG. 9, events may occur very rapidly in a tournament session—in FIG. 9, only 15 seconds have elapsed and players have already accrued between at least 9500 and 36,000 points or credits, at least one trophy has been won, and Player 1 has achieved a "big win." At this point, Player 3 may be discouraged since they have only accrued 9500 points compared to Player 1's 36,000 points. In order to inject new excitement into the tournament and give players like Player 3 a sense they could still have a competitive chance at winning, the tournament system may be configured to introduce new game play features at various times during the session. Such features may be provided for limited duration intervals, and may be selected so as to inject additional volatility and uncertainty into the outcome of the tournament. Since the wagering games that are used in tournament modes often rely on random outcomes to determine individual player wins/losses, the player's scores may, as the tournament progresses, grow more and more disparate. Features that inject greater volatility may thus act to level the playing field somewhat, or at least increase the chances that a player may suddenly see their score catapult them upwards multiple ranks if they experience a large win due to such features or if their win amount is dramatically increased due to such features, which may further increase player excitement. While such features may be introduced at any time during a session, it may be particularly advantageous to start introducing such features at approximately the halfway point of the session, thus allowing the first half or so of the session to be "normal" play and the latter half of the session presenting more opportunities for large-win events that could potentially even up the playing field and may give lower-ranked players an increased chance to catch up with the higher-ranked players.

For example, in some implementations, the tournament system may be configured to cause all of the EGMs 402 for all of the players to enter into a "sticky wilds" mode (which may also be referred to herein as a "persistent wild" mode). In reel-based wagering games, players cause a plurality of reels to be "spun" (in modern EGMs, the reels are virtual/digital representations of reels) and score credits or points based on which combinations of symbols are displayed across the reels when the reels stop moving. Typically, a portion of each reel having multiple symbols, e.g., 3 or 5 symbols, is visible when the reel stops rotating; the positions in which the symbols stop when the reels stop rotating are commonly referred to as "reel stops."

A "wild" symbol is typically viewed as equivalent to a plurality of other symbols featured on the reels or, in some cases, any symbol featured on the reels. A wild symbol can thus usually be used in place of any given symbol in order to complete a pattern. "Sticky wilds" mode refers to a mode in which any wild symbols that are located at a reel stop when the sticky wilds mode is active and the reels stop spinning are retained for subsequent plays while sticky wilds mode is active. Thus, for example, if three wild symbols are obtained during a first play of the wagering game during sticky wilds mode, those three wild symbols will remain at those reel stops when the reels are spun again during the sticky wilds mode. If an additional two wild symbols are obtained during the subsequent play of the wagering game, then the next play of the wagering game while sticky wilds mode is active will result in at least five reel stops having wild symbols in them. As more and more wild symbols remain "stuck" in the reel stops, the chances of forming a winning pattern of symbols increases with each additional wild symbol obtained.

If used, a sticky wilds mode may be limited to a certain duration, e.g., 10 seconds (if of too long a duration, there is a risk that there will be too many wild symbols in play, with maximum wins achieved on every spin, which would be somewhat pointless).

Figure 10:
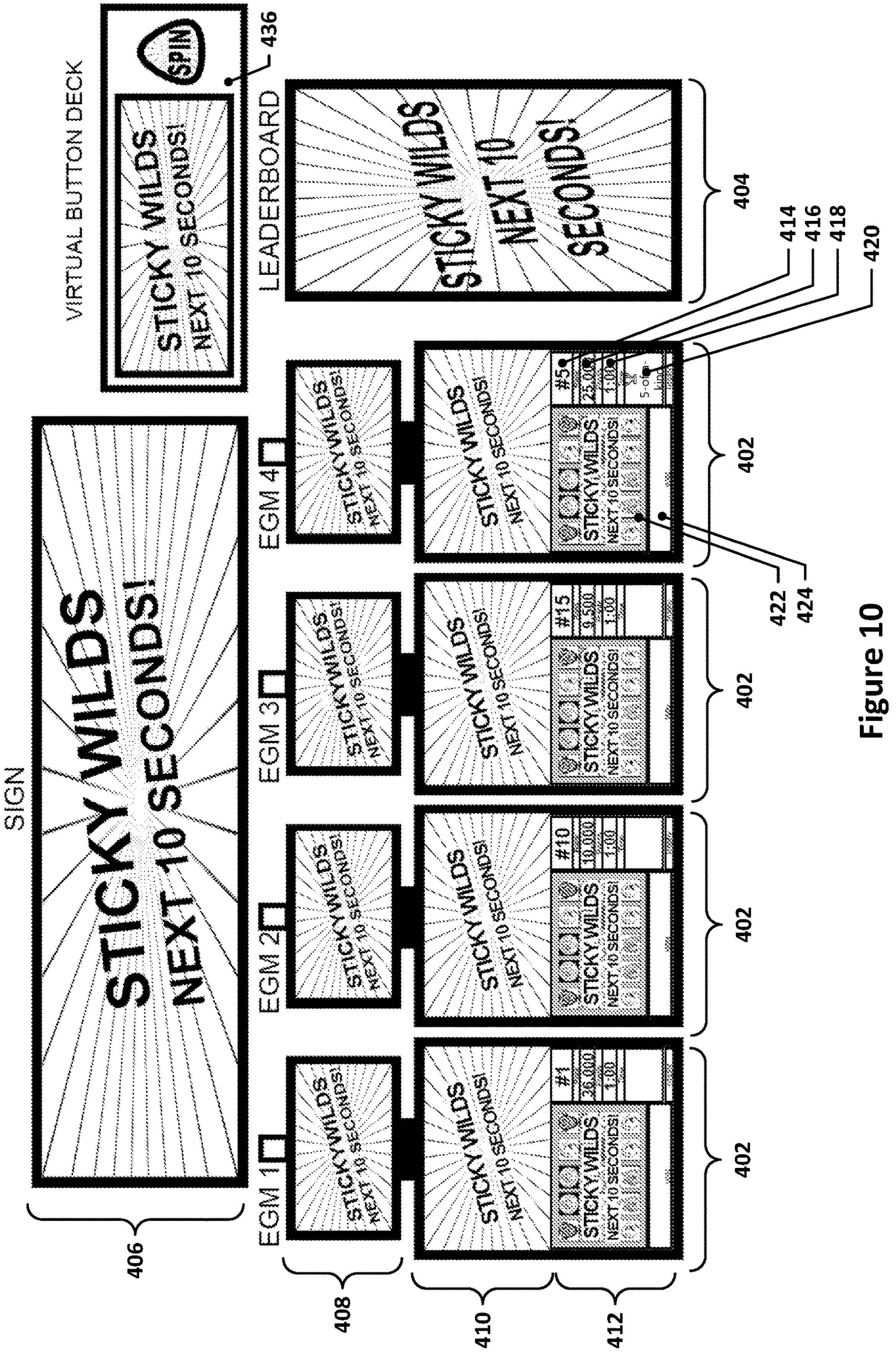

FIG. 10 depicts the bank of EGMs 402 at the start of a 10-second sticky wilds mode; the start of the sticky wilds mode may, in some implementations, be heralded by a message or notification that is displayed on one or more displays of the EGMs 402, the leaderboard display 404, and/or the overhead sign 406. In FIG. 10, such a notification is provided on the overhead sign 406, the topper displays 408, the main top display 410, the main bottom display 412, the virtual button deck display 436, and the leaderboard display 404.

Figure 11:
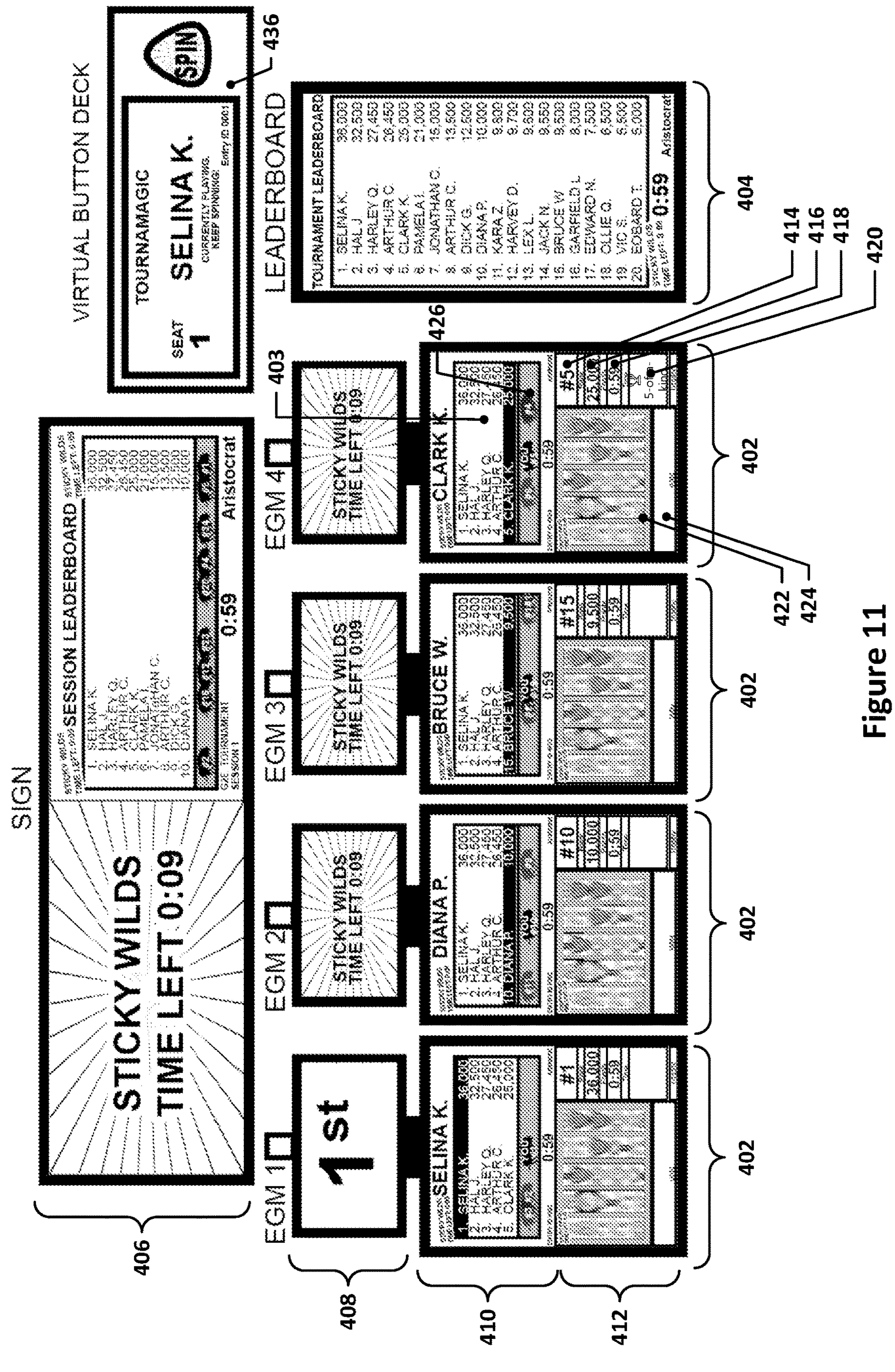

In FIG. 11, the initial notification that the sticky wilds mode is active has stopped, although various displays, e.g., the overhead sign 406, the topper displays 408, the main top display 410 and the main bottom display 412, and the leaderboard display 404 (in the lower left corner) continue to display an indication that the sticky wilds mode is active, as well as a countdown timer indicating how much time is left remaining before the sticky wilds mode ends. The reels for each EGM 402 are shown blurred, as they would be during mid-spin.

In this case, the far left EGM 402 is also displaying a "$1^{st}$" indicator in the topper display 408, which may be provided whenever a player moves into the first-ranked position, as Player 1 has in this instance; displaying the "$1^{st}$" indicator on, for example, a topper display 408 may make it easier for spectators and other players to see which player is in the lead, which may generate increased excitement as other players may be alerted as to who is the current leader, which may introduce an aspect of personalization to the tournament. Similar such displays may be provided on the topper displays 408 of EGMs 402 for other players as well, e.g., a "$2^{nd}$" and "$3^{rd}$" indicator may be displayed on the topper display 408 on the EGMs 402 for the players that are currently ranked second and third within the tournament session (based on their tournament session scores).

In addition (or alternative) to the potential display of the top-ranked players' ranks on the topper display 408, some tournament systems may activate other features of the EGMs 402 when the player of a respective EGM 402 achieves a particular rank. For example, when a player moves into a first-place position, the EGM 402 on which they are playing may be caused to, for example, flash the candle on top of the EGM 402 (the candle, as alluded to earlier with respect to candle 138 in FIG. 1, may be a light that may be used for various purposes during operation of the EGM 402), cause edge lighting effects (such as along the edges of the displays of the EGM 402) to pulse, flash, or change color, and/or emit sound effects (such as, for example, a person cheering "Woohoo!," "You're number 1!," or "Great job!") or music (e.g., a trumpet fanfare, a short ditty, etc.). If such indications are provided for players that also achieve, for example, a second place or third place ranking, then such indications may, in some instances, be presented with a lower intensity, shorter duration, a different color scheme, or other manner that suggests that achieving such a rank is less remarkable compared to achieving a rank above such a rank.

In some implementations, the EGMs 402 may also be caused to generate indications of a loss in rank of a player. For example, if the first-ranked player is unseated by another player and moves to second place, the "$1^{st}$" indicator displayed on the first player's topper (or other portion of the player's EGM 402) may be caused to flash briefly and then morph into "$2^{nd}$"; when the lowest-ranked player having their ranking displayed on the topper display 408 of their EGM 402 (or otherwise emphasized) is unseated and thus moves into a ranking that is not displayed on the topper display 408 of their EGM 402, their previous ranking may be animated in a way that makes it disappear instead of being replaced with the player's new ranking. Such transitions may be accompanied, in some instances, with corresponding sound effects. For example, audio or sounds associated with disappointment or the end of something, e.g., "whomp-whomp," "doh!," violins playing sad music, a bursting bubble sound, the sound of a motor dying, screeching tires, crashing noises, breaking glass, or other such audio cues may be played whenever a player in the top-ranked position, or one of the top-ranked positions, is unseated by another player.

Figure 12:
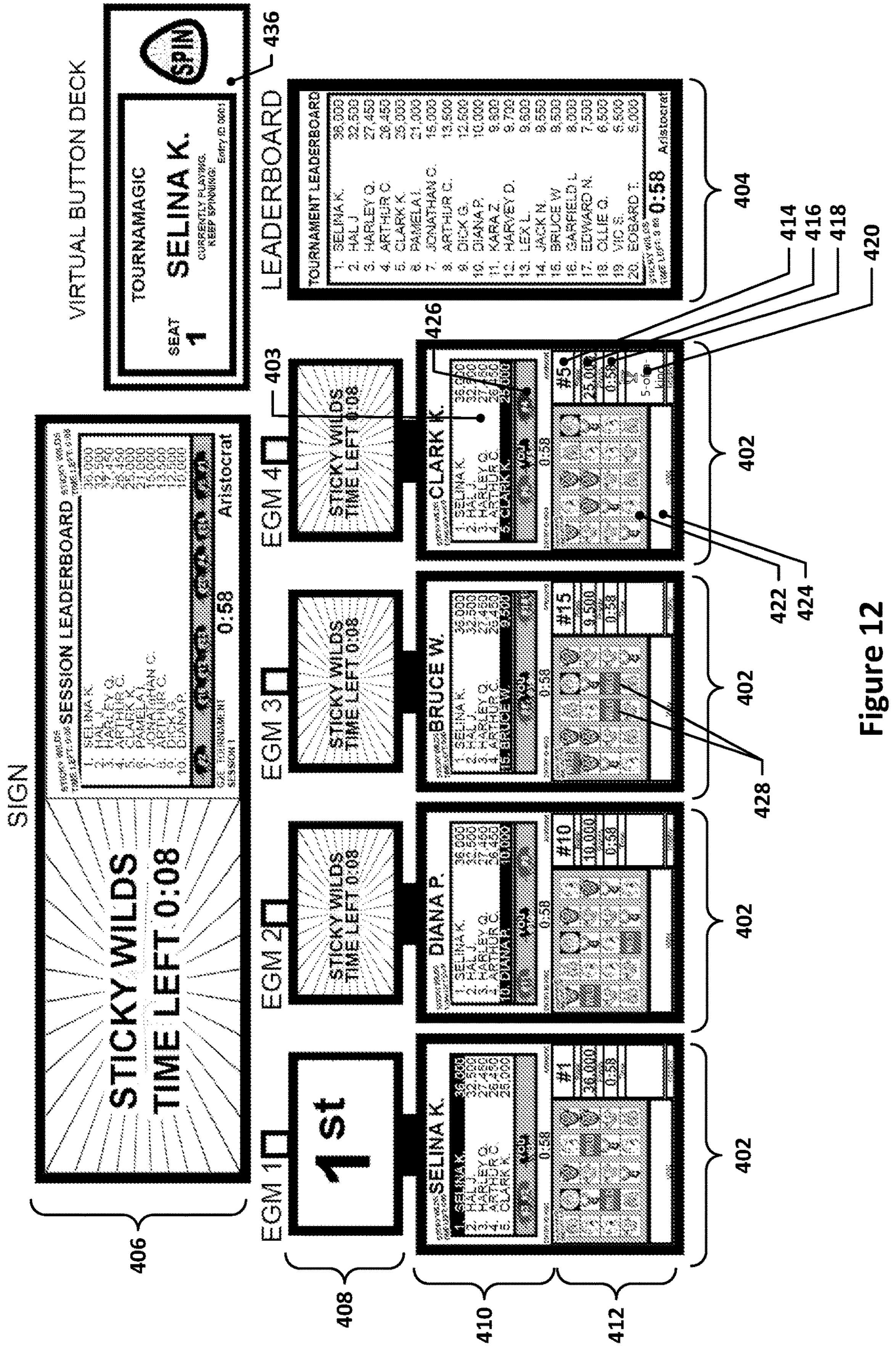
Figure 13:
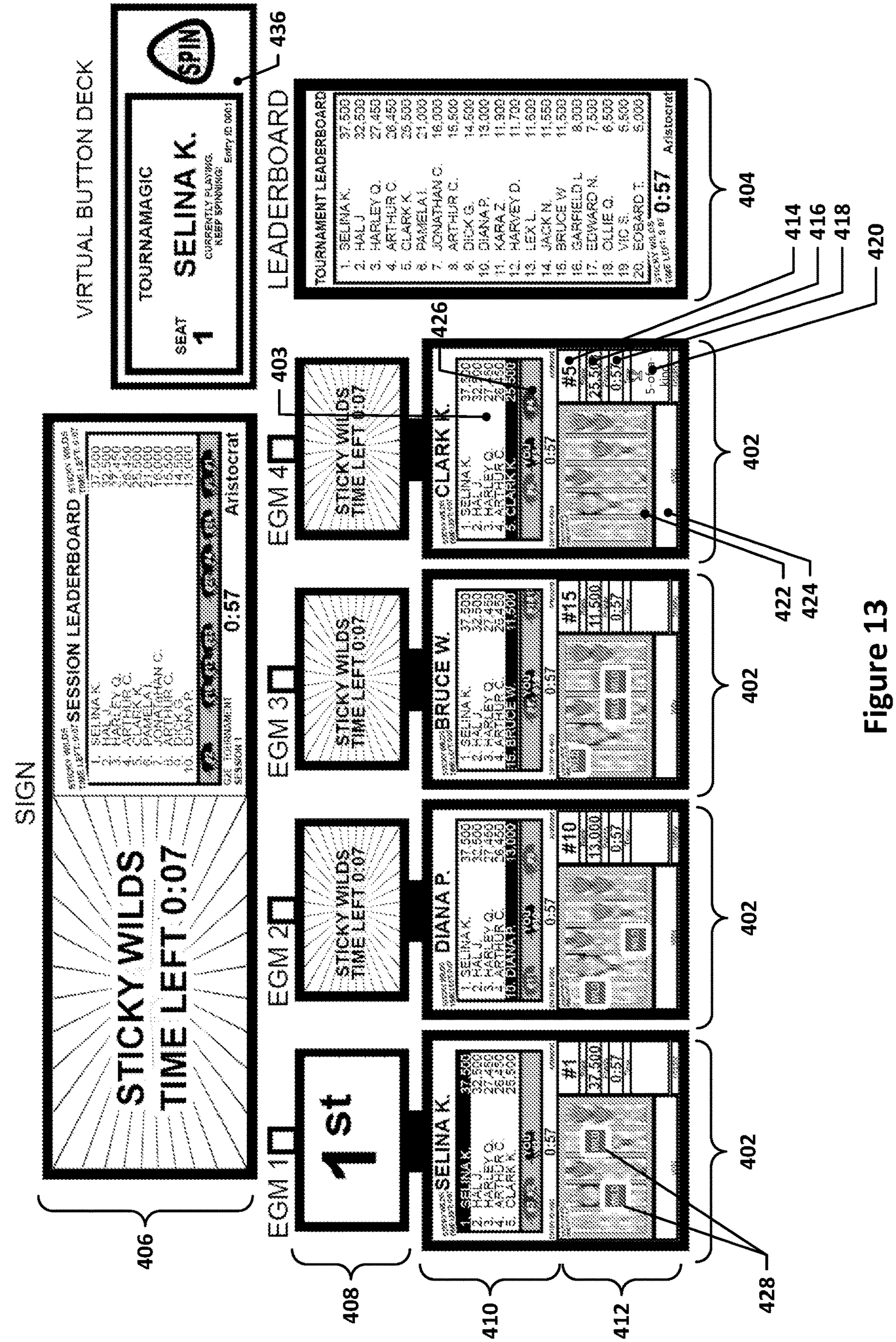

In FIG. 12, the reels have stopped with wild symbols 428 shown on the EGMs 402 for Player 1, Player 2, and Player 3; Player 4 has not received any wild symbols at this time (only the wild symbols for the EGM 402 for Player 3 are called out, although it will be readily apparent for the other EGMs which symbols are the wild symbols). In FIG. 13, the players have initiated further plays of the wagering games offered by the EGMs 402, as indicated by the blurred reels. The reel stops with wild symbols 428, however, remain fixed in position, i.e., sticky, as the reels appear to spin behind them.

Figure 14:
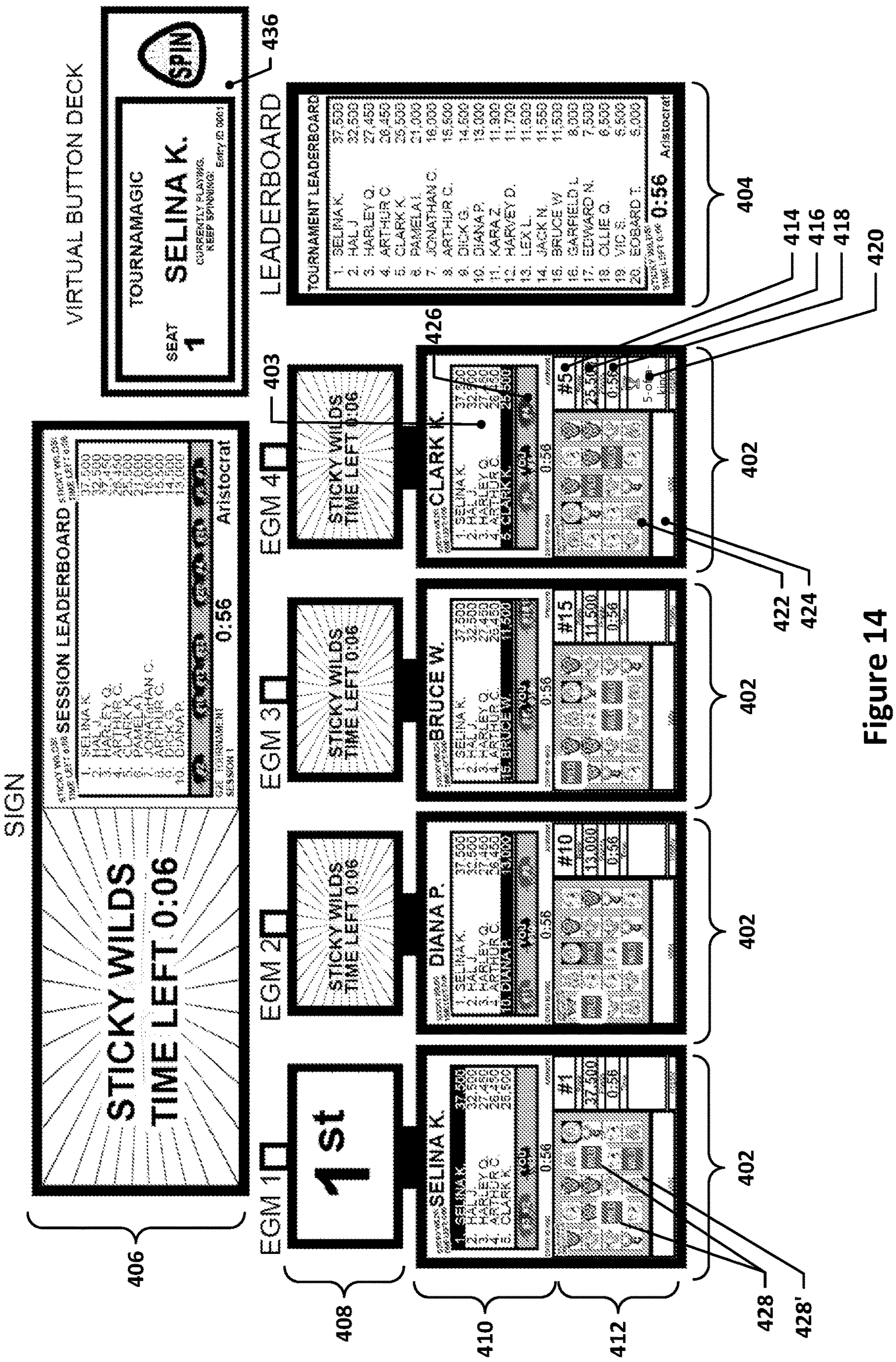

In FIG. 14, the reel spins from FIG. 13 have stopped, and the EGMs 402 for Player 1, Player 2, and Player 4 have new wild symbols 428' depicted in some of the reel stops. For the EGM 402 of Player 1, for example, there are now three wild symbols displayed—two from the previous play, and one that was just obtained. These wild symbols may remain in their respective reel stop locations and be usable to form winning patterns during all future plays of the wagering game until the sticky wilds mode terminates, at which point the "stuck" wild symbols will be removed. When the sticky wilds mode is finished, the stuck wild symbols may be removed either immediately (if there is no current play in progress) or at the conclusion of the play that was active when the sticky wilds mode was terminated. In some implementations, whatever sticky wilds are displayed on a player's EGM 402 at the time the sticky wilds mode ends may be retained and used in the outcome resulting from the player's current spin/play (assuming that the sticky wilds mode ended while such a play or spin was underway). In other implementations, however, whatever sticky wilds are displayed on a player's EGM 402 at the time the sticky wilds mode ends may be excluded from being used as wilds in the outcome resulting from the player's current spin/play (again, assuming that the sticky wilds mode ended while such a player or spin was underway). In some implementations of the latter case, the sticky wild indicators may be replaced, e.g., by fading out to reveal, by symbols on the slot reels that would normally have been masked by the sticky wild symbols; in other implementations, the sticky wild symbols may remain in place until the end of that spin or play, treated as a non-wild symbol for the purposes of outcome determination, and then removed from display.

Figure 15:
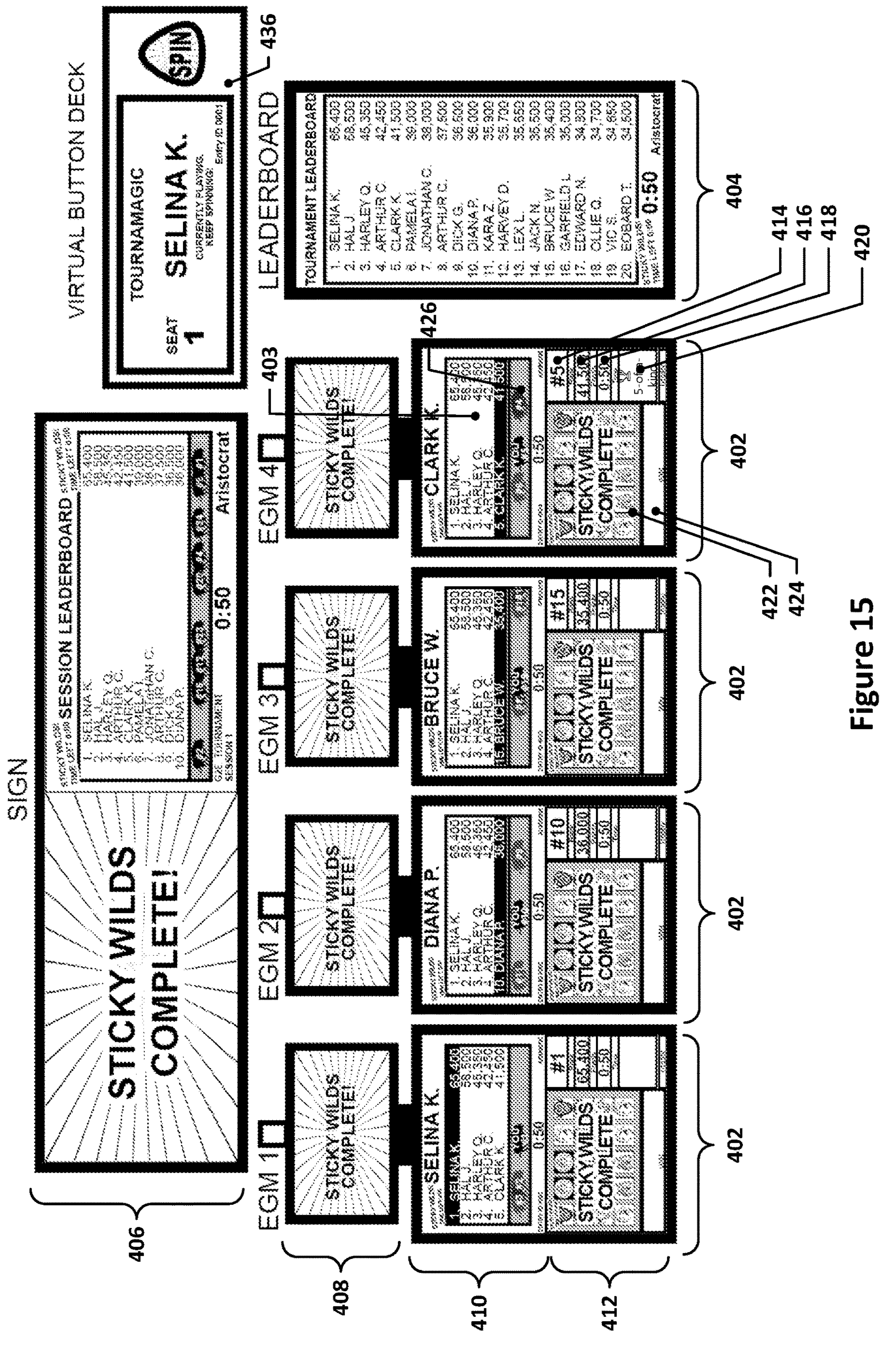
Figure 16:
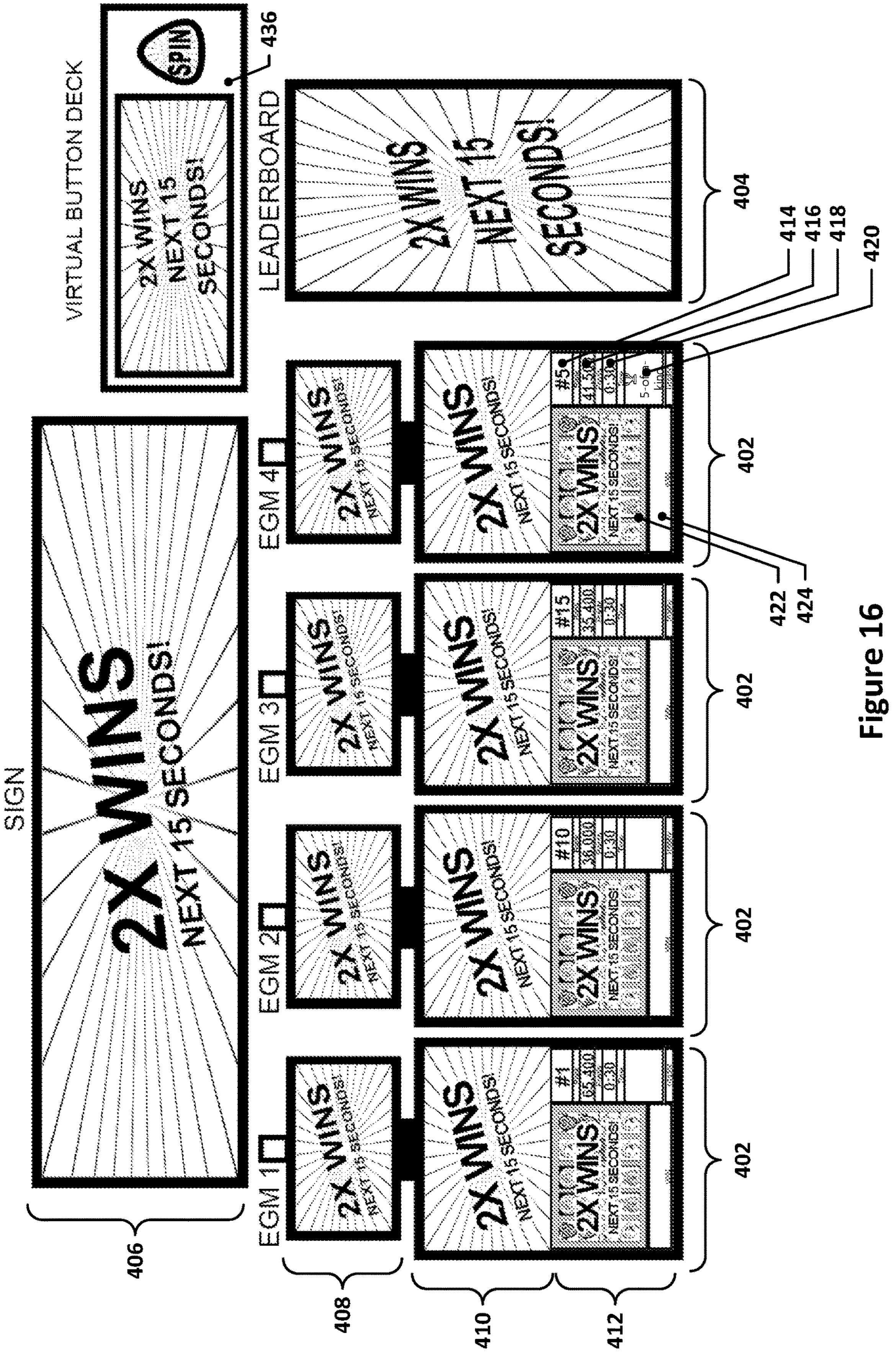

In FIG. 15, the bank of EGMs 402 is shown at the end of the sticky wilds mode, upon which a message may be displayed on various displays, such as the overhead sign 406, the leaderboard display 404, the topper displays 408, the main top displays 410, and/or the main bottom displays 412, indicating the end of the sticky wilds mode.

Figure 17:
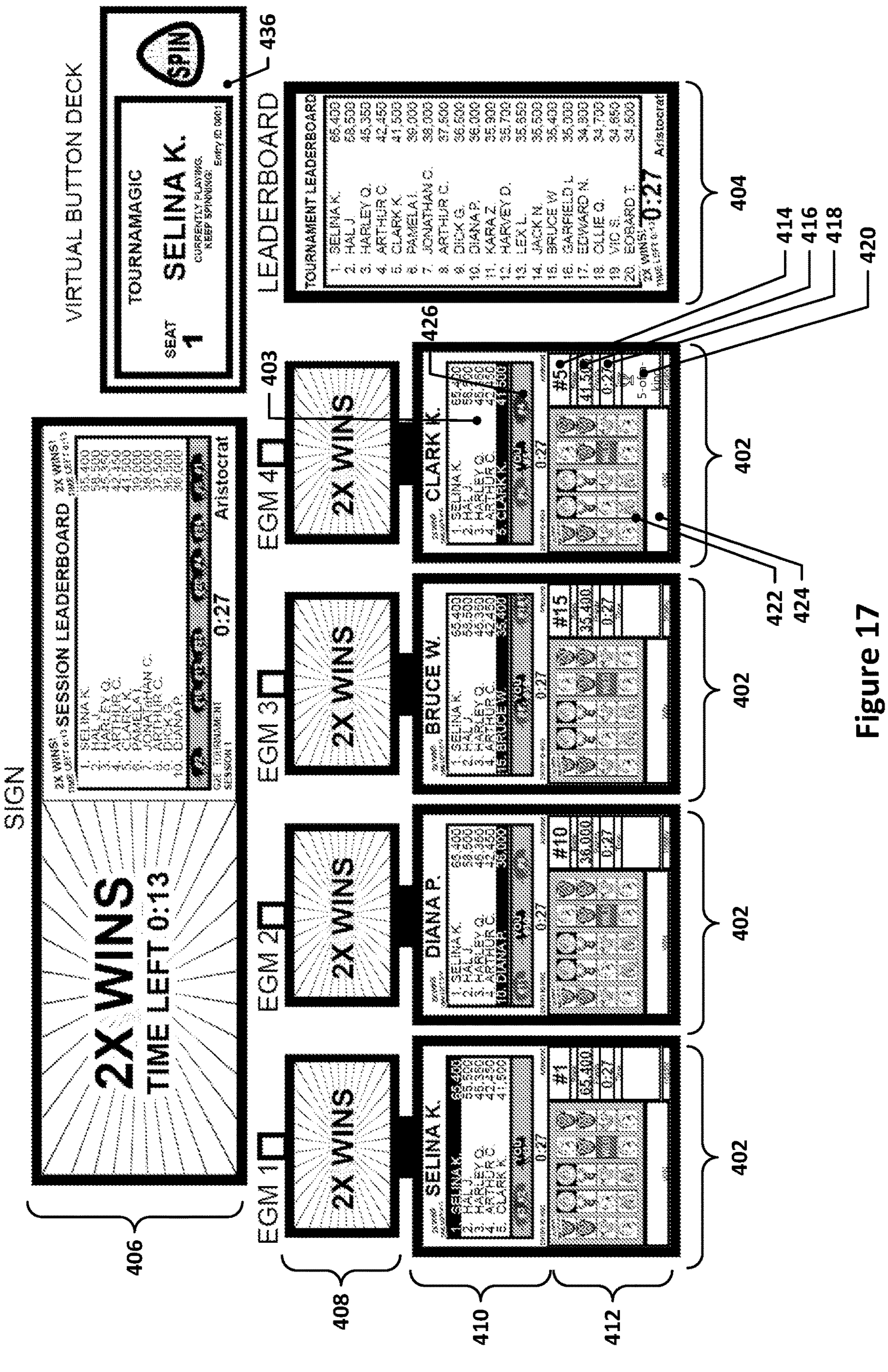

Another feature that may be triggered at some point during the play of a tournament session is an all wins multiplier mode in which, for a given interval of time, all wins on all EGMs 402 are multiplied by a specified multiplier factor. For example, in FIG. 16, the tournament session is 75% complete (30 seconds remaining), and a 2× all wins multiplier mode has been initiated by the tournament system. As indicated on the displays of the overhead sign 406, the topper displays 408, the main top displays 410, the main bottom displays 412, the virtual button deck displays 436, and the leaderboard display 404, the 2× all wins multiplier mode will last for 15 seconds; all plays made during this 15 second interval will result in double payouts. During the 2× all wins multiplier mode, a countdown timer indicating how many seconds are left before the 2× all wins multiplier mode ends may be displayed, e.g., on the overhead sign 406, the leaderboard display 404, and the topper displays 408, as shown in FIG. 17. In some implementations, smaller indicators of the 2× all wins multiplier mode, as well as the remaining time therein, may be shown, for example, on the main top display 410 and/or the main bottom display 412.

Figure 18:
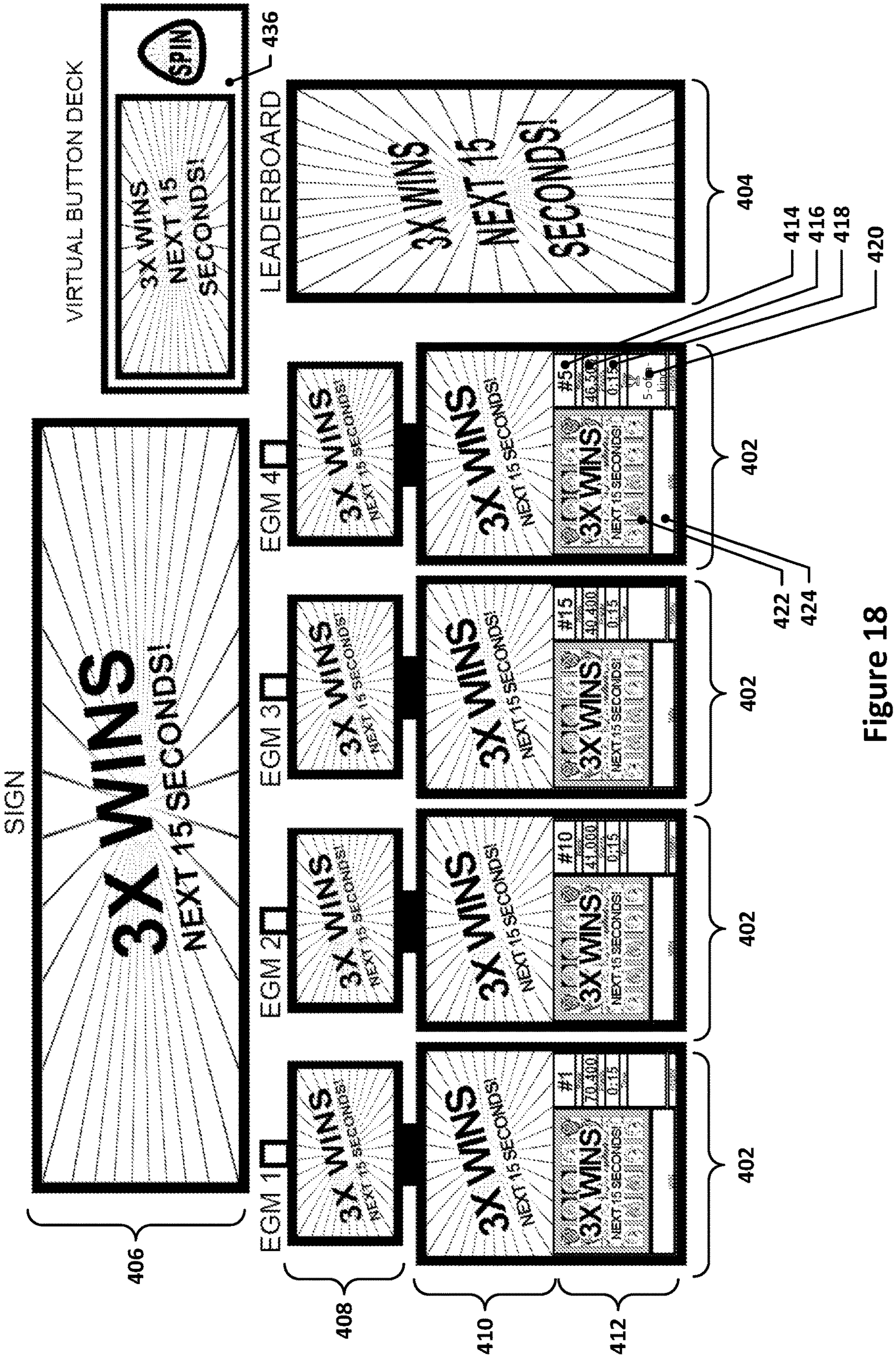
Figure 19:
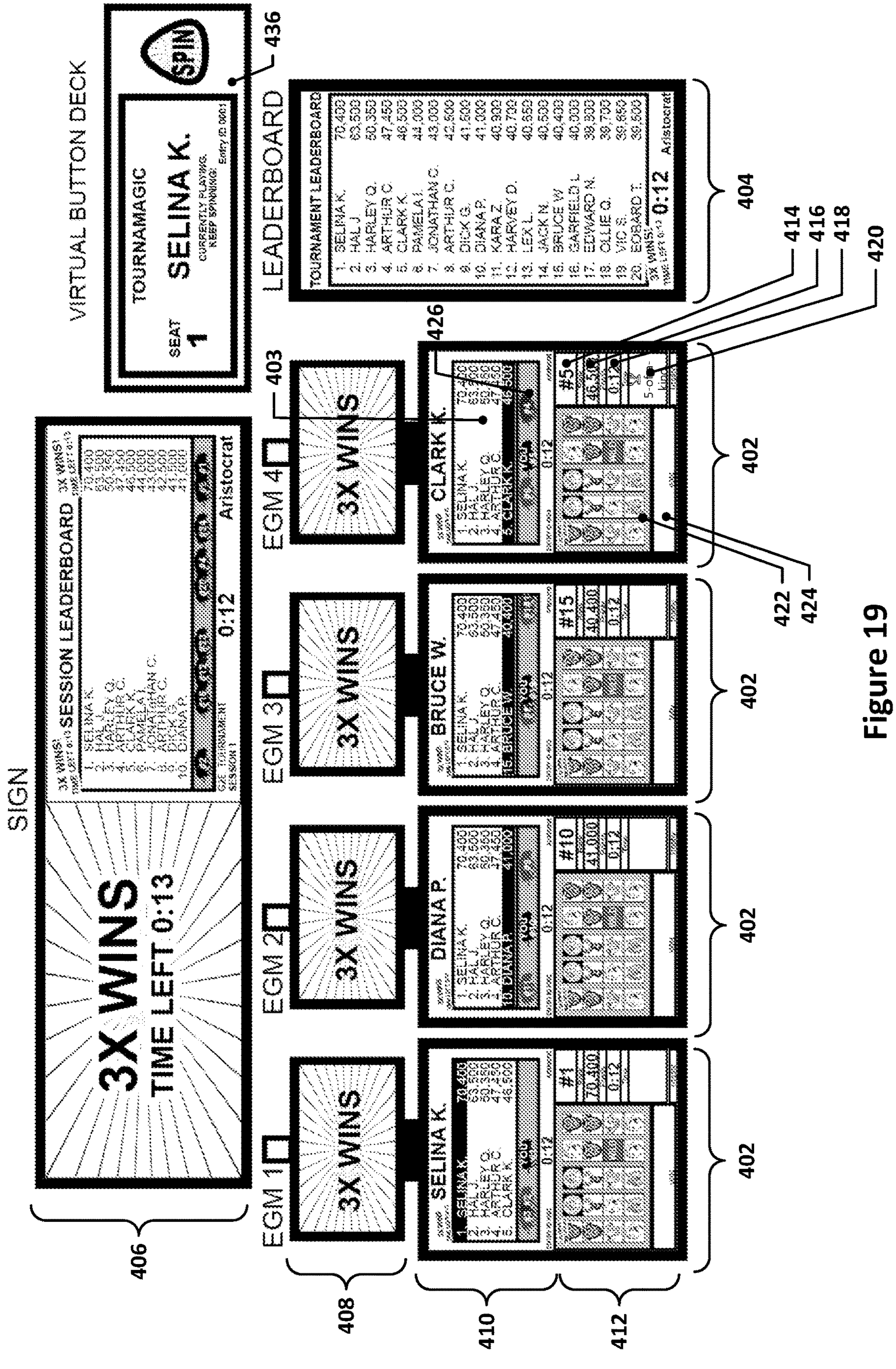

If desired, a further all wins multiplier mode, e.g., with a higher score multiplier factor, e.g., 3×, may be initiated after an earlier all wins multiplier mode, e.g., a 2× all wins multiplier mode. For example, as shown in FIG. 18, a 3× all wins multiplier mode may be initiated, for example, for a further 15 second interval. In this case, the 3× all wins multiplier interval is the last 15 seconds of the session, so all remaining wins for the session will be multiplied by the multiplier factor. As with the 2× all wins multiplier mode, the 3× all wins multiplier mode may have a countdown timer indicating how many seconds are left before the all wins multiplier mode ends, which may be displayed, e.g., on the overhead sign 406 and the leaderboard display 4044, as shown in FIG. 19 (and/or optionally on the topper displays 408). In some implementations, smaller indicators of the 3× all wins multiplier mode, as well as the remaining time therein, may be shown, for example, on the main top display 410 and/or the main bottom display 412.

Figure 20:
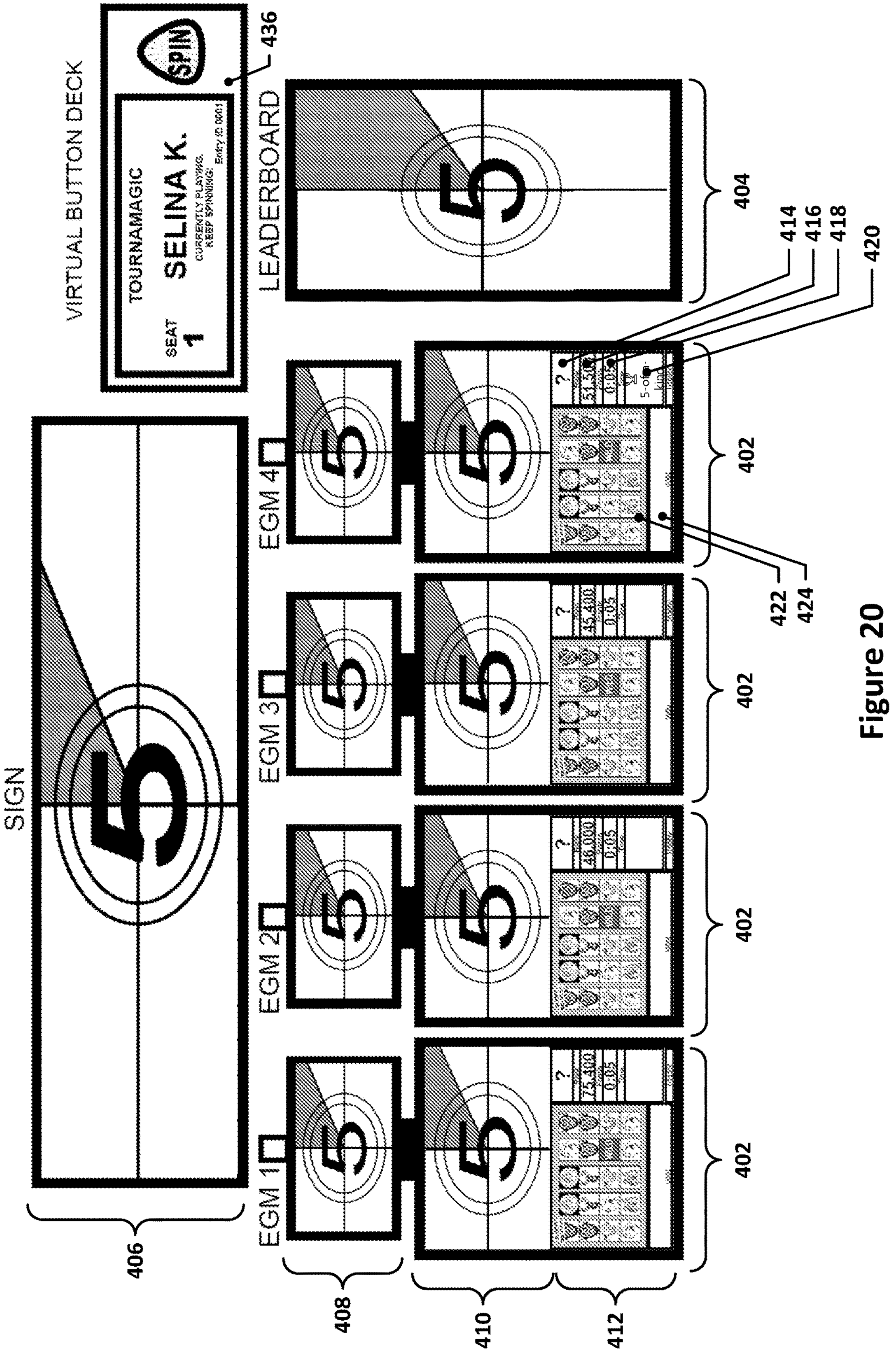

In some implementations, when the remaining time for a session drops below a threshold amount, e.g., 5 seconds, a session countdown timer may be displayed, e.g., as shown in FIG. 20. The session countdown timer may, in some implementations, supersede any other countdown timers, e.g., all wins multiplier countdown timers, that may be displayed on one or more of the displays. In FIG. 20, the session countdown timer is displayed on the overhead sign 406, the leaderboard display 404, the topper displays 408, and the main top display 410; the countdown timer for the 3× all wins multiplier mode, however, may continue to be displayed on the main bottom displays 412. In some instances, the leaderboard display 404 may be caused to no longer display the leaderboard during the last few seconds of the session; similarly, any other displays that may show leaderboard information, e.g., the main top displays 410, may be caused to also no longer show any leaderboard information. Moreover, any indication of ranking that may be displayed on each player's EGM 402, e.g., in the player rank region 414, may be hidden, obscured, or removed. By hiding all leaderboard information, as well as player rank information, during the last few seconds of session play, players are not aware of how their ranking compares against other players. Since players have no way of knowing how their rank compares with other players' rank, players may be more likely to make a last-ditch effort in playing—either to try and close the gap and better their ranking, or to try and preserve whatever lead they may have and maintain their current ranking.

It will be appreciated that, as discussed in more detail in U.S. Provisional Patent Application No. 62/913,685, some implementations of such systems may include a base multiplier that is applied to all win amounts awarded by the EGMs 402; such a base multiplier may be further augmented by the further application of one or more all wins multipliers. Use of a base multiplier may allow for scores during a tournament to have higher numeric values as compared with the number of credits that would normally be won for an equivalent outcome on such EGMs 402 during non-tournament play of that EGM 402. In many such instances in which base multipliers and all wins multipliers may be used, the base multiplier may be set to a value that may be considerably higher than that of the all wins multiplier(s). For example, a base multiplier value of 10 or 100 may be used in some instances while one or more all wins multiplier(s) having values of 2, 3, 4, or 5 may be used. In such systems, the multiplier(s) that are active (base multiplier and/or all wins multiplier(s)) may be applied by the tournament management system to each win amount that is reported out by each EGM 402. For example, each time an EGM 402 generates a non-zero winning outcome (or a non-consecutive zero outcome), it may send a message to the tournament management system with the win amount; the tournament management system may then apply the relevant multiplier(s) and then send the result back to the EGM 402 for presentation to the player. The win amount, as used herein, may refer to an amount that corresponds to an outcome determined by a wagering game in a multiplayer tournament setting, but which may then be modified by one or more of the multipliers discussed above before being presented to the player as the result of that play and used in determining the player's session score.

Figure 21:
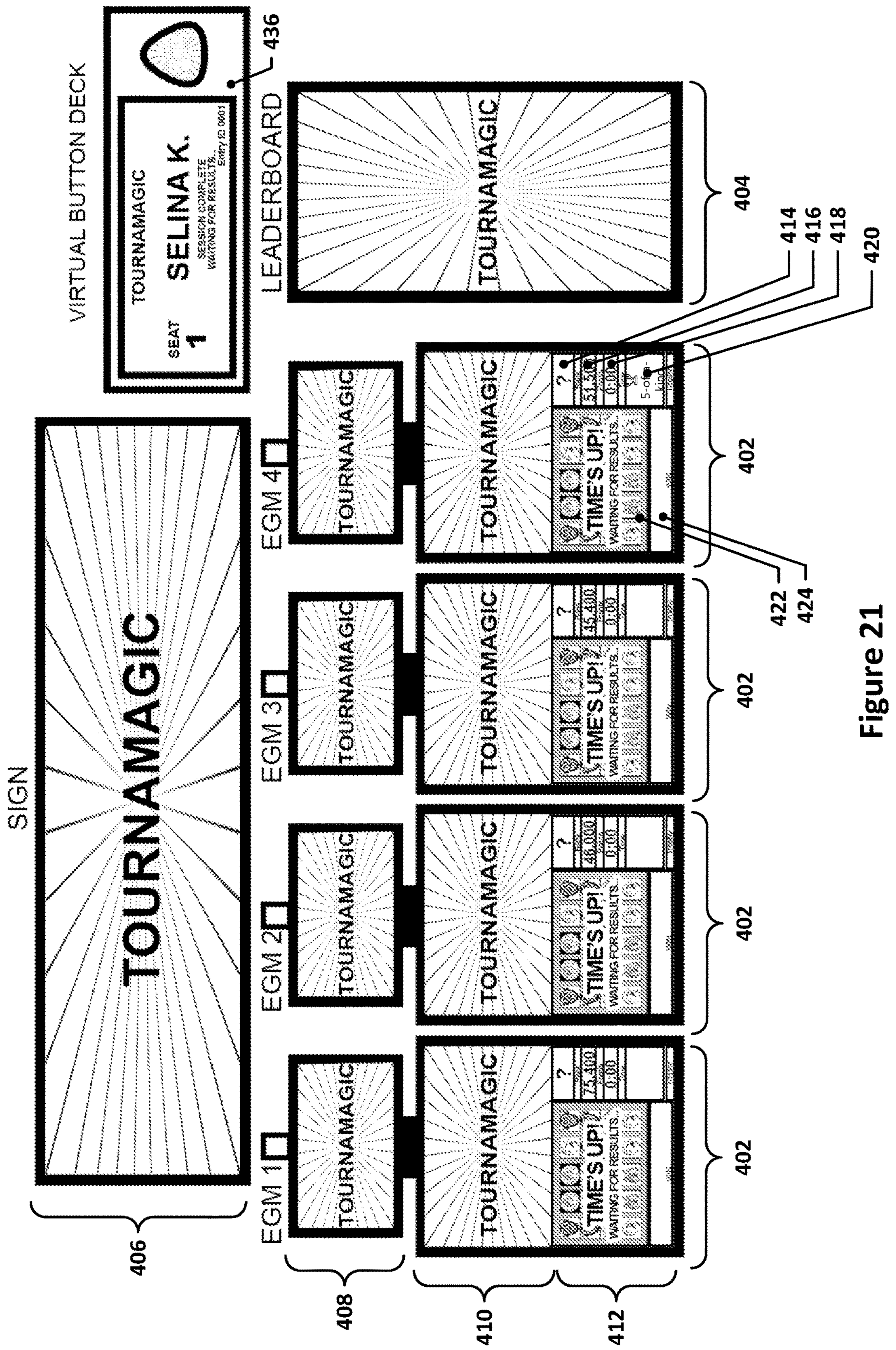
Figure 22:
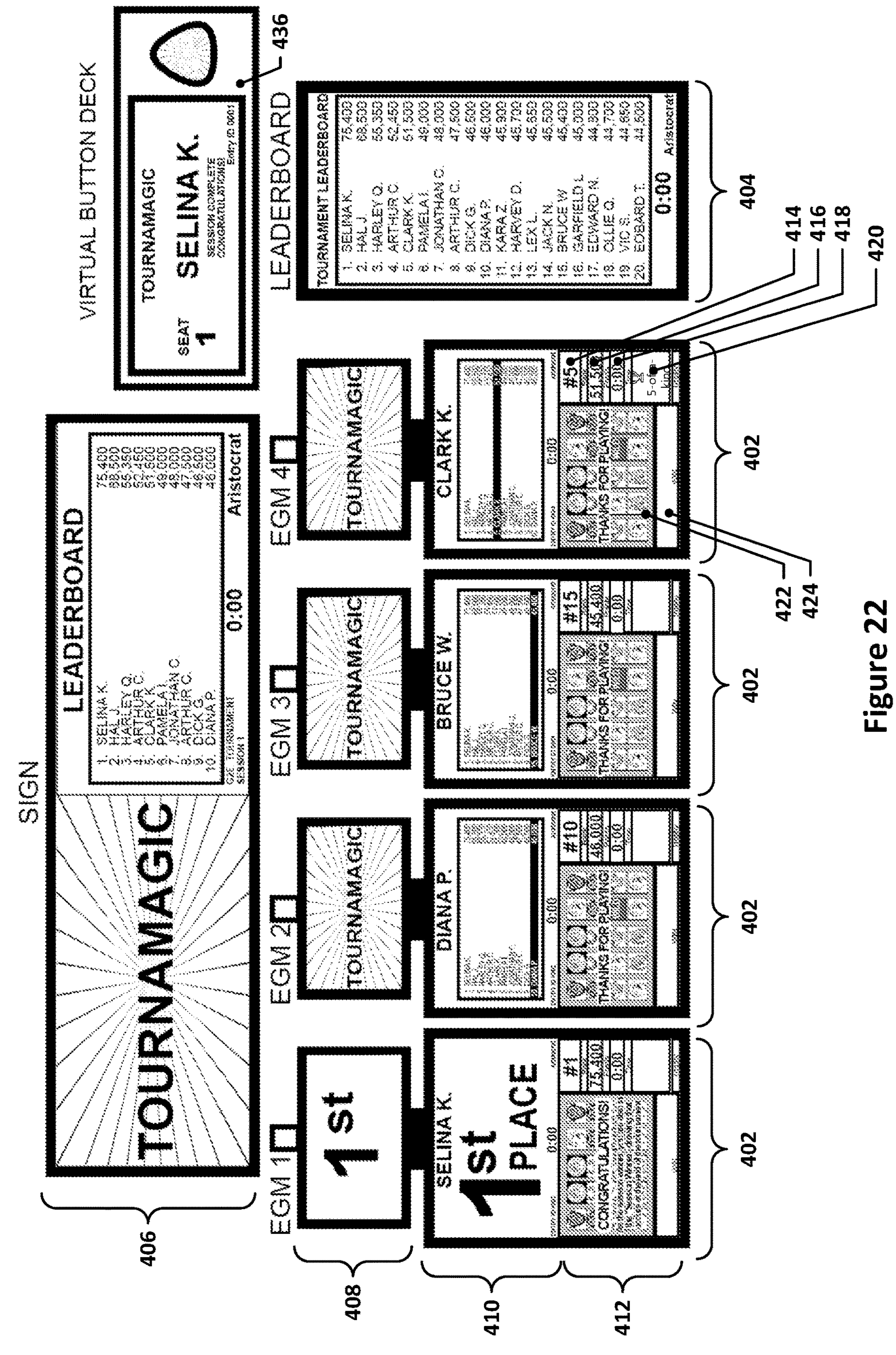

Once the session has ended, all of the EGMs 402 may be caused to no longer accept further plays or wagering events that count towards the tournament session score. As shown in FIG. 21, the various displays of the EGMs 402, leaderboard display 404, and/or overhead sign 406 may be caused to display, for example, a closing animation and/or indicate that the session time is up. Once all of the point totals have been evaluated for a given session, the results of that session may be caused to be displayed, as shown in FIG. 22, on the overhead sign 406, the topper displays 408 (although not in FIG. 22), and/or the main top display 410. In addition to displaying the overall tournament session rankings, some EGMs 402 may be caused to prominently display the session rank for the players of those EGMs 402. For example, the first, second, and third ranked players may each have their ranking displayed on the topper displays 408 and main top displays 410 of their respective EGMs 402.

In many tournament system implementations, the wagering game that is used for tournament play may generally be similar to a wagering game that is available for standard, non-tournament wagering play. By using wagering games that are familiar to players from their typical casino experiences, tournaments may attract players that have interest in such wagering games already, as well as potentially introduce players that have not played such wagering games before to a new player experience, which may cause such players to seek out the non-tournament version of such a wagering game in the future.

However, some features of non-tournament wagering games may be generally unsuited for tournament mode play. For example, in some wagering games, players may occasionally be rewarded with benefits like free plays or bonus games. In the context of a tournament session, free plays may be worthless since the players are provided with an infinite pool of credits with which to make wagers. Moreover, the extra time required to play a bonus game may occupy a significant portion of the total session time—this is time that a player cannot use to place further wagers (or make further plays or spins). Players of the non-tournament version of the wagering game, however, will be used to encountering such game features, and will feel that they are missing out on the game experience if such features are not present in some form. For example, if a free spin round/bonus is typically won in the non-tournament version of the wagering game when 3 or more scatter symbols are obtained on a play, the player will expect a) to also see scatter symbols appear periodically during tournament session play and b) to receive a benefit when enough such scatter symbols, e.g., 3 scatter symbols, are obtained on a given play of the wagering game. In tournament mode, such a wagering game may be configured differently in order to still provide players with a familiar, although slightly different, experience.

For example, if there are wagering game features that provide, for example, a bonus game play or free plays, during non-tournament wagering game play, those same features may be configured to instead provide other benefits during tournament play. For example, if various numbers of scatter symbols are obtained in a given wagering game play during the tournament session, the player may be rewarded with a personalized score multiplier, i.e., a score multiplier that only affects their score and does not extend to other players' scores. Such a score multiplier may, for example, apply to the next 1, 2, 3, 4, 5, etc. plays that the player makes after obtaining the scatter symbols; the number of plays for which the score multiplier is in effect, as well as the magnitude of the score multiplier, may be determined based on the number of scatter symbols that are obtained by the player, with increased numbers of scatter symbols being obtained resulting in increasingly larger numbers of plays in which the score multipliers may be in effect and/or larger score multipliers.

Scatter symbols, for clarity, refer to particular symbols that may result from a reel spin; in contrast to normal reel symbols, which must be obtained in particular patterns or on sequential reels in order to achieve a beneficial effect, e.g., a winning outcome, scatter symbols simply require that at least a predetermined number of such symbols be obtained, regardless of the patterns that such symbols may make or be part of, on a wagering game play in order to reap the benefits thereof. In some implementations, scatter symbols may also be eligible to form part of a winning symbol pattern, e.g., if five scatter symbols are obtained in a row across five reels, this may be considered a winning outcome—the five scatter symbols, however, may also count towards the scatter symbol count that may trigger, for example, a personalized score multiplier. In some implementations, any point or credit amount won based on a winning outcome involving scatter symbols may be held in reserve, in effect, until the conclusion of whatever wager game feature may be triggered by the scatter symbols. For example, if a five-in-a-row pattern of scatter symbols is obtained, this may a) cause a personalized score multiplier mode to be enabled and b) cause the player to receive 2000 credits or points. However, in some implementations, the 2000 credits or points may not be added to the player's running total while the personalized score multiplier mode is active, and may only be added after the personalized score multiplier mode has ended.

In some implementations, the player may be rewarded for a given scatter symbol outcome with a personal "wild multiplier mode" in which, for a predetermined number of subsequent plays, any wild symbols that the player obtains may turn into 2× or 3× multipliers. In such implementations, any occurrence of a wild symbol on a given play may be randomly replaced with a 2× or 3× multiplier symbol; all of the multiplier symbols that are displayed on the wagering game display region 422 of a player's EGM 402 may then be multiplied together and any amount won on the same game play may be multiplied by the resulting product. Thus, for example, if a player achieves a reel display outcome that includes five wild symbols that then change into three 2× score multipliers and two 3× score multipliers, the player's score for that play will be multiplied by $2 \cdot 2 \cdot 2 \cdot 3 \cdot 3 = 72$, e.g., if the player achieves an outcome that provides a 50× return on the initial wager, then, with the wild multiplier mode score multiplier, the actual outcome for that play, based on a 1 credit wager, will be $2 \cdot 2 \cdot 2 \cdot 3 \cdot 3 \cdot 50 = 3600$.

In some implementations, achieving various predetermined numbers of scatter symbols during a wild multiplier mode wagering game play may cause an extension of the wild multiplier mode, e.g., additional spins or wagering game plays in which the wild multiplier mode is active. For example, obtaining three scatter symbols during non-wild multiplier mode session play may cause the player to be rewarded by enabling the wild multiplier mode for the next three plays or spins. Similarly, obtaining four scatter symbols during non-wild multiplier mode session play may cause the player to be rewarded by enabling the wild multiplier mode for the next four plays or spins, and obtaining five scatter symbols during non-wild multiplier mode session play may cause the player to be rewarded by enabling the wild multiplier mode for the next five plays or spins. If a predetermined number of scatter symbols are obtained by the player while the wild multiplier mode is active, the wild multiplier mode may be extended by a predetermined amount, e.g., based on the number of scatter symbols obtained while the wild multiplier mode is active.

In some implementations, if the player achieves X scatter symbols during non-wild multiplier mode tournament session play, and X is between Y and Z, inclusive (Y and Z may, for example, be 3 and 5), then the player may be rewarded by enabling wild multiplier mode for the next X plays or spins. In some such implementations, if the player achieves A scatter symbols during wild multiplier mode tournament session play, and A is between B and C, inclusive (B and C may, for example, be 2 and 4), the wild multiplier mode may be extended for another A plays or spins. In some implementations, Z and C may not be used, e.g., there may be a lower limit Y and/or B, but no upper limit Z and/or C on X and/or A, respectively. In some implementations, a notification may be displayed on a display of the EGM 402 indicating the number of plays remaining where the wild multiplier mode will be enabled; each time the player makes a further play, the counter indicating the number of plays remaining in wild multiplier mode will be decremented by one. If the player earns additional plays in the wild multiplier mode, then the counter indicating the number of plays remaining in wild multiplier mode will be incremented by the number of additional such plays. In other implementations, a notification may be displayed on a display of the EGM 402 indicating the number of the current spin out of the total awarded spins where the wild multiplier mode will be enabled (e.g., spin 3 of 5); each time the player makes a further play, the counter indicating the spin being played in wild multiplier mode will be incremented by one. If the player earns additional plays in the wild multiplier mode, then the counter indicating the total number of wild multiplier mode plays awarded will be incremented by the number of additional such plays.

Figure 23:
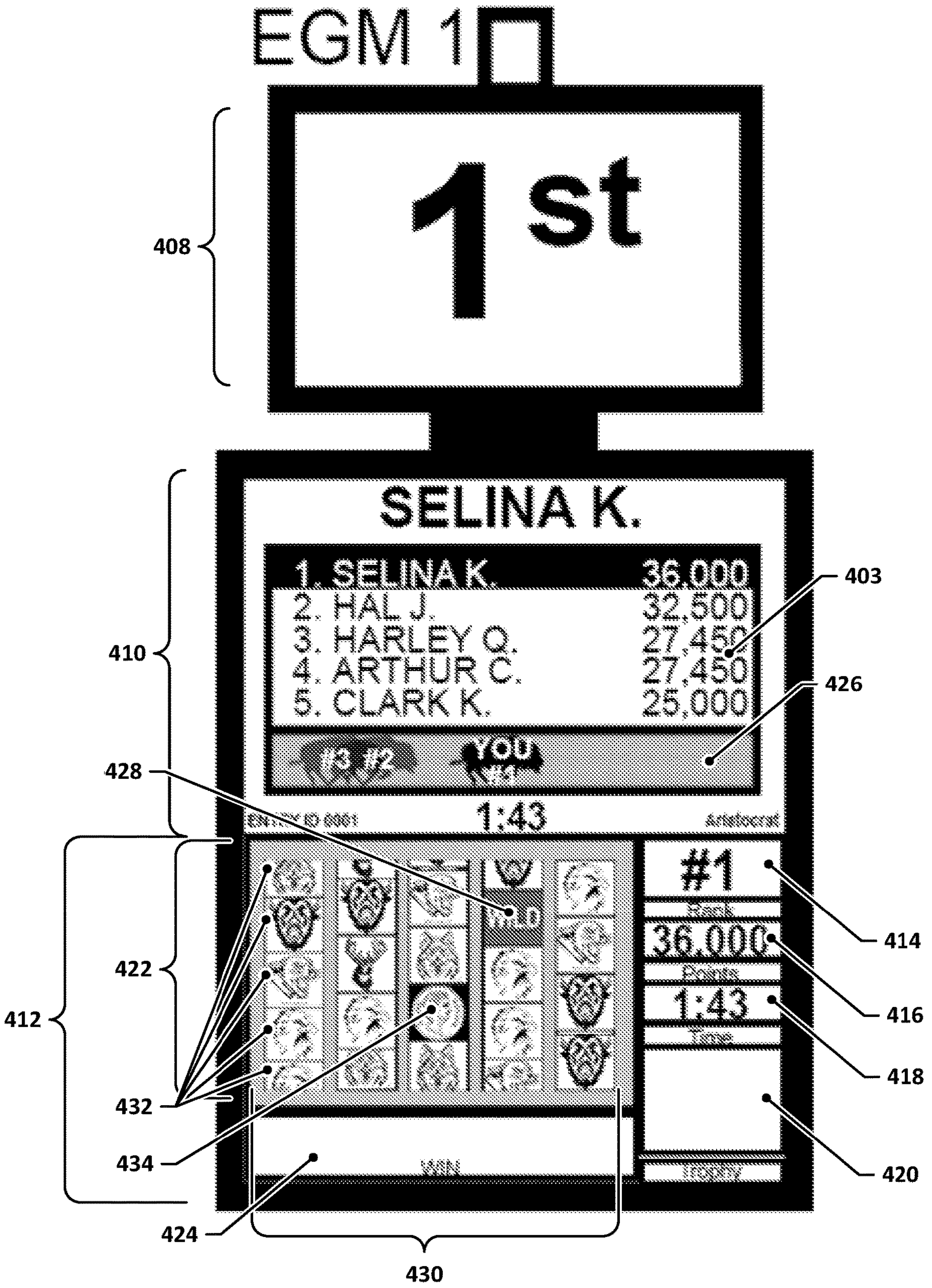
FIGS. 23 through 33 depict an EGM during various phases of tournament play, including while a wild multiplier mode is active.

FIGS. 23 through 33 depict one of the EGMs 402, e.g., the EGM 402 of Player 1, in various stages of tournament session game play, including while a wild multiplier mode is active. In FIG. 23, the reels 430 (there are five reels shown, each configured to provide symbols 432 to four reel stops) are shown mid-spin. The symbols 432, of which only five are explicitly called out (the rest are self-evident), may sometimes include, for example, wild symbols 428 and/or scatter symbols 434. The scatter symbols 434 in this example wagering game are coin symbols. Also shown in FIGS. 23 through 33 is an EGM-based leaderboard display 403, as well as an EGM-based race graphic 426. The background of the race graphic 426 may, for example, scroll from right to left, in this case, to create the illusion that the graphical indicators of the players, e.g., the buffalo icons or animations, are running from left to right. Of course, such directions may be reversed if desired to convey an opposite direction of travel. Each graphical indicator shown may, for example, be associated with a marker, e.g., #1, #2, #3, etc., that may provide an indication of information associated with the player that the graphical indicator represents. In this example, the markers indicate the relative player rankings within the session, but may alternatively be configured to provide other information, such as the seat position/EGM number of the player represented by the graphical indicator, the players' overall ranking in the tournament, etc. In particular, since the race graphic already provides a graphical depiction of relative positioning between players, using the marker to convey player rank may be, in some sense, superfluous. However, for race graphics that only feature a limited subset of player graphical indicators (as described earlier), using the markers to provide relative ranking information may still be useful if the race graphic does not convey enough information to allow the player to discern their overall ranking in the session (in FIG. 23, for example, the player is in first place, and thus knows that there are no other players ahead of them—but if the player were in 10$^{th}$ place and only 2 or 3 graphical indicators for players ahead of them were shown at a time, they would not know where they stood relative to first place from the race graphic unless the graphical indicators were associated with rank-indicating markers). As discussed earlier, the race graphic may be continuously updated to reflect relative rankings of players, and a variety of styles of animation may be used to convey changes in ranking of the player or of other players whose graphical indicator is shown.

Figure 24:
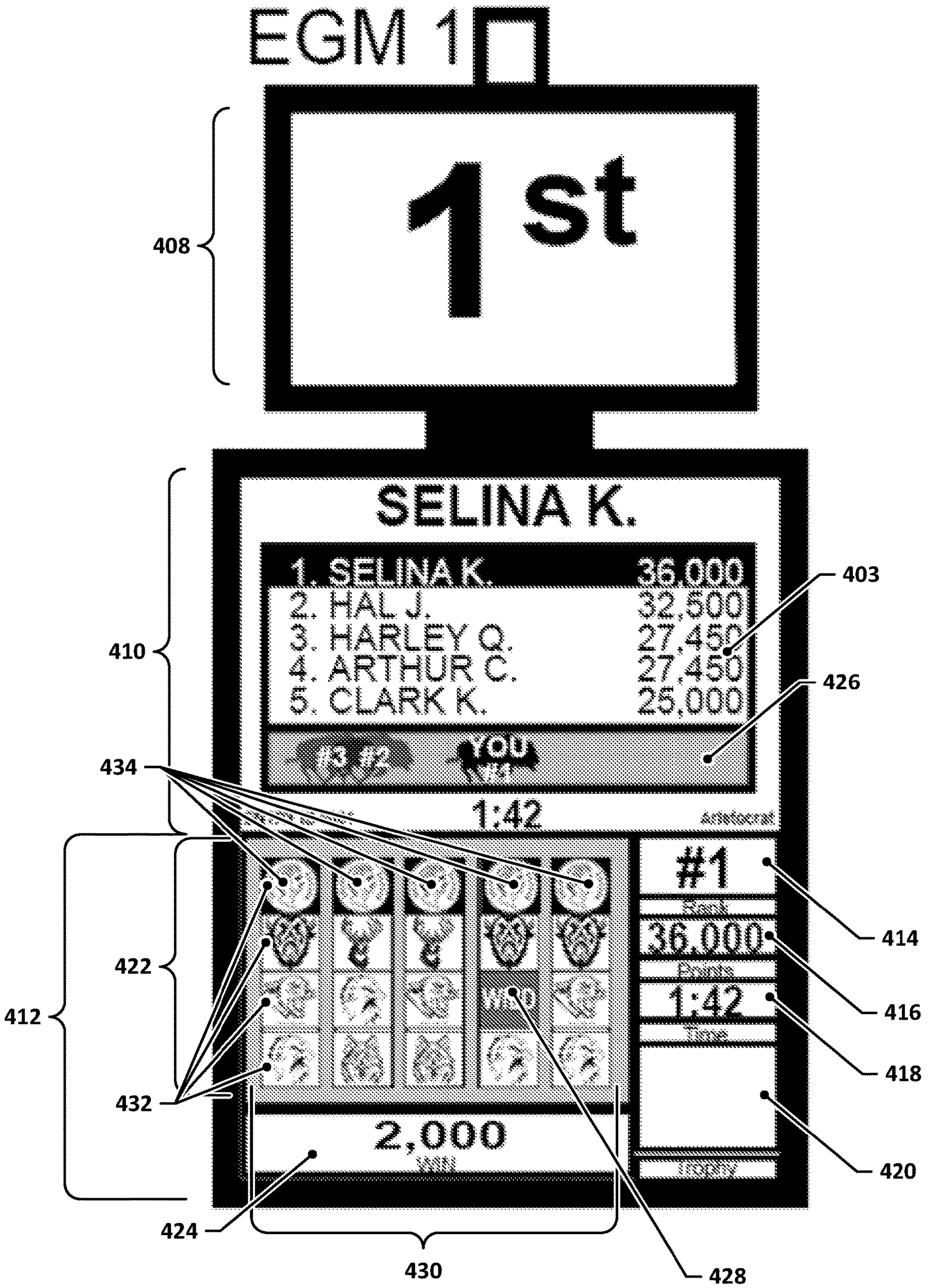

In FIG. 24, Player 1 has achieved a five-in-a-row pattern of scatter symbols 434, which has two effects in this particular implementation. The first effect is that the player receives a credit or point award for the pattern, which corresponds to one of the winning patterns offered in the wagering game. In return for achieving the winning pattern in this example, Player 1 is awarded 2000 points or credits, as shown in the win display region 424. The second effect is that, upon obtaining five scatter symbols 434 (regardless of whether or not they are part of a predefined pattern associated with a winning outcome), the EGM 402 may be caused to enter into a wild multiplier mode for some predetermined number of following plays. In this particular implementation, any credits or points won in connection with the game outcome that caused the wild multiplier mode to be initiated, as well as any credits or points won while the wild multiplier mode is active, may be totaled in the win display region 424 during the wild multiplier mode but may otherwise not be added to the player's overall session score, e.g., to the score shown in the score region 416, until after the wild multiplier mode has completed and is no longer in effect. As a result, a player may, through the course of the wild multiplier mode, amass a significant number of credits or points, e.g., via chained/multiplied together score multipliers, that are, in effect, kept hidden from other players until the wild multiplier mode is over, at which point in time, the accumulated points or credits may be added to the player's session total. This may result in sudden shifts in scores and rankings as players who complete a wild multiplier mode see the points or credits awarded during that mode added to their overall score, which may introduce an element of uncertainty that keeps players emotionally invested in the tournament.

Figure 25:
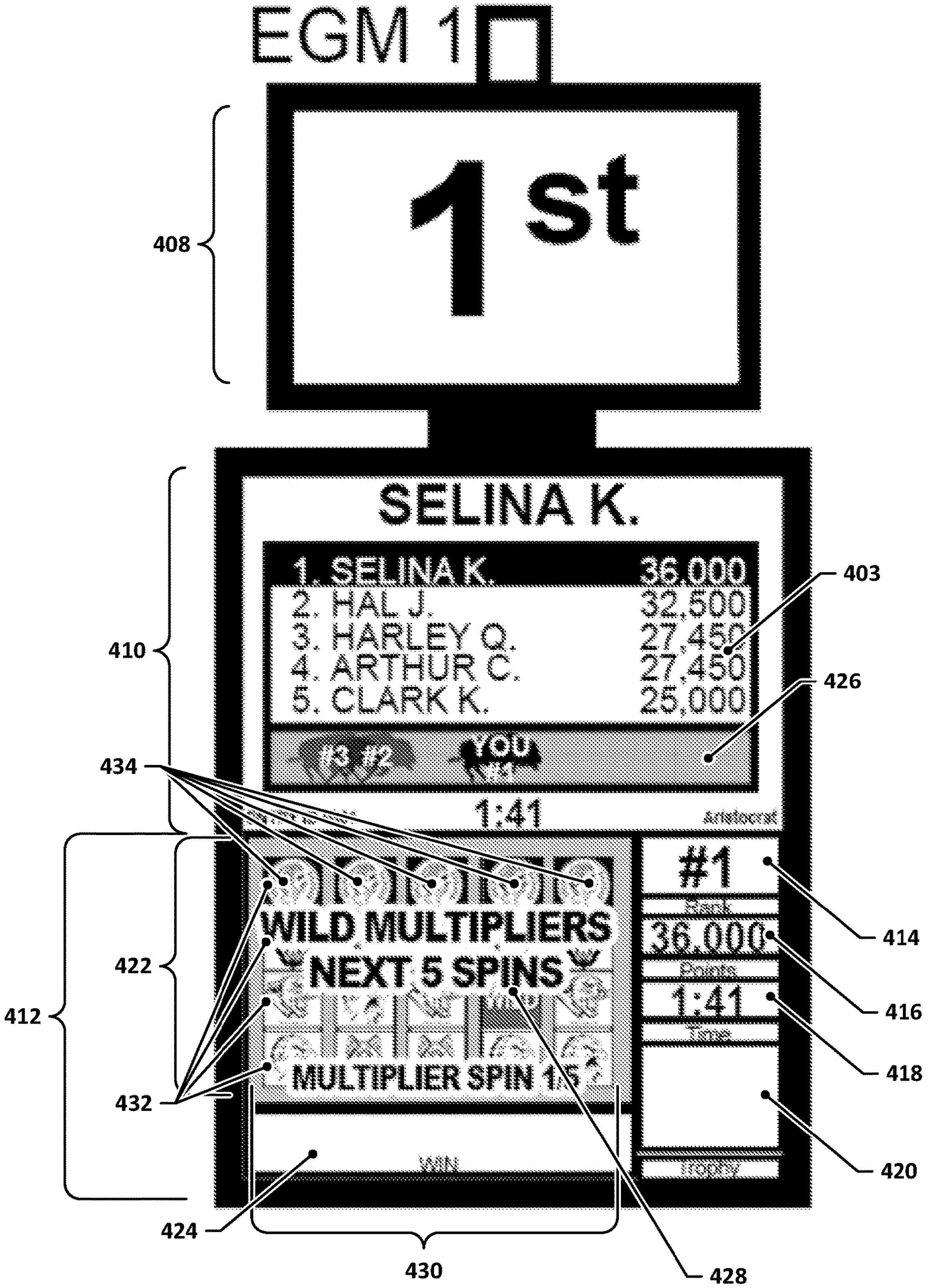

In FIG. 25, the EGM 402 has been caused to display a message to Player 1 indicating to Player 1 that the wild multiplier mode is active. This message may indicate, for example, that the wild multiplier mode is active and how many of the next plays of the wagering game will benefit from the wild multiplier mode. In this case, the next five spins will benefit from the wild multiplier mode.

Figure 26:
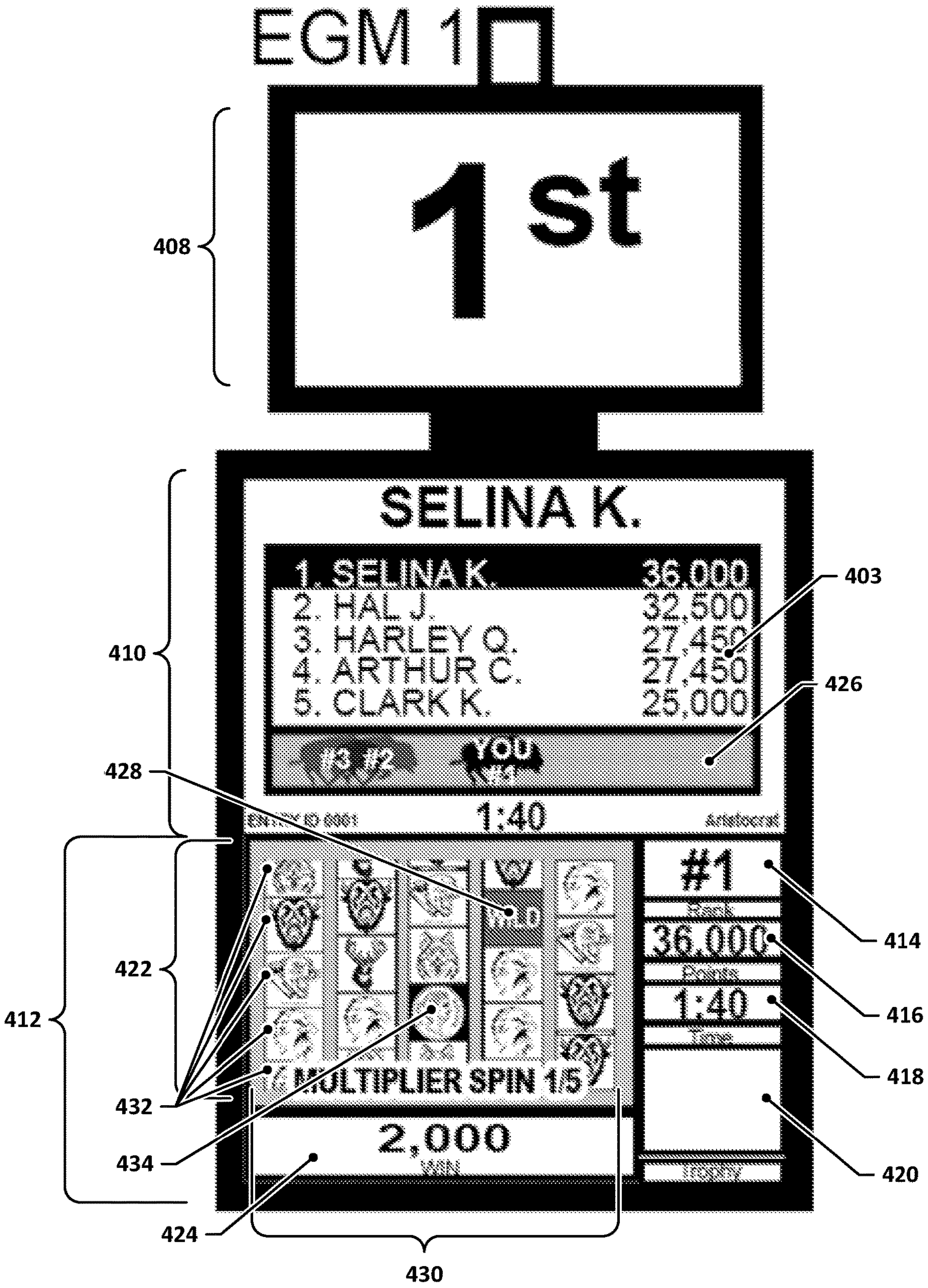

In FIG. 26, the EGM 402 has been caused to engage in another play of the wagering game; as can be seen, the win display region 424 continues to display the 2000 credits or points earned when the scatter symbol 434 pattern from FIG. 24 was achieved, and the player's overall score and rank in the score region 416 and the player rank region 414 have not been updated to reflect this 2000 point or credit total.

Figure 27:
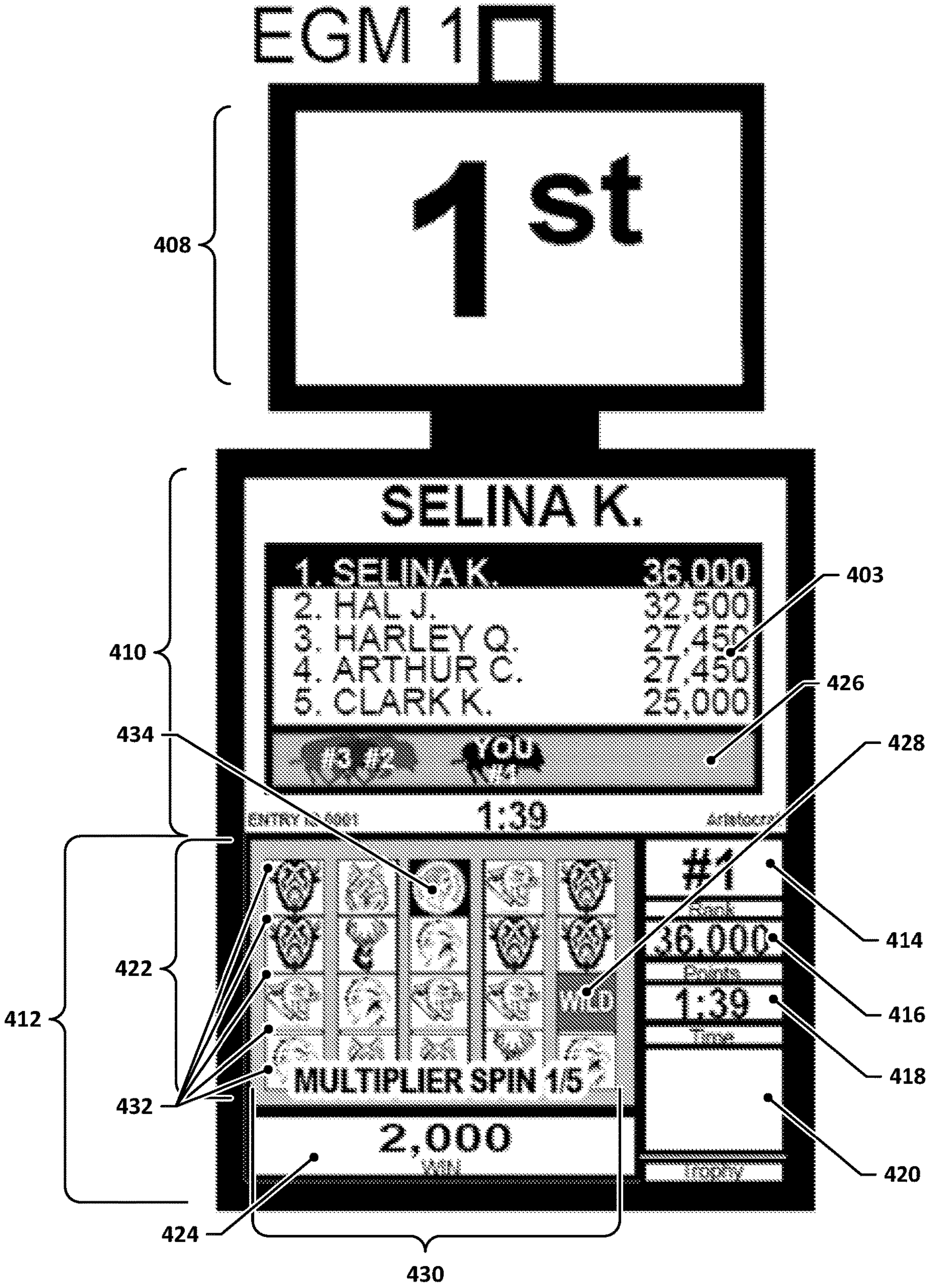
Figure 28:
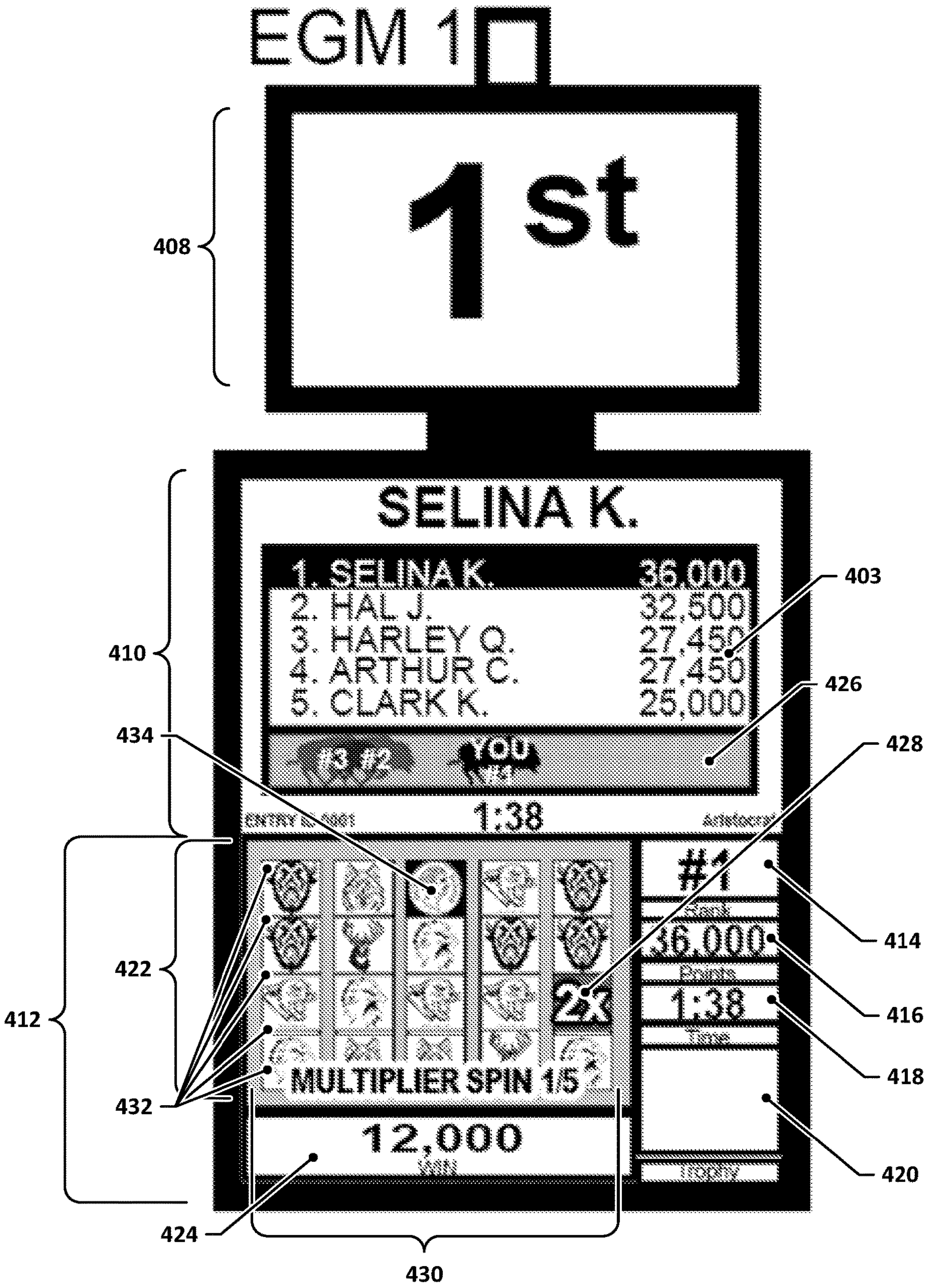

In FIG. 27, the reels 430 have been caused to stop spinning, and a single scatter symbol 434 and a single wild symbol 428 have been presented on the wagering game display region. A single scatter symbol 434 is not enough, in this implementation, to cause additional plays to be added to the wild multiplier mode, so the scatter symbol has little or no effect, and the current spin number of the total spins awarded for the wild multiplier mode is incremented by one. The wild symbol, however, may morph into, or otherwise be replaced by, a score multiplier symbol, e.g., as shown in FIG. 28, where the wild symbol has morphed into a 2× multiplier symbol. In this particular example, a pattern of other symbols 432 that are shown on the wagering game display region 422 may provide a winning outcome that awards 5000 credits or points to Player 1; these points, however are multiplied by the score multiplier, e.g., 5000 points multiplied 2×, to increase the wild multiplier mode score from 2000 points or credits to 12,000 points or credits.

Again, in this implementation, such increases in score are not reflected in the player's session total in the score region 416, in leaderboards, or in the player's ranking, e.g., as shown in the player rank region 414.

Figure 29:
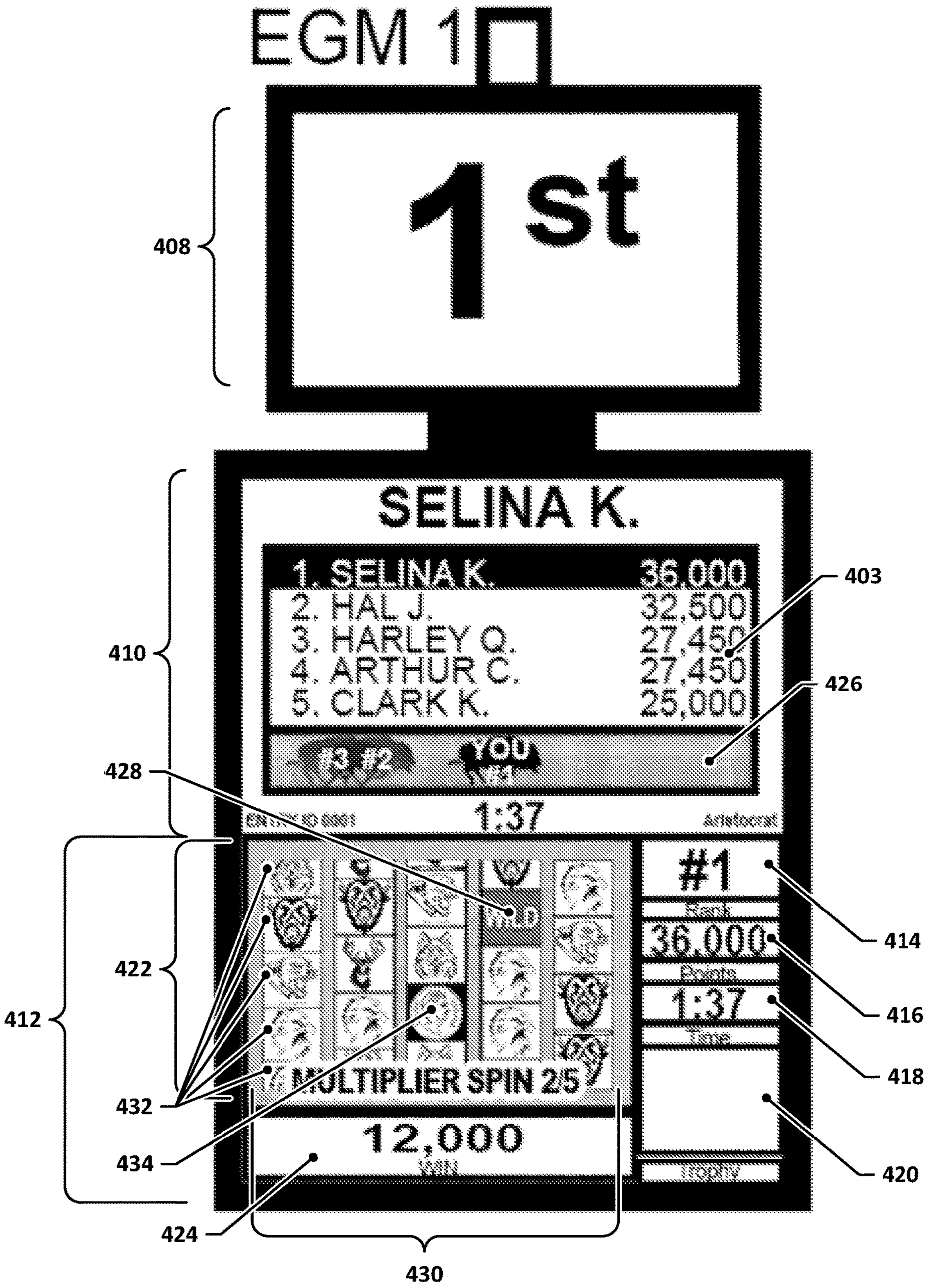
Figure 30:
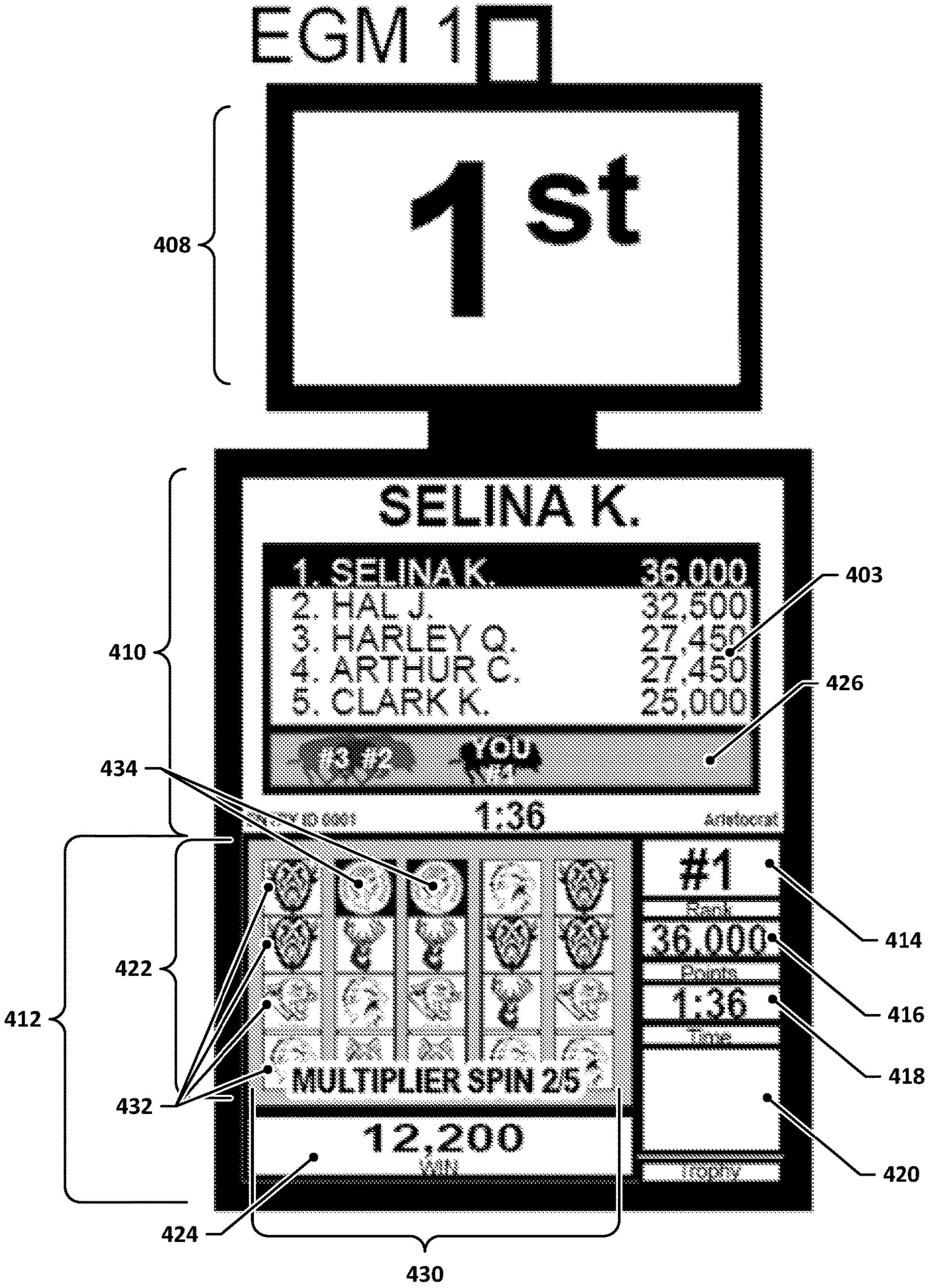
Figure 31:
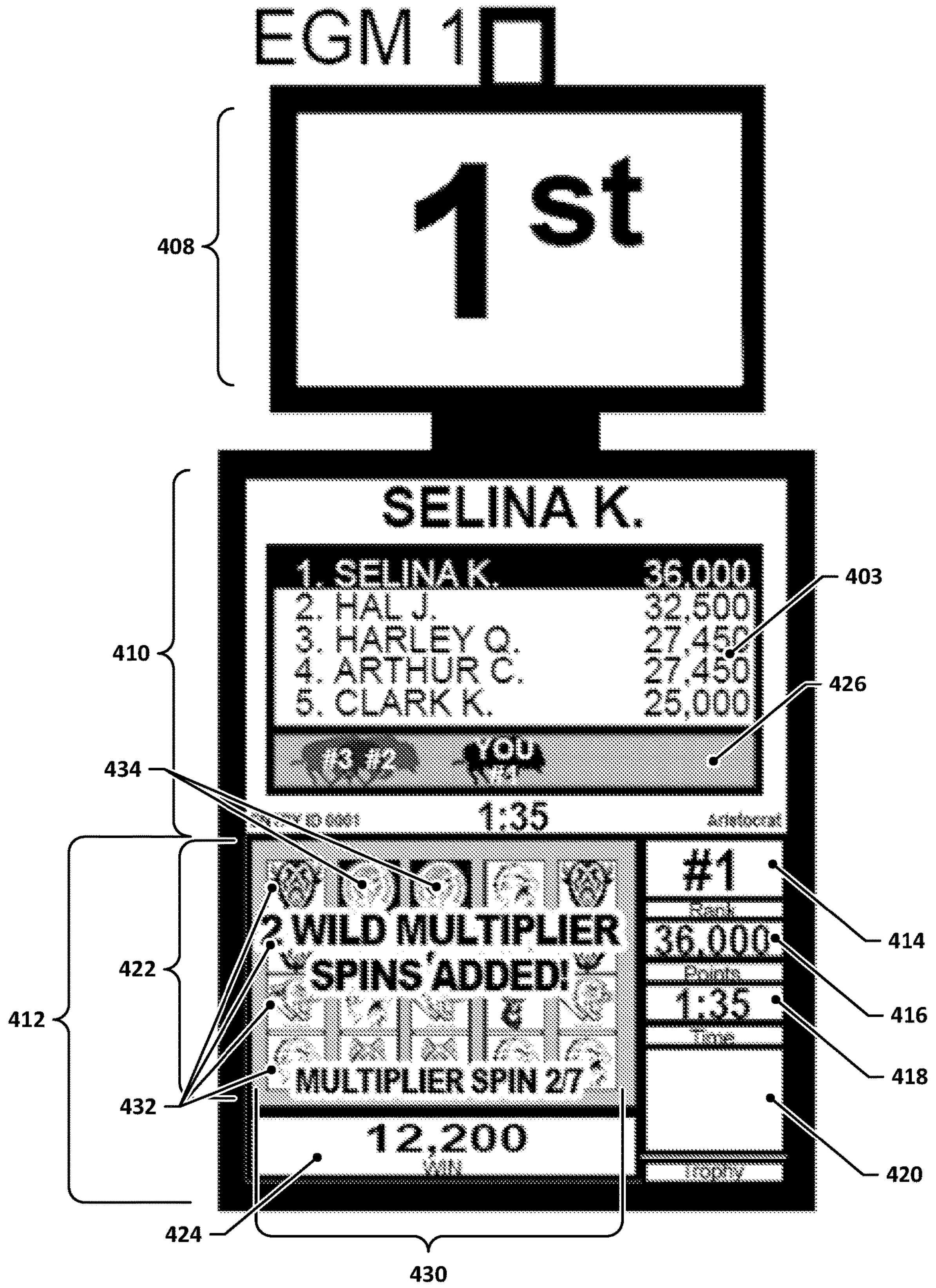

In FIG. 29, a further spin of the reels 430, i.e., a play of the wagering game, has been initiated—the wild multiplier mode indicator has been updated to indicate that two of the five spins in the wild multiplier mode have been used. In FIG. 30, the spin from FIG. 29 has completed, and two scatter symbols 434 have landed in the top row of the reels 430, resulting in a 200 credit or point winning outcome 4. Achieving two scatter symbols 434 while the wild multiplier mode is active, in this implementation, may also cause the wild multiplier mode to be extended for an additional quantity of plays, e.g., two plays. As seen in FIG. 31, the EGM 402 has been caused to display a message indicating the extension of the wild multiplier mode for an additional two plays. The 200 credits or points that were won in this play are added to the wild multiplier mode score shown in the win display region 424, although not to the player's session total in the score region 416 or in leaderboards, or used to modify the player's ranking, e.g., as shown in the player rank region 414. As can be seen, the additional two plays that resulted from getting the two scatter symbols 434 have been added to the total number of plays indicated in the wild multiplier mode indicator.

Figure 32:
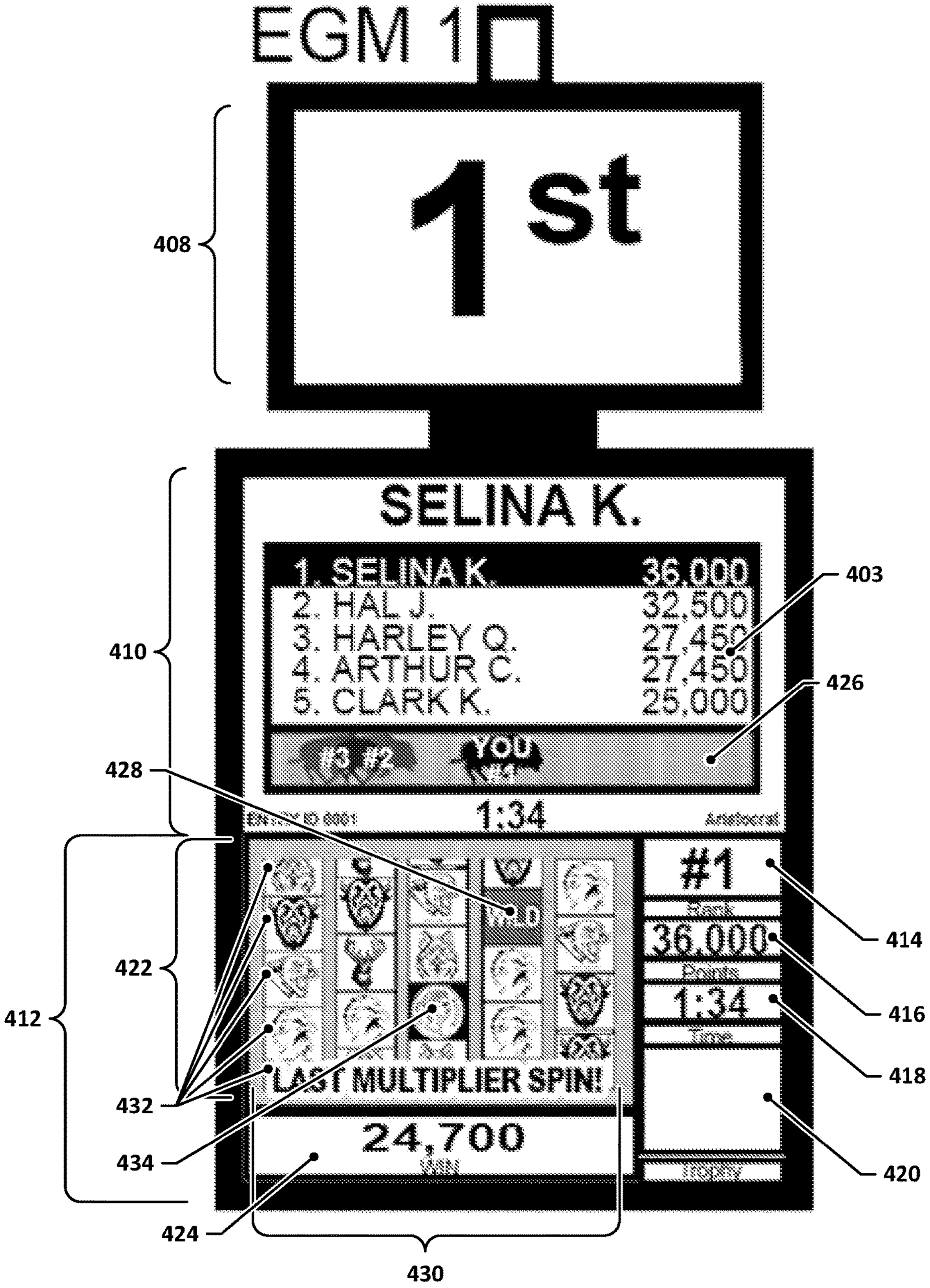
Figure 33:
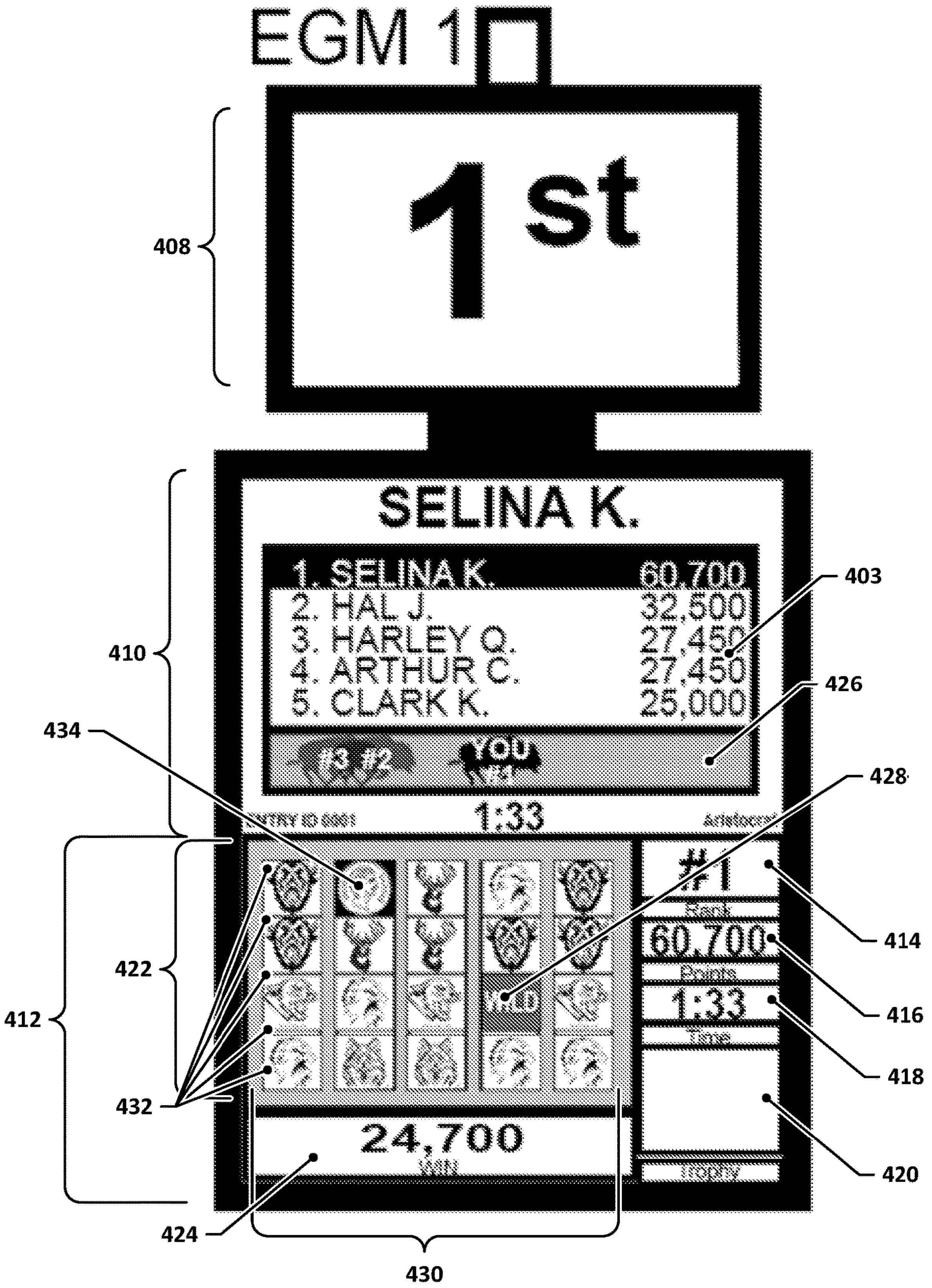

Plays in the wild multiplier mode may be continued until the last play in the wild multiplier mode is used up, e.g., as shown in FIG. 32, where the wild multiplier mode indicator has been updated to indicate that the wild multiplier mode is about to end. As can be seen, Player 1 has had some success in the intervening plays during the wild multiplier mode, having increased the winnings during the wild multiplier mode from 12,200 credits or points to 24,700 credits or points. In this example, the last play during the wild multiplier mode, as shown in FIG. 33, does not result in any additional winnings or extensions of the wild multiplier mode. The player's overall points, as shown in the score region 416, have now been increased to 60,700 points or credits, although this has not changed the player's rank, as they were already in first place prior to the start of the wild multiplier mode.

In addition to the various gameplay-related features discussed above, tournament systems such as are discussed herein may also feature numerous auditory features that may be used to enhance players' experiences and that may be activated or triggered based on the elapsed duration of a session. Such auditory features may include the playing of sound effects, voiceovers or announcements, and/or soundtracks. For example, for tournament sessions that are typically of a fixed duration, a soundtrack or other music may be selected that is tailored according to the session duration. Such a soundtrack may, for example, have one or more segments, with a first segment of the one or more segments having a duration equivalent to the session duration. Other segments may, for example, include a segment that is played before the first segment and that includes music that may be played while players move to their EGMs 402 in preparation for session play, as well as a segment that is played after the first segment and that includes music that may be designed to calm players down after a frenetic session of wagering game play. Such a calming segment of music may have a lower volume and/or slower tempo than the portion of the soundtrack played during the last portion of the session in order to provide a calming effect.

In some implementations, the first segment may be divided into two or more portions, with a first portion thereof preceding a second portion thereof when the soundtrack is played, and with the second portion having a tempo and/or a volume level that is greater, e.g., greater on average or having a greater peak value, than the tempo and/or volume level of the first portion. In such implementations, the music in the second portion may instill increased excitement in players since the volume and/or tempo of the second portion may increase in magnitude. This may correlate, for example, with the activation of various wagering game features, e.g., multiplier mode and/or sticky wilds mode.

In some implementations, the soundtrack may include, in addition to, as part of, or in place of the music, a Shepard scale, which is a sound effect that causes an auditory illusion in listeners. The Shepard scale (or Shepard tone) is a sound that appears to continuously increase or decrease in pitch, depending on the nature of the scale, as it is played—regardless of how long it is played for. The Shepard scale effect, for example, may be generated by simultaneously and cyclically playing multiple ascending (or descending) scales that are each separated from the closest neighboring scale(s) by one octave. The volume of the scales may be at a maximum near the middle of each scale, with the volume fading to zero or near zero at the start and end of each scale. The auditory effect is analogous to the visual effect of a rotating barber pole, in which slanted lines overlap one another in the vertical direction and appear to continuously move downward as the pole rotates, with no apparent end. A Shepard tone may use discrete scales or may use continuous scales; the latter option may also be referred to as a Shepard-Risset glissando, although the term Shepard scale is used herein to refer to either type of Shepard scale. The apparently continuously increasing (or decreasing) pitch of a Shepard scale, despite the actual audible structure of Shephard tone failing to do so, typically causes the human mind to experience a state of unease and tension that may cause heightened emotional investment in the source of the Shepard scale, e.g., the play of the wagering game. The use of a Shepard scale in a tournament session soundtrack, for example, may cause a player to experience increasing degrees of tension and emotional investment as the session progresses towards its conclusion, making the tournament session more memorable to the player.

In some implementations, the soundtrack for a given wagering game provided for tournament play may be composed of various portions, e.g., an intro portion, a loop or middle portion, and an outro portion. The soundtrack may be assembled in real-time or near-real-time depending on the session duration, with the intro portion played first, one or more repetitions of the middle or loop portion, and closing with the outro. The end of the intro portion, the start of the outro portion, and the start and end of the middle or loop portions may all be tailored such that the portions may be assembled into a cohesive musical experience in which the intro portion smoothly transitions to the middle or loop portion, and each loop or middle portion may smoothly transition to either a following middle or loop portion or the outro portion. In some implementations, the outro portion may have a higher tempo and/or volume level, e.g., a higher peak tempo and/or volume or a higher average volume and/or tempo, than the intro portion. In some cases, a tournament system may be configured to allow for a selection of a session duration from multiple possible session durations, with each offered session duration having a duration equal to the sum of the duration of the middle or loop portion multiplied by a positive whole integer X, the duration of the intro portion, and the outro portion.

Tournament systems as described herein may also provide various audible announcements that may convey information to the players and/or provide information regarding wagering game or tournament events. For example, prerecorded messages such as "Welcome to the tournament!," "Enjoy your tournament!," "Get ready to lead the herd!," "Almost time to charge ahead!," "It's BUUUUF-FAAAAALLOOOOO Time!," "Get ready to party!," or "Let's rock!" may be triggered before a session starts, e.g., after a player completes a sign-in or registration process. Similarly, messages such as "Welcome to the slot tournament!," "Players, take your seats!," or "Pick a seat—any seat!" may be prerecorded and played, for example, just before the session is about to begin and while the players are taking their seats.

After the players have taken their seats and just before actual session play is to begin, the tournament system may, in some cases, provide an additional pre-recorded message, e.g., "Ladies and gentlemen. Let's get this party started!," "Ladies and gentlemen, get ready to play!," or "Ladies and gentlemen, here we go!" Various other pre-recorded announcements may be automatically triggered during session play depending on the occurrence of various events, e.g., when a first place player is displaced to second place by another player, the tournament system may be caused to provide a prerecorded announcement such as "We have a new leader!," "Someone new just took the lead!," or "We have a new player in 1st place!"

In addition to such pre-recorded announcements, additional commentary or instructions may be provided by a live tournament director, e.g., an employee of the casino offering the tournament. The tournament director may, for example, act as a master-of-ceremonies (MC) for the tournament, assisting players with registering for the tournament, managing the seating of players for each session, initiating the start of each session, providing commentary on events during each session, and then engaging in post-session commentary, interviews with winning players, and other functions.

In order to facilitate the MC's role, the tournament system may include a tablet or similar computing device, e.g., a hand-held computing device with a touch-screen display (which may be referred to herein as a tournament host tablet or THT), that may execute one or more programs to provide graphical user interfaces for managing aspects of tournament configuration, player enrollment, monitoring of wagering game play during tournament sessions, and other aspects of the tournament system.

For example, during session wagering game play, the tablet may provide a GUI depicting player indications with a summary of player scores, ranking, trophy accumulation, big win events, names, current score multiplier (if any), number of wild multiplier mode plays remaining (if any), or other information that may be used by the MC to provide commentary regarding events of interest during the session, e.g., when a particular player is experiencing a significant score multiplier, when a particular player wins a trophy, when a particular player makes it into one of the top three rankings, etc. In some implementations, the GUI may consist of an overhead representation of the physical layout of the EGMs that are participating in the tournament; in such a GUI, the information associated with each player participating in a given session may be presented within the representation of the EGM which that player is using (and/or in close proximity to such a representation). For example, in a tournament with 24 EGMs, such an overhead representation may include three 4×2 rectangular arrays of rectangles, with the arrays centered along a common axis that the long axis of each rectangular array is perpendicular to. Each rectangle may represent one of the EGMs, and the name of the player playing that EGM, their current score, ranking, etc., may be displayed in the rectangle representing that EGM.

In some implementations, the GUI may be configured to highlight player indications for players based on various conditions, e.g., with a different color, or by alternating the background color for each player indication, or alternating the color or appearance of a border around the player indication. For example, in some implementations, the GUI may highlight all player indications for players having scores that are above a particular threshold, e.g., scores that are in the top 10 scores for a session. In some additional or alternative implementations, the GUI may highlight the player indication for a player that is experiencing the current highest rate of score change over the most recent time interval of a predetermined duration, e.g., over the last 5 seconds.

The tablet GUI may include controls that allow the MC to, for example, engage in live commentary, e.g., via a wireless headset and microphone linked to the tablet, that may be relayed over a sound system, e.g., speakers of the EGMs 402 and/or other speakers, such as speakers in the overhead sign 406 or leaderboard display 404, to the players and any spectators that may be watching. The tablet GUI may also, in some implementations, include controls that allow the MC to trigger playback of pre-recorded audio, such as celebration sounds, fireworks sounds, applause, etc. on selected EGMs, e.g., the EGM of a selected player, in order to highlight an event involving that player. Similarly, the tablet GUI may also, in some implementations, include controls that allow the MC to trigger other multimedia effects as well, such as illumination or flashing effects of an EGM's candle, animations that may be displayed on a display of an EGM, edge lighting effects on an EGM, etc.

FIGS. 34 and 35 depict two example GUIs that may be provided on a THT to display player information during a tournament session. In FIG. 34, a tabular format is used to list all of the current players for a given tournament session, as well as their names, rank, scores, any multiplier effects that may be in effect, and any trophies that may have been won by any of the players during the session thus far (for example, the "5×" indicator may indicate that the player has the first five-of-a-kind trophy, the "Pole" indicator may indicate that the player had the highest score after a predetermined period of time from the start of the session (the "pole position"), and the "CFB" indicator may indicate that the player has the "come from behind" trophy, which may indicate the player that has the greatest change in rank over a given time interval). The data shown in the GUI of FIG. 34 may be updated in real-time to reflect the current statuses of all of the session players. In this particular example, the tabular format GUI may be sorted by the contents of any particular column by providing a touch input to the column header of the column on which the sort is to be based.

In FIG. 35, the same data is shown as in FIG. 34, but arranged in a format that reflects the physical layout of the EGMs in the session. In this case, the player indications, and the data associated with each player, are each housed within a rectangle that represents an EGM; the relative locations of the rectangles indicates the relative physical positioning of the EGMs in the tournament session—such an arrangement may help the MC to more easily determine the physical locations of various players, e.g., if they wish to walk over to a particular player who is experiencing a significant gaming event and highlight their performance.

In the GUIs of both FIGS. 34 and 35, the GUIs feature user-selectable controls along the bottom edge in the form of five buttons, each of which may be used to trigger various behaviors. For example, the user may select one or more of the players shown by touching the associated rows for those players, and one of the three left-most controls may then be selected to cause the indicated effect to occur on the selected player's EGM. The fourth button from the left may be used to clear any player selections made, and the fifth button from the left may be used to open a menu that may be used to perform other tournament-related actions.

As mentioned above, the tablet may also be configured to allow for a particular tournament to be configured, and may include a separate or additional GUI for facilitating such setup. In some implementations, the tablet may be configured to provide a GUI that includes controls that may allow the MC to cause the EGMs that are to be used in a tournament to suspend normal wagering game play, e.g., wagering mode, and enter tournament mode, at which point they may be prevented from being used by a player unless for tournament game play.

In some implementations, players that participate in a tournament may be provided with the ability to access a replay of a tournament session in which they participated. For example, each EGM that is used in a tournament session may store video data of the wagering game play, e.g., video screen captures of the contents of the main bottom display 412, or data that allows key aspects of the wagering game play to be recreated (for example, instead of storing screen captures for the entire main bottom display contents, the EGM may instead store data such as information describing the reel spin behavior, which symbols appear at which reel stops, etc., that may then be used by a simulator program installed on a player's mobile device to re-create the same game play that the player experienced during the session). The phrase "replay data" is used herein to refer to any data that may be used to later re-create one or more aspects of wagering game play, e.g., via screen-captured video or via re-created game play using a simulator.

Such replay data may be used to provide the players of the tournament with the ability to re-live their tournament gaming experience at a later time, e.g., in the comfort of their homes, with friends, etc. The tournament system may, in some instances, be configured to allow players to share their replays with other people, e.g., by providing the players with a hyperlink or internet address, or the ability to post such links or addresses to a social media platform, that may be sent to another individual to allow that individual to access a particular player's replay.

The replay data may also include data that allows at least some leaderboard information to be replayed in tandem with the wagering game replay so that the player may see their progression up (or down) through the ranks of other players during the course of the replay.

In some implementations, players may also be provided with player video data that was recorded during a session in which they participated. Such player video data may, for example, be obtained using imaging sensors, e.g., digital camera sensors, located in each EGM and positioned so as to capture video of the face or head of the player of that EGM while the player is playing the wagering game offered by that EGM. When a player initiates a session replay, for example, the player's wagering game play for the session may be recreated and presented to the player in tandem with player video data of the player that is synchronized with the replay of the wagering game. Thus, the player will be shown not only the re-creation of the wagering game during the replay, but video of their facial expressions and reactions during that wagering game play. This allows them to re-live the excitement that they experienced during the tournament, giving them a greater connection to their tournament experience and fostering an increased desire on the player's part to experience further such excitement, e.g., by participating in further tournaments and/or playing the wagering game in question during normal wagering play.

In some further implementations, players may also be provided with replay data and/or player video data for other players in addition to their own replay data and/or player video data. For example, when a player initiates a replay of a tournament session experience that they participated in, they may be provided, as discussed above, with a re-creation of their wagering game play during the session, and possibly player video data of themselves during the session. The player may also be provided, in some implementations, with re-creations of other players' wagering game play and/or player video data of other players in tandem with the re-creation of their own wagering game play and/or the player video data of themselves. The re-creations of other players' wagering game play and/or the player video data of the other players may be selectively provided during the re-creation of the player's wagering game play such that, for example, the wagering game play and player video data for the player with the next-highest score and rank is shown, i.e., the player is able to view their own game play and facial expressions at any given point during the session while simultaneously viewing the game play and facial expressions of the person that they were trying to surpass in score at that point in time during the session. Thus, they may see their own expression of increasing elation as they approach the next-highest-ranked player's score, along with increasing concern on the part of the next-highest-ranked player as the gap between the two players narrows, followed by, for example, the player's jubilation as they pass the next-highest-ranked player's score and the next-highest-ranked player's dismay as they lose a rank position. The re-created game play and player video data of other players may be switched as the replay progresses so as to generally always show the next-highest-ranked player based on current rank of the player at any given time during the replay or, if the player is in the highest-ranked position at any point in the replay, the next-highest-ranked player may be the player with a rank immediately below the player's rank, e.g., second place. The wagering game replay and player video data for the current next-highest-ranked player may not be replaced with the wagering game replay and player video data for the subsequent next-highest-ranked player immediately after the replay depicts the player surpassing the current next-highest-ranked player's score; there may be a delay introduced of a few seconds to allow the current next-highest-ranked player's facial expression upon being displaced/outranked by the player to be savored during the replay. After the short delay period the wagering game replay and player video data for the current next-highest-ranked player (or, more accurately, the former next-highest ranked player, as the player that was the current next-highest-ranked player will no longer be the next-highest-ranked player once displaced) may be replaced with or displaced by the wagering game replay and player video data for the subsequent next-highest-ranked player.

Figure 36:
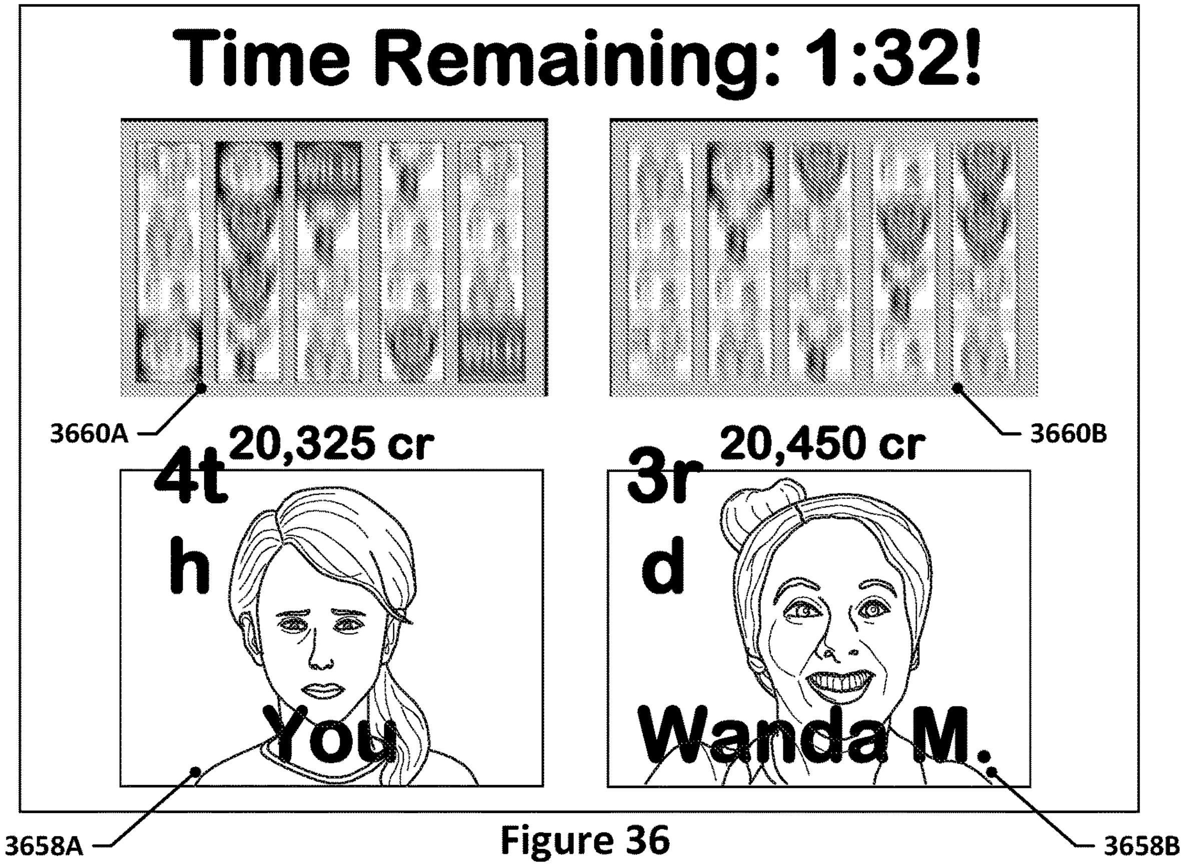
FIGS. 36 through 41 depict various examples of a tournament session replay GUI.

FIGS. 36 through 41 depict an example of a replay GUI that allows a player to re-live highlights of their tournament session play. In FIG. 36, a replay GUI is shown, e.g., as may be displayed on a smart phone, tablet, or other device with a display. The replay GUI is split into a left half, which shows replay content related to the player of the player for which the replay has been created, e.g., a first player, and a right half, which shows content related to other players in the session that the replay recreates, e.g., second players. In the upper left quadrant, a replay of the first player's wagering game play is being presented; the replay shows replay video 3660A that recreates the state of the first player's wagering game at 28 seconds into a 2-minute tournament session. The lower left quadrant shows player video 3658A of the first player that was recorded contemporaneously with the first player's play of the wagering game at the 28-second mark. Various overlays have been added to the replay GUI to show, for example, the first player's score at the 28-second mark (20,235 cr), the first player's rank ($4^{th}$) at the 28-second mark, and how much time is remaining in the session.

On the right side of the GUI, the upper quadrant shows replay video 3660B that recreates the state of a second player's wagering game and player video 3658B that shows the second player's facial expressions at the 28-second mark; overlays for the second player's score (20,450 cr), rank ($3^{rd}$), and name (Wanda M.) have been added to the right side of the GUI as well. The second player, in this case, is the player that had the next-highest score or rank compared to the first player at the 28-second mark of the session; at the 28-second mark during the session, the first player and the second player Wanda M. would effectively be engaged in competition with each other, as any upward change in the first player's rank would likely cause the second player Wanda M.'s rank to decrease (there may be some scenarios, e.g., where both the first player and the second player Wanda M. score winning outcomes that cause both players to advance upward in rank in tandem, in which the first player may experience a change in rank without surpassing the second player Wanda M.). As can be seen in FIG. 36, the first player is presented with footage of themselves reflecting building excitement as they realize that their score is approaching that of the second player, Wanda M.

Figure 37:
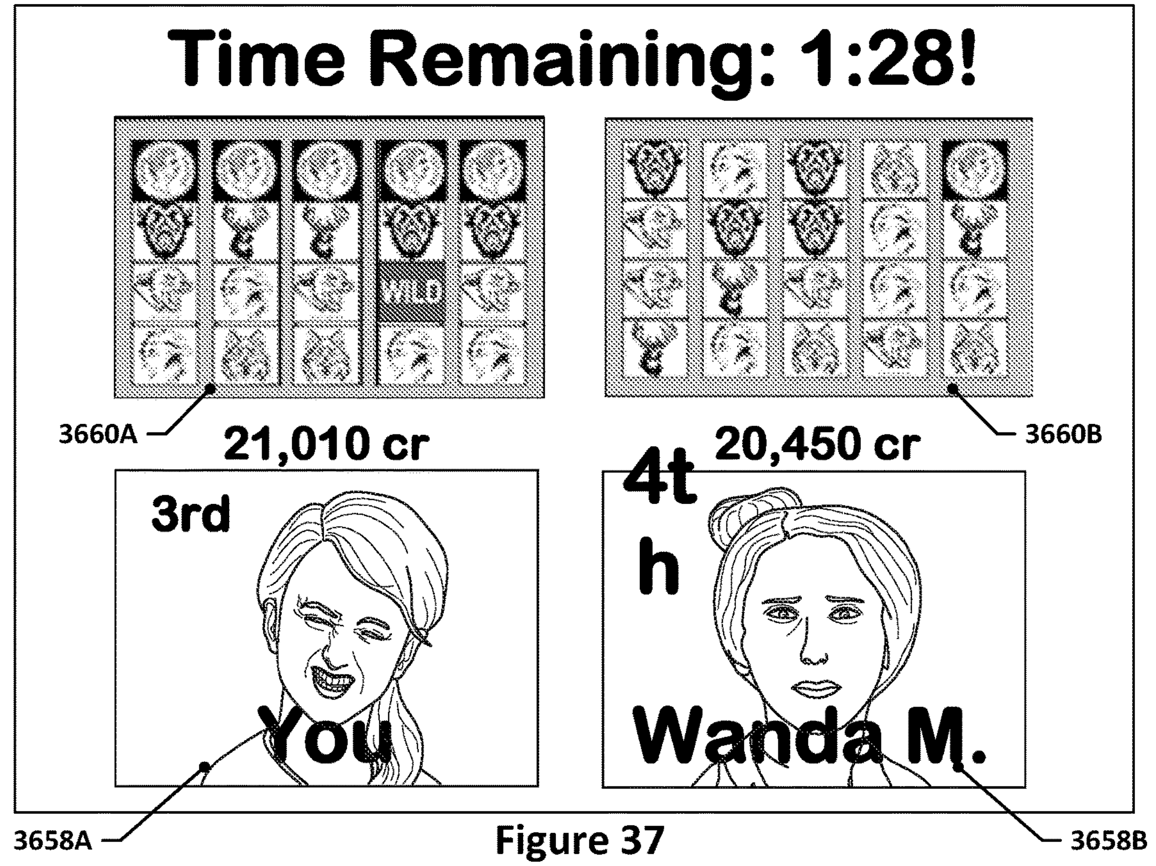

In FIG. 37, the replays of the wagering games and the player videos reflect the state of the first player and the second player Wanda M., as well as their respective wagering game states, at 32 seconds into the session. The first player is ecstatic, as shown in the player video 3658A, since she has just surpassed the second player Wanda M.'s rank, and the second player Wanda M. is upset, as shown in the player video 3658B, since she has just dropped out of the top three rankings.

Figure 38:
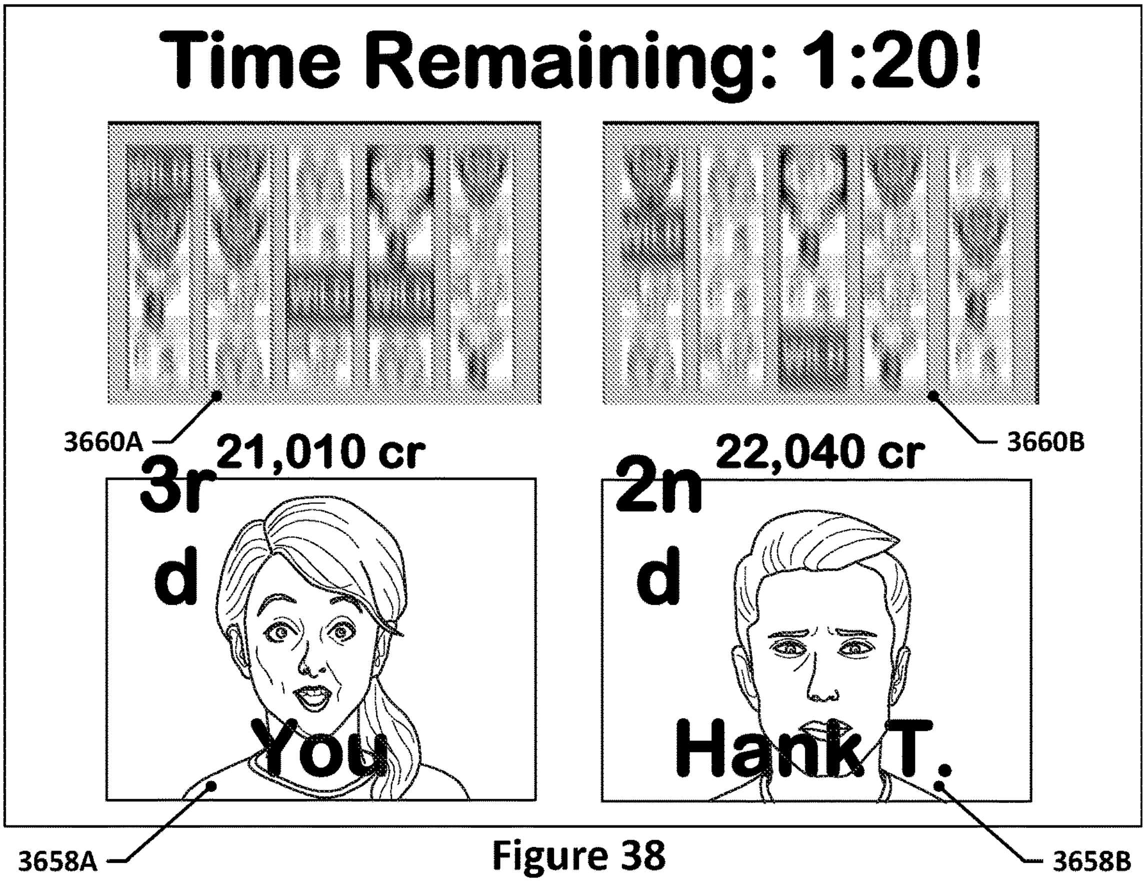
Figure 39:
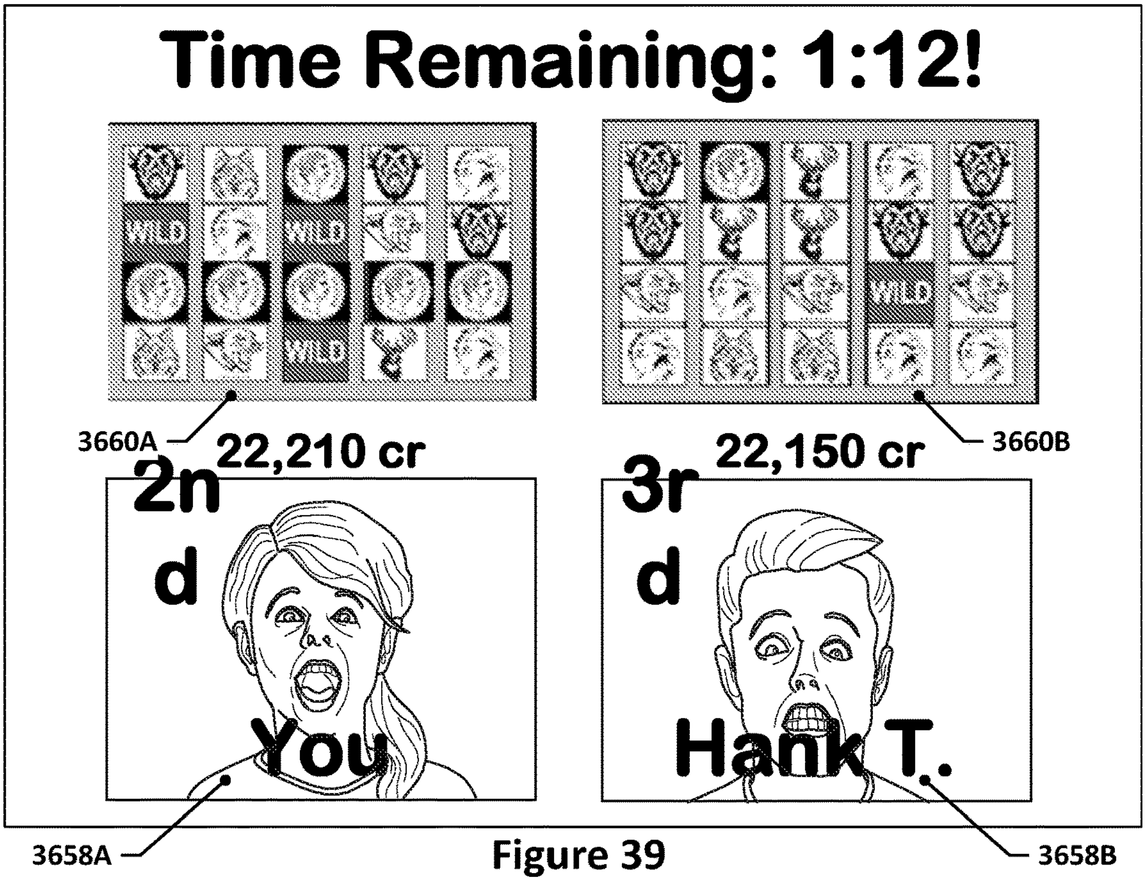

In FIG. 38, the second player Wanda M. has been replaced by the new, next-highest ranked second player relative to the first player, Hank T. The ranking and score overlays have also been updated to reflect the first player's increased point total and rank. The first player, as seen from the player video 3658A, is still somewhat excited from her recent vanquishing of the second player Wanda M., and is likely also feeling that she has momentum and may soon surpass the second player Hank T. as well. In FIG. 39, the first player has again surpassed the second player—in this case, the second player Hank T.—in score and rank, and the player videos 3658A, 3658B of the first player and the second player reflect each player's respective emotional state.

Figure 40:
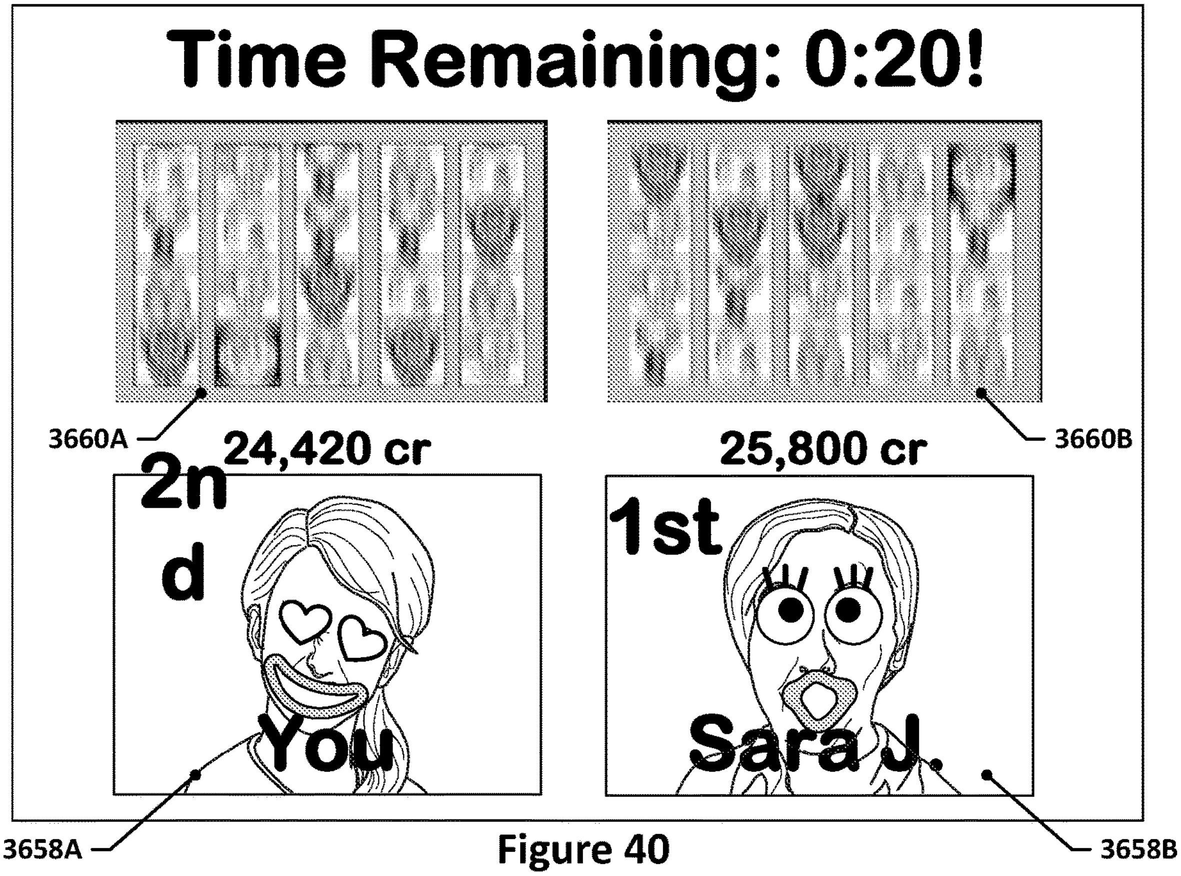
Figure 41:
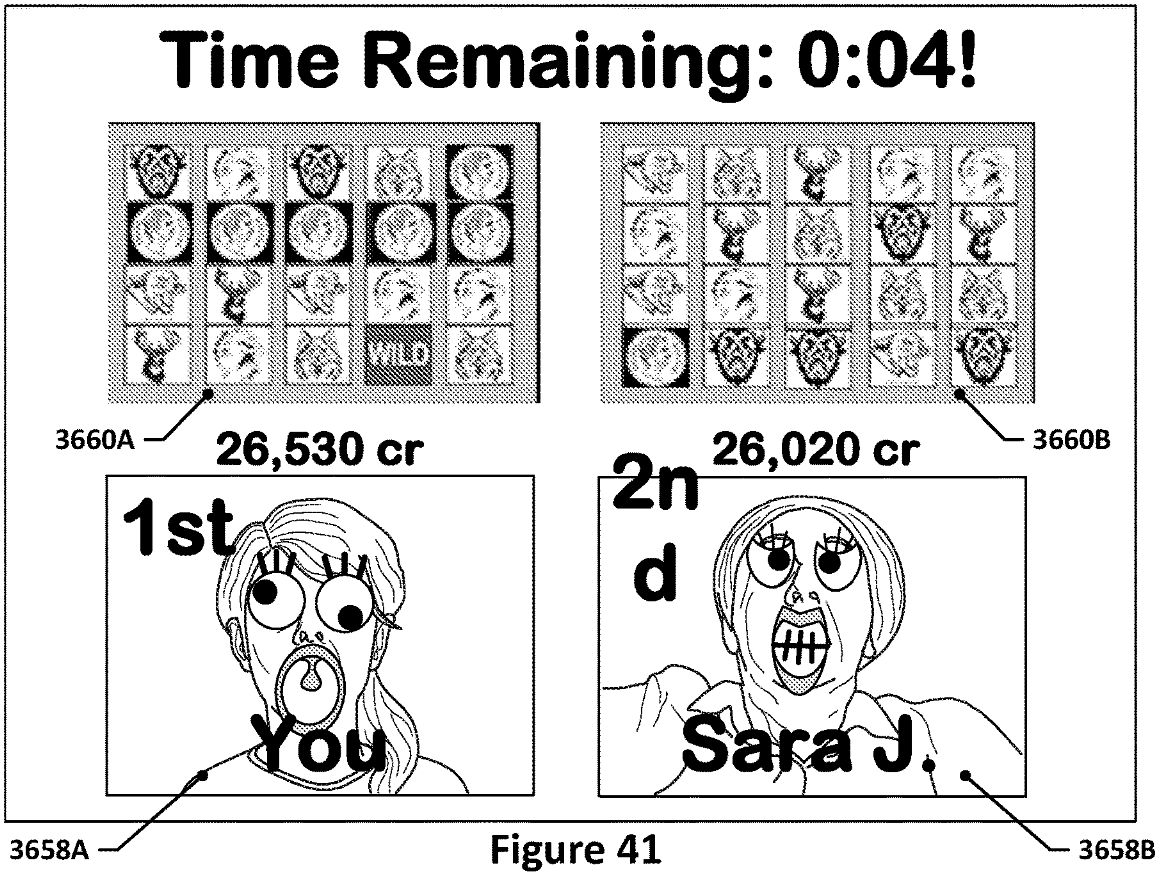

FIGS. 40 and 41 show a similar scenario in which the first player overtakes the second player, in this case, the first-ranked second player Sara J., but with an augmented reality overlay adding on animated features that are mapped to the movements of the players in the player videos. The augmented reality overlay graphics effectively anonymize the faces of the players while still conveying the emotional content of their expressions.

In some implementations, the player video that is used for replay purposes may be augmented in a way that partially or wholly masks one or more of the players' identities. For example, the player video associated with at least some players may be processed using one or more augmented reality routines that overlay identity-masking graphics over the source video content; such identity-masking graphics may, for example, include cartoon-like facial features, such as oversized eyes and mouths, that may be added to the video and located and sized such that such features align with corresponding facial features of the player visible in the video. Such features may then be animated in a way that mimics the movement of those same features in the video, similar to how some modern smartphones are configured to overlay augmented-reality "emoji" content over video taken with the smartphone camera, or how the smartphone app "Snapchat" operates in some modes. Such augmented reality overlays may thus still generally communicate the emotional state of the "masked" player to a viewer while preserving the displayed player's identity.

In some implementations, the augmented reality overlay may cover almost all or all of the overlaid player's face or visible body, e.g., the player's face may be overlaid with an animated portrayal of a cartoon character or animal avatar, instead of just a partial overlay.

Such augmented reality overlays may be implemented in a variety of ways. For example, in some implementations, such augmented reality masking overlays may be applied to all player video obtained during session play, and the replay presentation for any particular player may feature masked player video (both of the player for which the replay is prepared and any other players that may be depicted as part of the replay). In some other implementations, the video of the player for which the replay is prepared may be unmodified, allowing the player to see themselves without any masking effects applied, but the video of any other player that is shown as part of the replay may have an augmented reality masking overlay applied, thereby preserving the privacy of the other player to some extent.

In some implementations, the augmented reality overlay feature may be a player-selectable feature, e.g., each player may have the opportunity to enable or disable the augmented reality overlay for video that features that player, thus allowing each player to, in effect, control the level of privacy afforded to that player in other player's video replays.

The type of content that may be provided to a player viewing a replay provided by the tournament system may take a variety of forms. For example, a replay may, as discussed above, include screen captures of the wagering game itself and video of the player (or other players). A replay may also include content from a variety of other sources as well, such as content shown on the player's EGM's main top display, the topper display, the leaderboard displays, etc. For example, a replay may include graphical content for a race graphic, e.g., a herd of running buffalo, with each buffalo representing a particular player in the tournament session being replayed. In some implementations, the tournament system may receive inputs from a player requesting a replay that defines which content to include therein. For example, a player may use a concierge application on their smartphone to request a replay from the tournament system; the concierge application may, in turn, allow the user to select certain options that may define what content will be displayed during the replay. Thus, the player may choose, for example, one or more video of the player's face, video of the player's opponents' faces, screen captures of the player's wagering game play, screen captures of the player's opponents' game play, screen captures of leaderboard information, screen captures of "race" graphics or other similar mechanisms for graphically depicting the rank of the player requesting the replay. The tournament system, responsive to receiving data indicative of such user selections, may cause the corresponding tournament session content for each selection to be presented to the user via the replay feature in a synchronized format, e.g., with each region of the display showing content for the tournament session that occurred at the same time during the tournament session. This may allow players to experience tournament session multimedia content that they perhaps missed during the actual tournament session, e.g., because the player was focused on playing the wagering game during the tournament session, they may not have been able to divert their attention to content that was displayed on displays other than the display showing the wagering game content and may have missed such additional content. The tournament system may also provide the player with the ability to share such replays with other people, e.g., through providing a code, hyperlink, message, or social media platform or posting to the other person that may give the other person the ability to interact with the tournament system and initiate the replay for the player.

While the tournament systems disclosed herein provide various features that provide a more engaging experience during tournament session game play, as well as potential features that may allow players to re-live that experience, some implementations of the tournament systems disclosed herein may include additional features that may encourage particular post-session behaviors by players, e.g., encouraging players to remain geographically close to a particular location, such as the casino or venue where the tournament is being held.

For example, as discussed earlier, players that have won trophies during session game play may be entered into a lottery drawing or similar contest where their chances of winning increase with the number of trophies they have won during the tournament. Such a lottery drawing, however, may only be performed at the conclusion of the tournament, and players that are selected during the lottery may only be able to collect their prizes if they are present at the venue, e.g., present to collect the prize in-person at the time of the lottery or, in some instances, verified as being within a geofence enclosing the venue at the time of the lottery (such as if a smartphone associated with that player indicates that the player, or at least a person assumed to be the player, is within the boundaries of the geofence).

Another feature that may be included in some implementations is a "follow-the-leader" feature, where players may be eligible to obtain further winnings based on the performance in later sessions (or the tournament overall) of another player in their session. For example, if a particular player, e.g., a first player, wins their session, the other players in that session, e.g., second players, may be given opportunities to share in potential rewards earned by the first player in other, subsequent sessions and/or the tournament overall. As with the trophy lottery discussed above, eligibility for such rewards-by-association may be made contingent on player behaviors, such as the player being within a particular geographic area. Thus, for example, some tournaments may feature session-level awards, e.g., a moderate monetary prize, vouchers for free meals at a casino restaurant, etc., for the player that wins that session, and may feature a pool of lesser rewards, e.g., smaller monetary amounts, vouchers for free appetizers or drinks at the casino restaurant, etc., that may be awarded to players that competed in one or more previous sessions that the winning player of the session also won (such additional players may be referred to herein as "associated players." Such awards, however, may only be distributed to each of the associated players if the associated player is on-site or within a geofence associated with the tournament venue. The rewards for associated players may, for example, be provided at the end of each session, only at the end of the tournament, or both at the end of each session and the end of the tournament, depending on the particular configuration of the tournament.

Yet another feature that may be included in tournament gaming systems, as disclosed herein, may be "mystery" prizes that may be received by players during or after their tournament sessions. Such mystery prizes may, for example, be awarded to players for various reasons, e.g., randomly, as consolation prizes that are awarded to one or more players that do not achieve a high enough score in a session to be considered session winners (such as players that do not achieve sufficient points to advance to play in a following session or players that do not place in the top three ranks in a session, etc.), as the result of obtaining a particular game play outcome, etc.

Mystery prizes may be awarded virtually, and may be configured such that the actual nature of the mystery prize is not apparent to the player that wins it (as well as to other players) until at least after the player's session ends. For example, the tournament system may be configured to display on the player's EGM an icon or other indicator of one or more mystery prizes that the player may have won during a tournament session; once the tournament session is over, the tournament system may, for example, continue to maintain an association between a player and records identifying the nature of the various mystery prizes that the player may have won. In some implementations, indicators of the various mystery prizes may be made available to the player through a device other than the EGM. For example, if the player has a smartphone with a concierge application installed, then the player's mystery prizes may be depicted using various icons or other indicators in the concierge application. Similar notifications may be provided via a push notification system, e.g., through text messages.

The tournament system (of which a concierge application such as that described above may be part) may be configured to maintain the secrecy regarding the nature of each mystery prize until after the tournament session in which the mystery prize was awarded has completed and until one or more particular conditions are met, after which the player may be allowed to learn the nature of the mystery prize. For example, a tournament system may be configured to present a GUI, e.g., via a concierge application, in which an icon or other indicator for a mystery prize may be configured to be selectable by a user. The tournament system may then, responsive to such selection, change the indicator for the mystery prize to an image, animation, and/or text that identifies the nature of the prize (as well as other relevant information).

Mystery prizes may be "unlocked" or revealed to players responsive to the fulfillment of a variety of different conditions being met. For example, some conditions may simply be time-based, e.g., the tournament system may be configured to reveal the nature of a mystery prize to a player after a predetermined period of time has elapsed, e.g., from when the mystery prize was awarded to the player or from the end of the tournament session in which the mystery prize was awarded. Such a period of time may be, for example, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, or any desired time interval.

In some implementations, the tournament system may be configured to reveal the nature of the mystery prize when a location-based condition is satisfied, e.g., when the player to which the mystery prize was awarded travels to a particular location or within a particular region or area, e.g., a geofence, or outside of a particular location or region, e.g., when the player leaves the casino or property where a tournament session was held. The tournament system may determine that the player is at such a location or within such a region through a variety of mechanisms. In some instances, the tournament system may use geolocation data for the player, e.g., geolocation data provided through a mobile communications device associated with the player (such geolocation data may, for example, be obtained from the player's mobile communications device by the concierge application or some other application that is configured to communicate with one or more servers of the tournament system that may manage the distribution and status of the mystery prizes awarded to players), to determine whether the player is at the location or within the region. In other implementations, other mechanisms may be used to determine whether the player is at the location or within the region. For example, the tournament system may be configured to receive a signal from a kiosk, terminal, or other location-based device that may be configured to read a player's player tracking card (when inserted by the player into the device), a radio-frequency identification (RFID) tag associated with the player, or otherwise engage in short-range communications with a device carried by the player when such a location-based device engages in such short-range communications with the device carried by the player. On receiving such a signal, the tournament system may determine, based on the occurrence of the short-range communication between the player-carried device and the location-based device, that the player is at the location where the location-based device is located. In yet further implementations, the tournament system may determine the location of a player through, for example, receiving data from a remote device indicating that the player is present at the location. For example, in some implementations, the tournament system may receive data from a website, remote terminal, or other device that may be interacted with by a third party, e.g., an employee at an establishment at the location. The employee, upon interacting with the player, may then interact with such a device to provide inputs that indicate that the player is at the location of the device.

It will be understood that the above conditions, as well as other conditions not explicitly discussed above, may also be combined—e.g., a mystery prize may be unlocked for a player if the player travels to a particular location within a particular time window after receiving the mystery prize.

Mystery prizes may provide the players that receive them with any of a variety of actual benefits when unlocked or revealed to the player. For example, a mystery prize may cause a predetermined number of points to be awarded to the receiving player upon being unlocked or revealed to the player, e.g., 10,000 points, that may be added to the player's tournament total. Another implementation of a mystery prize may automatically enter a player into a higher-level tournament session, e.g., a quarterfinal or semifinal tournament session. In yet another example, a mystery prize may provide a cashable award, a voucher that may be redeemed on an EGM for promotional credits that may be used to place wagers on the EGM, etc. Other types of mystery prizes may include, for example, awards of virtual credits or points that may be used in online gaming, e.g., social gaming, or rewards that may require additional action on the part of a player to obtain, e.g., an award that will cause the player to be elevated to the next higher tier of a player loyalty program if they return to the venue/casino within some timeframe, e.g., 24 to 48 hours, and spend a predetermined threshold amount, e.g., $500.

In addition to mystery prizes, some implementations of tournament systems may include secret winning outcome patterns that may trigger special bonuses for players. In most cases, the various winning patterns for an EGM are typically known to a player in advance (or knowable in advance, e.g., by looking at an information screen of the EGM that provides information about the wagering game offered on the EGM). In addition to such publicly known winning outcomes, some tournament systems may be configured to recognize additional patterns that are not publicly advertised to the player; such additional patterns may be referred to herein as "secret patterns" or "secret winning outcomes." If a player's EGM forms a secret winning pattern during a play or spin of the wagering game, the tournament system may cause the player to be awarded with a corresponding prize or secret award. The tournament system, having determined that a player should be awarded such a prize or secret award, may associate the play with such a prize or secret award. However, the tournament system may not make the player immediately aware of the prize or secret award that has been awarded to them. Instead, the tournament system may wait to inform the player of the prize or secret award until after one or more predetermined conditions are met, e.g., after a predetermined period of time has elapsed, after the tournament session in which the secret pattern was achieved has finished, after the tournament has completed, etc.

Such a secret prize or award may, for example, cause the receiving player to advance to the next level or tier of tournament sessions (regardless of the player's score), or may provide a one-time grant of points, or other benefit.

In some tournament systems, players may be offered the chance to participate in a team-based format, e.g., players may be paired up into teams of two or more players. In some such implementations, one person on the team may play the wagering game in a session for points, and the other person on the team may play the wagering game in that same session for multipliers or other bonuses that affect the points that the first player on the team is winning. For example, the tournament system may be configured to allow players to register for play as a two-person team, and may then designate one of the two players on each team as being the player that is playing for points, e.g., the scoring player or the main player, and the other player of each team as being the player that is playing for multipliers or other bonuses, e.g., the non-scoring player or the booster player. Such designations may be randomly made by the tournament system, or may be made responsive to inputs provided by one or both of the players of each team, i.e., user-selectable. The wagering game that each player of each team is provided to play may be tailored by the tournament system to match the "role" that each player has within their team. For example, in some such implementations, the wagering game that is presented to the main player of each team may be specially configured by the tournament system to generally only acknowledge outcomes that produce a payout or point increase and not generally acknowledge outcomes that would normally produce non-payout outcomes, e.g., bonus awards, multipliers, etc. Conversely, the tournament system may specially configure the wagering games played by the booster player of each team such that the wagering game generally only acknowledges outcomes that result in bonuses and/or multipliers and generally does not acknowledge outcomes that would normally produce a payout or point increase. During tournament session play, the tournament system may cause any bonuses or multipliers that are obtained by the booster player to be applied to the main player's game play as if the main player had obtained them during play. For example, if the booster player on a team achieves a 3× multiplier bonus for the next three spins, the outcomes for the next three spins obtained by the main player may be multiplied by 3×. It will be understood that in some implementations, the main player's wagering game may still acknowledge some bonus or multiplier outcomes (which may be applied to the main player's game play), and that the booster player's wagering game may still acknowledge outcomes that result in a win of an amount of credits (which may be added to the team score), but the outcomes that are predominantly acknowledged by the main player's wagering game may be credit-win outcomes, and the outcomes that are predominantly acknowledged by the booster player's wagering game may be bonus or multiplier outcomes. It will be further understood that the wagering games played by the main players and the booster players need not be the same game—each player "role" may actually be provided, in some implementations, with very different wagering game experiences in terms of game play, graphics, sound, etc.

Such an arrangement, in effect, splits up the wagering game experience that is normally experienced by a single player into two interwoven wagering game experiences that allow two players to have their own wagering game experiences in which the outcome experienced by the players collectively is the product of the outcomes that each individual player achieves during their individual play. In such an arrangement, the rankings in a tournament session may be reflective of team ranking instead of individual player rankings.

Another team implementation may include a tournament where players on a team are treated as a unit for the purposes of determining ranking or progression through the tournament, but the tournament session scores of the team may be based on a subset or other composite of the scores of the players on that team, e.g., the average score of the team players during the session (or sessions), or the sum or average of the highest X scores of each team for each session.

In many such team-based implementations, the tournament system may be configured to configure the EGMs involved in providing a tournament session such that the players on each team are seated at adjacent EGMs in order to promote communication between players and to increase player excitement. However, some other tournament systems may be configured to allow teammates to play on non-adjacent EGMs, e.g., EGMs in different banks of EGMs or even different properties.

The various tournament features discussed herein may be provided, for example, through cooperation between a large number of different devices, e.g., using processors of a plurality of EGMs 402, one or more processors of a tournament management system (TMS), and, in some instances, one or more processors of a tournament host tablet (THT) that may be directly or indirectly communicatively connected with one another (for example, the TMS may be directly communicatively connected with the EGMs and a THT, but the THT may not be directly communicatively connected with the EGMs; the THT may still, however, cause the EGMs to perform various actions by relaying commands or instructions through the TMS). The EGMs, TMS, and THT may also have respective memory devices that may store computer-executable instructions for controlling the one or more processors of each respective device to perform various aspects of the tournament functions and features discussed above. It will be understood that there may be a large number of ways in which such a group of communicatively connected devices or systems may be configured in order to provide various types of functionality, and all such configuration permutations are considered within the scope of this disclosure. For example, in some implementations, an EGM may store computer-executable instructions for controlling game play of a wagering game presented on the EGM. However, much of the processing that may be performed in order to provide such wagering game play may optionally be performed on another device, and the EGM itself may simply act as a presentation device that shows particular graphics at particular times based on instructions received from another device.

Figure 42:
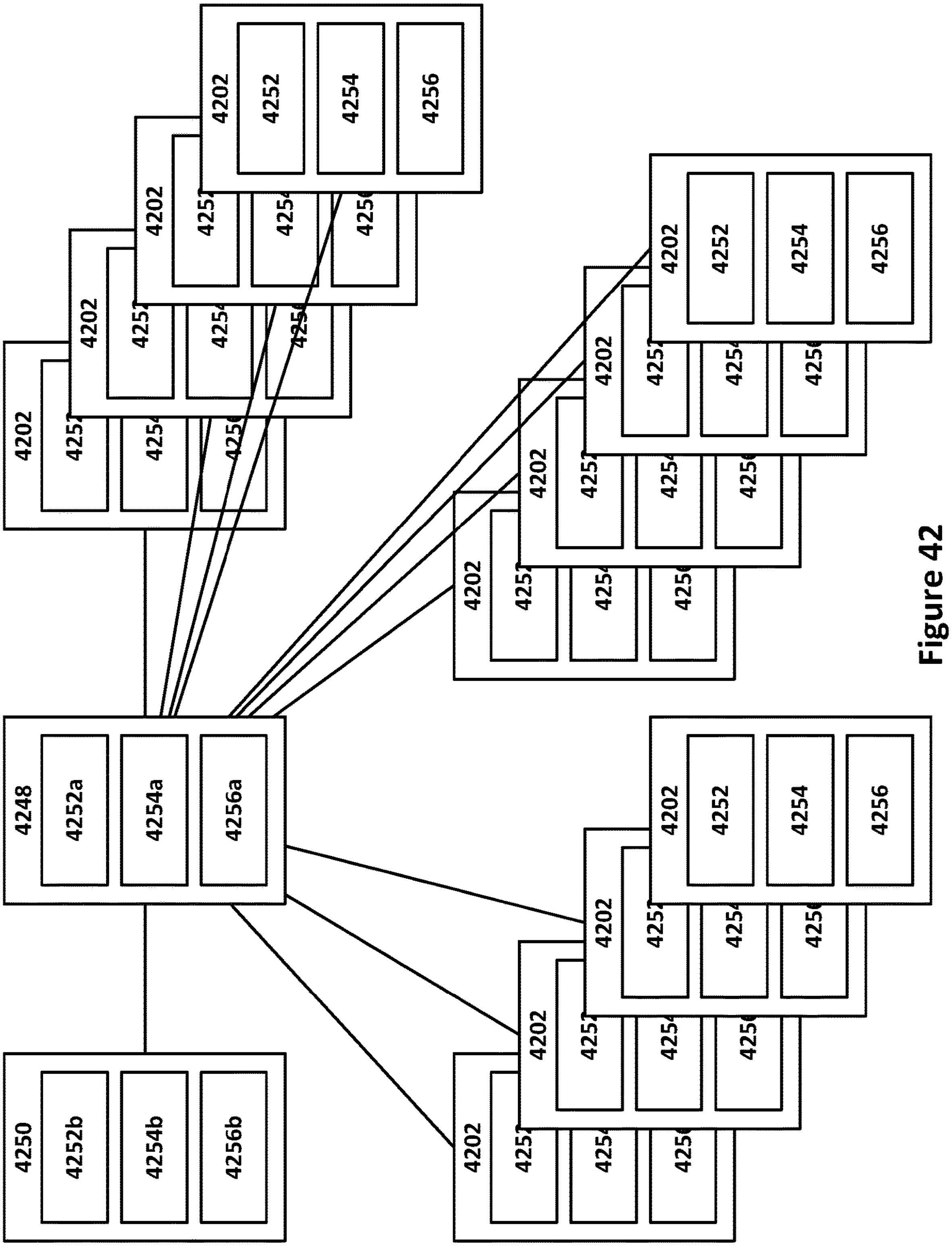
FIG. 42 depicts a diagram of one possible implementation of a tournament system according to the disclosure herein.

FIG. 42 depicts a diagram of one possible implementation of a tournament system according to the disclosure herein. In FIG. 42, a plurality of EGMs 4202 are shown, each EGM 4202 being similar to the EGMs discussed earlier herein and having one or more EGM processors 4252, one or more EGM memory devices 4254, and one or more EGM communications interfaces 4256. Also shown is a TMS 4248, which may include one or more processors 4252*a*, one or more memory devices 4254*a*, and one or more communications interfaces 4256*a*, as well as a THT 4250, which may include one or more processors 4252*b*, one or more memory devices 4254*b*, and one or more communications interfaces 4256*b*.

The EGMs 4202 and the TMS 4248 may be communicatively connected with one another via at least one of their respective communications interfaces 4256, 4256*a*, and the THT 4250 and TMS 4248 may, similarly, be communicatively connected with one another via at least one of their respective communications interfaces 4256*a*, 4256*b*. The one or more memory devices, e.g., random access memory devices, solid-state memory devices, hard disk drives, etc., of the various devices may store computer-executable instructions for controlling various processors of the system to provide one or more of the functionalities discussed above.

In recognition of the possibility of such distributed processing arrangements, the term "collectively," as used herein with reference to memory devices and/or processors or various other items, should be understood to indicate that the referenced collection of items has the characteristics or provides the functionalities that are associated with that collection. For example, if a server and a client device collectively store instructions for causing A, B, and C to occur, this encompasses at least the following scenarios:

a) The server stores instructions for causing A, B, and C to occur, but the client device stores no instructions that cause A, B, and C to occur.
b) The client device stores instructions for causing A, B, and C to occur, but the server stores no instructions that cause A, B, and C to occur.
c) The server stores instructions for causing a proper subset of A, B, and C to occur, e.g., A and B but not C, and the client device stores instructions that cause a different proper subset of A, B, and C to occur, e.g., C but not A and B, where instructions for causing each of A, B, and C to occur are respectively stored on either or both the client device and the server.

d) The server stores instructions for causing a subset of A, B, and C to occur, e.g., A and B but not C, and the client device stores instructions that cause a different subset of A, B, and C to occur, e.g., B and C but not A, where instructions for causing each of A, B, and C to occur are respectively stored on either or both the client device and the server.

e) The server stores instructions for causing A and a portion of B to occur, and the client device stores instructions that cause C and the remaining portion of B to occur.

In all of the above scenarios, between the server and the client device, there are, collectively, instructions that are stored for causing A, B, and C to occur, i.e., such instructions are stored on one or both devices and it will be recognized that using the term "collectively," e.g., the server and the client device, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to, perform one or more actions, e.g., actions A, B, and C. As with the previous example, various permutations fall within the scope of such "collective" language:

a) The first set of one or more processors may be caused to perform each of A, B, and C, and the second set of one or more processors may not perform any of A, B, or C.

b) The second set of one or more processors may be caused to perform each of A, B, and C, and the first set of one or more processors may not perform any of A, B, or C.

c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.

d) The first set of one or more processors may be caused to perform A and a portion of B, and the second set of one or more processors may be caused to perform C and the remainder of B.

As discussed above, for example, the TMS may be a server system that features one or more processors, memory devices, and storage devices, and may be communicatively connected, e.g., via a network connection, with each EGM participating in the tournament. The TMS may include, in some instances, multiple geographically separate devices, e.g., a central server that is located in the casino where tournaments using the TMS are being held, a remote server that may be used to store tournament result information, another remote server that may be used to store replay data, and so forth. For example, during session game play, the EGMs may record video data of each player and store such data locally on the EGM to avoid unduly taxing the processors and communications bandwidth of the EGMs during such session play. In the intervals between sessions, however, the EGMs may cause the stored video data to be transmitted to a replay data server that is part of the TMS. Such stored video may then be processed by the replay data server and formatted for presentation to a player, e.g., via the player's smartphone or via a website.

It will be appreciated that a TMS may be at least partially implemented in a cloud computing environment, e.g., an environment in which the TMS may be implemented using shared computing resources, e.g., one or more servers that are located in disparate geographic areas, are in communication with each other, and cooperate to provide tournament functionality to remote devices, e.g., EGMs in a casino. Such cloud-based architectures may allow the TMS to operate tournaments in multiple locations, e.g., different casinos (either under common ownership or separate ownership), or may allow the TMS to operate a single tournament across multiple locations, e.g., where tournament sessions may include players located at different geographical locations, including, for example, players who may participate via an online wagering game.

It will also be appreciated that, as discussed earlier herein, the tournament systems and techniques discussed herein may also be implemented such that one or more tournament sessions may be played by a player on a remote device, e.g., on a smartphone at a location other than at the venue where EGMs that are participating in the tournament are located. In such implementations, the remote devices for the players participating in a particular session may be controlled by the tournament system in a manner similar to how the EGMs are controlled in the implementations discussed above. In such implementations, the replay feature discussed above may have increased utility, as the players will generally not be able to see one another as they are playing (unless they happen to be in the same remote location), and the replay feature may allow them to re-live the tournament with the additional benefit of seeing the other players and their reactions.

As mentioned earlier herein, a player may be able to interact with a tournament management system using a concierge application that is installed on a mobile communications device, e.g., a tablet or smartphone, that belongs to the player (or via, for example, one or more webpages or other mechanisms for presenting a person with a graphical user interface and sending and receiving data). Concierge applications may take any of a variety of different forms, but many implementations thereof may generally include functionality for receiving and presenting messages or notifications to a player, sending notifications or messages to another player (either directly or via the TMS), providing indications of the status of other players that may be associated with the player (for example, a list of "friends" that are associated with the player may be presented by the concierge application, along with icons indicating each player's status, e.g., "in game," "in tournament," "at Five Start Casino," "Offline," "Away," etc.), allowing the player to invite other players to view the player's tournament game replay data, allowing the player to review statistics relating to their wagering game play, including statistics relating to their performance in any tournament that they are participating in, allowing the player to register for a tournament, allowing the player to invite another player or players to form a team (such as, for example, inviting another player to be a booster player for the player in a 2-person team format tournament, as discussed above), and so forth.

The concierge application, for example, may be configured to obtain data from a remote server, e.g., a player tracking server, that may store information identifying various other players that are associated with a particular player, e.g., friends, teammates, etc., of the player. Such information may, for example, be associated with further data identifying a mechanism for communicating with such other players, e.g., an email address, a phone number, a physical address, or an account identity, e.g., a player tracking account. The concierge application may, in some instances, allow the user to initiate communications with one or more of those other players, e.g., through receiving inputs from the player that define the parameters of such a message, and then transmitting data defining the message to a device used by the other player, e.g., using the other player's email address, phone number, etc.

In some implementations, as discussed above, the concierge application may include an interface that allows a user to share tournament-specific information with one or more other people, e.g., friends of the player. For example, the concierge application may include a graphical user interface in which the player may review details of various upcoming tournaments, including tournaments that they may be invited to or in which they may have already registered. Such an interface may, for example, include one or more user-selectable controls that allow the player to, for example, share their participation in a particular tournament with a friend, e.g., by sending the friend a notification indicating that the player is participating in a particular tournament. Such a notification may include information identifying the location and time of the tournament, in case the friend wishes to try and coordinate a visit to the venue of the tournament so as to coincide with the player's participation in the tournament. In some implementations, the concierge application and/or TMS may be configured to include in the notification information that may allow the recipient to either join the tournament as well or be apprised of what conditions must be met in order to potentially be invited to participate in the tournament.

In some implementations, the concierge application (or similar feature) may be configured to provide the user with the ability to live-stream or otherwise receive real-time or near-real time video content pertaining to a tournament. For example, the concierge application may be configured to allow a user to select a tournament that is either underway or about to begin. The concierge application may then, in some instances, present the user with one or more inputs that allow the user to select, for example, between different options for the content to be presented. For example, the concierge application may be configured to allow a user to specify a particular player that is participating in the tournament, and the TMS may then cause one or more video feeds relating to that player's participation in the tournament to be provided to the user's device on which the concierge application is executing. For example, a video feed showing the wagering game played by that player may be provided, as well as another video feed that may provide video of the player's face as they play the wagering game.

In some implementations, a version of the concierge application or other application providing similar capabilities in many respects may also be provided on various devices that may not be associated with a particular person, e.g., a casino property may have terminals, kiosks, or other apparatuses with displays thereon that may be configured to stream content relating to a tournament in real-time or near-real time.

In yet further implementations, the tournament system may include the capability of streaming to a social media platform, e.g., via a plugin or other mechanism that may allow video content, as well as other data (rankings, scores, etc.) relating to a tournament to be streamed to a social media website for distribution to various social media accounts.

As mentioned earlier, the concierge application may also serve as a mechanism that allows a player to track various statistics relating to their tournament play, including, for example, statistics relating to any trophies won in the various sessions played by the player in the tournament, the player's overall ranking in the tournament, how much time is left in the tournament, how many tournament session entries the player may have available (each tournament session entry entitling the player to participate in a tournament session and attempt to improve their score), the rankings of all of the players in the tournament, times/schedules for upcoming tournament events, e.g., upcoming tournament sessions, drawings, etc., information describing any "mystery prizes" that the player may have been awarded (including, for example, what the nature of those prizes is, if such information has been revealed to the player, or what the player must do in order to have the nature of the mystery prize(s) revealed to them), information regarding the timing of any drawings or lotteries that may, for example, be based on the player's trophy count, and so forth.

Figure 43:
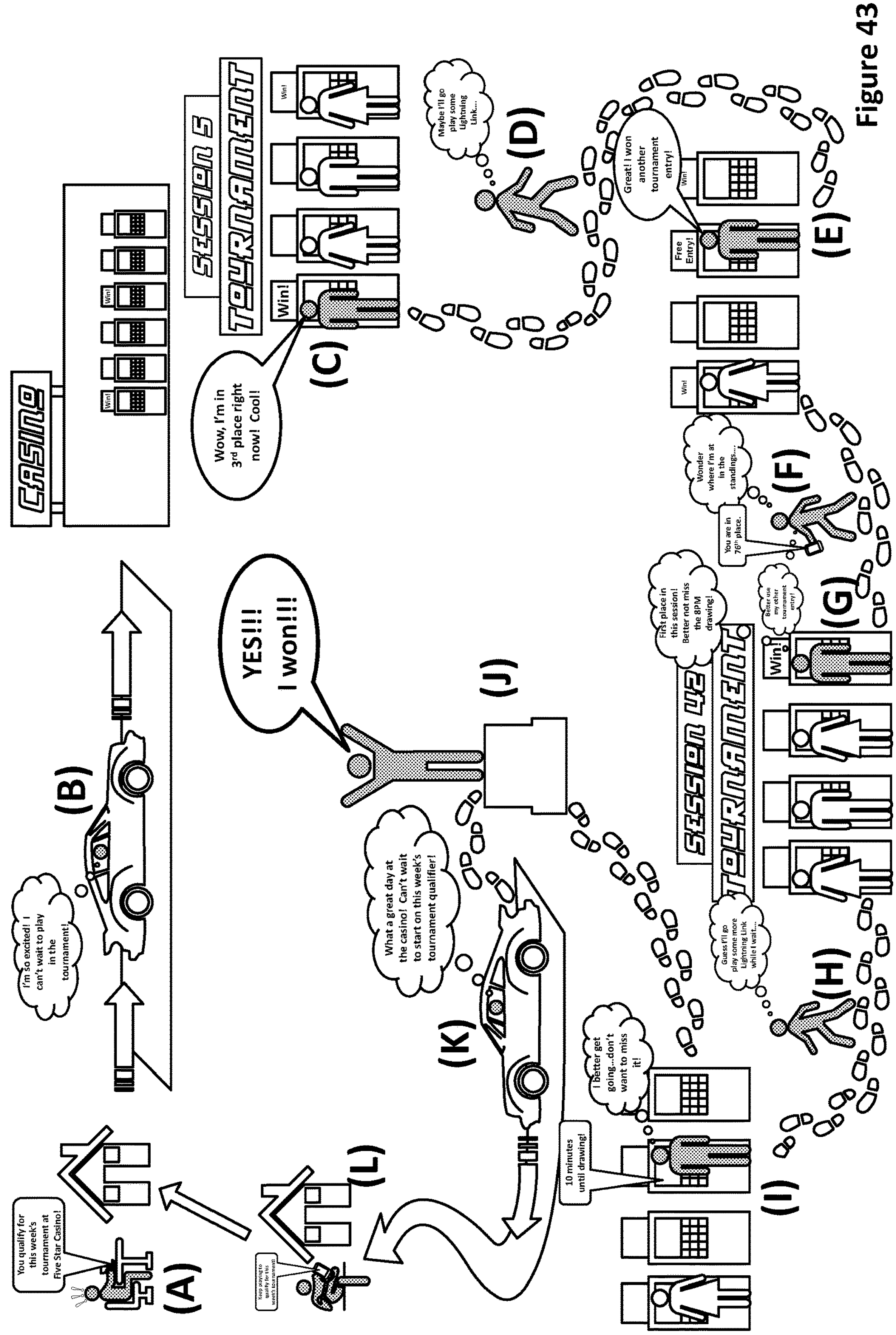
FIG. 43 depicts an example engagement loop between a casino and a player.

The tournament systems disclosed herein may be part of a larger architecture that is designed to encourage repeat user engagement with all parts of a patron ecosystem. FIG. 43 depicts an example engagement loop between a casino and a player. The loop may begin at (A), where the player is at home and may get a notification on their smartphone, e.g., via a concierge application or text message, indicating that they have qualified for a tournament at a casino, e.g., the Five Star Casino. The player may have earned such a tournament entry, for example, by attaining a particular achievement in a social slot machine game, e.g., placing in the top three for a mobile tournament or reaching a specific point threshold within a given timeframe, that may be accessible through the concierge application or another application. The term "social slot machine game" or "social wagering game" is used herein to refer to online play of wagering games in which the winnings are non-cashable winnings—players in social wagering games typically place wagers using an in-game currency that may be obtained through a variety of mechanisms, e.g., winning wagers in social wagering games, purchasing in-game currency with real currency (or credit card transaction), being awarded in-game currency through a promotion, etc. The player, in (B), drives to the Five Star Casino on the day of the tournament, anticipating an exciting experience at the casino. Once the player arrives at the casino (or even in advance thereof), the player may sign in to the tournament using, for example, the concierge application, which may communicate with the TMS that is running the tournament and provide information to the TMS that the player is either ready to participate or en route. As part of such a sign-in process, or as a separate process, the player may provide, via the concierge application, input that allows the TMS to assign a seat and/or session for the player to participate in in advance; the TMS may then assign a seat and/or session to the player based on such input.

In (C), the player participates in one of the earlier tournament sessions for the tournament, doing quite well—well enough that they are in third place overall in the tournament. After finishing the tournament session, the player may, in (D), walk over to another area of the casino to engage in some non-tournament wager gaming, e.g., on Lightning Link (an Aristocrat® Technologies, Inc. offering), while waiting to see how the tournament is going. In some implementations, the TMS may cause a message to be presented to the player, e.g., via the concierge application, via text message, and/or via an on-screen message provided on an EGM used by the player, that indicates that further tournament session entries may, at times, be awarded during play of non-tournament wagering games in the establishment; this may serve as an incentive to the player to engage in such other wagering game play. In some implementations, the TMS may be configured to inform the player that additional tournament session entries may potentially be won after engaging in particular activities, e.g., making X wagers on a particular type of EGM, playing a particular type of wagering game, playing a wagering game that the player has not played before, playing a wagering game that the player has not played within a predetermined period of time, and/or on an EGM in a particular location.

While playing the non-tournament EGMs, the player finds in (E) that his non-tournament wagering game play has resulted in a free additional entry into the tournament, e.g., another play in a tournament session. For example, the player may experience a "big win," e.g., a winning outcome exceeding a predetermined threshold amount that may, as part of the payout, include another entry into a tournament session for the player. In another example, a player may be awarded another tournament session entry after providing a certain amount of coin-in to a wagering game, e.g., placing at least that amount of wagers while playing the wagering game. After finishing playing on the non-tournament EGMs, the player decides to take a break in (F) and uses the concierge application on their smartphone to check their ranking in the tournament (the player may, alternatively, check the leaderboards on any display in the casino providing such information to potentially discover their ranking). The concierge application has unfortunate news for the player—a large number of other players in other sessions have achieved higher scores than the player, resulting in the player's overall ranking dropping to 76$^{th}$ place. The player realizes that it would be a good idea to use the free tournament entry they won earlier, and returns to the tournament EGM area and enters another session in (G); this time, the player does well enough to place first in the session. The player, who has been informed, e.g., via the concierge application, general knowledge, or through conversations with casino or tournament personnel, that a drawing will be conducted at the completion of the tournament based on the number of trophies won by each player and/or the number of sessions won by each player, decides in (H) to walk back to the non-tournament EGM area and engages in some further wagering game play in (I) while waiting for the tournament to conclude. The tournament system, via the player's EGM and/or the concierge application, provides a notification to the player that drawings related to the end of the tournament will be occurring in 10 minutes. Such drawings may be for additional prizes, such as are discussed earlier herein with respect to trophies. The player then goes to the tournament area of the casino, discovers that they won a drawing prize that further increased their overall tournament ranking to first place—the player is crowned the winner of the tournament in (J), and then drives home in (K) reflecting on the exciting experience they had in the tournament and at the Five Star Casino. The TMS may also cause the concierge application to, in some implementations, notify the player that they have been awarded an amount of non-cashable credits that may be used, for example, in online or social wagering games similar to those that may have resulted in the player's initial qualification for the tournament. In some implementations, the player may be notified of either winning a prize as a result of tournament play or the nature of a mystery prize that they received as a result of tournament play after leaving, for example, the property, e.g., casino, where the tournament session was held. This can help to re-engage the player with the tournament operator, e.g., the casino, and keep their interest piqued. For example, in some implementations, the player may receive a prize of non-cashable credits that may be used in an online wagering game, e.g., for social gaming, that is operated by or affiliated with the tournament operator. The player, once back at home, may continue to engage with the casino/tournament system in (L) by using the concierge application on their smartphone, e.g., to play online versions of wagering games (for example, using some of the non-cashable credits that the player may have earned as a result of participating in the tournament), message friends of theirs, view replays of their tournament session play, or otherwise interact with the tournament system. The player's interactions with the concierge application may, for example, lead to the player satisfying one or more criteria that make the player eligible for entry into another tournament, at which point the engagement loop shown in FIG. 43 may return to (A), and the player may again return to the casino for another tournament experience, further interacting with the casino property.

It is to be further understood that while many of the tournament systems discussed herein may randomly determine wagering game play outcomes, some tournament systems may be configured to determine wagering game play outcomes using, for example, historical data that may be randomly selected. For example, in a horse-racing venue, historical horse race data may be randomly selected to determine an outcome of a wagering game play, e.g., the results of a randomly selected historical horse race may be used as a proxy for a wagering game outcome (such a result may be transformed or translated into an equivalent outcome in the wagering game if it occurs). This, as well as other mechanisms for determining wagering game outcomes in a tournament context, are all considered to be within the scope of this disclosure.

As noted earlier, the tournament systems discussed herein may include, in some implementations, sticky wilds features for enhancing the game play experience of players participating in a tournament. As discussed above, gaming tournament systems that feature a "sticky wilds" feature may enable such a feature at a particular time (or times) to provide an enhanced gameplay experience. As set forth below, such a sticky wilds feature may be implemented in a variety of ways, several of which are discussed below with respect to FIGS. 44 through 53.

In the context of gaming tournament systems, a "sticky wilds mode" in which a sticky wilds feature is activated may, in some implementations, be activated for all players participating in a particular gaming tournament session (e.g., engaged in simultaneous play against each other) at a particular time during the tournament session and for a particular duration of time. For example, in a two-minute tournament session, a sticky wilds mode may be enabled at the 1:00 minute mark for 15 seconds, e.g., all of the players in that gaming tournament session may have the sticky wilds feature activated simultaneously and for the same period of time. As noted earlier, such a sticky wilds mode may be time-based, as opposed to a sticky wilds mode that is outcome-based (e.g., where obtaining a particular outcome may cause a sticky wilds mode to be enabled for some number of spins).

The time-based nature of sticky wilds modes may present some unique outcomes that do not occur in outcome-based sticky wilds features. For example, if a "wild" symbol is newly selected for display near the end of a sticky wilds mode, the sticky wilds mode may end before the player has a chance to start or complete their next play and potentially obtain the benefit of the newly selected wild symbol. In some such implementations, the "stuck" wilds may simply be reverted back to normal, non-wild symbols before the completion of that next play (thus, the player gets no additional benefit from the newly selected wild symbol); in other implementations, however, these "stuck" wilds may be retained and applied to the outcome of that next play—even if the sticky wilds mode is technically over when the player starts or finishes the next play—before being reverted back to non-wild symbols). Such an implementation may be particularly advantageous when applied to scenarios where a sticky wild mode concludes after a player initiates a play but before an outcome responsive to that play is displayed—in such an implementation, the player may feel robbed or cheated by the game if the sticky wild mode concludes before the outcome is displayed and the sticky wild pattern is caused to not be applied to the outcome. In some implementations, the sticky wild pattern may be retained after the conclusion of the sticky wilds mode if there is a "pending" play, i.e., a play that has started but not yet concluded, and may be applied to the outcome of the pending play (whenever it is displayed). The sticky wild pattern may then be removed after it has been applied to such an outcome.

Figure 44:
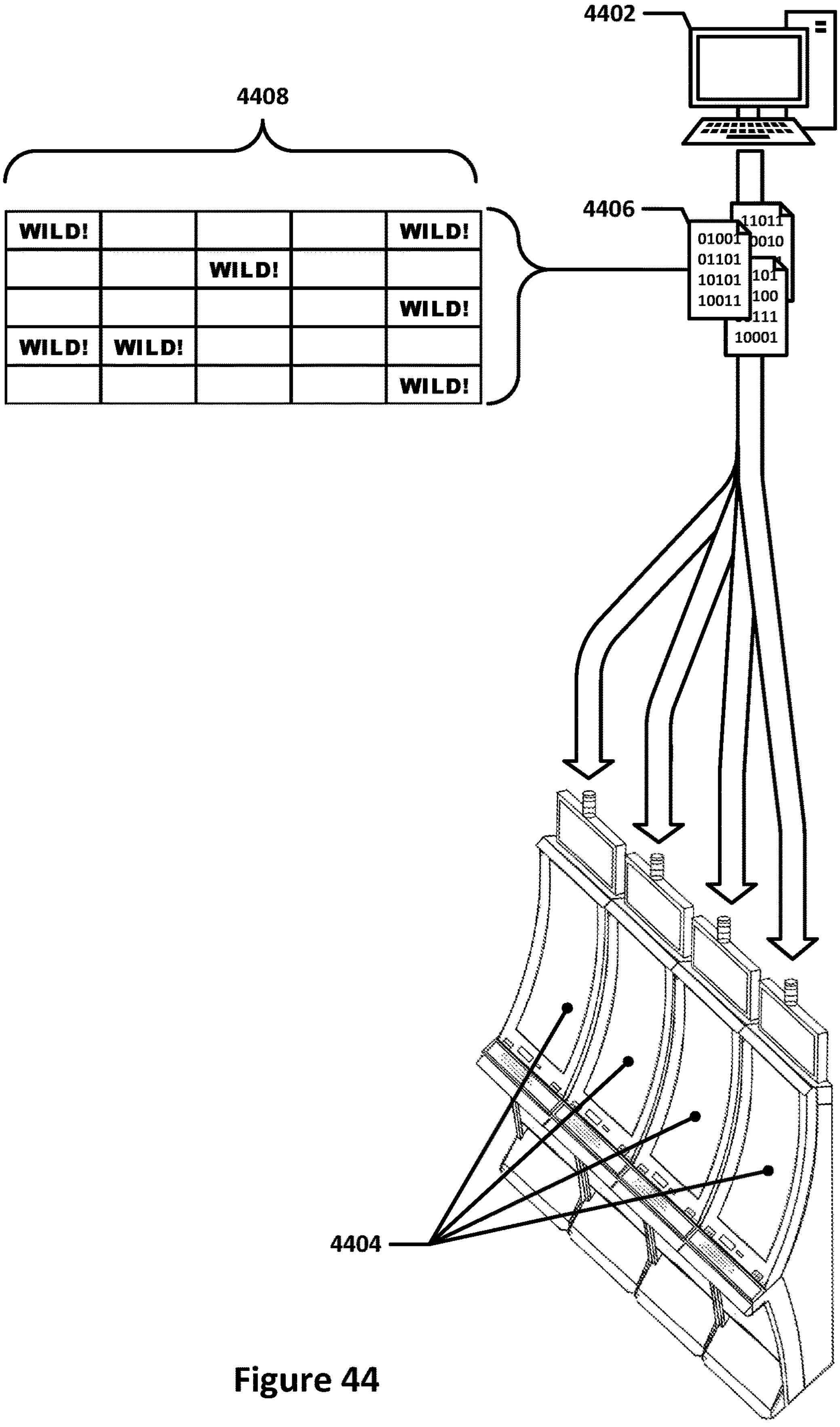
FIG. 44 depicts an example sticky wild pattern distribution system.

FIG. 44 depicts an example sticky wild pattern distribution system. In FIG. 44, a tournament management system (TMS) 4402 is shown represented by a computer; the TMS 4402 may, in actual practice, be provided by one or more computing devices, e.g., servers, such as a multiplayer game server, that may provide various functionalities for implementing and conducting gaming tournaments.

The TMS 4402 may be communicatively connected with a plurality of EGMs 4404, which may, for example, be configured to be used by participants in a gaming tournament. It will be understood that while four EGMs 4404 are shown, the number of EGMs 4404 that may be used may be as few as a single EGM 4404 and up to tens, hundreds, or thousands of EGMs (in fact, there is no theoretical upper limit on the number of EGMs 4404 that may be used in the depicted system or the other systems discussed below). Moreover, other computing devices, such as mobile devices, could be utilized in place of EGMs 4404 (in the context of this disclosure, such other devices that may be used in place of the EGMs 4404 may also, for ease of reference, be referred to herein as "EGMs"). Generally speaking, the TMS 4402 may receive information that identifies a plurality of EGMs 4404 that are each associated with a common tournament session of a gaming tournament, i.e., EGMs that are being used or will be used by players to participate in that common tournament session. In some implementations, the EGMs 4404, for example, may be configured to provide for simultaneous game play of the same wagering game during a predetermined period of time, e.g., a 2-minute window. In some such implementations, the TMS 4402 may determine that a sticky wilds feature should be enabled on the EGMs 4404, either for the duration of the remainder of the period of time or for some sub-portion thereof. In the implementation of FIG. 44, the TMS may cause a sticky wild dataset 4406 to be generated and sent to each of the EGMs 4404 in preparation for enabling the sticky wilds feature. The sticky wild dataset 4406 may be sent to the EGMs 4404 at any time in advance of the enablement of the sticky wilds feature and may even be provided to the EGMs 4404 before game play begins. In some instances, the sticky wild dataset 4406 may be provided hours, days, weeks, etc. in advance of when the sticky wilds feature may actually be enabled. In such cases, the sticky wild dataset 4406 may be stored on the EGMs and retrieved by the EGMs when appropriate.

The TMS 4402 may generate sticky wild datasets through any of a variety of mechanisms, including through random selection events (where outcomes from a random number generator may be used to determine which symbol positions are to be associated with a wild symbol for a given sticky wild pattern or sub-pattern), random (or non-random) selection from a pool of predefined sticky wild patterns, and so forth.

The sticky wild dataset 4406 may be in any of a variety of formats but may generally include information that either explicitly or implicitly defines a sticky wild pattern 4408 that will be presented by the EGMs 4404 upon enablement of the sticky wilds feature. As shown in FIG. 44, the sticky wild pattern 4408 is a 5×5 array of symbol positions (where selected symbols may be displayed during play) with "WILD!" indicators in each symbol position where a sticky wild symbol is to be displayed. In practice, the sticky wild dataset 4406 may, for example, take the form of a simply binary string (e.g., a string of twenty-five 1's and 0's that each individually indicate, for a corresponding one of the symbol positions (for a 5×5 symbol position grid) whether a sticky wild symbol is to be shown (1) or not shown (0)). In other implementations, the sticky wild dataset 4406 may be provided as a structured array or even just a list of symbol positions that should have wild symbols shown, e.g., 1, 5, 8, 15, 16, 17, 25 (corresponding to the positions in the 5×5 array of symbol positions shown in FIG. 44, with each symbol position assigned a number starting with 1 in the upper left corner and incrementing by one as one moves to each next symbol position to the right for each row before starting at the left-most symbol position on the next row down). In some further implementations, the sticky wild dataset may take the form of a series of commands, e.g., individual commands or sets of commands sent to each EGM 4404 that may cause the desired symbol locations to depict a wild symbol. Generally speaking, a sticky wild pattern may provide information that designates a set of one or more symbol positions for associated with a symbol-based game display, e.g., a reel display for a slot machine, that are to be indicated as having wild status, e.g., by displaying a wild symbol in those symbol positions.

In this example, each EGM 4404 is provided with the same sticky wild pattern 4408, which may thereby ensure that every player is provided with the same sticky wild benefit (the random outcomes generated by each EGM 4404, however, may still provide different outcomes or results even if the same sticky wild pattern is used on each EGM 4404).

Figure 45:
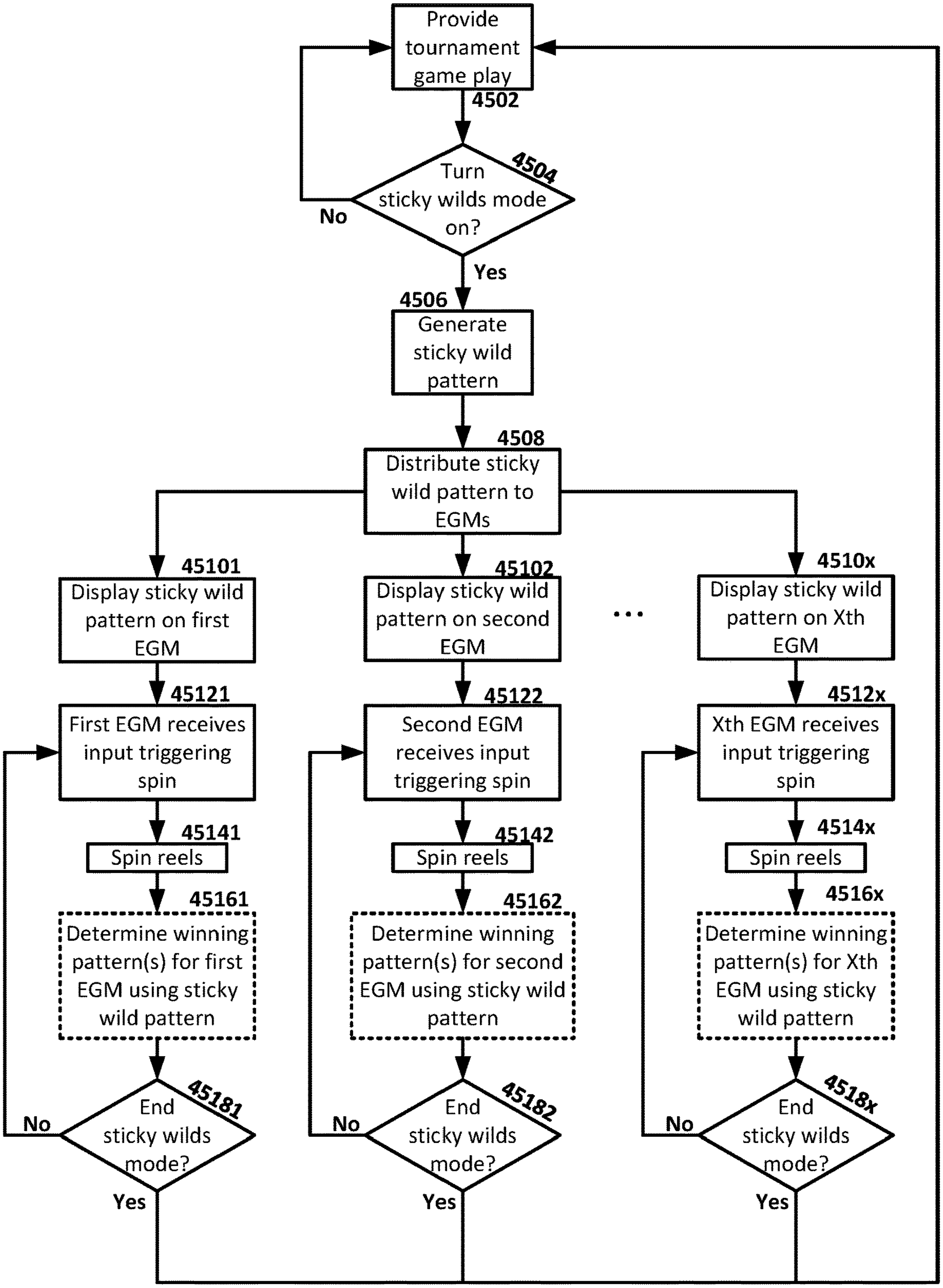
FIG. 45 depicts a flow chart of a technique for implementing sticky wilds on EGMs such as are depicted in FIG. 44.

FIG. 45 depicts a flow chart of a technique for implementing sticky wilds on EGMs such as are depicted in FIG. 44. In FIG. 45, the technique may begin in block 4502, in which tournament game play (or other game play) may be provided. For example, a TMS may be used to cause a plurality of EGMs, such as EGMs 4404, to provide game play for a tournament session in which a plurality of players all play the same wagering game at the same time on different EGMs 4404 and compete against each other for a maximum score achieved during the tournament session.

In block 4504, the TMS 4402 (or other system) may make a determination as to whether a sticky wilds mode should be enabled, turned on, or otherwise activated, e.g., for the EGMs 4404. If it is determined in block 4504 that the sticky wilds mode should not be turned on, then the technique may return to block 4502 where further tournament game play may be provided on the EGMs 4404. If it is determined in block 4504 that the sticky wilds mode should be turned on, then the technique may proceed to block 4506, in which the TMS 4402 may generate or obtain the sticky wild pattern before distributing a sticky wild dataset 4406 representing the sticky wild pattern to the EGMs 4404 in block 4508. It will be understood, as mentioned earlier, that such sticky wild patterns may, in some implementations, be obtained or generated (and optionally distributed to the EGMs 4404) prior to the determination of whether the sticky wilds mode is to be enabled. In implementations in which the sticky wild dataset has been previously distributed to the EGMs 4404, the TMS 4402 may cause one or more commands to be sent to the EGMs 4404 after determining that the sticky wilds mode is to be enabled in order to cause the EGMs 4404 to actually implement the sticky wilds mode using the provided sticky wild pattern 4408 in the wagering game. In some such implementations, the one or more commands may be provided in conjunction with, for example, timing information that causes the EGMs 4404 to enable the sticky wilds mode all at the same time. In other implementations, the EGMs 4404 may be configured to enable the sticky wilds mode immediately upon receipt of the one or more commands or of the sticky wild dataset. It will be understood that such characteristics relating to the transmission of the sticky wild dataset and/or one or more commands, as well as the mechanics of enablement of the sticky wilds mode on EGMs 4404, is generally applicable not only to this example, but to the remaining examples discussed below as well.

Once the sticky wild pattern, e.g., as defined by the sticky wild dataset 4406, has been distributed to the EGMs 4404, the EGMs 4404 may be configured to cause wild symbols to be displayed according to the sticky wild pattern 4408 on one or more displays of the EGMs 4404 in blocks 4510$_1$, 4510$_2$, . . . 4510$_x$ (it is to be understood that reference herein to "displaying a sticky wild pattern" or the like refers to the practice of displaying wild symbols in the symbol positions identified in a sticky wild pattern as being selected for display of a wild symbol). It will be appreciated that there are several parallel streams of blocks shown in FIG. 45 starting with blocks 4510$_1$, 4510$_2$, . . . 4510$_x$; this represents the generally parallel, but independent, nature of game play on each EGM 4404. Thus, in this example, while the same sticky wild pattern 44AA08 is shown on all of the EGMs 4404, each EGM 4404 will generally have a different player that plays at different speeds and obtains a different (or, at least, independently generated) outcome as a result of each play of the wagering game. For example, in block 4512$_1$, a first EGM 4404 may receive an input, e.g., a player input of a "spin" button, that causes the first EGM 4404 to register that a reel spin action is being triggered. In block 4514$_1$, the first EGM 4404 may cause the reels (or other symbol selection feature) to spin in response to receipt of the input and may, if any winning patterns are displayed (taking into account the wild effect of the displayed sticky wild pattern 44AA08) on the first EGM 4404, determine what winning patterns are displayed on the one or more displays of the first EGM 4404 in block 4516$_1$. In block 4518$_1$, a determination may be made as to whether the sticky wilds mode should end. For example, the sticky wilds mode may be configured to end after 15 seconds, in which case the first EGM 4404 may simply check how much time has elapsed since the sticky wilds mode was enabled or turned on and, when the elapsed time is greater than or equal to 15 seconds, disable the sticky wilds mode. In other implementations, the first EGM 4404 may be configured to keep sticky wilds mode operational until it receives a further communication from the TMS 4402 indicating that sticky wilds mode should be disabled (in such implementations, similar communications may be contemporaneously sent to the other EGMs 4404 as well to cause a synchronized cessation of sticky wilds mode on all of the EGMs 4404).

If it is determined in block 4518$_1$ that the sticky wilds mode should continue to remain enabled, then the technique may return to block 4512$_1$ and further game play in sticky wilds mode may be performed. If it is determined in block 4518$_1$ that the sticky wilds mode should be disabled, then the technique may return to block 4502 for further tournament game play; in some implementations, the remaining tournament game play may simply be a conclusion of the tournament session, e.g., with presentation of tournament session winners/top finishers.

It will be understood that blocks 4510$_2$ through 4518$_2$ and blocks 4510$_x$ through 4518$_x$ may involve similar actions, but with respect to other EGMs 4404; generally speaking, this convention is followed in the remaining FIGS. as well (although the range of blocks in each Figure may be different).

It will be appreciated that the above approach offers the most uniform sticky wilds mode experience for a group of players—every player gets the same sticky wild pattern, and there is no uncertainty as to how one's sticky wild pattern 44AA08 compares to another player's sticky wild pattern 44AA08 for a given sticky wilds mode.

Figure 46:
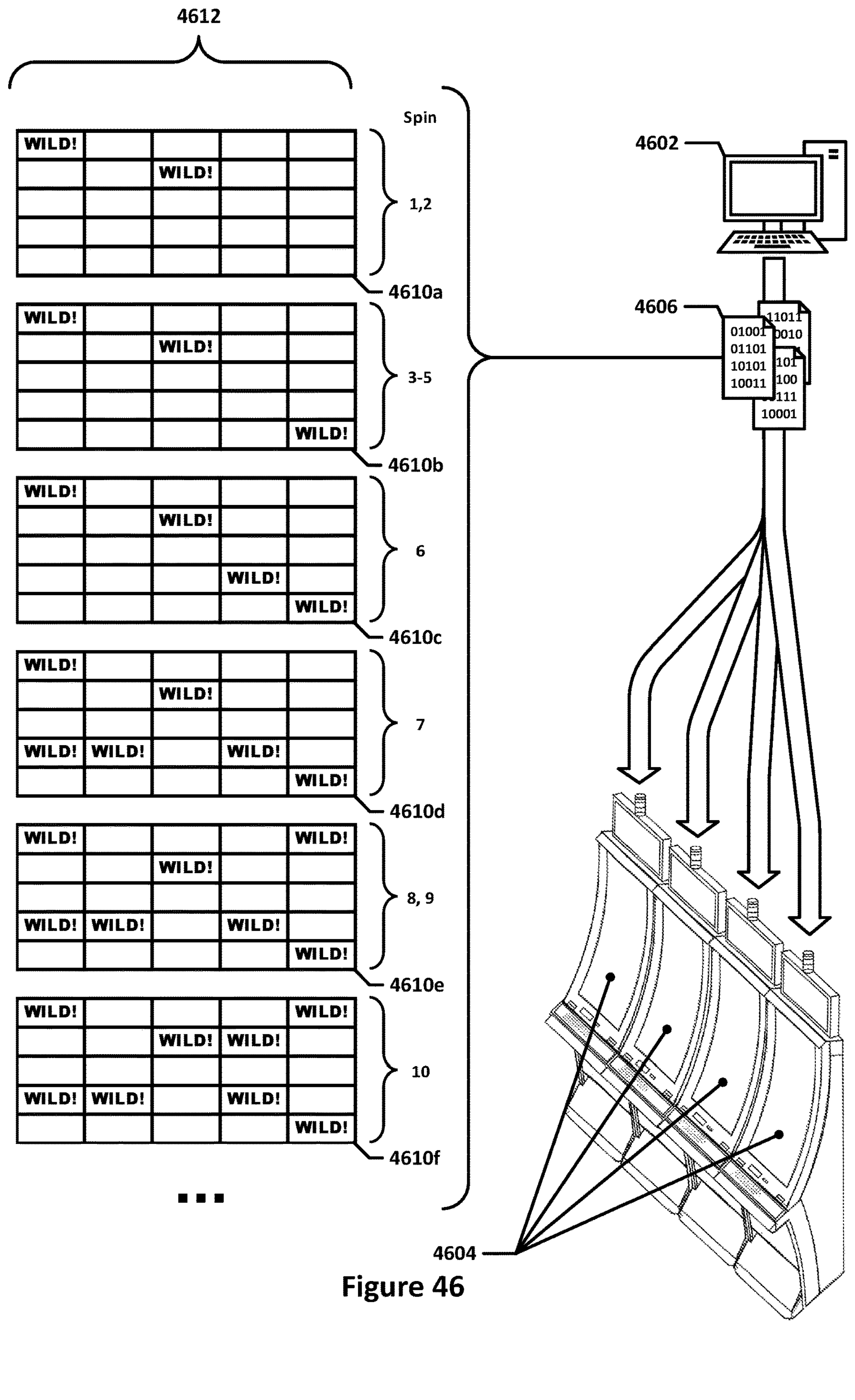
FIG. 46 depicts another example sticky wild pattern distribution system.

FIG. 46 depicts another example sticky wild pattern distribution system. In the implementation of FIG. 46, a TMS 4602 is configured to obtain or generate an ordered set 4612 of sticky wilds mode sub-patterns 4610, e.g., sticky wild sub-patterns 4610*a*-4610*f*. Each sticky wild sub-pattern 4610 in the ordered set 4612 of sticky wild sub-patterns 4610 may include at least all of the wild symbol positions of the immediately preceding sticky wild sub-pattern 4610 in the ordered set 4612 and may, optionally, add one or more additional wild symbols to the immediately preceding sticky wild sub-pattern 4610. It will be understood that the term "sticky wild sub-pattern" herein is used herein to refer to a "sticky wild pattern" that is one of several sticky wild patterns that are part of an ordered set of sticky wild patterns defined by a sticky wild dataset. Each sticky wild sub-pattern 4610 may be associated with a spin number, i.e., which spin of the spins made while the sticky wilds mode is active will cause the sticky wild sub-pattern 4610 to be displayed (or for which spins of the sticky wilds mode the designated sticky wild sub-pattern 4610 will be displayed and used for determining winning patterns). It will be understood that the sticky wild dataset 4606, in this instance, will represent multiple sticky wild sub-patterns 4610. In some implementations, there may be identical sticky wild sub-patterns 4610 designated for display in two or more consecutive spins (for example, if no additional sticky wild symbol is to be added to the displayed sticky wild symbols as a result of a spin); in such instances, the sticky wild dataset 4606 may, for example, simply repeat the identical sticky wild sub-pattern 4610 or may instead include only a single instance of the sticky wild sub-pattern 4610, but in conjunction with additional data that identifies for which spins that sticky wild sub-pattern 4610 will be displayed.

For example, in FIG. 46, the sticky wild sub-patterns 4610 include a first sticky wild sub-pattern 4610*a* that will be displayed for the first and second spins while the sticky wilds mode is enabled; a second sticky wild sub-pattern 4610*b* that will be displayed for the third, fourth, and fifth spins while the sticky wilds mode is enabled; a third and fourth sticky wild sub-pattern 4610*c* and 4610*d*, respectively, that will be displayed for the sixth and seventh spins, respectively, while the sticky wilds mode is enabled; a fifth sticky wild sub-pattern 4610*e* that will be displayed for the eighth and ninth spins while the sticky wilds mode is enabled; a sixth sticky wild sub-pattern 4610*f* that will be displayed for the tenth spin while the sticky wilds mode is enabled, and so forth. Thus, as each player on each EGM 4604 causes spins of their respective EGM 4604 to be made, the sticky wild sub-patterns 4610 on those respective EGMs 4604 may be updated to match the sticky wild sub-pattern 4610 that corresponds with how many spins have been made on that EGM 4604 during the sticky wilds mode. In pattern-based sticky wilds modes, once the sticky wilds mode is over, any sub-patterns that have not yet been displayed for a player will not be displayed for the player as part of that sticky wilds mode.

In one variant of such a system, the sticky wild sub-patterns may, instead of each being associated with particular spins that occur while sticky wilds mode is enabled, be associated with a particular time window during the sticky wilds mode, e.g., a first sticky wild sub-pattern may be designated for display during the first two seconds of a sticky wilds mode, a second sticky wild sub-pattern may be designated for display during the next two seconds of the sticky wilds mode, a third sticky wild sub-pattern may be designated for display during the next two seconds of the sticky wilds mode, and so forth. In such an implementation, the EGM may be caused to not actually display the sticky wild sub-pattern that was most recently designated for display until after the next spin has started. For example, if sticky wild sub-pattern A is designated for display during the first three seconds of a sticky wilds mode, and sticky wild sub-pattern B is designated for display during the next three seconds of the sticky wilds mode, a player who has the sticky wilds shown only for the sticky wild sub-pattern A at the three-second mark and who has not yet started their next spin or play at that time may continue to be shown only the wild symbols in the sticky wild sub-pattern A at the 4-second mark provided they have not completed their next spin (even after the sticky wild sub-pattern B has been designated for display). The additional sticky wild symbols that may be added by the sticky wild sub-pattern B may then be added to that player's sticky wild symbols (from sticky wild sub-pattern A) at the conclusion of their first spin that occurs while the sticky wild sub-pattern B is designated for display. In a further variant, if a player "misses" multiple sticky wild sub-patterns that are designated for display in various time slots, then when the player completes a spin while a particular sticky wild sub-pattern is designated for display, any sticky wild symbols from previously designated sticky wild sub-patterns that were not previously displayed may also be displayed for the player. For example, if a player does not press the play button until the $7^{th}$ second of a sticky wilds mode, and each new sticky wild sub-pattern of that sticky wilds mode is designated for display three seconds after the previous one, then the player may a) not have any sticky wild symbols displayed and b) may have missed the windows in which the first (zero to three seconds of the mode being active) and second (three to six seconds of the mode being active) sticky wild sub-patterns were designated for display. However, if the player then presses the play button in the seventh second, then the EGM may cause the wild symbols for the third sticky wild sub-pattern to be displayed in conjunction with the "missed" wild symbols from the first and second sticky wild sub-patterns.

Figure 47:
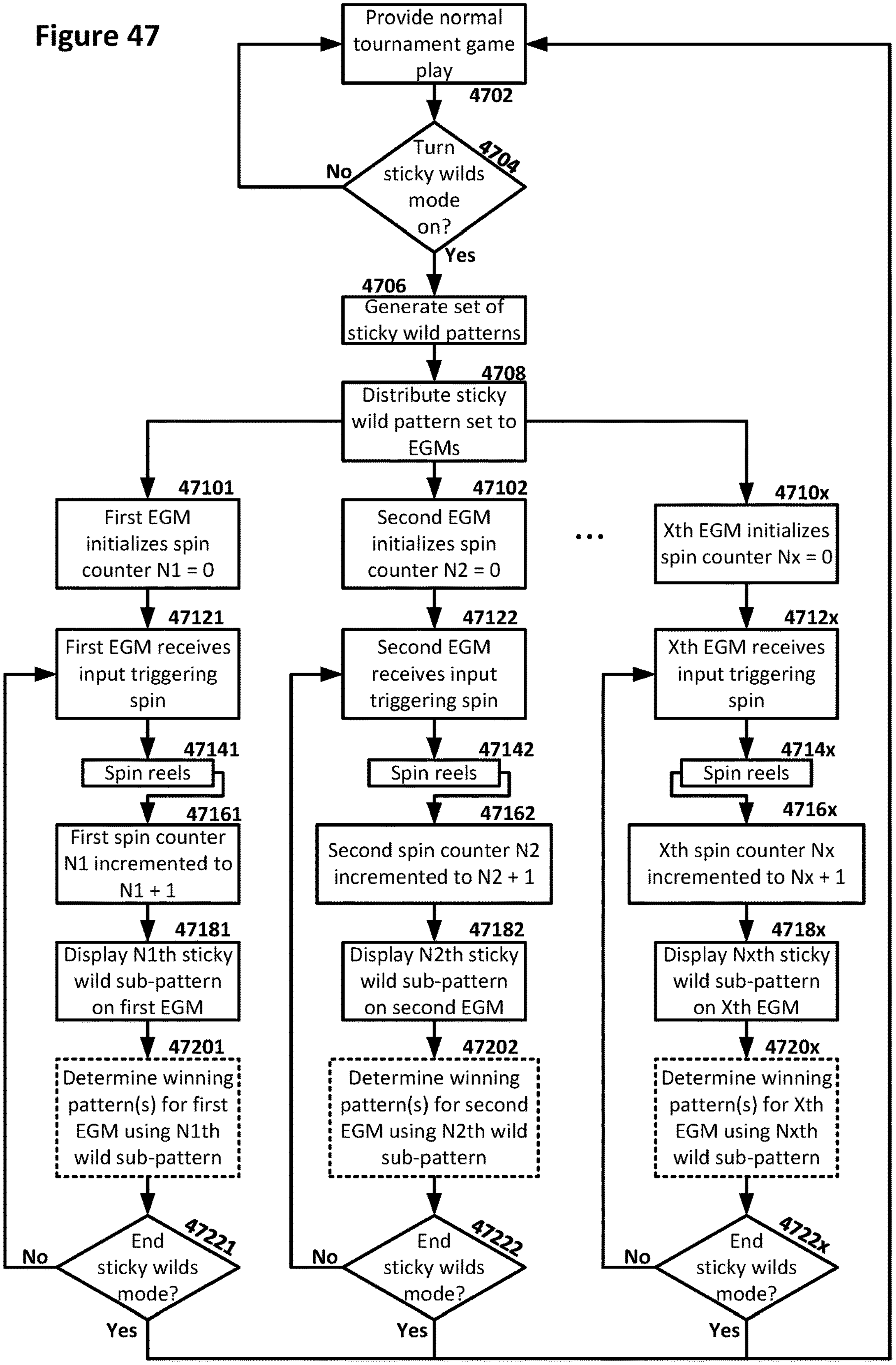
FIG. 47 depicts a flow chart of a technique for implementing sticky wilds using a system such as is depicted in FIG. 46.

FIG. 47 depicts a flow chart of a technique for implementing sticky wilds on EGMs such as are depicted in FIG. 46. In FIG. 47, the technique may begin in block 4702, in which tournament game play (or other game play) may be provided. For example, a TMS may be used to cause a plurality of EGMs, such as EGMs 4604, to provide game play for a tournament session in which a plurality of players all play the same wagering game at the same time on different EGMs 4604 and compete against each other for a maximum score achieved during the tournament session.

In block 4704, the TMS 4602 (or other system) may make a determination as to whether a sticky wilds mode should be enabled or turned on, e.g., for the EGMs 4604. If it is determined in block 4704 that the sticky wilds mode should not be turned on, then the technique may return to block 4702 where further tournament game play may be provided on the EGMs 4604. If it is determined in block 4704 that the sticky wilds mode should be turned on, then the technique may proceed to block 4706, in which the TMS 4602 may generate or obtain a set of sticky wild sub-patterns before distributing a sticky wild dataset 4606 representing the set of sticky wild sub-patterns to the EGMs 4604 in block 4708.

In block $4710_1$, a first EGM 4604 may be caused to initialize a first spin counter $N_1$ to zero (or otherwise initialize some mechanism that allows determination of how many spins have occurred while the sticky wilds mode is enabled). In block $4712_1$, the first EGM 4604 may receive an input indicating that a player has pressed a "spin" button or other input device to indicate that a play or spin of the game is desired. In block $4714_1$, the first EGM 4604 may cause the reels displayed on the one or more displays of the first EGM 4604 to spin (or otherwise cause a game outcome to be provided). In block $4716_1$, the first spin counter $N_1$ may be incremented by 1 to track the number of spins that have occurred while the sticky wilds mode is enabled. In block $4718_1$, the first EGM 4604 may cause the $N_1^{th}$ sticky wild sub-pattern of the set of sticky wild sub-patterns to be displayed on one or more displays of the first EGM 4604. A determination may then be made in block $4720_1$ as to whether one or more winning patterns result from the displayed sticky wilds and the other symbols that result from the spin. If so, then a corresponding award may be provided to the player. After resolving whether a winning pattern was obtained, the technique may progress to block $4722_1$, in which a determination may be made as to whether sticky wilds mode is to be continued. If so, then the technique may return to block $4712_1$. If not, however, then the technique may return to block 4702.

It will be understood that blocks $4710_2$ through $4722_2$ and blocks $4710_x$ through $4722_x$ may involve similar actions, but with respect to other EGMs 4604. This implementation provides similar benefits to that of FIGS. 44 and 45, i.e., consistency between players in terms of all generally experiencing the same sticky wild pattern. In the technique and system of FIGS. 44 and 45, however, the sticky wild pattern is provided at the outset and does not change over time, which may be less interesting than if the sticky wild pattern evolves over the course of the sticky wilds feature. The implementation of FIGS. 46 and 47 allows for the sticky wild pattern to have additional sticky wild symbols added to it over time, which may add enhanced excitement for the players as they play during sticky wilds mode. Such an implementation also provides the additional benefit that while every player is provided with the same set of sticky wild sub-patterns, different players may, depending on how fast they play, experience different numbers of sticky wild sub-patterns. For example, a player that plays or spins more frequently than other players during the same session will be able to advance through the sticky wild sub-patterns that are included in the set at a faster pace, allowing them to reap the benefit of additional wild symbols that may be added on later from the sticky wilds feature earlier than other players and, ultimately, increasing the likelihood of achieving winning patterns as compared with their slower-playing peers. Thus, while all of the players on the EGMs for the implementation shown in FIGS. 46 and 47 are provided with the same sequence or progression of sticky wild pattern development during play, the speed with which each player advances through that progression is dependent on the speed with which each player plays the wagering game. Thus, the degree of benefit provided by the sticky wilds feature for each player is generally contingent on the speed with which the player plays the wagering game.

Figure 48:
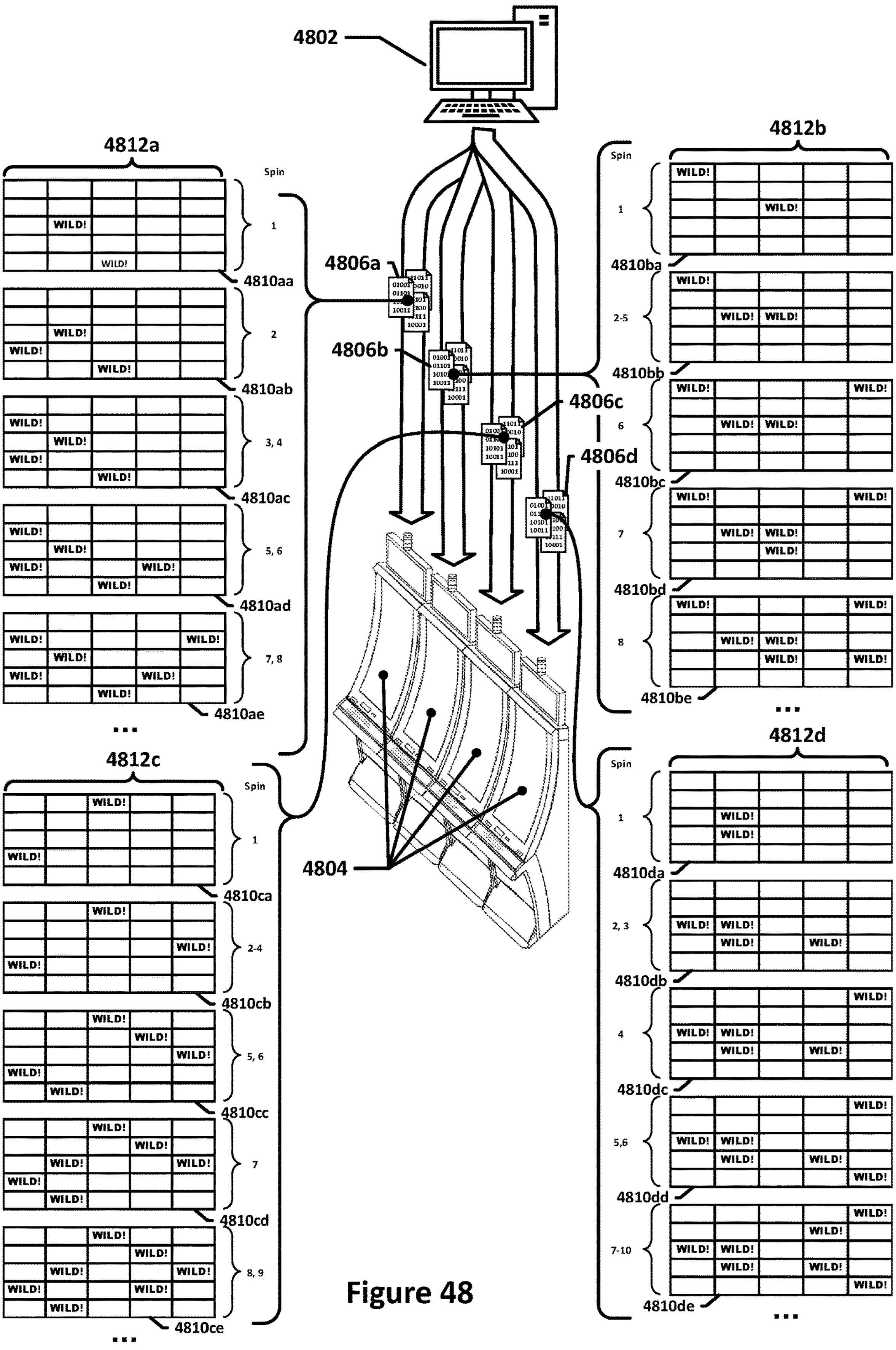
FIG. 48 depicts another example sticky wild pattern distribution system.

FIG. 48 depicts another example sticky wild pattern distribution system. The system in FIG. 48 is similar to that discussed with respect to FIG. 46, with a TMS 4802 and a plurality of EGMs 4804. In contrast, however, the TMS 4802 provides a different sticky wild dataset 4806 to each EGM 4804. Each different sticky wild dataset 4806 thus defines a different set 4812 of sticky wild sub-patterns 4810. For example, the sticky wild dataset 4806*a* defines a set 4812*a* of sticky wild sub-patterns 4810*aa* through 4810*ae* (and beyond). Similarly, the sticky wild dataset 4806*b* defines a set 4812*b* of sticky wild sub-patterns 4810*ba* through 4810*be* (and beyond), and so forth. It will be appreciated that in some implementations, a similar system may be provided in which the sticky wild datasets each include information defining only a single sticky wild pattern (but where those sticky wild patterns may vary between sticky wild datasets).

Figure 49:
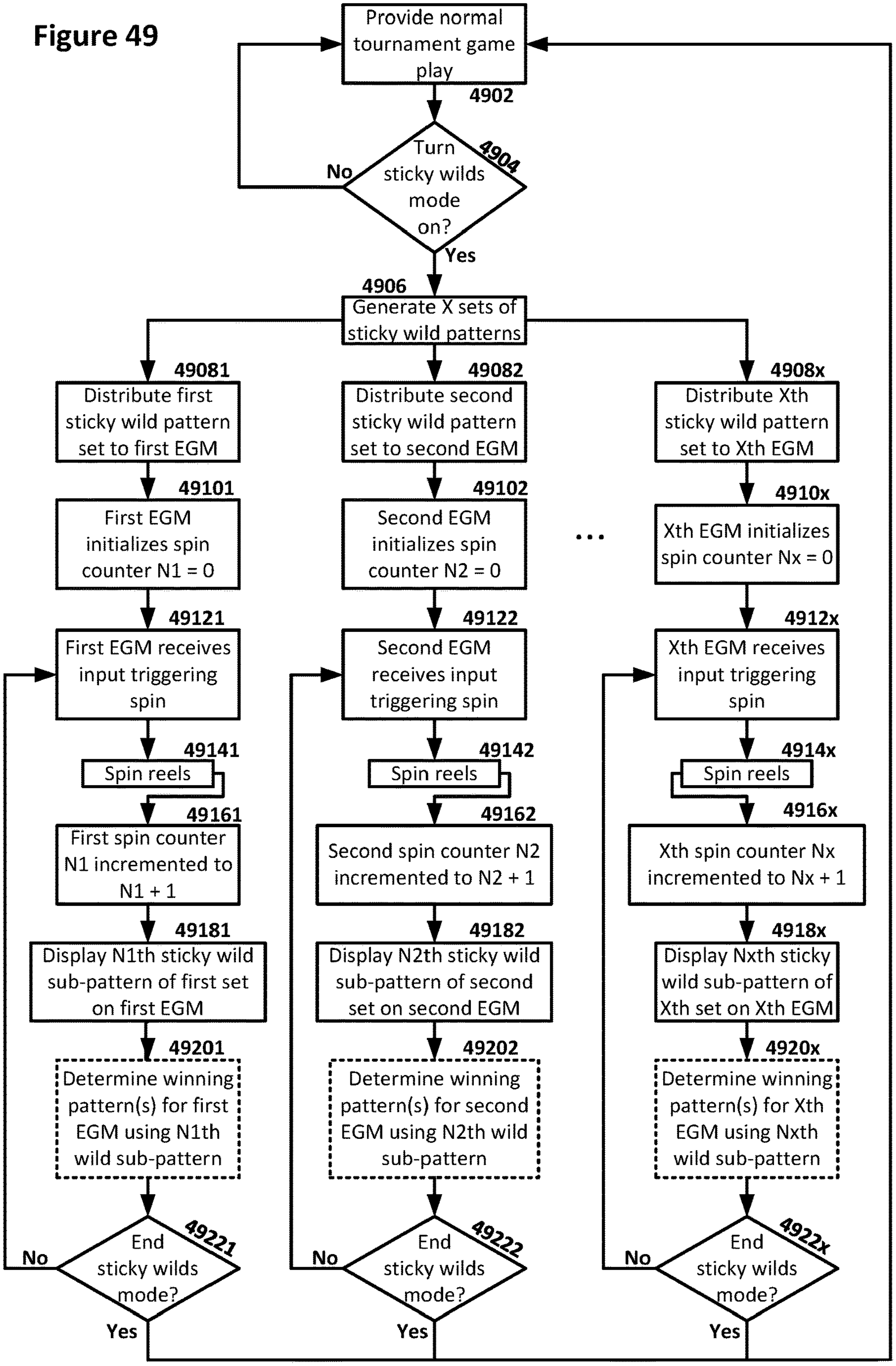
FIG. 49 depicts a flow chart of a technique for implementing sticky wilds using a system such as is depicted in FIG. 48.

FIG. 49 depicts a flow chart of a technique for implementing sticky wilds using a system such as is depicted in FIG. 48. In FIG. 49, the technique may begin in block 4902, in which tournament game play (or other game play) may be provided. For example, a TMS may be used to cause a plurality of EGMs, such as EGMs 4804, to provide game play for a tournament session in which a plurality of players all play the same wagering game at the same time on different EGMs 4804 and compete against each other for a maximum score achieved during the tournament session.

In block 4904, the TMS 4802 (or other system) may make a determination as to whether a sticky wilds mode should be enabled or turned on, e.g., for the EGMs 4804. If it is determined in block 4904 that the sticky wilds mode should not be turned on, then the technique may return to block 4902 where further tournament game play may be provided on the EGMs 4804. If it is determined in block 4904 that the sticky wilds mode should be turned on, then the technique may proceed to block 4906, in which the TMS 4802 may generate or obtain a different set of sticky wild sub-patterns for each EGM 4804 before distributing a corresponding sticky wild dataset 4806 representing the set of sticky wild sub-patterns generated or obtained for each EGM 4804 to each individual EGM 4804 in blocks 4908$_1$ through 4908$_x$.

In block 4910$_1$, a first EGM 4804 may be caused to initialize a first spin counter $N_1$ to zero (or otherwise initialize some mechanism that allows determination of how many spins have occurred while the sticky wilds mode is enabled). In block 4912$_1$, the first EGM 4804 may receive an input indicating that a player has pressed a "spin" button or other input device to indicate that a play or spin of the game is desired. In block 4914$_1$, the first EGM 4804 may cause the reels displayed on the one or more displays of the first EGM 4804 to spin (or otherwise cause a game outcome to be provided). In block 4916$_1$, the first spin counter $N_1$ may be incremented by 1 to track the number of spins that have occurred while the sticky wilds mode is enabled. In block 4918$_1$, the first EGM 4804 may cause the $N_1^{th}$ sticky wild sub-pattern of the first set of sticky wild sub-patterns to be displayed on one or more displays of the first EGM 4804. A determination may then be made in block 4920$_1$ as to whether one or more winning patterns result from the displayed sticky wilds and the other symbols that result from the spin. If so, then a corresponding award may be provided to the player. After resolving whether a winning pattern was obtained, the technique may progress to block 4922$_1$, in which a determination may be made as to whether sticky wilds mode is to be continued. If so, then the technique may return to block 4912$_1$. If not, however, then the technique may return to block 4902.

It will be understood that blocks 4908$_2$ through 4922$_2$ and blocks 4908$_x$ through 4922$_x$ may involve similar actions, but with respect to other EGMs 4804. The technique and system of FIGS. 48 and 49 allow for centralized control of sticky wild pattern creation and distribution, as with the systems and techniques of FIGS. 44 through 47, but allow each player to play using a different progression of sticky wild patterns. This may avoid situations where players feel as if every player is getting the same benefit (or nearly the same benefit), and may lead to players placing a higher value on, or experiencing heightened anticipation for, the benefit than they might with sticky wild patterns in which all players generally receive the same patterns.

Figure 50:
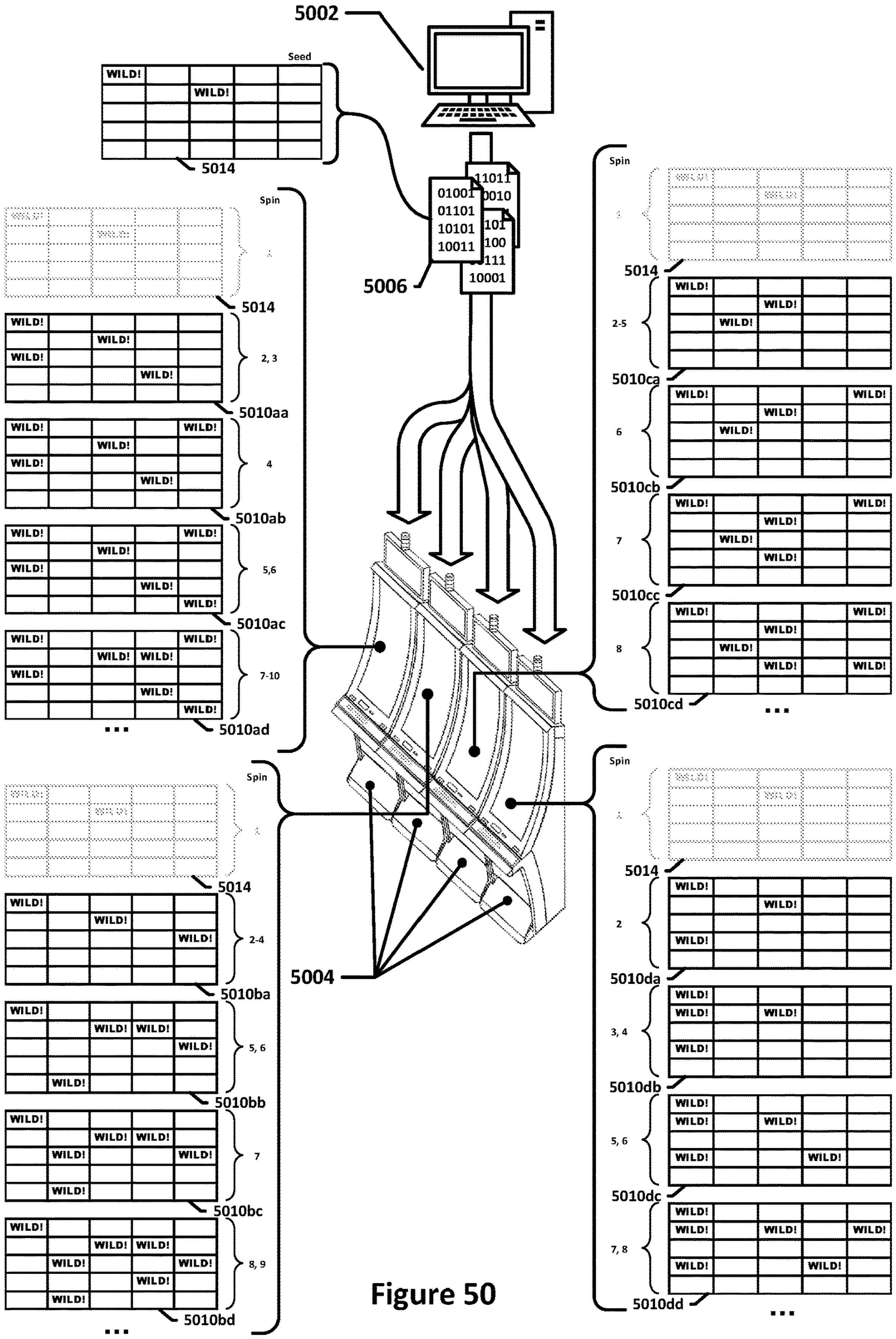
FIG. 50 depicts another example sticky wild pattern distribution system.

FIG. 50 depicts another example sticky wild pattern distribution system. The system in FIG. 50 is similar to that discussed with respect to FIG. 44, with a TMS 5002 and a plurality of EGMs 5004. As with the implementation of FIG. 44, the TMS 5002 may generate a single sticky wild pattern—in this case, referred to as a sticky wild seed pattern 5014. The sticky wild seed pattern is then distributed to the EGMs 5004, where it is used by each EGM as the starting sticky wild pattern when sticky wilds mode is enabled. This is similar, for example, to how the implementation of FIG. 44 operates. Where the implementation of FIG. 50 differs from that of FIG. 44 is that in the implementation of FIG. 50, the EGMs 5004 are configured to each individually randomly determine additional subsequent sticky wild symbol occurrences and the placements thereof, e.g., randomly select, for plays of the underlying symbol-based game, zero or more of the symbol positions associated therewith for display of a wild symbol. For example, all of the EGMs 5004 use the same sticky wild seed pattern 5014 in FIG. 50 as the sticky wild pattern that is applied during the first spin. However, the subsequent spins for each EGM 5004 utilize different sticky wild patterns. For example, the left-most EGM 5004 generates sticky wild patterns 5010*aa*, 5010*ab*, 5010*ac*, and 5010*ad* for the second/third, fourth, fifth/sixth, and seven through tenth spins, respectively. Similarly, the right-most EGM 5004 generates sticky wild patterns 5010*da*, 5010*db*, 5010*dc*, and 5010*dd* for the second, third/fourth, fifth/sixth, and seventh/eighth spins, respectively. However, all of the players started from the same sticky wild seed pattern 5014.

Figure 51A:
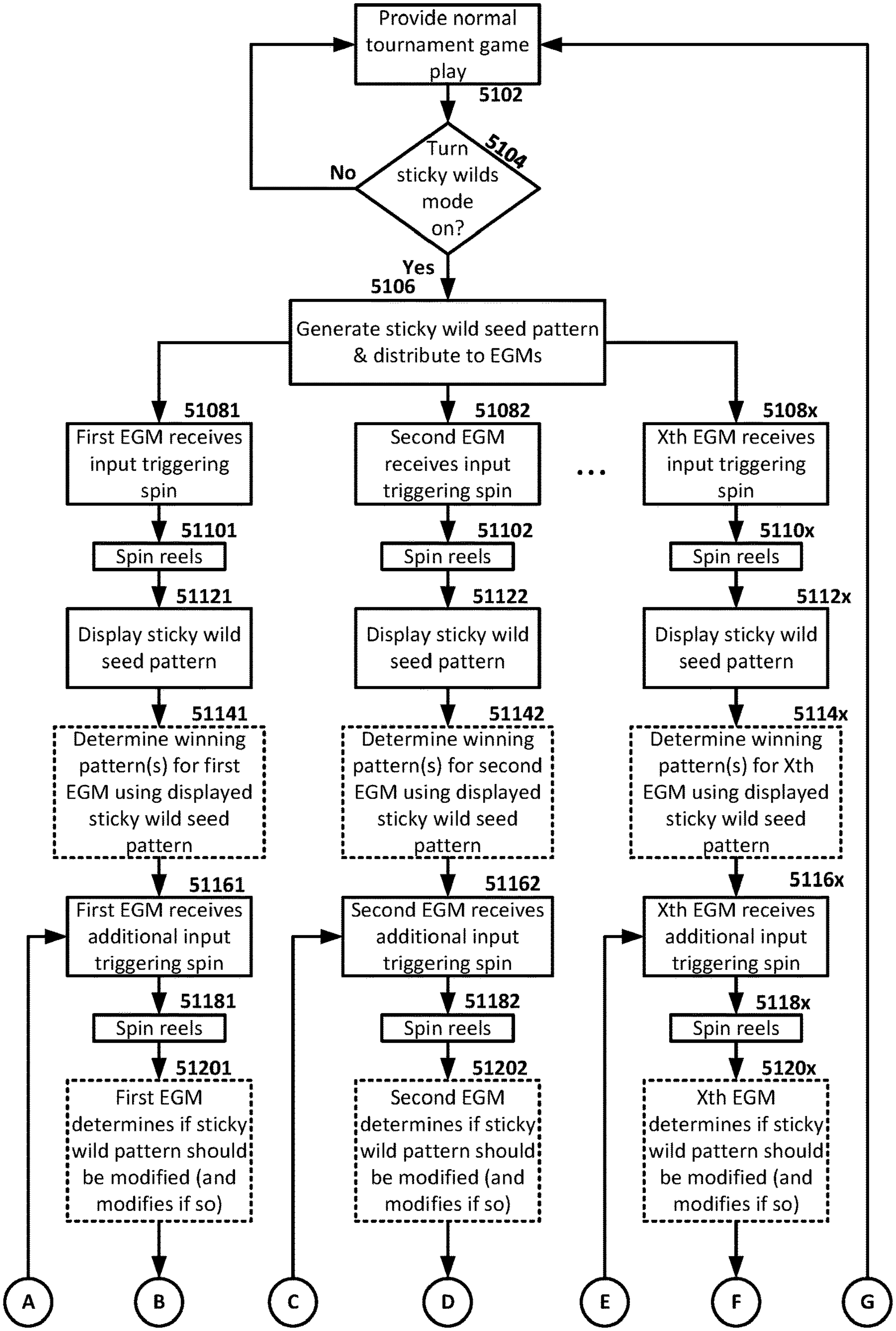
FIGS. 51A and 51B depict a flow chart of a technique for implementing sticky wilds using a system such as is depicted in FIG. 50.
Figure 51B:
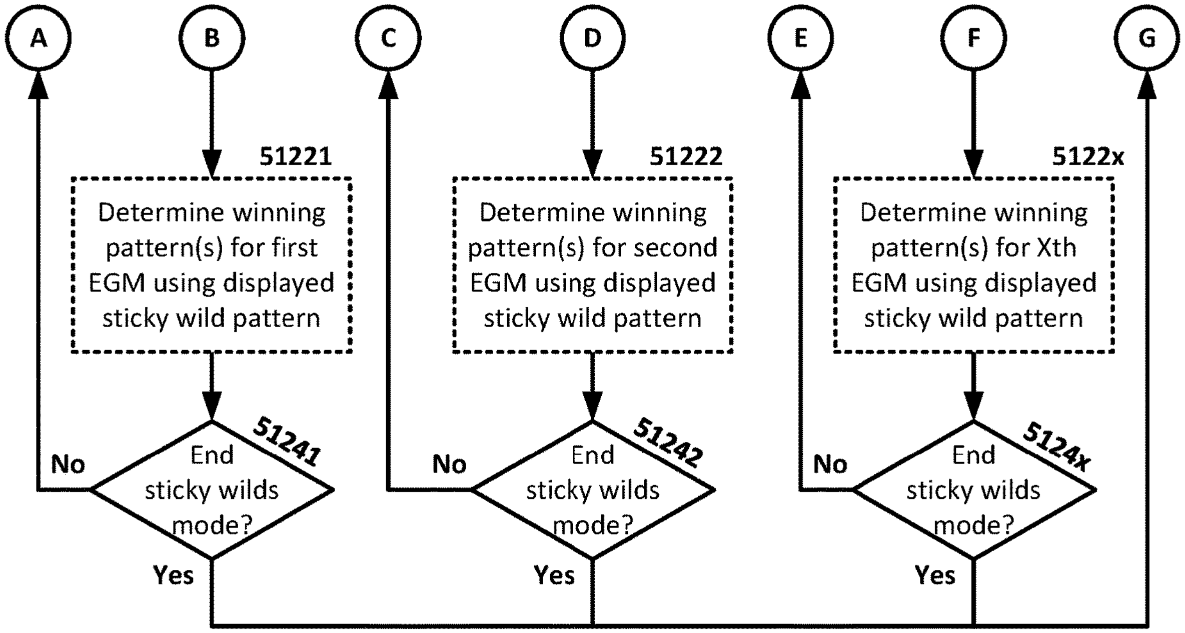

FIGS. 51A and 51B depict a flow chart of a technique for implementing sticky wilds using a system such as is depicted in FIG. 50. In FIG. 51, the technique may begin in block 5102, in which tournament game play (or other game play) may be provided. For example, a TMS may be used to cause a plurality of EGMs, such as EGMs 5004, to provide game play for a tournament session in which a plurality of players all play the same wagering game at the same time on different EGMs 5004 and compete against each other for a maximum score achieved during the tournament session.

In block 5104, the TMS 5002 (or other system) may make a determination as to whether a sticky wilds mode should be enabled or turned on, e.g., for the EGMs 5004. If it is determined in block 5104 that the sticky wilds mode should not be turned on, then the technique may return to block 5102 where further tournament game play may be provided on the EGMs 5004. If it is determined in block 5104 that the sticky wilds mode should be turned on, then the technique may proceed to block 5106, in which the TMS 5002 may generate or obtain a sticky wild seed pattern 5014 for the EGMs 5004 and then distribute them to those EGMs 5004.

In block $\mathbf{5108}_1$, the first EGM 5004 may receive an input indicating that a player has pressed a "spin" button or other input device to indicate that a play or spin of the game is desired. In block $\mathbf{5110}_1$, the first EGM 5004 may cause the reels displayed on the one or more displays of the first EGM 5004 to spin (or otherwise cause a game outcome to be provided) and may, in block $\mathbf{5112}_1$, cause the sticky wild seed pattern 5014 to be displayed. A determination may then be made in block $\mathbf{5114}_1$ as to whether one or more winning patterns result from the displayed sticky wilds and the other symbols that result from the spin. If so, then a corresponding award may be provided to the player. After the sticky wild seed pattern 5014 has been displayed to the player, a subsequent input may be received in block $\mathbf{5116}_1$ that triggers an additional reel spin in block $\mathbf{5118}_1$. The first EGM 5004 may then determine in block $\mathbf{5120}_1$ if the displayed sticky wild pattern should be modified, e.g., by adding one or more additional sticky wild symbols. If it is determined in block $\mathbf{5120}_1$ that additional sticky wild symbols are to be added, then the first EGM 5004 may perform the appropriate modification of the sticky wild pattern. A determination may then be made in block $\mathbf{5122}_1$ as to whether one or more winning patterns result from the displayed sticky wilds and the other symbols that result from the spin. If so, then a corresponding award may be provided to the player.

After resolving whether a winning pattern was obtained, the technique may progress to block $\mathbf{5124}_1$, in which a determination may be made as to whether sticky wilds mode is to be continued. If so, then the technique may return to block $\mathbf{5116}_1$. If not, however, then the technique may return to block 5102.

It will be understood that blocks $\mathbf{5108}_2$ through $\mathbf{5124}_2$ and blocks $\mathbf{5108}_x$ through $\mathbf{5124}_x$ may involve similar actions, but with respect to other EGMs 5004. The technique and system of FIGS. 50 and 51 allow for centralized control of sticky wild pattern creation and distribution, as with the systems and techniques of FIGS. 44 through 47, but allow each player to play using a different progression of sticky wild patterns. This may avoid situations where players feel as if every player is getting the same benefit (or nearly the same benefit), and may lead to players placing a higher value on, or experiencing heightened anticipation for, the benefit than they might with sticky wild patterns in which all players generally receive the same patterns.

The implementation of FIGS. 50 and 51A/51B allows players to all begin with the same starting sticky wild pattern, thus giving players the impression that each player started on an even playing field, but then allows the sticky wild patterns for each player to evolve independently throughout the course of the sticky wilds feature, thereby allowing each player's experience to be unique.

Figure 52:
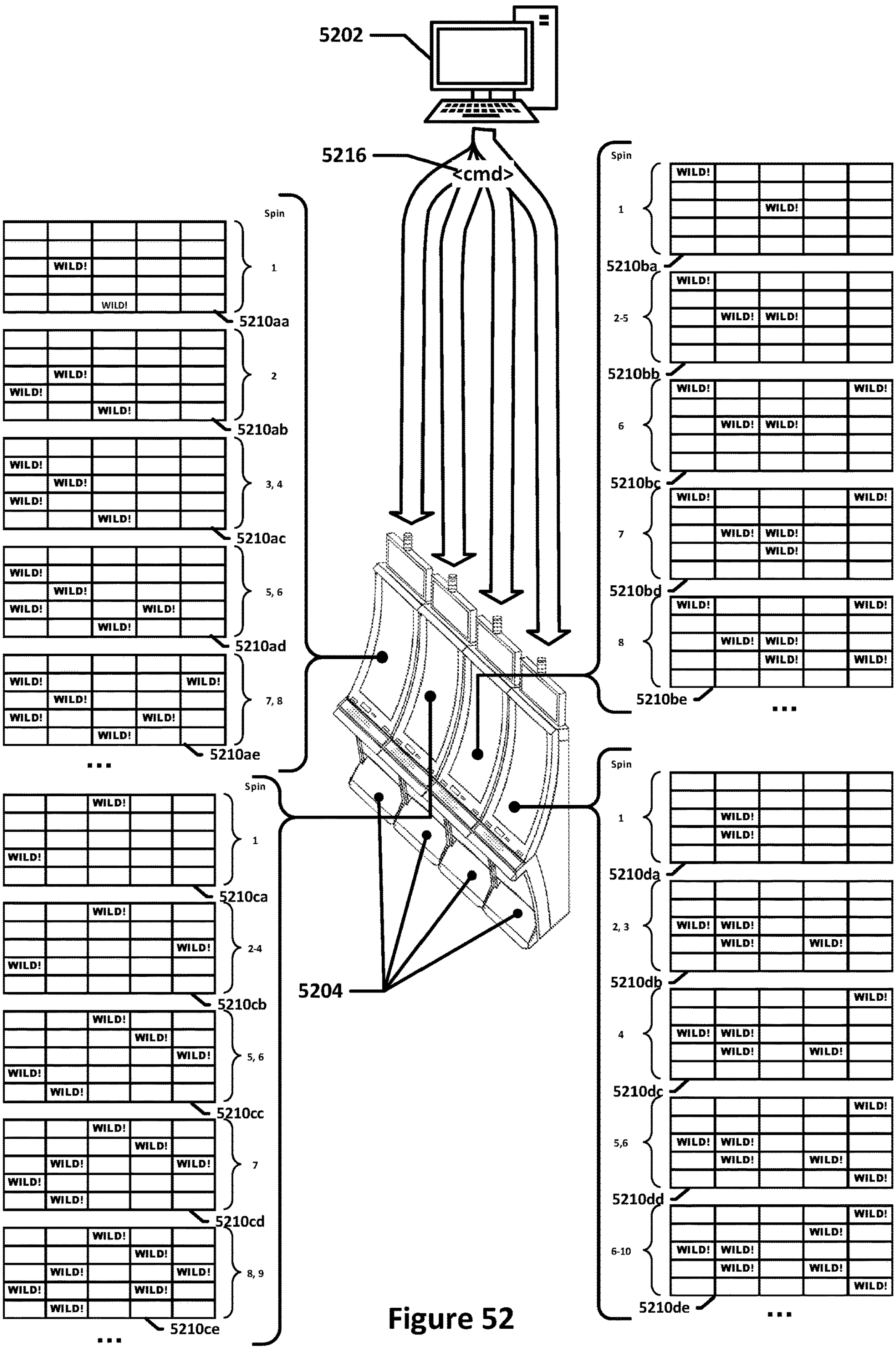
FIG. 52 depicts another example sticky wild pattern distribution system.

FIG. 52 depicts another example sticky wild pattern distribution system. In FIG. 52, a TMS 5202 is shown that is communicatively connected with a plurality of EGMs 5204. The TMS 5202 may send a command 5216 to the EGMs 5204 to cause each of the EGMs 5204 to enter a sticky wilds mode. Each EGM 5204 may, while in sticky wilds mode, randomly determine, during each spin or play of the wagering game, whether any of the selected symbols are sticky wild symbols that will remain in place for further spins during the sticky wilds mode.

For example, the left-most gaming machine 5204 has generated a sticky wild pattern 5210*aa* by selecting two sticky wild symbols in the first spin. In the second spin, the same EGM 5204 has kept the two previous sticky wild symbols in place and has selected and displayed a third sticky wild symbol. In the third spin, the left-most EGM 5204 has selected yet another sticky wild symbol, leaving four sticky wild symbols displayed. The fourth spin did not result in any additional sticky wilds being selected, and so forth. As can be seen, the patterns that develop on each player's EGM 5204 may be completely different and independent, although they may converge as more and more sticky wild symbols are selected.

Figure 53:
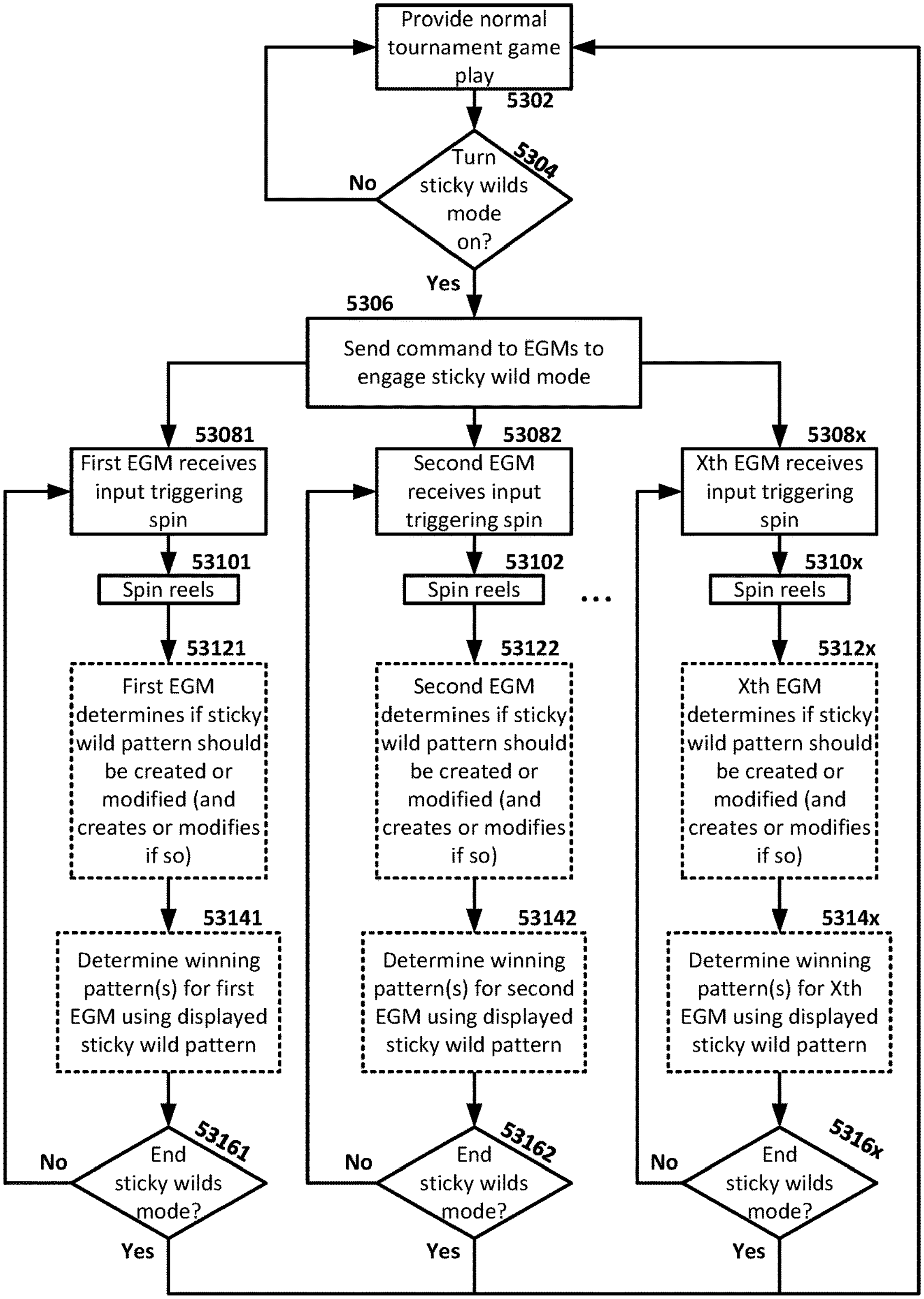
FIG. 53 depicts a flow chart of a technique for implementing sticky wilds using a system such as is depicted in FIG. 52.

FIG. 53 depicts a flow chart of a technique for implementing sticky wilds using a system such as is depicted in FIG. 52. In FIG. 53, the technique may begin in block 5302, in which tournament game play (or other game play) may be provided. For example, a TMS may be used to cause a plurality of EGMs, such as EGMs 4804, to provide game play for a tournament session in which a plurality of players all play the same wagering game at the same time on different EGMs 4804 and compete against each other for a maximum score achieved during the tournament session.

In block 5304, the TMS 5202 (or other system) may make a determination as to whether a sticky wilds mode should be enabled or turned on, e.g., for the EGMs 5204. If it is determined in block 5304 that the sticky wilds mode should not be turned on, then the technique may return to block 5302 where further tournament game play may be provided on the EGMs 5204. If it is determined in block 5304 that the sticky wilds mode should be turned on, then the technique may proceed to block 5306, in which the TMS 5202 may send a command 5216 to the EGMs 5204 to cause the EGMs 5204 to each initiate sticky wilds mode.

In block $\mathbf{5308}_1$, the first EGM 5204 may receive an input indicating that a player has pressed a "spin" button or other input device to indicate that a play or spin of the game is desired. In block $\mathbf{5310}_1$, the first EGM 5204 may cause the reels displayed on the one or more displays of the first EGM 5204 to spin (or otherwise cause a game outcome to be provided) and may, in block $\mathbf{5312}_1$, determine whether a sticky wild pattern should be created by selecting one or more sticky wild symbols for display (or, if a sticky wild pattern is already displayed, if the displayed sticky wild pattern should be updated or modified to include additional sticky wild symbols. It will be understood that in some implementations, blocks 5310 and 5312 may be combined, e.g., one or more of the reel strips may have one or more sticky wild symbols on them, and in the course of spinning the reels and then stopping the reels to select various symbols, one or more of the sticky wild symbols may be selected for display (this also applies to the implementations discussed earlier herein).

A determination may then be made in block $\mathbf{5314}_1$ as to whether one or more winning patterns result from the displayed sticky wilds and the other symbols that result from the spin. If so, then a corresponding award may be provided to the player.

After resolving whether a winning pattern was obtained, the technique may progress to block $\mathbf{5316}_1$, in which a determination may be made as to whether sticky wilds mode is to be continued. If so, then the technique may return to block 5308$_1$. If not, however, then the technique may return to block 5302.

It will be understood that blocks 5308$_2$ through 5316$_2$ and blocks 5308$_x$ through 5316$_x$ may involve similar actions, but with respect to other EGMs 5204. The technique and system of FIGS. 52 and 53 allow for centralized triggering of sticky wild pattern creation, but allow each player to play using a different progression of sticky wild patterns. This may avoid situations where players feel as if every player is getting the same benefit (or nearly the same benefit), and may lead to players placing a higher value on, or experiencing heightened anticipation for, the benefit than they might with sticky wild patterns in which all players generally receive the same patterns.

As discussed above, a sticky wilds feature may be implemented in a variety of ways. While the above examples have explored several possible ways of providing sticky wilds functionality, each providing somewhat unique gameplay characteristics and effects, the following examples, may provide even more insight.

As noted earlier, a sticky wilds mode may be triggered by a TMS at a specified point (e.g., halfway through) in a tournament session. For example, all players in a tournament session may have a sticky wilds mode simultaneously activated for 10 seconds. Any wild symbols that land (or are selected for display as part of the outcome) once sticky wilds mode is initiated will "stick" on the screen through any other spins made during the 10-second period. Just before the sticky wilds mode starts, or simultaneously therewith, overhead signage, leaderboard, EGM toppers, top screens, bottom screens, and/or virtual button decks may, in some implementations, display the message: "Sticky Wilds next 10 seconds!"

In some implementations, after this intro or lead-in, one or more of the screens (sign, leaderboard, top screen, bottom screen, topper, and/or button deck) may display messaging that sticky wilds mode is active, along with an indicator of the time remaining for the sticky wilds mode.

When the reels stop, any landed wild symbol, i.e., a wild symbol selected for display as part of the game outcome, may remain at the designated reel position for subsequent spins during the 10-second feature. In some implementations, any landed wild symbol may be accompanied by a "burst" animation to show that it is now sticky.

In some implementations, sticky wilds that are displayed as part of a sticky wilds mode may be configured to be time-, spin-, or outcome-limited. For example, each displayed sticky wild symbol may only be displayed for a predetermined period of time after it is first displayed (e.g., 2, 3, 4, 5, 6, 7, 8, 9, 10, etc. seconds), for a specified number of plays after it is first displayed (e.g., 2, 3, 4, 5, 6, 7, 8, 9, 10, etc. plays), or only until that symbol has been used to complete a specified number of winning outcome patterns (e.g., 1, 2, 3, 4, 5, 6, 7, 8, 9, 10, etc. winning outcome patterns). Of course, the end of sticky wilds mode may also cause such "stuck" wild symbols to no longer be displayed, as discussed earlier.

In some implementations, as the reels continue to spin and stop, the sticky wilds may stay in place and animate to show they will remain stuck.

In some implementations, when the ten second duration (or whatever the duration of the sticky wilds mode has been set to be) of the sticky wilds mode is up, the sign, the topper, and/or the bottom screen may display "Sticky Wilds complete!" while "Sticky Wilds Time Left 0:00" displays on the top screen, the bottom screen, and/or the leaderboard. When this message is finished, all messaging related to Sticky Wilds may go away and the game continues like normal.

As noted earlier, in some implementations, to activate a sticky wilds round, the multiplayer game server (or tournament management system) may send an event notice, e.g., command, to the EGMs. The event notice notifies the EGMs to start tracking wild symbol landing positions and maintaining the landed wild symbols for a specific timeframe, e.g., until the end of the sticky wilds mode. In some implementations, the EGMs do not utilize any initial or predetermined sticky wild patterns and instead simply accumulate sticky wilds as a player continues to push the play button. For example, when a sticky wilds mode activates, in a 3×5 slot game, the first vertical reel (reel 1) could return one wild at the middle position of the reel after the RNG call. The EGM would then record that a wild appeared at the middle position of reel 1 (e.g., using an array structure). When a player hits the play button to pull the RNG stop position for reel 1, regardless of the symbol identified at the middle position of reel 1, the EGM may replace the symbol with the stored wild symbol (or simply keep it in place as an overlay). The EGM may also do this for other wild symbols located on other reel strips if prior spins produced wild symbols. The EGMs may track and accumulate the number of wild symbols that replace identified symbols for subsequent spins until the sticky wilds mode ends.

In implementations where the TMS or other device provides predetermined patterns of wild symbols, the sticky wild pattern(s) that is sent to the EGMs may be used by the EGMs to adjust any spin outcome determined thereby such that sticky wild symbols appear to travel with the reels and then land on the symbol locations designated as the sticky wild locations. As discussed above, in some implementations, the sticky wild pattern may be used for the entire sticky wilds model. In some such implementations, additional wild symbols that the EGMs produce can be added to the initial sticky wild pattern that the TMS provides.

In some implementations, when the TMS sends an event notification, the EGM may utilize a weighted table to determine or select a sticky wild pattern (TMS-provided sticky wild patterns may also be similarly determined or selected). Similar to the server scenario, the EGM may add more sticky wild symbols to the sticky wild pattern if the EGM generates or lands additional wild symbols during the sticky wilds mode. Such implementations may be useful for producing varying wild patterns across multiple EGMs.

It will be appreciated that for implementations in which predetermined sticky wild patterns are used by EGMs (according to any of the scenarios discussed above), such patterns (or the data that defines them) may be pre-generated at any time and distributed to the EGMs at any point in time after they are generated, including well before a sticky wilds mode utilizing such a pattern is activated. In such implementations, sticky wild patterns may be stored on the EGMs for later retrieval/reference, and the TMS or other centralized system may send a command to the EGMs that causes the EGMs to activate a sticky wilds mode using one of the sticky wild patterns stored on the EGM. Such a command may, in some implementations, be a real-time command (causing the EGM to begin to activate the sticky wilds mode immediately upon receipt) or may be a scheduling command that causes the EGM to schedule activation of the sticky wilds mode at a particular time, e.g., at the one-minute mark in a tournament session or at a particular time of day. In some implementations, the TMS may simply send one configuration command that instructs the EGMs to activate the sticky wilds mode using one of the stored sticky wild patterns at a given time, e.g., one minute after the start of a tournament session, during each tournament session in which the EGM participates. This setting may then be applied to multiple tournament sessions in which the EGM participates. It will be further understood that in some implementations, the particular sticky wild pattern used by the EGM may be assigned/designated by the TMS (for example, when all EGMs are to use the same sticky wild pattern, it may be most efficient to have a central designator of which pattern to use), whereas in other implementations, the particular sticky wild pattern used by the EGM may be randomly selected, e.g., through a randomly generated number that is used to randomly pick a stored sticky wild pattern from, for example, a look-up table listing all of the sticky wild patterns stored on the EGM.

It will also be appreciated, as suggested above, that sticky wilds mode may be activated on EGMs responsive to, at least in part, receiving, by the EGMs, a notification or command from the TMS (or other centralized system) that the sticky wilds mode is to be activated. This allows for centralized control of sticky wilds mode triggering and may help prevent scenarios where sticky wilds mode is enabled at different times on EGMs during a session, which may make players feel as if their competitors are receiving an unfair advantage.

It is to be understood that the phrases "for each<item> of the one or more <items>," "each<item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

one or more processors and one or more memory devices, wherein:
- the one or more processors and the one or more memory devices are operably connected, and
- the one or more memory devices store computer-executable instructions for controlling the one or more processors to:
  - a) receive information identifying a plurality of gaming devices that are each associated with a common tournament session of a gaming tournament,
  - b) generate one or more sticky wild datasets, each sticky wild dataset defining one or more sticky wild patterns, each sticky wild pattern providing information designating a corresponding first set of one or more symbol positions associated with a symbol-based game that are to have a wild status,
  - c) distribute a sticky wild dataset of the one or more sticky wild datasets to each gaming device of the plurality of gaming devices in association with the common tournament session, and
  - d) transmit first information to each gaming device of the plurality of gaming devices that is configured to cause the gaming devices in the plurality of gaming devices to simultaneously initiate a sticky wilds feature for the common tournament session at a predetermined first point in time after the common tournament session starts and using the sticky wild datasets distributed to the gaming devices and one or more lookup tables to determine sticky wild patterns provided during the sticky wilds feature.

2. The electronic gaming system of claim 1, wherein the first information is further configured to cause the gaming devices in the plurality of gaming devices to simultaneously terminate the sticky wilds feature for the common tournament session on each gaming device of the plurality of gaming devices at a predetermined second point in time after the first point in time.

3. The electronic gaming system of claim 1, wherein the first information transmitted to each gaming device of the plurality of gaming devices includes the sticky wild dataset distributed thereto.

4. The electronic gaming system of claim 1, wherein the one or more memory devices further store additional computer-executable instructions for controlling the one or more processors to, for the common tournament session:
- generate a single sticky wild dataset defining a single sticky wild pattern for the common tournament session,
- distribute the single sticky wild dataset to each gaming device of the plurality of gaming devices, and
- cause the gaming devices in the plurality of gaming devices to simultaneously initiate the sticky wilds feature for the common tournament session at a predetermined first point in time after the common tournament session starts and using the single sticky wild dataset distributed to the gaming devices.

5. The electronic gaming system of claim 1, wherein the one or more memory devices further store additional computer-executable instructions for controlling the one or more processors to, for the common tournament session:
- generate a single sticky wild dataset defining a plurality of sticky wild sub-patterns, and
- distribute the single sticky wild dataset to each gaming device of the plurality of gaming devices.

6. The electronic gaming system of claim 5, wherein the sticky wild sub-patterns are sequentially defined, each successive sticky wild sub-pattern of the sticky wild sub-patterns includes information at least designating zero or more additional symbol positions associated with the symbol-based game that are to have the wild status and are not designated by the information included in the sticky wild sub-pattern immediately preceding that successive sticky wild sub-pattern.

7. The electronic gaming system of claim 1, wherein the one or more memory devices further store additional computer-executable instructions for controlling the one or more processors to, for the common tournament session:

generate multiple sticky wild datasets, each sticky wild dataset defining multiple sticky wild sub-patterns, and distribute a different sticky wild dataset of the multiple sticky wild datasets to each gaming device of the plurality of gaming devices, wherein at least two of the sticky wild datasets are different from each other.

8. One or more computer-readable media storing computer-executable instructions which, when executed by one or more processors, control the one or more processors to:

a) receive information identifying a plurality of gaming devices that are each associated with a common tournament session of a gaming tournament, b) generate one or more sticky wild datasets, each sticky wild dataset defining one or more sticky wild patterns, each sticky wild pattern providing information designating a corresponding first set of one or more symbol positions associated with a symbol-based game that are to have a wild status, c) distribute a sticky wild dataset of the one or more sticky wild datasets to each gaming device of the plurality of gaming devices in association with the common tournament session, and d) transmit first information to each gaming device of the plurality of gaming devices that is configured to cause the gaming devices in the plurality of gaming devices to simultaneously initiate a sticky wilds feature for the common tournament session at a predetermined first point in time after the common tournament session starts and using the sticky wild datasets distributed to the gaming devices and one or more lookup tables to determine sticky wild patterns provided during the sticky wilds feature.

9. The one or more computer-readable media of claim 8, wherein the first information is further configured to cause the gaming devices in the plurality of gaming devices to simultaneously terminate the sticky wilds feature for the common tournament session on each gaming device of the plurality of gaming devices at a predetermined second point in time after the first point in time.

10. The one or more computer-readable media of claim 8, wherein the first information that is to be transmitted to each gaming device of the plurality of gaming devices includes the sticky wild dataset distributed thereto.

11. The one or more computer-readable media of claim 8, wherein the one or more computer-readable media further store additional computer-executable instructions which, when executed by the one or more processors, cause the one or more processors to, for the common tournament session:

generate a single sticky wild dataset defining a single sticky wild pattern for the common tournament session, distribute the single sticky wild dataset to each gaming device of the plurality of gaming devices, and cause the gaming devices in the plurality of gaming devices to simultaneously initiate the sticky wilds feature for the common tournament session at a predetermined first point in time after the common tournament session starts and using the single sticky wild dataset distributed to the gaming devices.

12. The one or more computer-readable media of claim 8, wherein the one or more computer-readable media further store additional computer-executable instructions which, when executed by the one or more processors, cause the one or more processors to, for the common tournament session:

generate a single sticky wild dataset defining a plurality of sticky wild sub-patterns, and distribute the single sticky wild dataset to each gaming device of the plurality of gaming devices.

13. The one or more computer-readable media of claim 12, wherein the sticky wild sub-patterns are sequentially defined, each successive sticky wild sub-pattern of the sticky wild sub-patterns includes information at least designating zero or more additional symbol positions associated with the symbol-based game that are to have the wild status and are not designated by the information included in the sticky wild sub-pattern immediately preceding that successive sticky wild sub-pattern.

14. The one or more computer-readable media of claim 8, wherein the one or more computer-readable media further store additional computer-executable instructions which, when executed by the one or more processors, cause the one or more processors to, for the common tournament session:

generate multiple sticky wild datasets, each sticky wild dataset defining multiple sticky wild sub-patterns, and distribute a different sticky wild dataset of the multiple sticky wild datasets to each gaming device of the plurality of gaming devices, wherein at least two of the sticky wild datasets are different from each other.

15. A method, executed using one or more processors, comprising:

a) receiving information identifying a plurality of gaming devices that are each associated with a common tournament session of a gaming tournament;

b) generating one or more sticky wild datasets, each sticky wild dataset defining one or more sticky wild patterns, each sticky wild pattern providing information designating a corresponding first set of one or more symbol positions associated with a symbol-based game that are to have a wild status;

c) distributing a sticky wild dataset of the one or more sticky wild datasets to each gaming device of the plurality of gaming devices in association with the common tournament session; and d) transmitting first information to each gaming device of the plurality of gaming devices that is configured to cause the gaming devices in the plurality of gaming devices to simultaneously initiate a sticky wilds feature for the common tournament session at a predetermined first point in time after the common tournament session starts and using the sticky wild datasets distributed to the gaming devices and one or more lookup tables to determine sticky wild patterns provided during the sticky wilds feature.

16. The method of claim 15, wherein the first information is further configured to cause the gaming devices in the plurality of gaming devices to simultaneously terminate the sticky wilds feature for the common tournament session on each gaming device of the plurality of gaming devices at a predetermined second point in time after the first point in time.

17. The method of claim 15, further comprising, for the common tournament session:

generating the one or more sticky wild datasets by generating a single sticky wild dataset defining a single sticky wild pattern for the common tournament session, distributing the sticky wild dataset of the one or more sticky wild datasets to each gaming device of the plurality of gaming devices in association with the common tournament session by distributing the single sticky wild dataset to each gaming device of the plurality of gaming devices, and causing the gaming devices in the plurality of gaming devices to simultaneously initiate the sticky wilds feature for the common tournament session at a predetermined first point in time after the common tournament session starts includes causing the gaming devices in the plurality of gaming devices to simultaneously initiate the sticky wilds feature for the common tournament session at the predetermined first point in time after the common tournament session starts using the single sticky wild dataset distributed to the gaming devices.

18. The method of claim 15, further comprising, for the common tournament session:

generating the one or more sticky wild datasets by generating a single sticky wild dataset defining a plurality of sticky wild sub-patterns, and distributing the sticky wild dataset of the one or more sticky wild datasets to each gaming device of the plurality of gaming devices in association with the common tournament session by distributing the single sticky wild dataset to each gaming device of the plurality of gaming devices.

19. The method of claim 18, wherein the sticky wild sub-patterns are sequentially defined, each successive sticky wild sub-pattern of the sticky wild sub-patterns includes information at least designating zero or more additional symbol positions associated with the symbol-based game that are to have the wild status and are not designated by the information included in the sticky wild sub-pattern immediately preceding that successive sticky wild sub-pattern.

20. The method of claim 15, further comprising, for the common tournament session:

generating the one or more sticky wild datasets by generating multiple sticky wild datasets, each sticky wild dataset defining multiple sticky wild sub-patterns, and distributing the sticky wild dataset of the one or more sticky wild datasets to each gaming device of the plurality of gaming devices in association with the common tournament session by distributing a different sticky wild dataset of the multiple sticky wild datasets to each gaming device of the plurality of gaming devices, wherein at least two of the sticky wild datasets are different from each other.

* * * * *